United States Patent
Darling, III

(10) Patent No.: US 8,505,959 B2
(45) Date of Patent: Aug. 13, 2013

(54) CART TRANSPORTABLE MOBILE MEDICAL CRITICAL CARE POINT OF NEED FIELD INSTALLATION UNITS

(75) Inventor: Charles W. Darling, III, Hampton Bays, NY (US)

(73) Assignee: Valiant Rock, LLC, Hampton Bays, NY (US)

( * ) Notice: Subject to any disclaimer, the term of this patent is extended or adjusted under 35 U.S.C. 154(b) by 524 days.

(21) Appl. No.: 12/387,175

(22) Filed: Apr. 28, 2009

(65) Prior Publication Data

US 2009/0212535 A1 Aug. 27, 2009

Related U.S. Application Data

(63) Continuation-in-part of application No. 11/705,396, filed on Feb. 12, 2007, now Pat. No. 7,775,530, which is a continuation of application No. 11/396,157, filed on Mar. 31, 2006, now Pat. No. 7,461,857, and a continuation of application No. 11/396,158, filed on Mar. 31, 2006, now Pat. No. 7,766,365, which is a continuation-in-part of application No. 10/686,948, filed on Oct. 15, 2003, now Pat. No. 7,150,465, which is a continuation-in-part of application No. 10/431,839, filed on May 7, 2003, now Pat. No. 7,017,939, which is a continuation of application No. 09/989,376, filed on Nov. 21, 2001, now Pat. No. 7,324,237, and a continuation of application No. 09/745,116, filed on Dec. 21, 2000, now Pat. No. 6,270,092.

(60) Provisional application No. 60/246,014, filed on Nov. 6, 2000, provisional application No. 60/233,138, filed on Sep. 18, 2000, provisional application No. 61/125,785, filed on Apr. 28, 2008.

(51) Int. Cl.
*B62B 3/02* (2006.01)

(52) U.S. Cl.
USPC .............. 280/651; 280/640; 5/626; 5/627

(58) Field of Classification Search
USPC .............. 280/640, 651; 5/626, 627
See application file for complete search history.

(56) References Cited

U.S. PATENT DOCUMENTS

| 806,097 A | 12/1905 | Baumann |
| 910,728 A | 1/1909 | Russell |

(Continued)

FOREIGN PATENT DOCUMENTS

| EP | 041855 | 12/1981 |
| FR | 2708464 | 7/1993 |

(Continued)

OTHER PUBLICATIONS

Mullar Compression Clamp; Narang Medical Limited narang.com/general_orthopedic_instruments/knee_skull_surgery_instruments.php.mullar.pdf.

(Continued)

*Primary Examiner* — Jeffrey J Restifo
(74) *Attorney, Agent, or Firm* — Alfred M. Walker

(57) ABSTRACT

A cart transportable mobile medical emergency response facility includes a plurality of hand carried carts with cargo canisters with interchangeable components for establishing a decentralized mobile medical treatment facility at a disaster or other emergency area with a lack of usable hospital facilities. The rapidly deployable and accessible collection of carts and medical equipment delivers point-of-need critical care in the absence of conventional time consuming and complex assembly of medical response facilities.

14 Claims, 106 Drawing Sheets

(56) References Cited

U.S. PATENT DOCUMENTS

| | | |
|---|---|---|
| 1,109,520 A | 9/1914 | Flower |
| 2,042,598 A | 6/1936 | Harvey |
| 2,467,075 A | 4/1949 | Birnberg |
| 2,479,356 A | 8/1949 | Hennes |
| 2,504,360 A | 4/1950 | Van Auken |
| 2,540,279 A | 2/1951 | Mosier |
| 2,600,362 A | 6/1952 | Harder |
| 2,637,050 A | 5/1953 | Oliver |
| 2,657,069 A | 10/1953 | Quist |
| 2,836,449 A | 4/1954 | Varlonga |
| 2,700,573 A | 1/1955 | Nordgard |
| 2,831,201 A | 4/1958 | Limbach |
| 2,868,559 A | 1/1959 | Vincelette |
| 2,893,580 A | 7/1959 | Fischer |
| 2,918,296 A | 12/1959 | Goodale |
| 2,970,846 A | 2/1961 | Boston |
| 2,978,713 A | 4/1961 | Scalzitti et al. |
| 2,979,338 A | 4/1961 | Dwyer |
| 3,034,801 A | 5/1962 | Huston |
| 3,054,622 A | 9/1962 | Davis et al. |
| 3,073,614 A | 1/1963 | Zinneman |
| 3,093,386 A | 6/1963 | Case |
| 3,159,410 A | 12/1964 | Raymond |
| 3,160,378 A | 12/1964 | Geowey |
| 3,164,392 A | 1/1965 | Lane |
| 3,177,542 A | 4/1965 | James |
| 3,188,108 A | 6/1965 | Davis |
| 3,222,100 A | 12/1965 | Lindzy |
| 3,236,537 A | 2/1966 | Eckman |
| 3,316,993 A | 5/1967 | Weitzner |
| 3,336,060 A | 8/1967 | Bradford |
| 3,363,787 A | 1/1968 | Macomber |
| 3,379,452 A | 4/1968 | Torrisi |
| 3,403,924 A | 10/1968 | Oliveira |
| 3,445,018 A | 5/1969 | Reagan |
| 3,464,607 A | 9/1969 | Grace |
| 3,567,241 A | 3/1971 | Foschino |
| 3,579,829 A | 5/1971 | Sampson |
| 3,580,346 A | 5/1971 | McLaren |
| 3,580,592 A | 5/1971 | Schrecengost |
| 3,581,354 A | 6/1971 | Usiskin |
| 3,687,476 A | 8/1972 | Abbott |
| 3,743,344 A * | 7/1973 | Jameson ............... 296/20 |
| 3,744,838 A | 7/1973 | Jackson |
| 3,813,071 A | 5/1974 | Noryd |
| 3,822,422 A | 7/1974 | Buntyn |
| 3,843,083 A | 10/1974 | Angibaud |
| 3,860,254 A | 1/1975 | Wegener |
| D234,695 S | 4/1975 | Anderson |
| 3,955,249 A | 5/1976 | Shiozaki |
| 3,981,492 A | 9/1976 | Hallmann |
| 3,985,372 A | 10/1976 | Olsson |
| 3,986,746 A | 10/1976 | Chartier |
| 4,023,849 A | 5/1977 | Bethlen |
| 4,037,456 A | 7/1977 | Jarman |
| 4,037,871 A * | 7/1977 | Bourgraf et al. ............ 296/20 |
| 4,045,040 A | 8/1977 | Fails |
| 4,055,354 A | 10/1977 | Sharpe |
| 4,059,282 A | 11/1977 | Prickett |
| 4,063,744 A | 12/1977 | Fraser |
| 4,114,914 A | 9/1978 | Cohen |
| 4,169,550 A | 10/1979 | Williams |
| 4,212,392 A | 7/1980 | McKenzie |
| 4,214,774 A | 7/1980 | Kluge |
| 4,215,877 A | 8/1980 | Pritchett |
| 4,286,800 A | 9/1981 | Lomas |
| 4,300,252 A | 11/1981 | Montooth |
| 4,305,165 A | 12/1981 | Wall, Jr. |
| 4,316,615 A | 2/1982 | Willette |
| 4,392,665 A | 7/1983 | Miller et al. |
| 4,422,665 A | 12/1983 | Hinnant |
| 4,444,405 A | 4/1984 | Barrus |
| 4,457,159 A | 7/1984 | Jarman et al. |
| 4,457,546 A | 7/1984 | Wiant |
| 4,460,188 A | 7/1984 | Maloof |
| D279,646 S | 7/1985 | Ferdinand et al. |
| 4,533,151 A | 8/1985 | Maitland |
| 4,550,925 A | 11/1985 | McDonough |
| 4,579,357 A | 4/1986 | Webster |
| 4,648,388 A | 3/1987 | Steffee |
| D289,852 S | 5/1987 | Tuvesson |
| 4,700,437 A | 10/1987 | Hoshino |
| 4,705,283 A | 11/1987 | Kleisath |
| 4,712,803 A | 12/1987 | Garcia |
| 4,713,850 A | 12/1987 | Flaherty |
| 4,735,424 A | 4/1988 | Stelter |
| 4,743,038 A | 5/1988 | Myers |
| 2,844,383 A | 7/1988 | Deeter |
| 4,789,180 A | 12/1988 | Bell |
| 4,822,065 A | 4/1989 | Enders |
| 4,824,127 A | 4/1989 | Stamm |
| 4,824,167 A | 4/1989 | King |
| 4,826,187 A | 5/1989 | Abbott et al. |
| 4,852,895 A | 8/1989 | Moffitt |
| 4,901,964 A | 2/1990 | McConnell |
| 4,936,595 A | 6/1990 | Cunningham |
| 5,016,792 A | 5/1991 | Jay |
| D318,282 S | 7/1991 | Kern |
| 5,040,807 A | 8/1991 | Snover |
| 5,072,959 A | 12/1991 | Marullo |
| 5,090,368 A | 2/1992 | Berghoefer |
| 5,163,643 A | 11/1992 | Auclair |
| 5,187,821 A | 2/1993 | Nieminen |
| 5,203,580 A | 4/1993 | Cunningham |
| D335,718 S | 5/1993 | Maglica et al. |
| 5,207,441 A | 5/1993 | Granbery |
| D337,172 S | 7/1993 | Maglica et al. |
| 5,261,680 A | 11/1993 | Freitus et al. |
| 5,265,892 A | 11/1993 | Said |
| 5,295,556 A | 3/1994 | Mullin |
| 5,320,371 A | 6/1994 | Levad |
| 5,330,212 A | 7/1994 | Gardner |
| D350,683 S | 9/1994 | Tessman |
| 5,348,327 A | 9/1994 | Gieske |
| 5,356,197 A | 10/1994 | Simic |
| 5,375,276 A | 12/1994 | Nelson |
| 5,375,277 A | 12/1994 | Carr |
| D356,721 S | 3/1995 | Tessman |
| 5,460,307 A | 10/1995 | Stevenson |
| 5,474,595 A | 12/1995 | McCombs |
| 5,518,258 A | 5/1996 | Cox |
| 5,535,973 A | 7/1996 | Bailey et al. |
| 5,564,720 A | 10/1996 | Stringer |
| 5,588,985 A | 12/1996 | Shagott et al. |
| 5,634,537 A | 6/1997 | Thorn |
| 5,673,928 A | 10/1997 | Jury |
| 5,687,978 A | 11/1997 | Rhodes |
| 5,695,208 A | 12/1997 | Baechler et al. |
| 5,755,478 A | 5/1998 | Kamiya et al. |
| 5,769,556 A | 6/1998 | Colley |
| 5,791,279 A | 8/1998 | Hart |
| 5,794,897 A | 8/1998 | Jobin |
| 5,820,141 A | 10/1998 | Wilkerson |
| 5,829,771 A | 11/1998 | Hsu |
| 5,836,559 A | 11/1998 | Ronci |
| 5,864,902 A | 2/1999 | Rogers |
| 5,884,935 A | 3/1999 | Tholkes |
| 5,887,879 A | 3/1999 | Chumley |
| 5,895,354 A | 4/1999 | Simmons |
| 5,906,034 A | 5/1999 | Weisshaar |
| 5,918,331 A | 7/1999 | Hall et al. |
| 5,941,483 A | 8/1999 | Baginski |
| 5,941,544 A | 8/1999 | Fiedler |
| 5,975,003 A | 11/1999 | Manson |
| 5,975,081 A | 11/1999 | Hood et al. |
| 6,032,964 A | 3/2000 | Capobianco |
| 6,039,333 A | 3/2000 | Hamblin |
| D426,459 S | 6/2000 | van den Branden et al. |
| D427,407 S | 6/2000 | Witt |
| 6,079,777 A | 6/2000 | Simmons et al. |
| 6,082,799 A | 7/2000 | Marek |
| D429,984 S | 8/2000 | Cummings |
| D430,472 S | 9/2000 | Cummings |
| 6,125,485 A | 10/2000 | Way |

| | | |
|---|---|---|
| 6,142,491 A | 11/2000 | Darling, III |
| 6,142,492 A | 11/2000 | DeLucia |
| 6,164,671 A | 12/2000 | Darling, III |
| 6,175,977 B1 | 1/2001 | Schumacher et al. |
| 6,179,358 B1 | 1/2001 | Hirayama et al. |
| 6,189,900 B1 | 2/2001 | MacDonald |
| 6,195,821 B1 | 3/2001 | Hall et al. |
| 6,234,172 B1 | 5/2001 | Ausbourne et al. |
| 6,270,092 B2 | 8/2001 | Darling, III |
| D448,161 S | 9/2001 | Holodnicki |
| 6,283,496 B1 | 9/2001 | Dickmann |
| 6,346,139 B1 | 2/2002 | Czabala |
| 6,357,063 B1 | 3/2002 | Selby |
| 6,364,336 B1 | 4/2002 | Jenkins |
| 6,370,741 B1 | 4/2002 | Lu |
| 6,375,200 B1 | 4/2002 | Harter |
| D459,564 S | 6/2002 | Daniels |
| 6,416,066 B1 | 7/2002 | Ciulis |
| 6,478,857 B2 | 11/2002 | Czabala |
| 6,481,887 B1 | 11/2002 | Mirabella |
| 6,499,158 B1 | 12/2002 | Easterling |
| D468,612 S | 1/2003 | Coulter |
| 6,546,577 B1 * | 4/2003 | Chinn ........................... 5/600 |
| 6,550,791 B2 | 4/2003 | Ramsey |
| 6,550,860 B2 | 4/2003 | Lombardi |
| 6,561,529 B2 | 5/2003 | Darling, III |
| 6,563,910 B2 | 5/2003 | Menard et al. |
| 6,575,482 B2 | 6/2003 | Dombroskie |
| 6,582,456 B1 | 6/2003 | Hand et al. |
| 6,688,635 B1 | 2/2004 | Watts |
| 6,691,350 B2 | 2/2004 | Weismiller |
| D488,161 S | 4/2004 | Korpai |
| 6,746,079 B2 | 6/2004 | Cabedo-Deslierres |
| 6,761,366 B1 | 7/2004 | Klemmensen |
| 6,798,343 B2 | 9/2004 | Carrier et al. |
| 6,811,180 B1 | 11/2004 | Molliere |
| 6,820,849 B2 | 11/2004 | Kennard |
| 6,824,150 B2 | 11/2004 | Simione |
| 6,842,922 B2 | 1/2005 | Smeed |
| 6,843,527 B2 | 1/2005 | Nelson et al. |
| 6,926,292 B1 | 8/2005 | Weeks |
| 6,928,672 B2 | 8/2005 | Pastyr |
| 6,932,555 B2 | 8/2005 | Dale et al. |
| 6,945,545 B2 | 9/2005 | Celli |
| 6,962,354 B1 | 11/2005 | Miller |
| 6,976,696 B2 | 12/2005 | O'Krangley et al. |
| 6,986,275 B2 | 1/2006 | Conner |
| 7,003,827 B2 | 2/2006 | DeMayo |
| 7,014,267 B1 | 3/2006 | Nagar |
| 7,017,939 B2 | 3/2006 | Darling |
| 7,032,921 B2 | 4/2006 | Swanner |
| 7,044,496 B2 * | 5/2006 | Holmes ......................... 280/639 |
| 7,053,772 B2 | 5/2006 | Wagner et al. |
| 7,077,855 B2 | 7/2006 | Curtis |
| 7,150,465 B2 * | 12/2006 | Darling, III .................. 280/640 |
| 7,159,832 B2 | 1/2007 | Easterling |
| 7,175,143 B1 | 2/2007 | Ho |
| 7,188,846 B2 | 3/2007 | Deavila |
| 7,228,579 B2 | 6/2007 | Tidwell |
| 7,347,472 B2 | 3/2008 | Pellegrin, Jr. |
| 7,407,177 B2 * | 8/2008 | Darling, III .................. 280/640 |
| 7,461,857 B2 * | 12/2008 | Darling, III .................. 280/640 |
| 7,766,365 B2 * | 8/2010 | Darling, III .................. 280/640 |
| 2003/0115726 A1 | 6/2003 | Liao |
| 2003/0127476 A1 | 7/2003 | Lockard |
| 2004/0108688 A1 | 6/2004 | Holmes |
| 2005/0252821 A1 | 11/2005 | Azzolini et al. |
| 2006/0163829 A1 | 7/2006 | Livengood et al. |
| 2007/0157389 A1 | 7/2007 | Eriksson |
| 2007/0220672 A1 | 9/2007 | Roberts |

FOREIGN PATENT DOCUMENTS

| | | |
|---|---|---|
| GB | 229971 | 3/1925 |
| GB | 534162 | 8/1940 |
| GB | 635999 | 4/1950 |
| GB | 641984 | 8/1950 |
| GB | 743831 | 1/1956 |
| JP | 0931312 | 12/1997 |
| JP | 10138931 A | 5/1998 |
| JP | 2001018804 A | 1/2001 |
| SG | 2007046428 | 6/2011 |
| SG | 2007046394 | 7/2011 |
| WO | 03105720 A2 | 12/2003 |

OTHER PUBLICATIONS

Mo-Clamp #0054 Mini Spring Clamp; Tools USA; toolsusa.com/ap/item_detail.asp?T1=PBE+9MS+PU0054&GENB=&UID=moclamp.pdf.

Pedigo Infusion Pump Universal Clamp; Universal Medical, Inc. universalmedicalinc.com/pedigo-infusion-pump-universal-clamp/detail/P-3500_4545pedigo.pdf.

MedSystemIII(R)Infusion System with Advanced Dose Rate Calculation and Drug List Editor; Directions for Use, p. 8;cardinal.com/alaris/brochure/medsystemiiiadvanceddoserate.

Cardellini Center Jaw Clamp; Cardellini Products Film Crew Services, Inc.; cardelliniclamp.com/clamp_info/cardellini.pdf.

Brewer Universal Clamp w/Set Screw #43433; Med1Online; med1online.com/p-33990brewer-universal-clamp-w-set-screw-43433.aspx/brewer.pdf.

Narang Medical Ltd, "Narang Instruments for Knee and Skull Surgery", Article, Nov. 25, 2008, 7 pages.

Carole J. Bolster, "Mobile hospital provides care when disaster strikes: etc.", Healthcare Financial Management article, 2006, 3 pages.

ACEP Press Release, American College of Emergency Physicians, "One-of-a-Kind Mobile Hospital from North Carolina Providing Critical Care to Mississippi Residents after Katrina Debillitation at Local Hospital", article, 2006, 2 pages.

EADS Press Release, "EADS Mobile Hospital completes a month-long deployment to Mississippi for hurricane relief medical support", article, Nov. 30, 2005, 3 pages.

Staff Sgt. Alicia Prakash, Air Force Print News, "C-17s airlift Qatari mobile hospital to Pakistan", article, Oct. 18, 2005, 1 page.

* cited by examiner

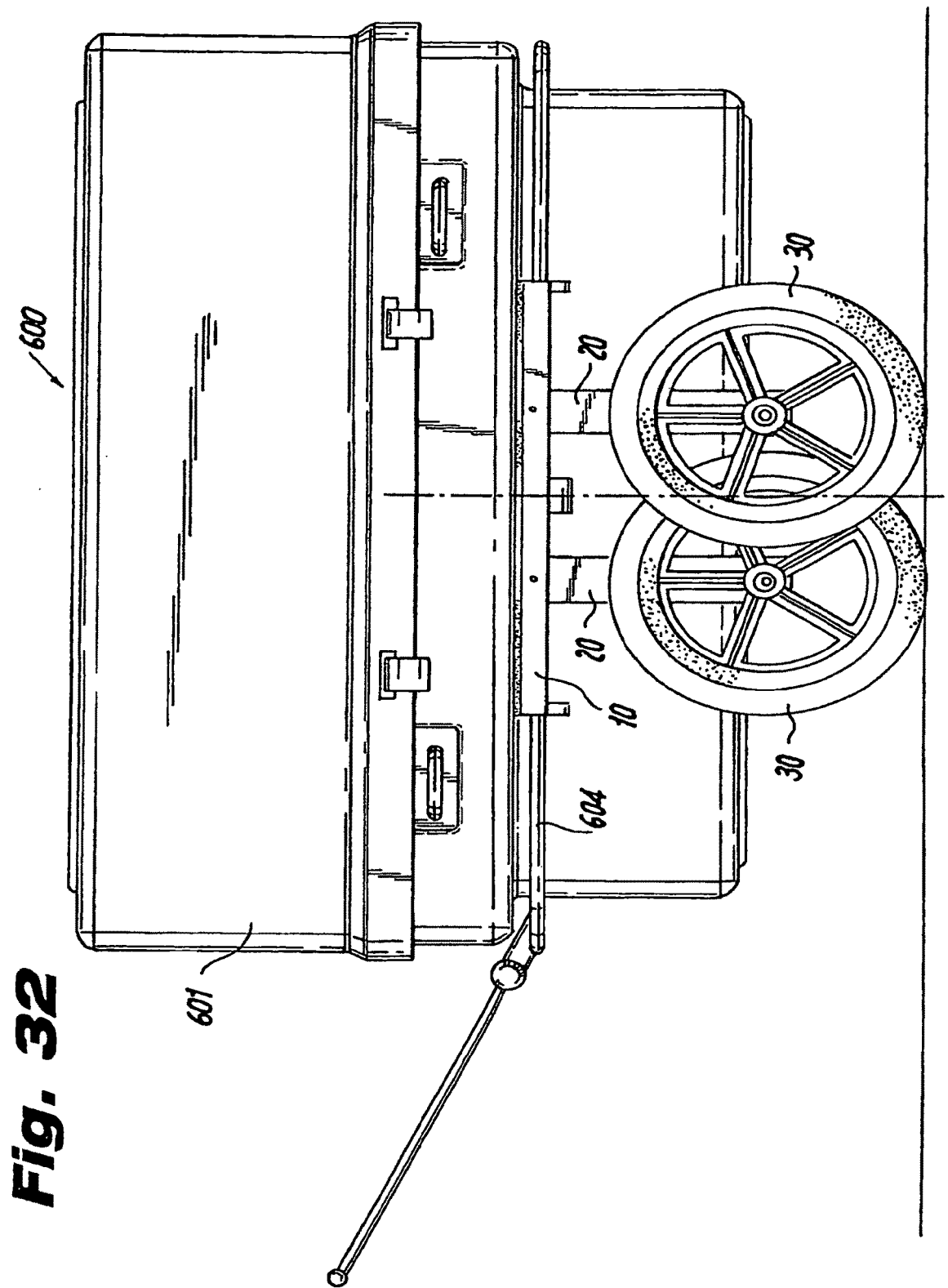

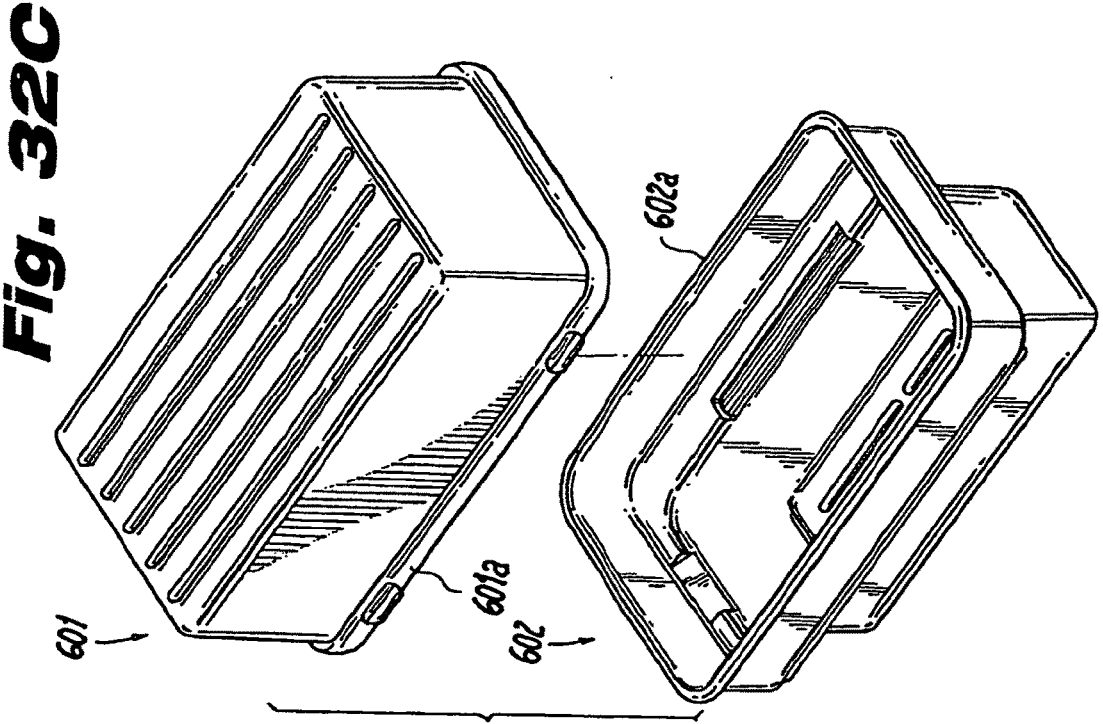
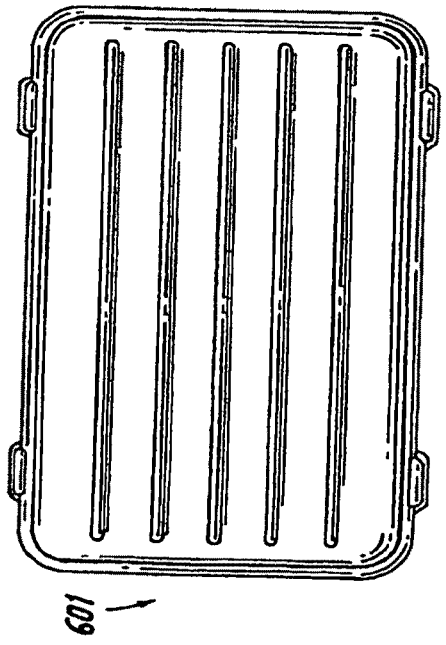
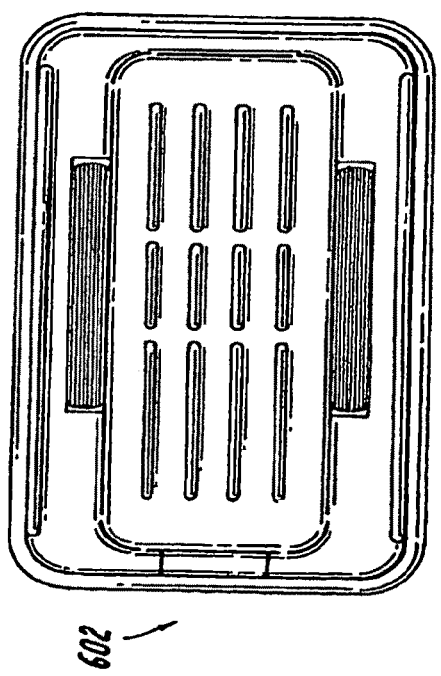

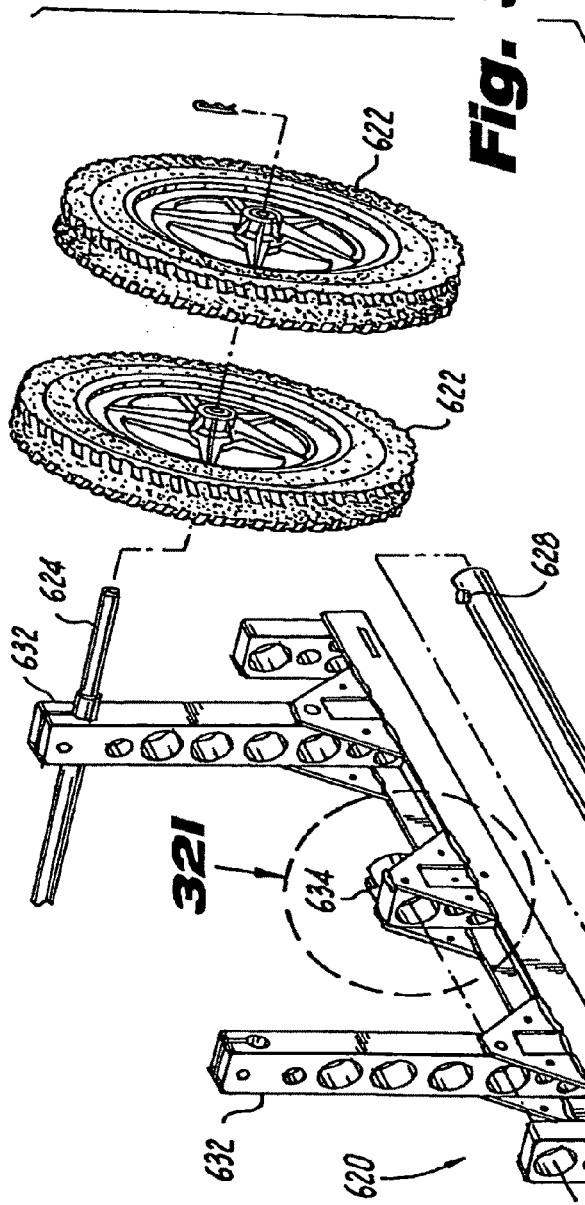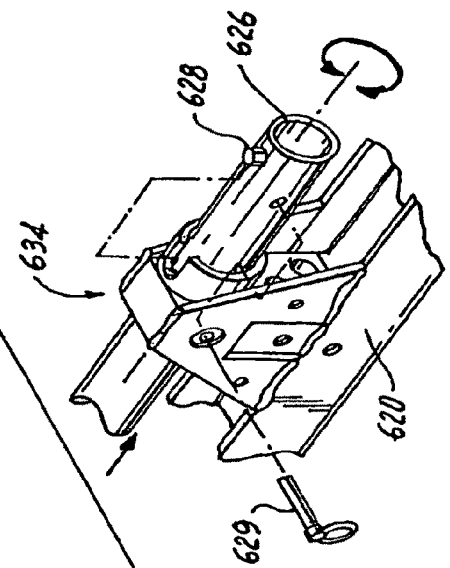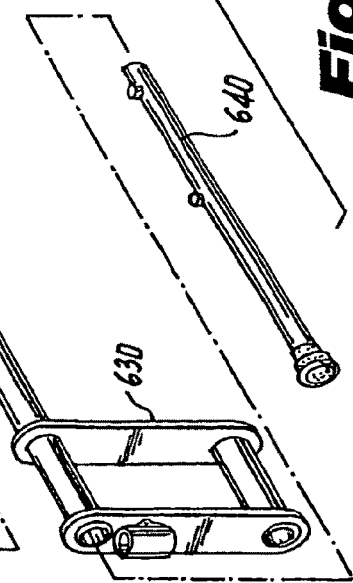

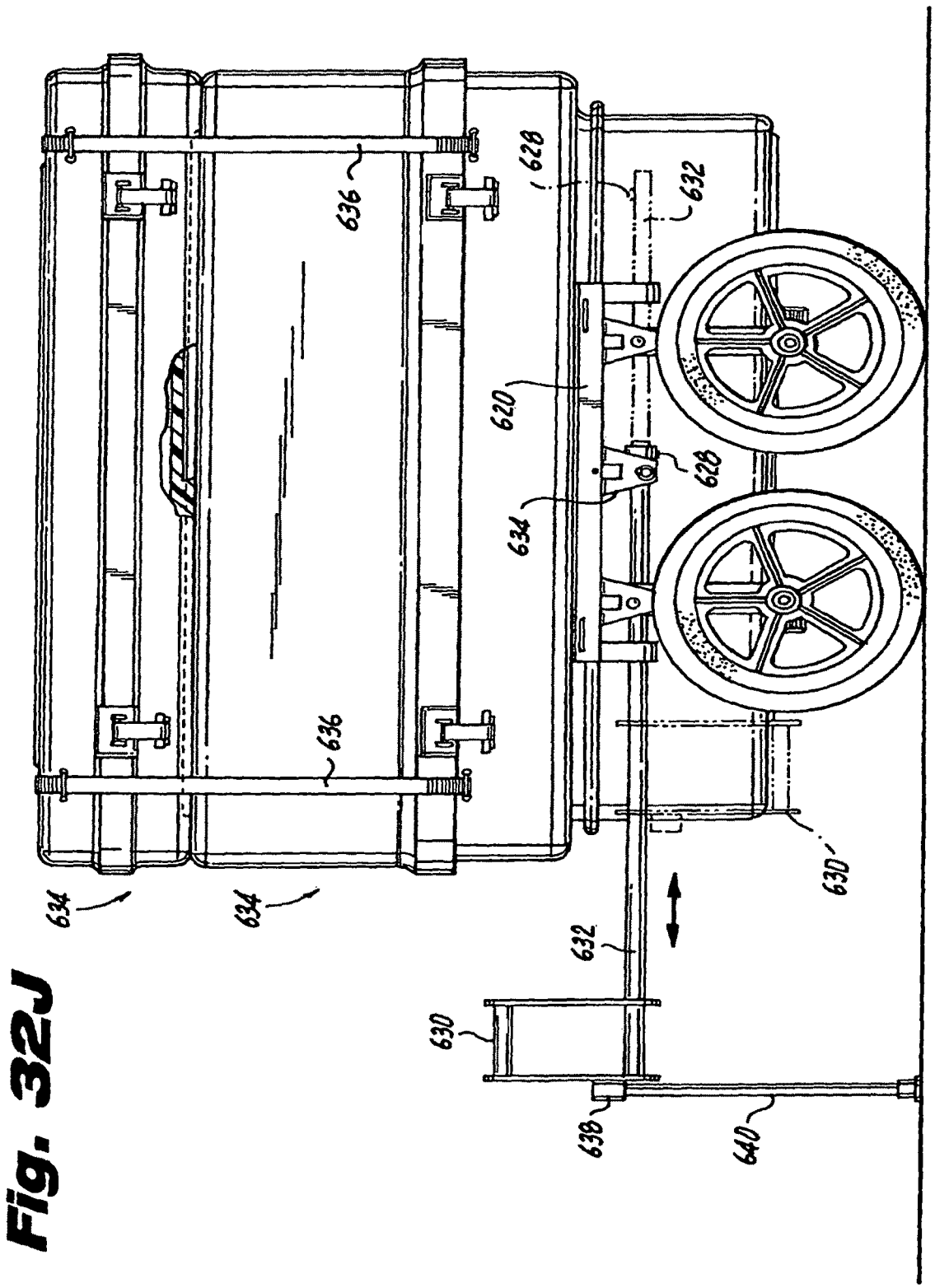

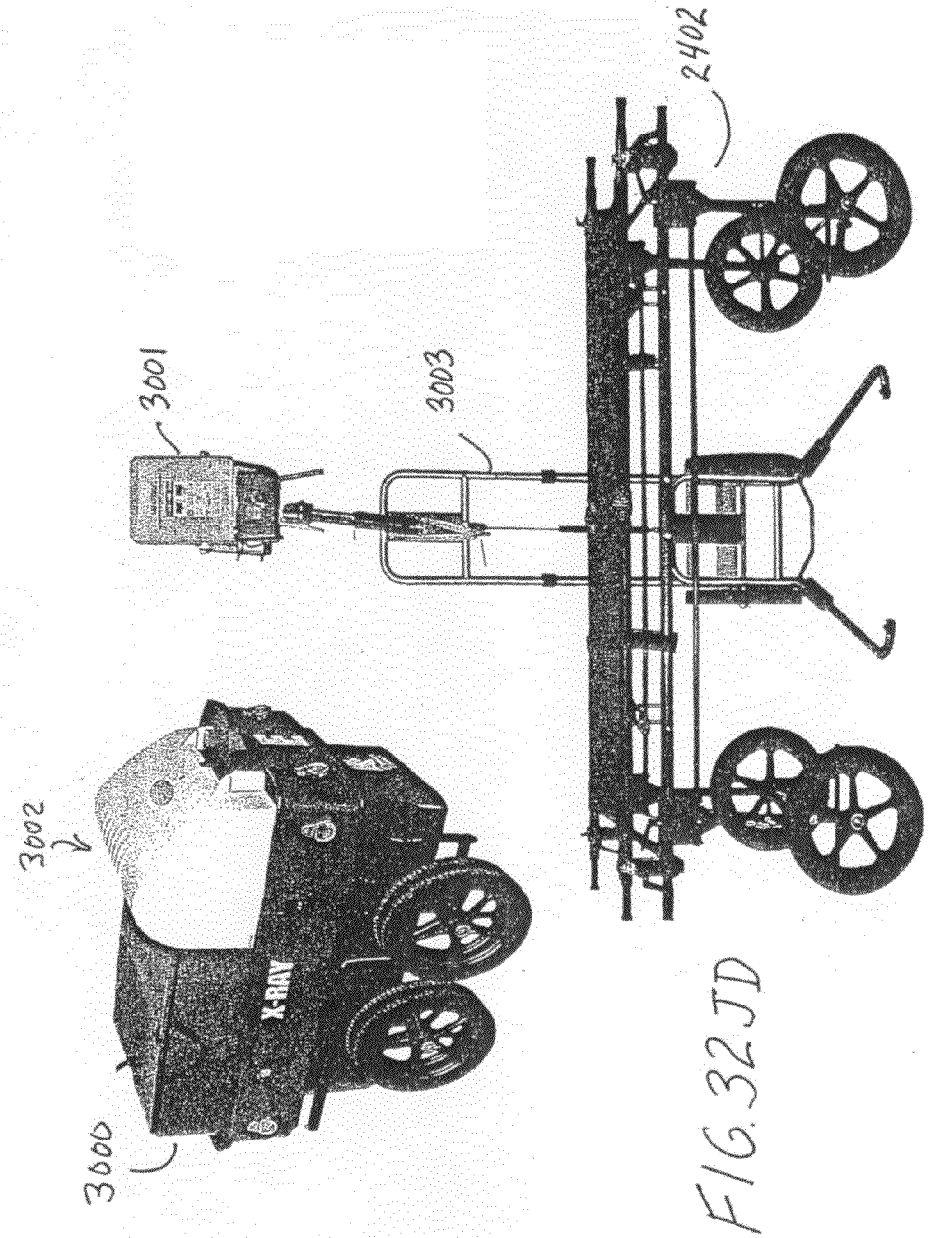

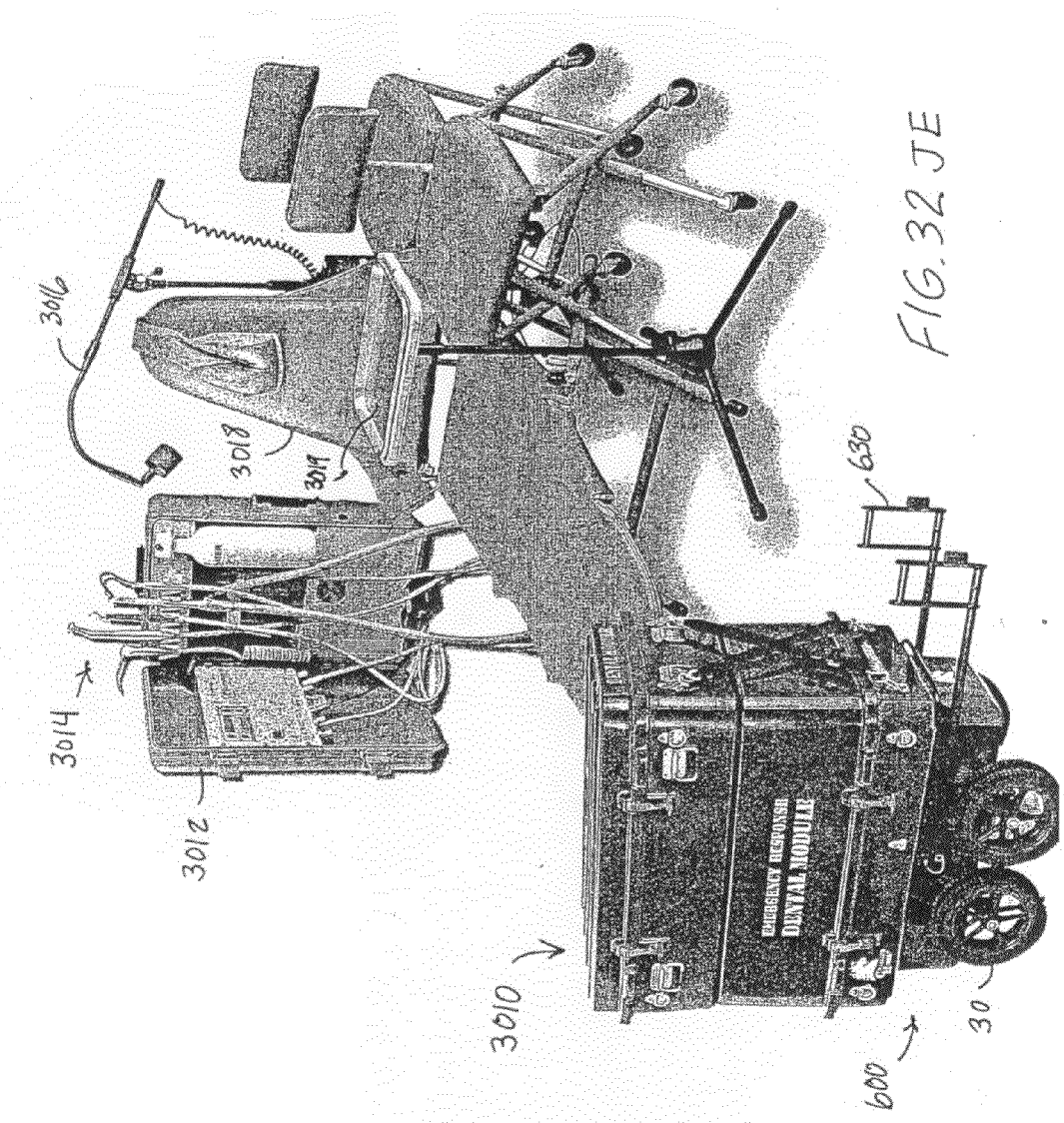

POWER GENERATION MODULE

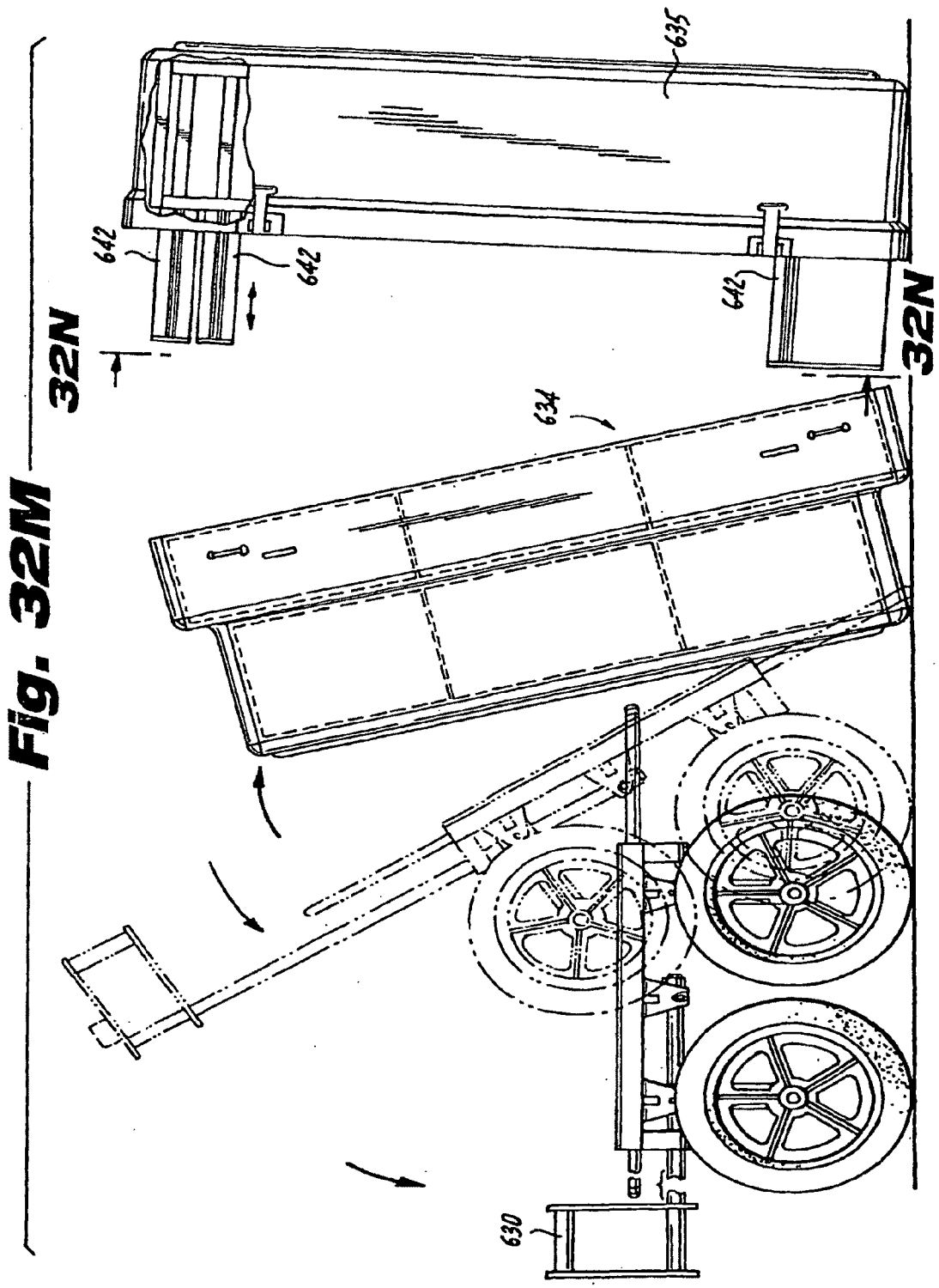

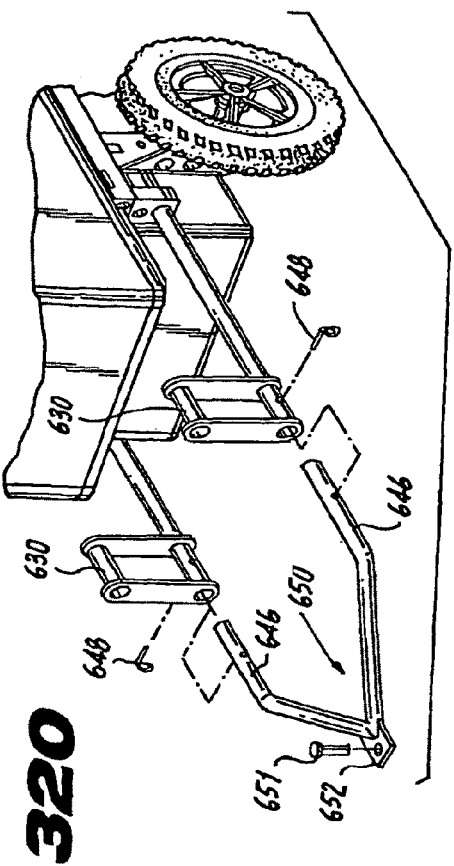
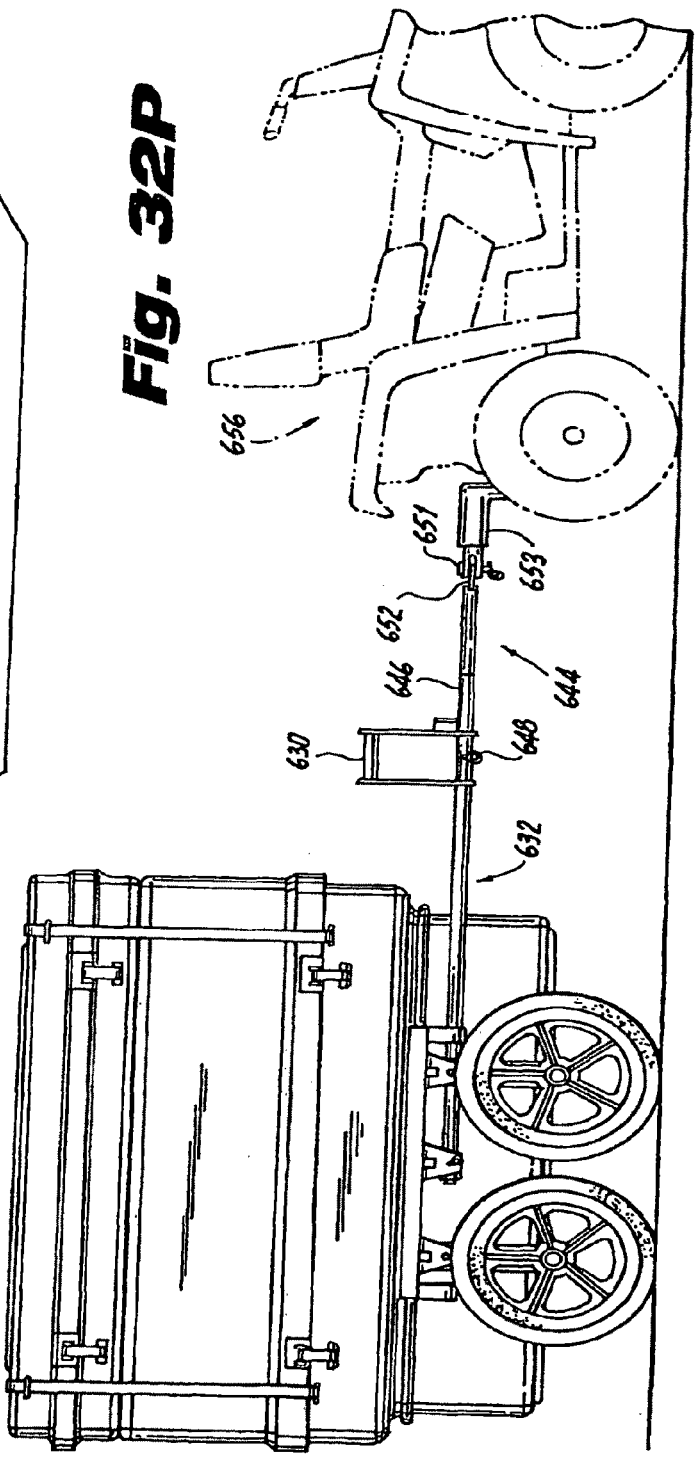

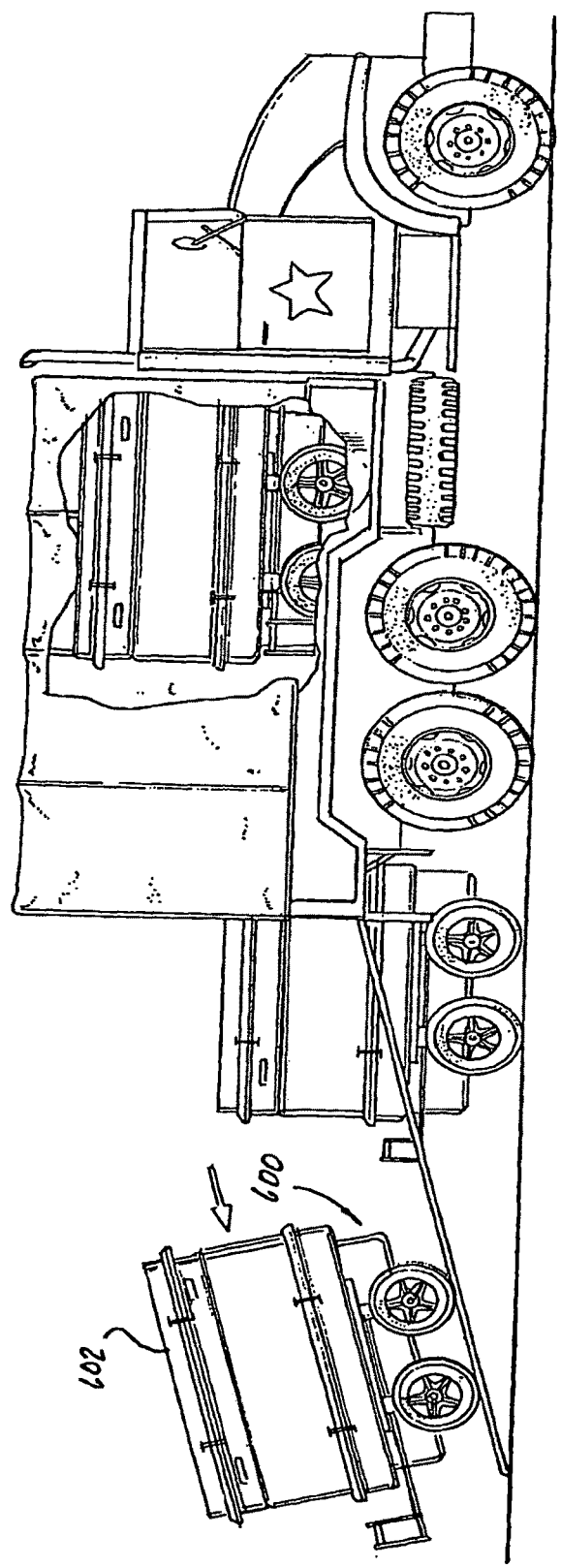

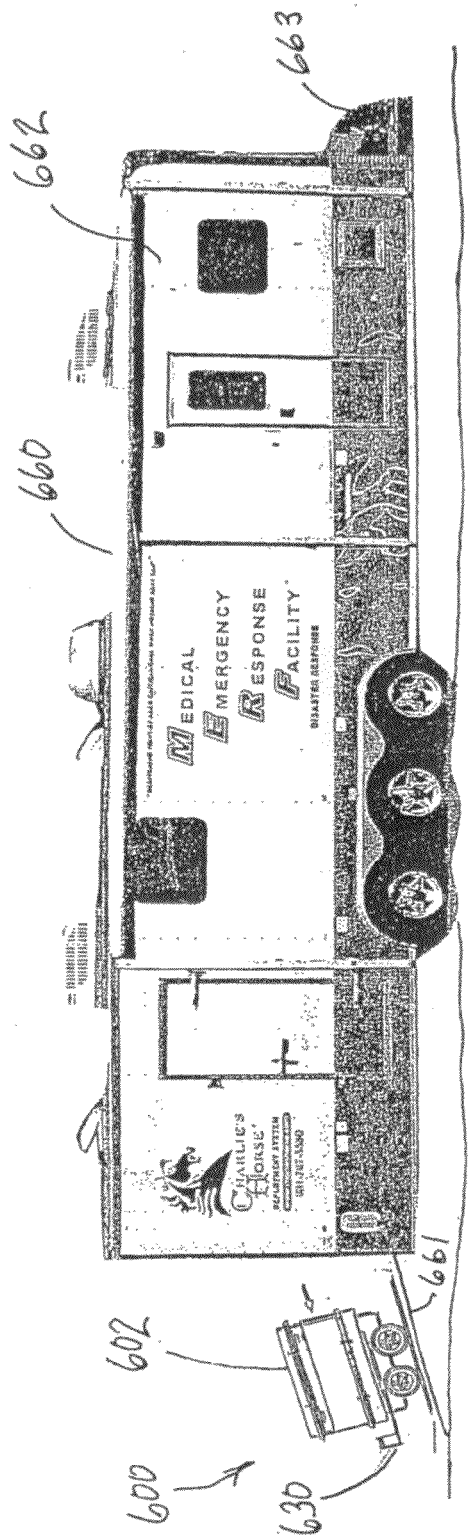

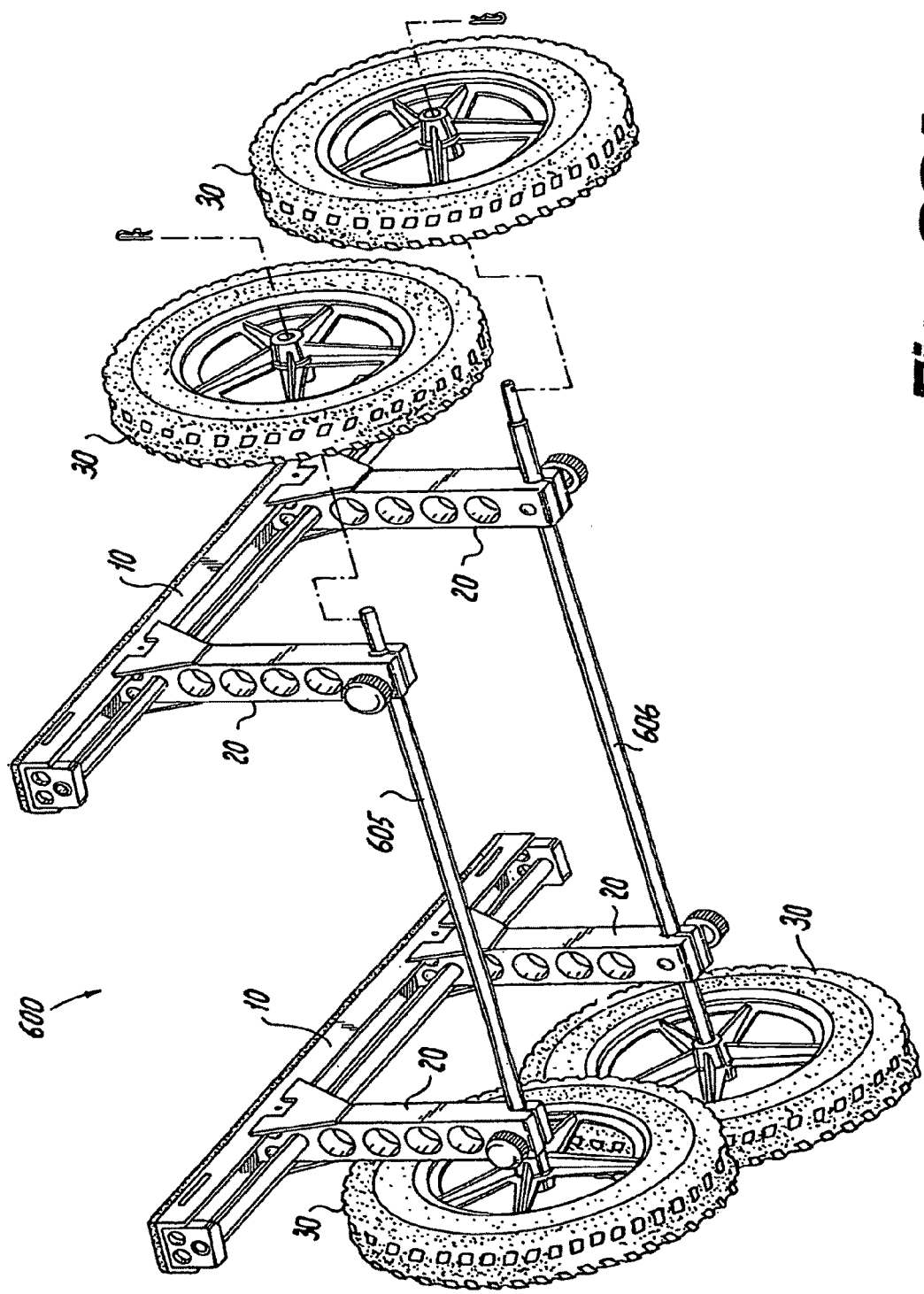

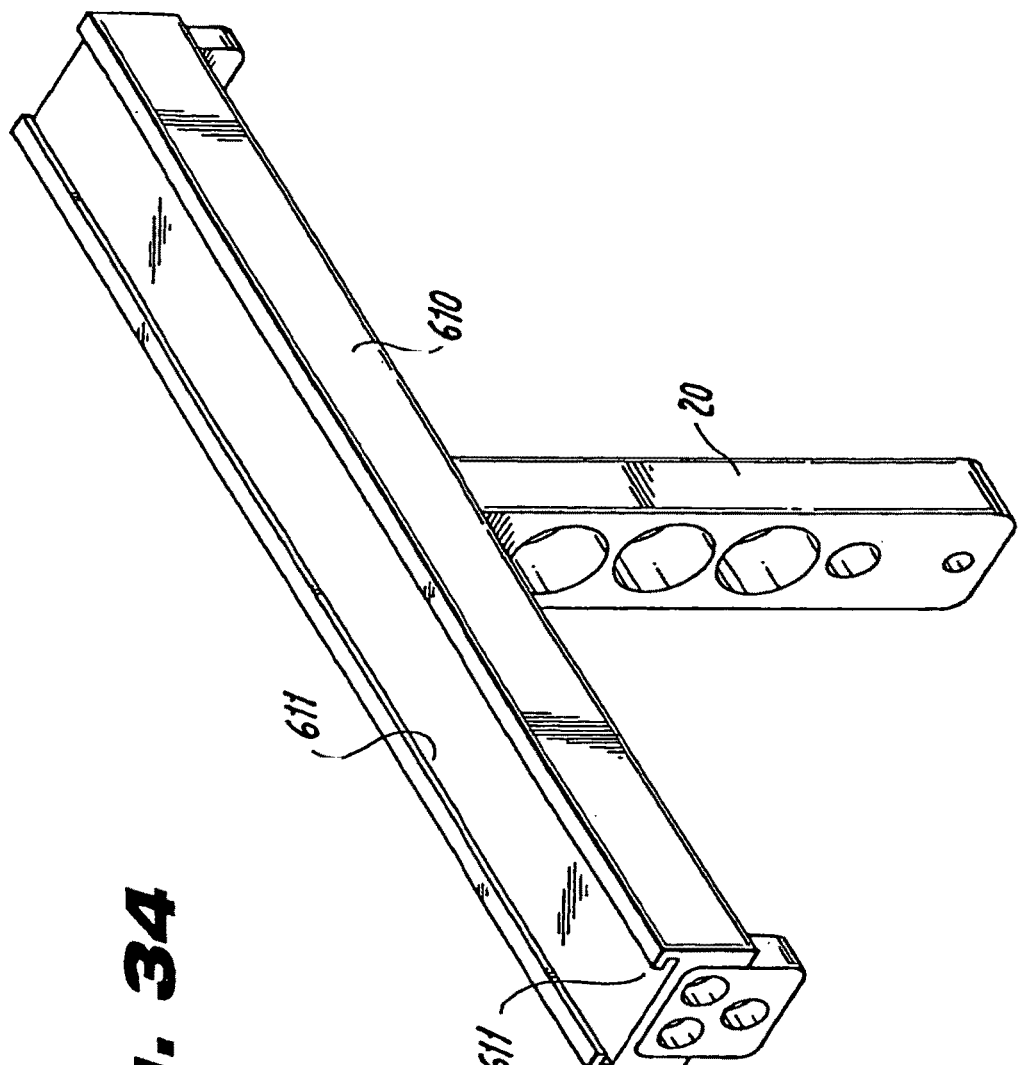

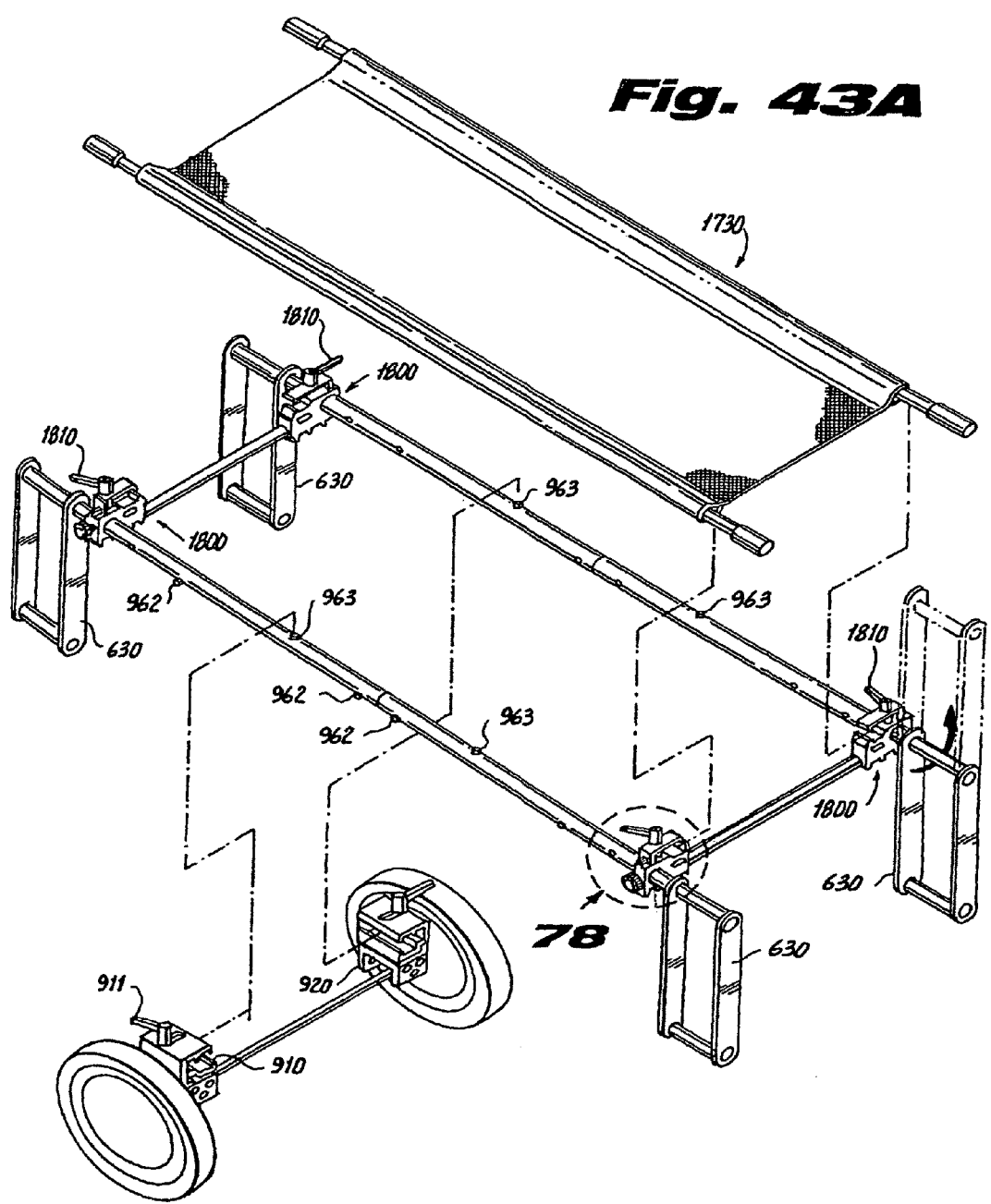

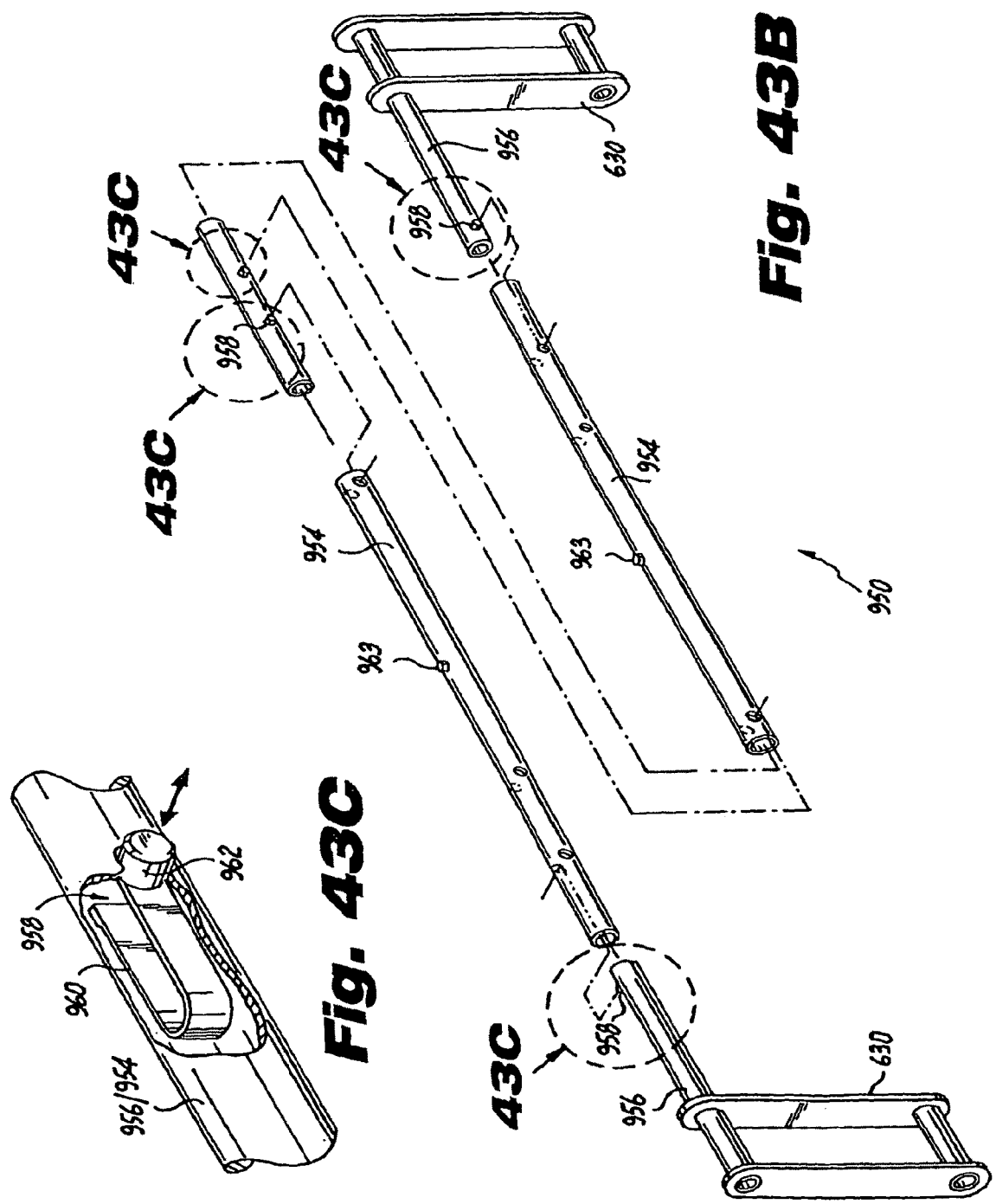

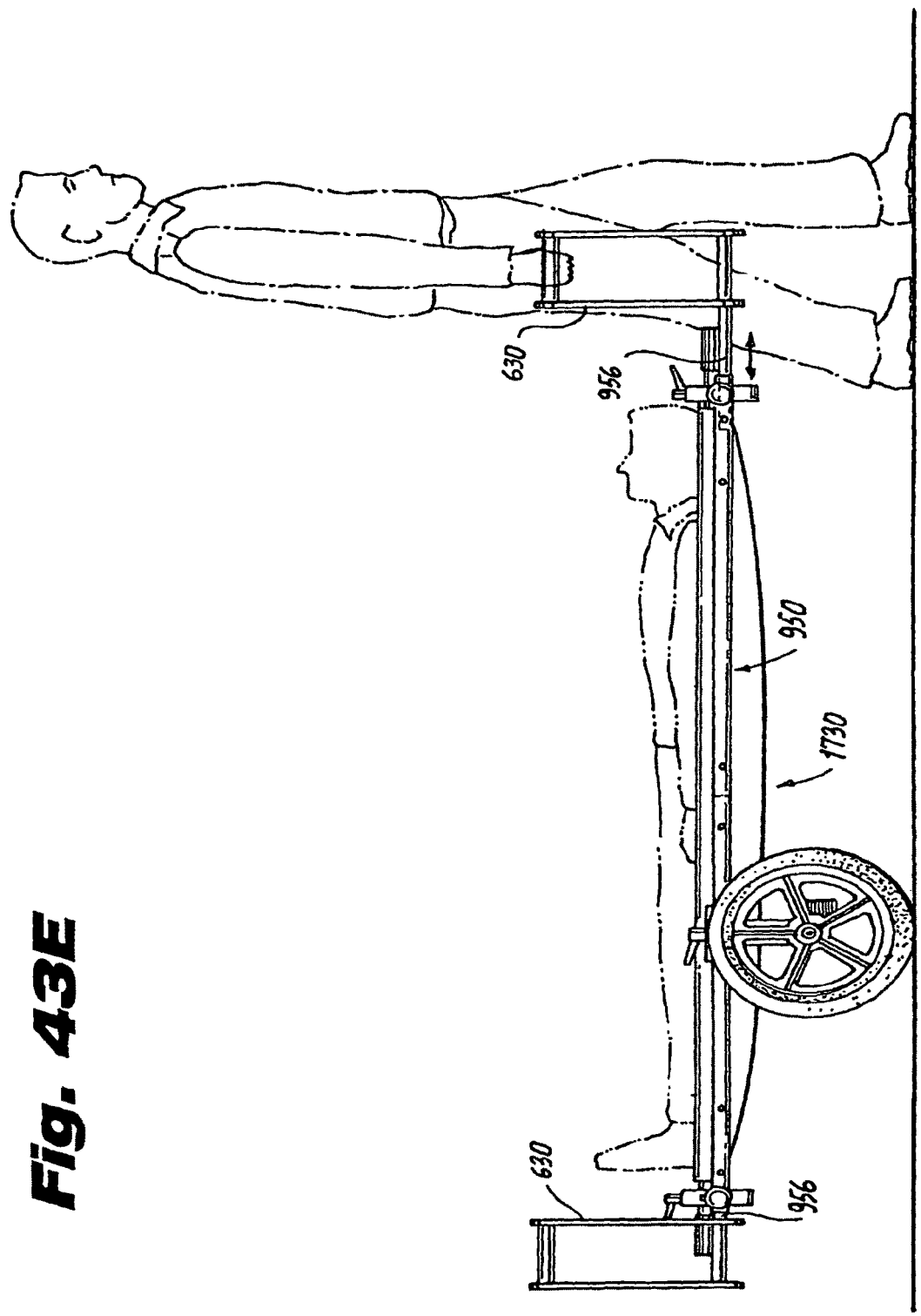

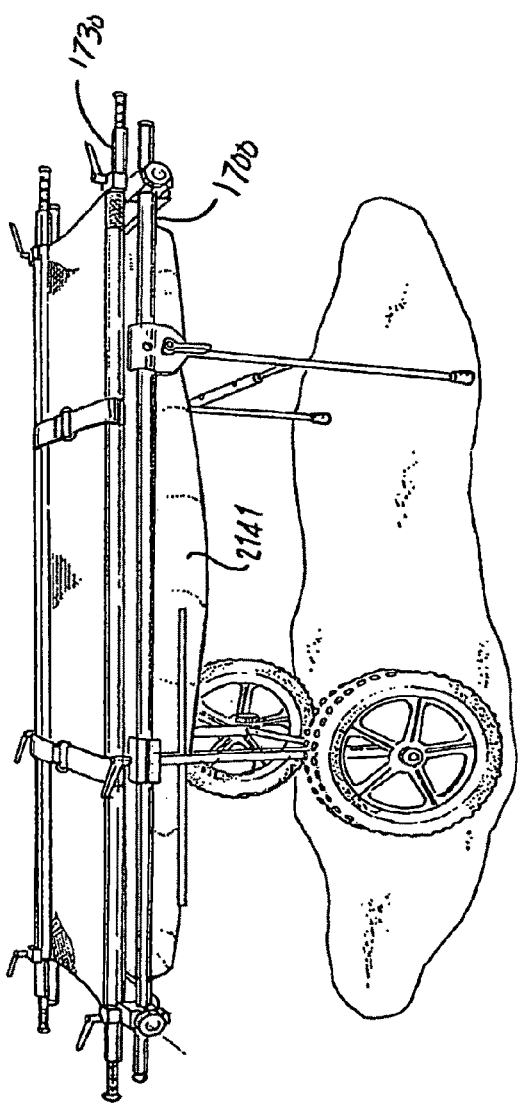
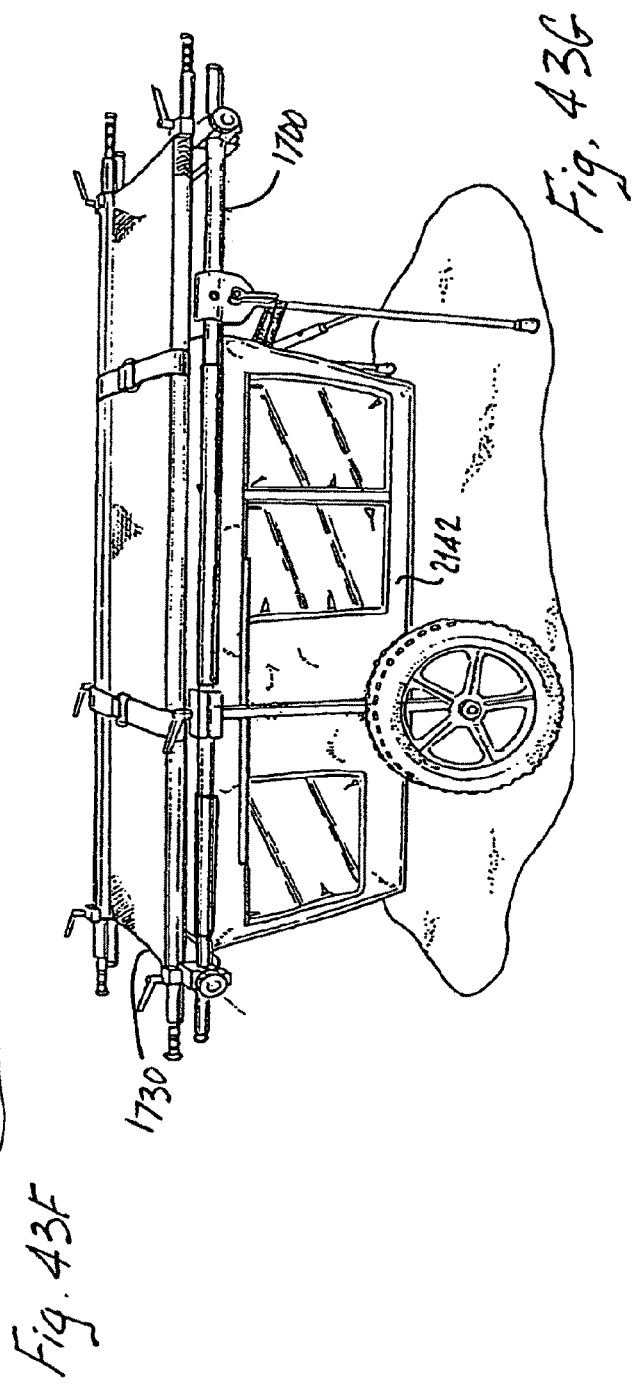
Fig. 43F
Fig. 43G

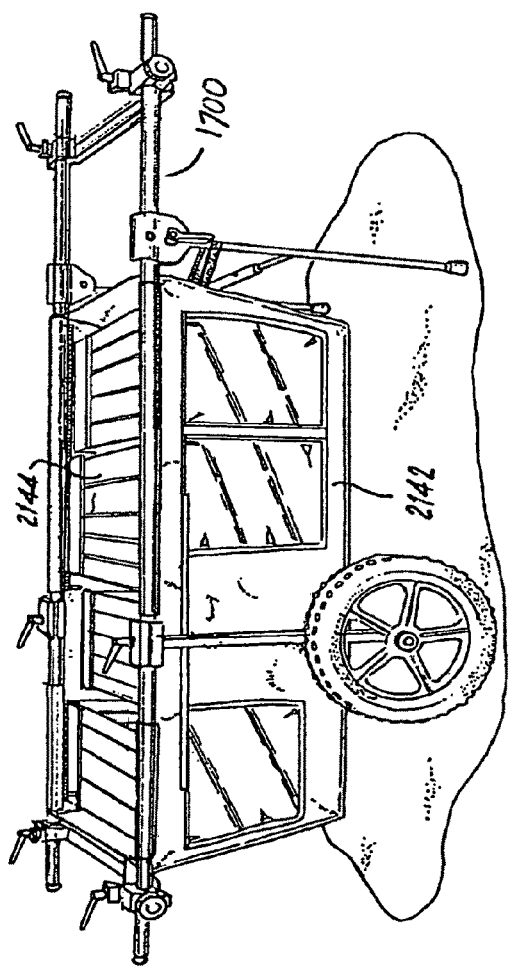
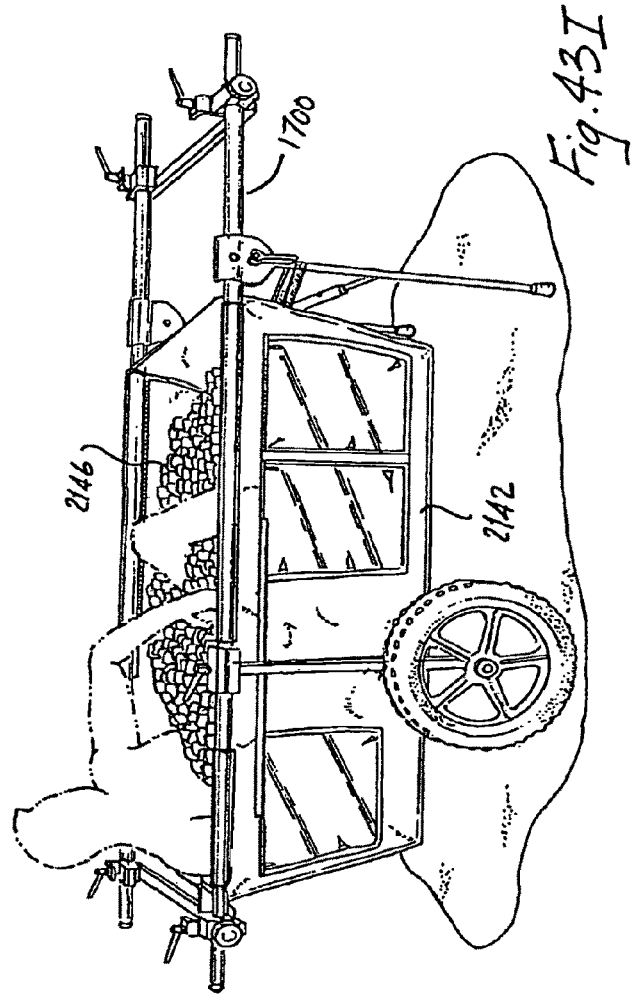
Fig. 43H
Fig. 43I

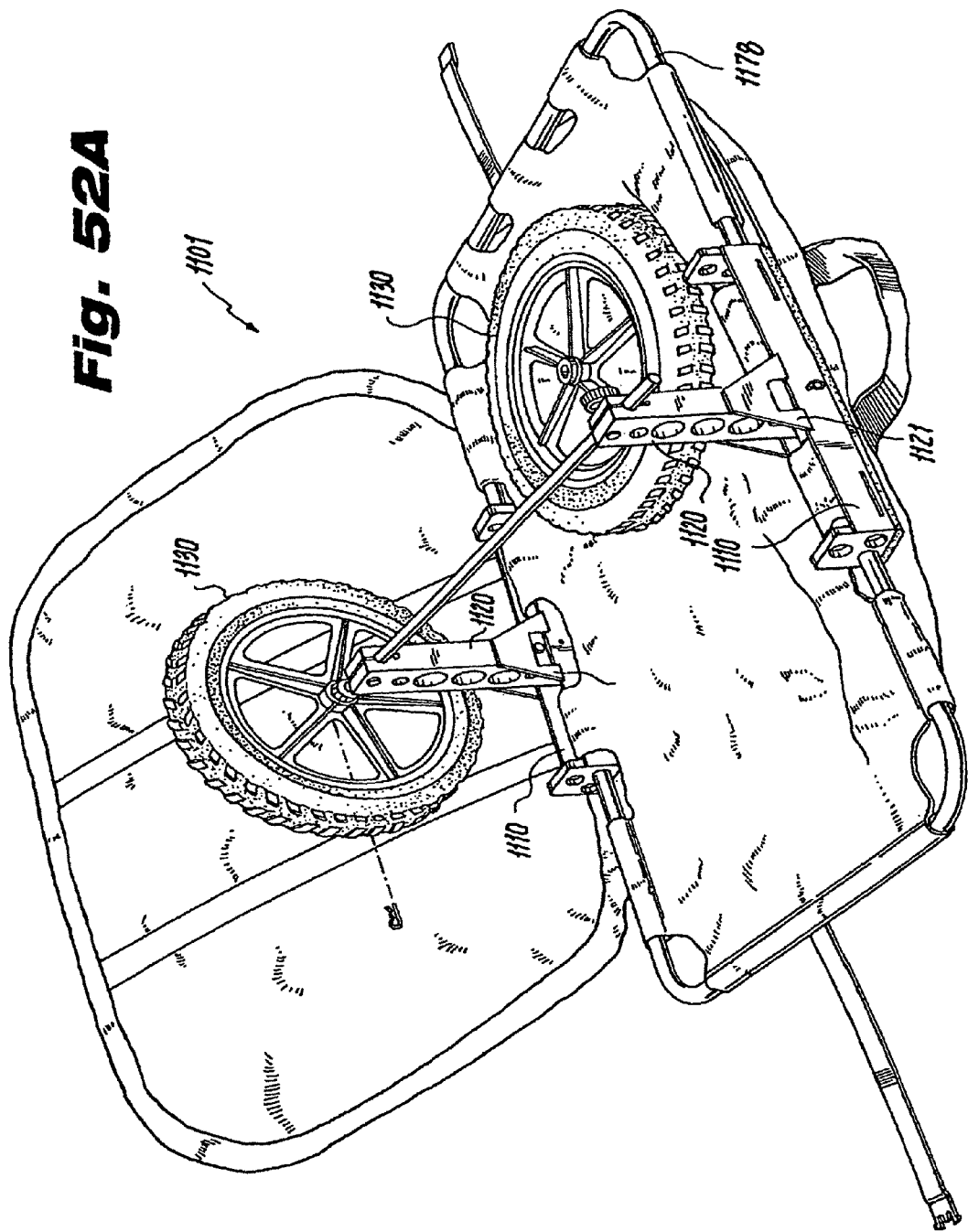

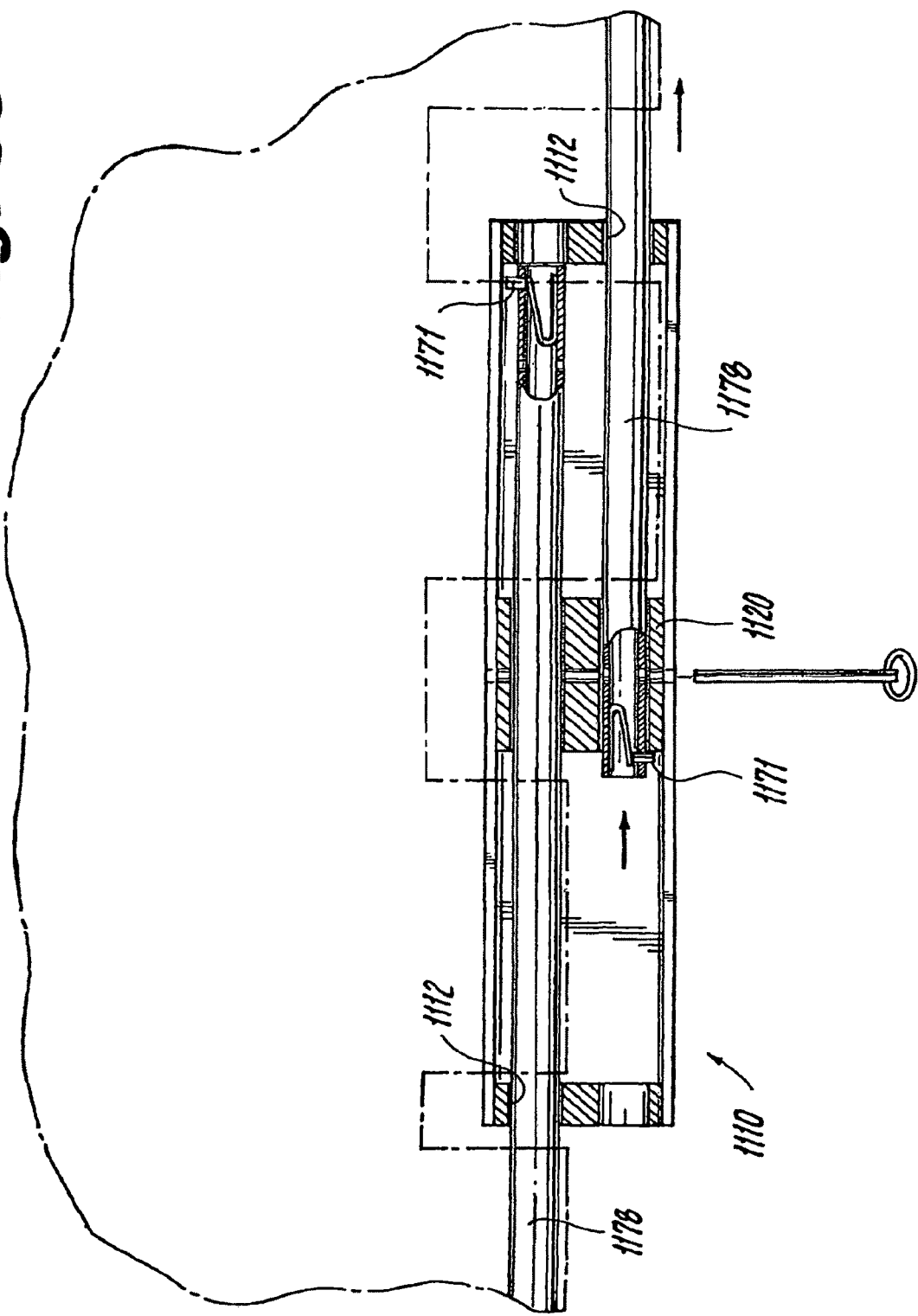

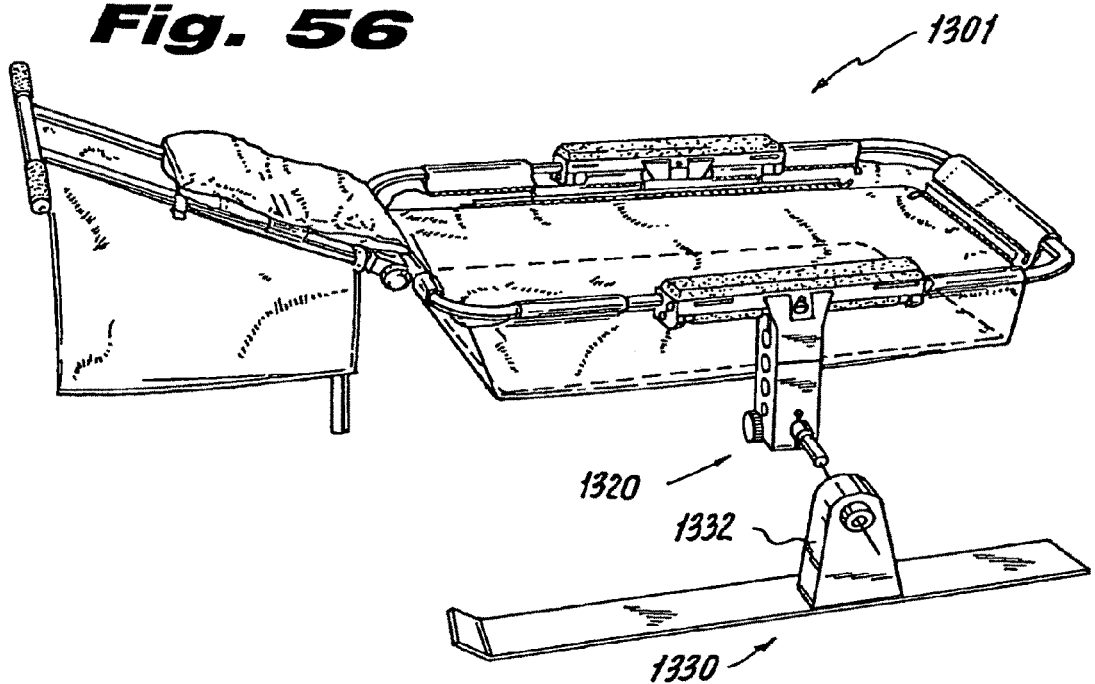
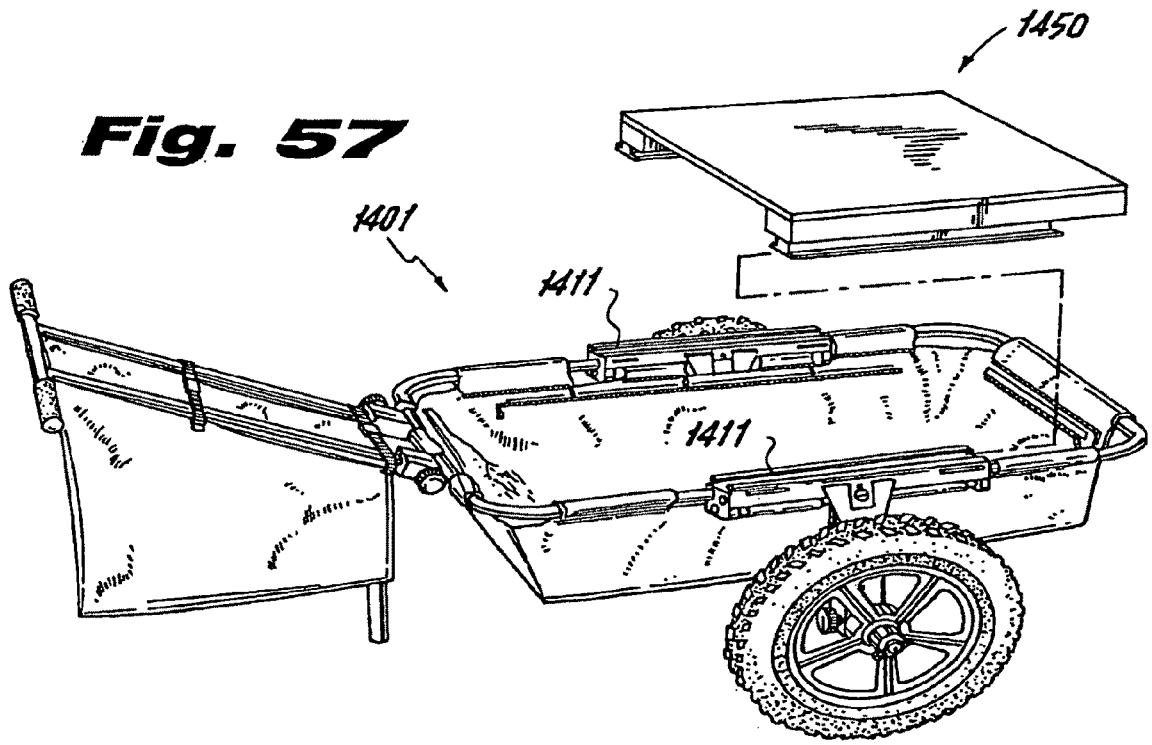

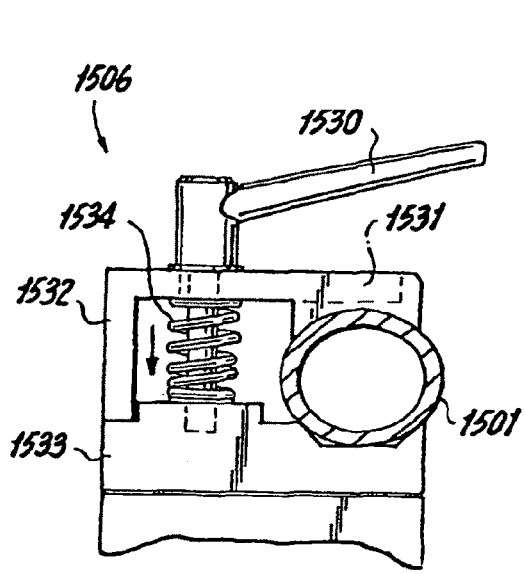
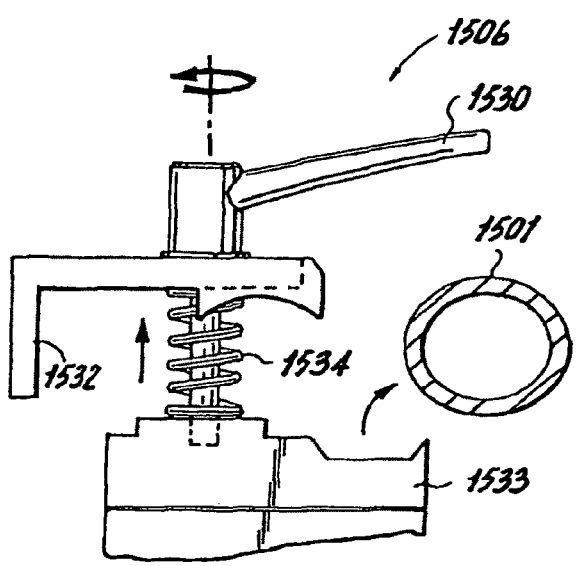
Fig. 62  Fig. 63
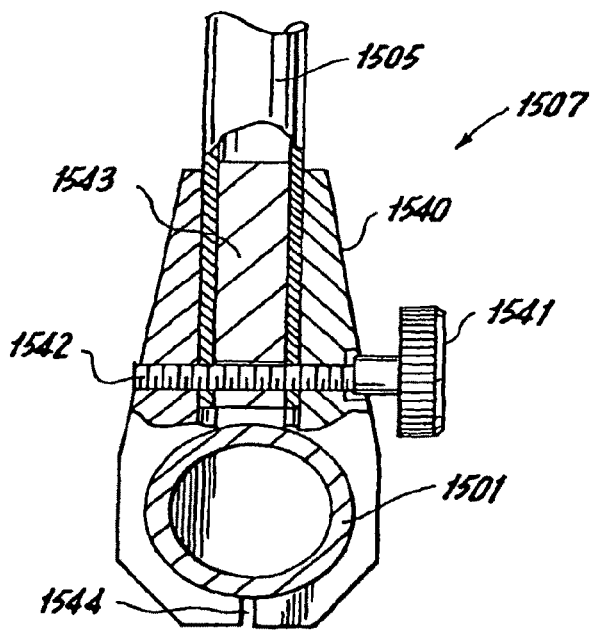
Fig. 64

ISSUES
Surge Capacity
Staffing
Deployment
Casualty Collection
Casualty Treatment
Casualty Evacuation
Chemical/Biological
Impact
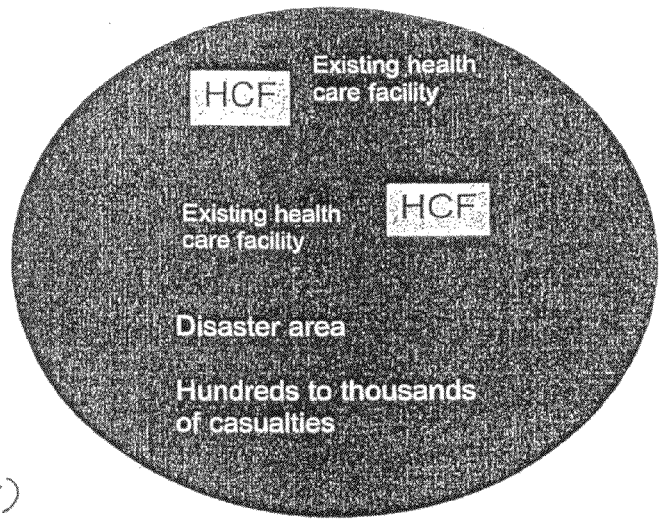
FIG. 71A
(PRIOR ART)
Major disaster – Existing HCF's overwhelmed by walk-in patients.
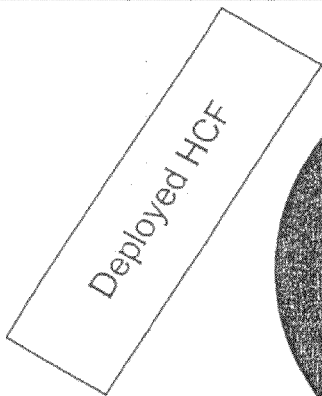
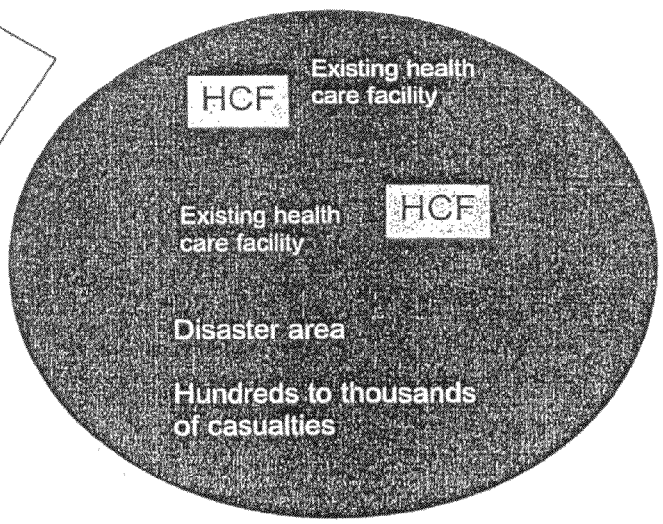
FIG. 71B
(PRIOR ART)

CHEM/BIO impact on deployed facility. Probable loss of 100% of Mobile Response.

CHEM/BIO impact as suggested above, only 10% of capability is impacted.

As situation stabilizes (72 hrs.) MERF units are re-supplied and relocated to treat additional casualties or consolidated to establish a more permanent 100 bed facility.

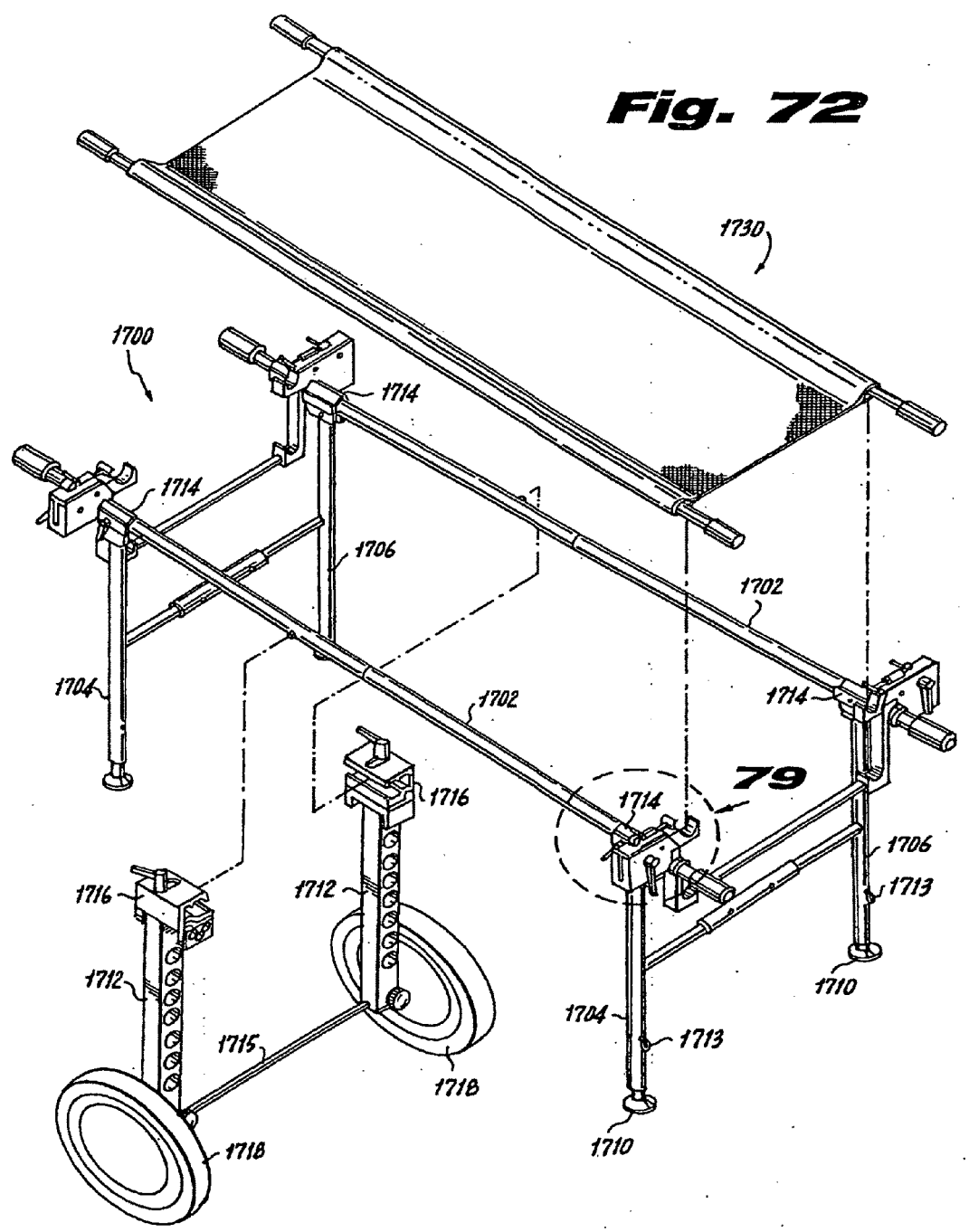

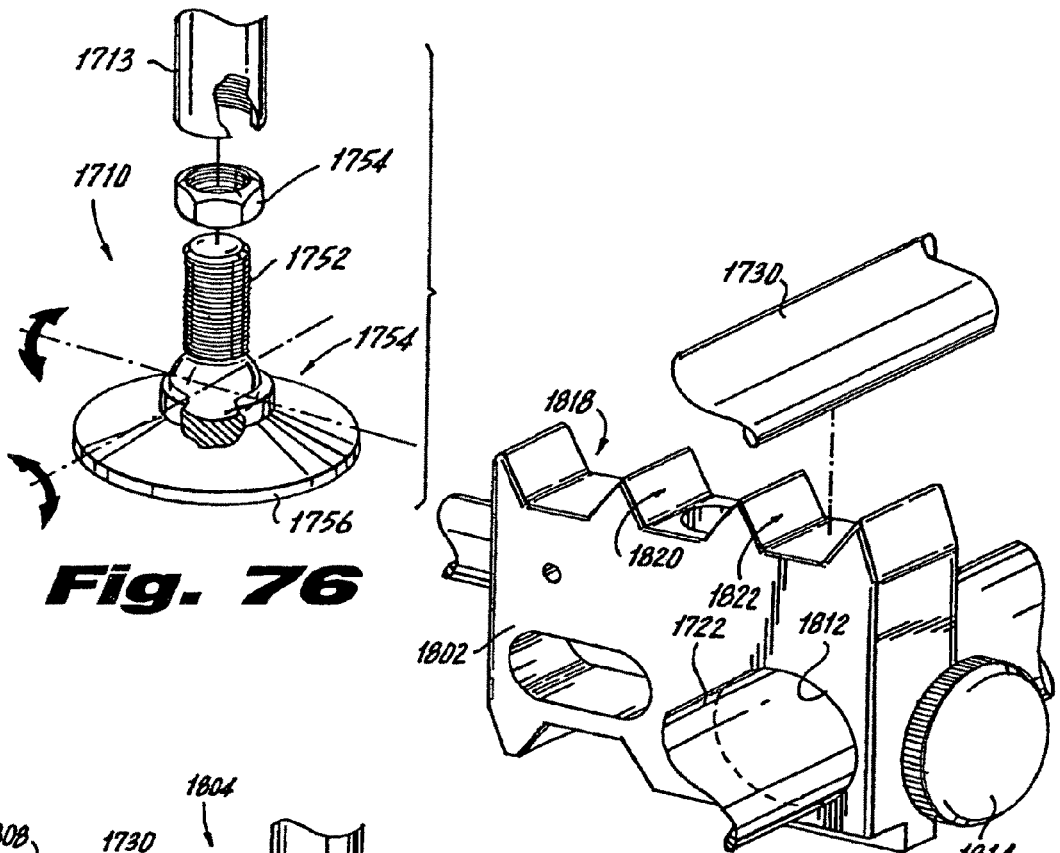
Fig. 76
Fig. 77
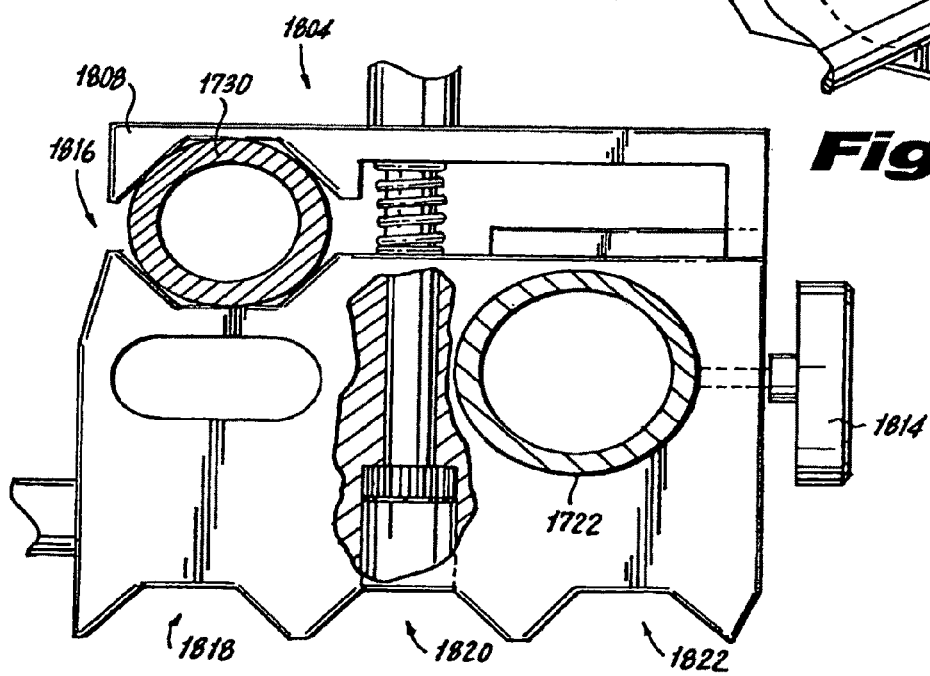
Fig. 78

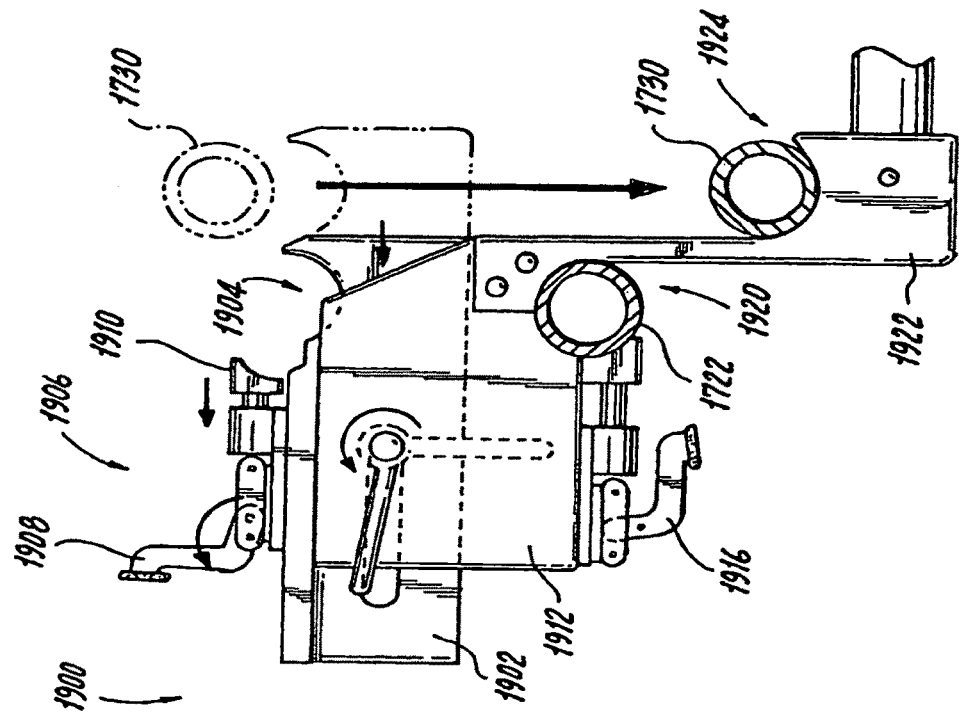
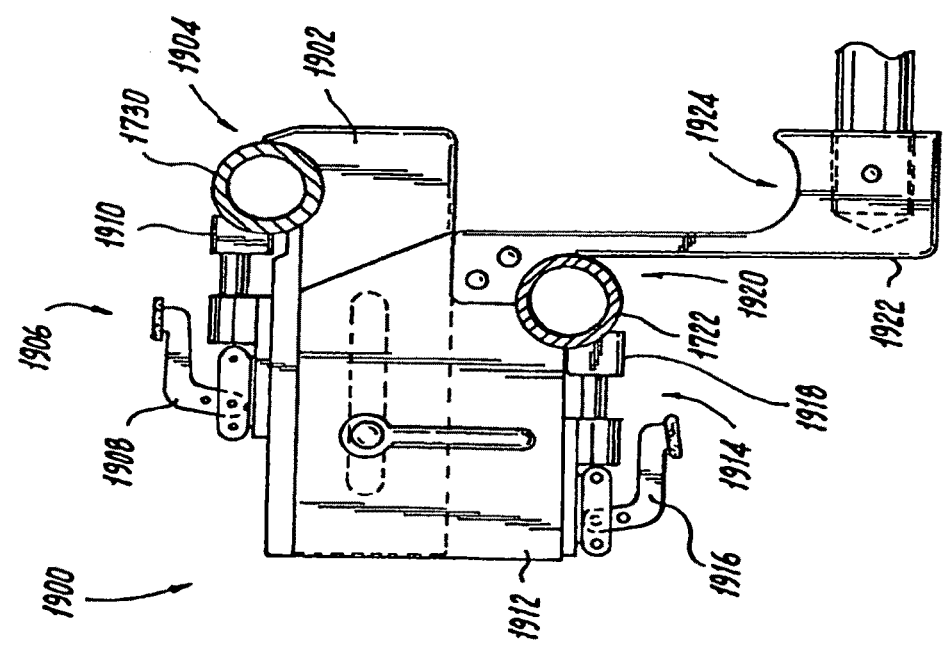

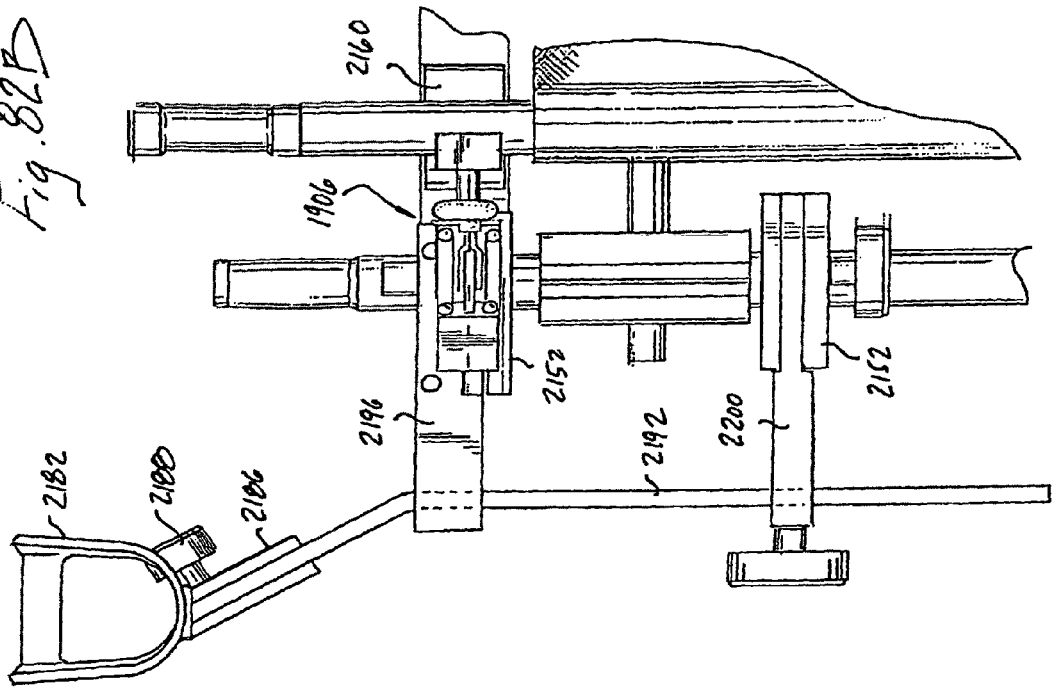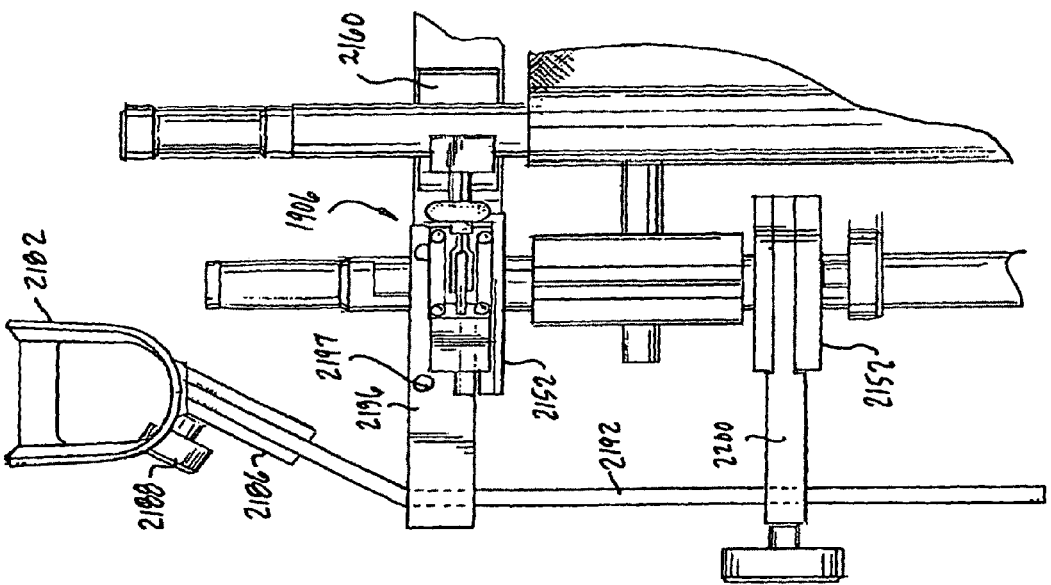

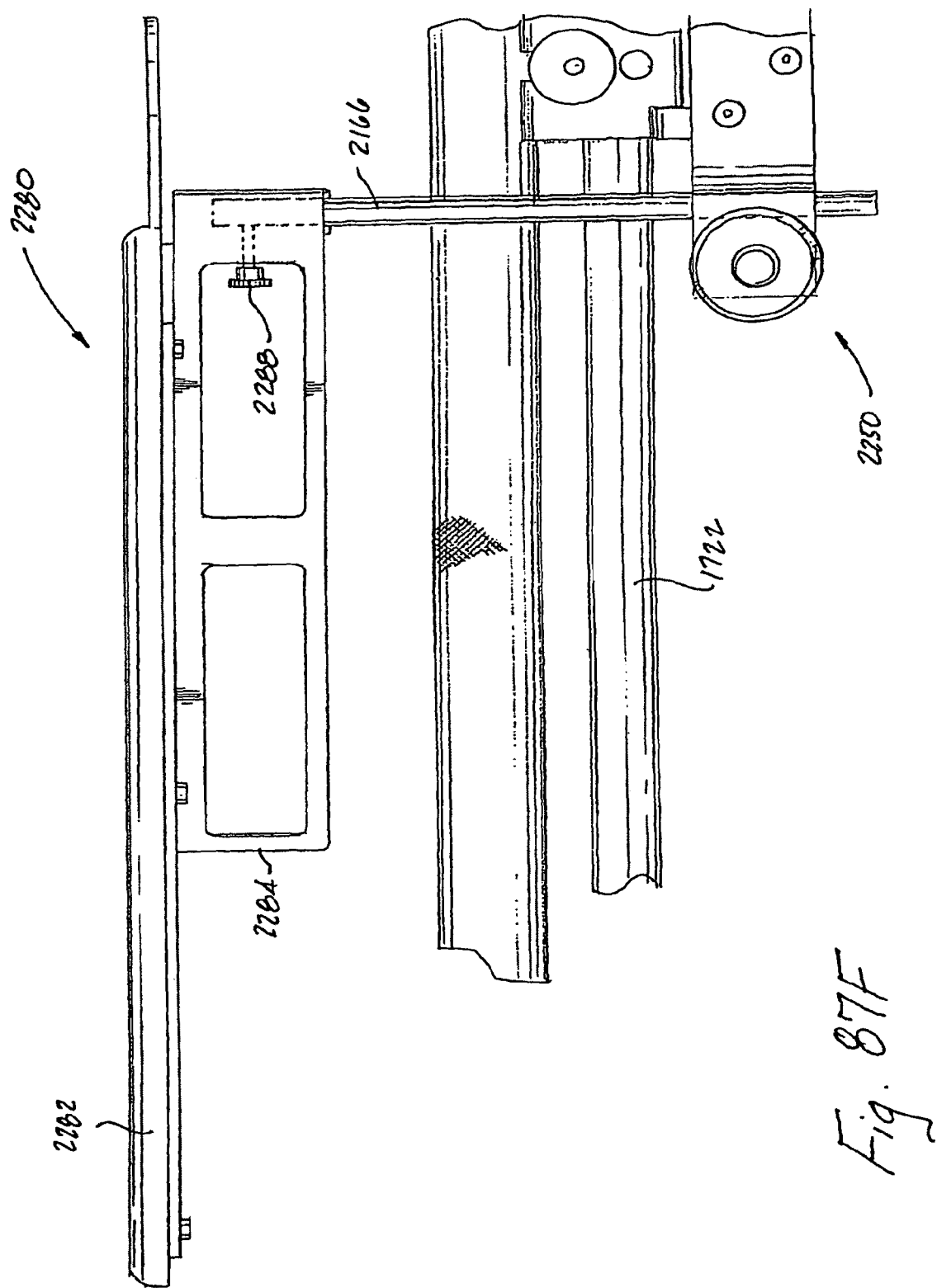

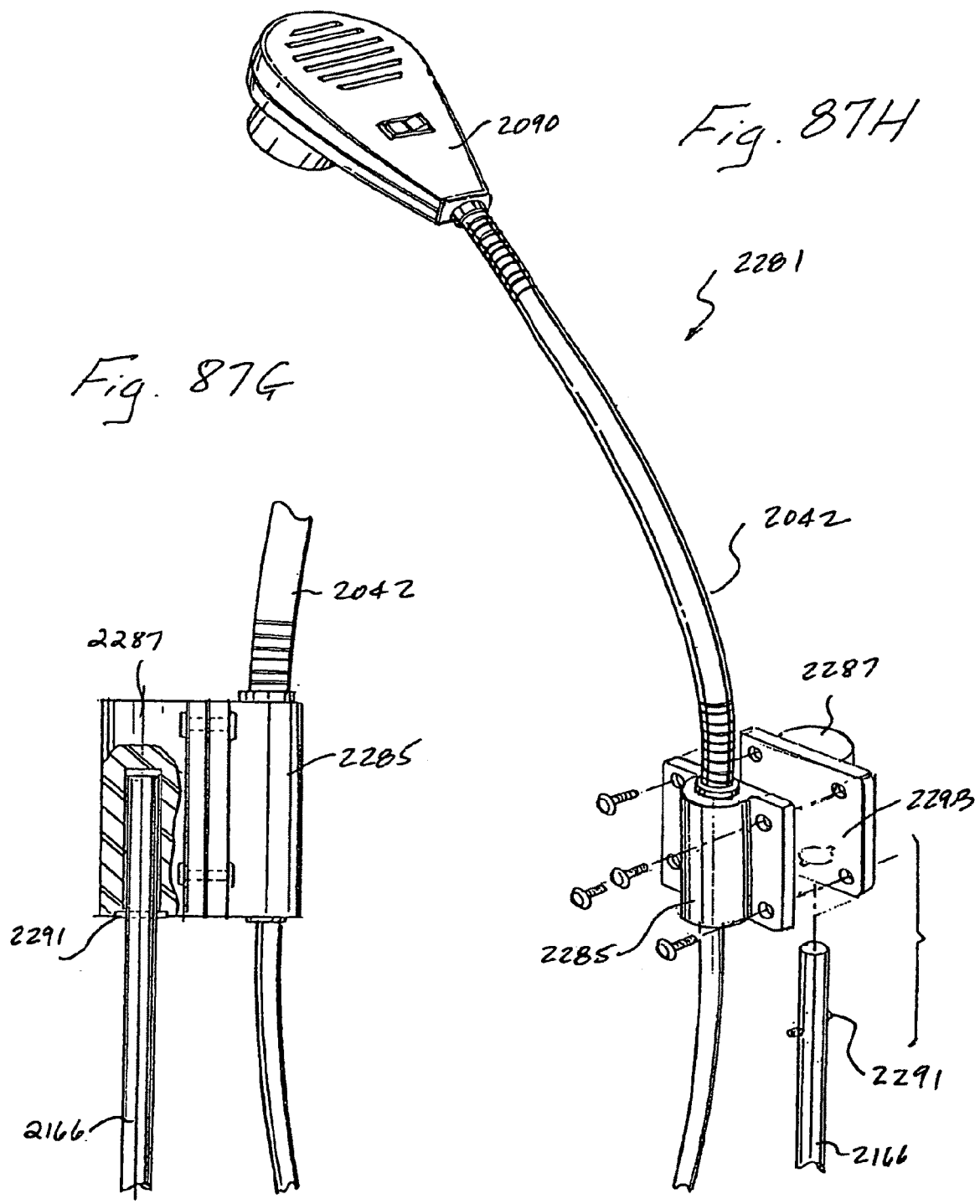

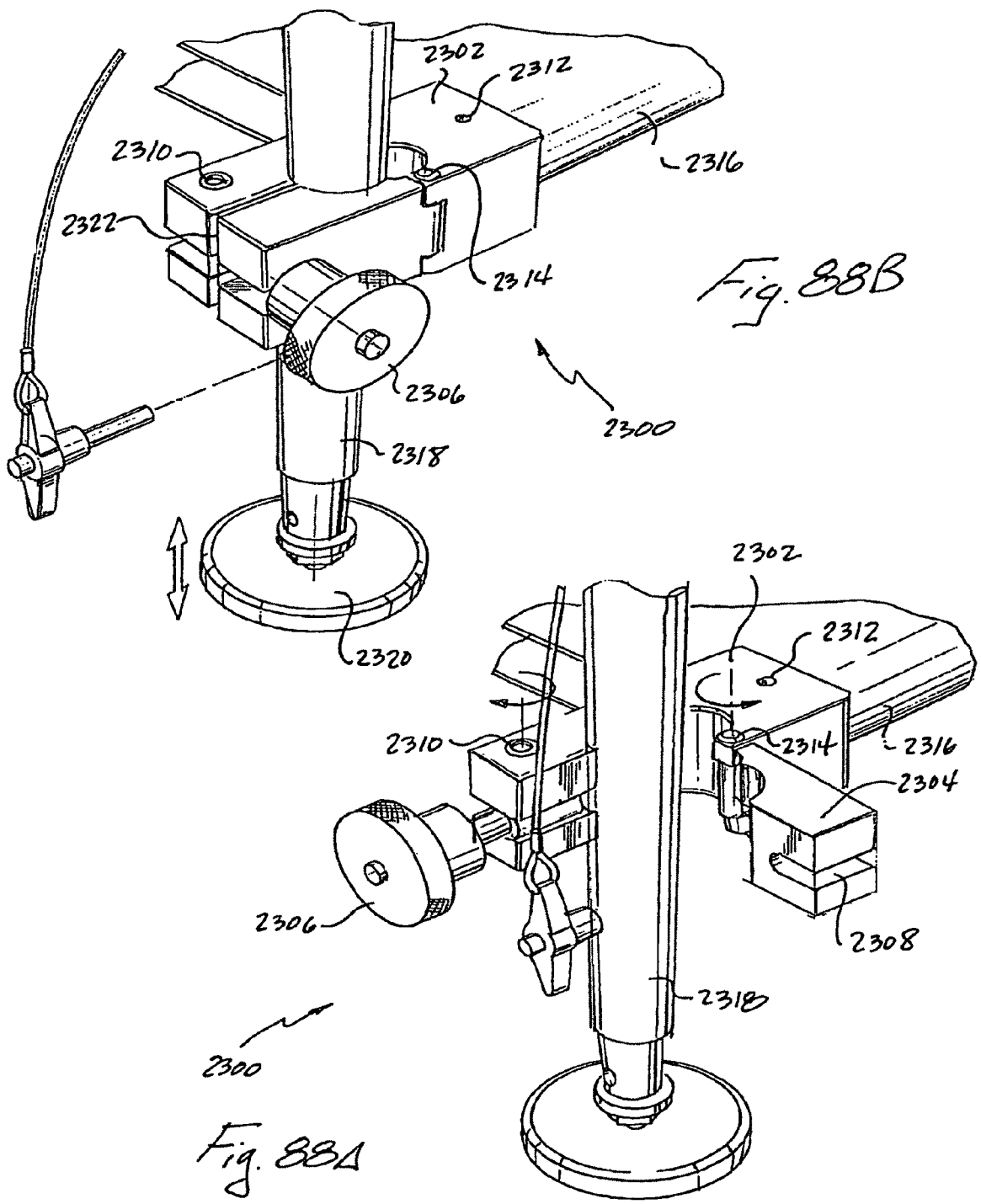

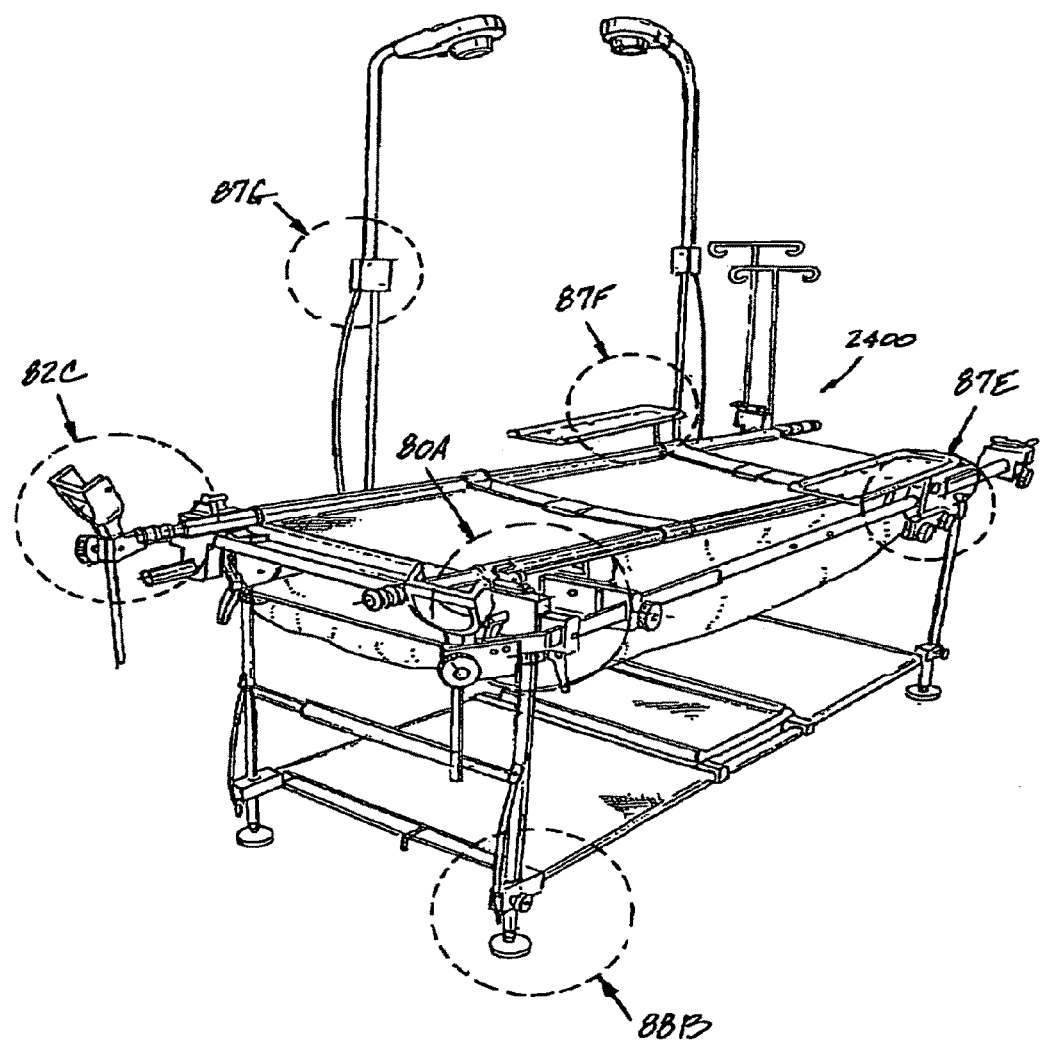

& # x 2 0 ;
CART TRANSPORTABLE MOBILE MEDICAL CRITICAL CARE POINT OF NEED FIELD INSTALLATION UNITS

RELATED APPLICATIONS

This application in part disclosed and claims priority under 35 U.S.C, §120 in part from subject matter disclosed in my earlier filed patent application Ser. No. 11/705,396, filed Feb. 9, 2007, which application is a continuation of application Ser. Nos. 11/396,157 and 11/396,158, both filed Mar. 31, 2006, which are continuation-in-part applications of application Ser. No. 10/686,948, filed Oct. 15, 2003, which is a continuation-in-part of application Ser. No. 10/431,839 filed May 7, 2003, which is a continuation of application Ser. No. 09/989,376, filed Aug. 24, 2001, now U.S. Pat. No. 6,561,529, and Ser. No. 09/745,116 filed Dec. 21, 2000, now U.S. Pat. No. 6,270,972, which application is based upon my provisional application Nos. 60/246,014 filed Nov. 6, 2000 and 60/233,138 filed Sep. 18, 2000, which applications are incorporated by reference herein. This application also claims priority under 35 U.S.C. §119(e) of provisional application Ser. No. 61/125,785 filed Apr. 28, 2008, which application is incorporated by reference herein.

FIELD OF THE INVENTION

The present invention relates to a mission adaptable set of components for a multiple-purpose collapsible portable mobile medical critical care point of need field installation unit, which may convert to a utility table, for use in camping, hunting, search and rescue, medical treatment, disaster relief and other outdoors activities. The cart can be easily assembled in a number of uses, and disassembled for easy transporting of the cart in a movable storage bin, a backpack or a hand-carried bag. A plurality of carts and related components may form a reconfigurable, modular, expandable, transportable, mobile medical critical care point of need field installation system.

BACKGROUND OF THE INVENTION

Various single use carts exist for carrying canoes and small boats by hand. Other outdoors-oriented carts exist for carrying game. In addition, wheelbarrows and small carts are used for transporting gear at outdoors locations. However, none of the existing carts can be converted to a versatile portable cart which can interchangeably function as a rescue cart with a carrier for injured persons and be converted to a stationary utility table, as a portable canoe or boat cart which can be folded down and transported within the canoe or boat, as a game cart for transporting game over long, rough terrain, or as a gear cart, all of which can broken down into a carrying position, by hand or by back.

Hirayama et al., in U.S. Pat. No. 6,197,358, discloses a mobile hospital system entirely constructed of interconnected shipping containers. These large containers form hospital rooms that can serve as surgical suites, examination rooms, storage, and a variety of infrastructure support facilities from supplying electrical power, water, and fuel to a communications center. These units can be transported by ocean freighters, helicopters, rail, or over land by tractor trailers. They can be set up remotely and then shipped out ready for use. They are moved to their final destination much as any cargo container; the movement requires a tractor to set them in place and roads to get them there, unless the set-up is on an airfield or at a dock. While the equipment inside each shipping container can be varied, the exterior box-like trailer shaped containers are large and fixed in shape.

OBJECTS OF THE INVENTION

It is therefore an object of the present invention to provide a mission-adaptable set of interchangeable components forming movable and stationary load supports and work surfaces.

It is an object of the present invention to provide a versatile multi-purpose cart, which is quickly assembled or disassembled.

It is also an object to provide a multi-purpose cart, which quickly converts from one use to another.

It is further an object to provide a cart which as a stable, flat platform for supporting cooking devices, machinery, camera tripods and the like.

It is yet another object to provide a caravan of components for a load support system, which is stable during transport over rough terrain.

It is yet another object to provide a portable collapsible cart/utility table with minimal fasteners.

It is yet another object to provide a portable collapsible cart/utility table, which can be stabilized in a position of rest.

It is also an object of the present invention to provide a universally adaptable carrier cart/utility table.

It is yet another object of the present invention to provide a reconfigurable cart for carrying medical rescue stretchers, canoes and small boats by hand, which converts to a utility table for triage and emergency medical response.

It is yet another object to provide a portable search and rescue cart/utility table adapted to carry a stretcher or other carrier for an injured person.

It is also an object of the present invention to provide an outdoors-oriented cart for carrying game or injured parties.

It is yet another object of the present invention to provide a small cart with a well for transporting gear at outdoor locations, which can be converted to a stable utility table with a work surface.

It is also an object of the present invention to provide a versatile portable cart which can interchangeably function as a stationary work surface table, as a portable canoe or boat cart which can be folded down and transported within the canoe or boat, as a rescue cart for injured persons, as a game cart for transporting game over long, rough terrain, or as a gear cart, all of which can be broken down into a carrying position, by hand or by back.

It is yet another object to provide a portable cart/utility table which is either backpackable or which can be carried by hand.

It is yet another object to provide a carrier for transporting military equipment and ordnance.

It is yet another object to provide a cart-hauling clamp for pulling the portable cart/utility table behind a bicycle or motorized all terrain vehicle while resisting tipping over of the cart during directional change of the cart-hauling bicycle or all terrain vehicle.

It is yet another object to provide a portable cart/utility table, which can be used as a wheeled cart on terrain or as a ski cart on snow.

It is also an object of the present invention to improve over the disadvantages of the prior art.

SUMMARY OF THE INVENTION

In keeping with these objects and others, which may be apparent, the present invention relates to a universal mission-adaptable set of structural components forming a myriad of useful movable reconfigurable support carts or stationary utility tables, which can be rapidly and accurately deployed in the field with minimal or no tool assembly.

A mobile medical critical care point of need field installation unit includes at least one assembly of a plurality of rapid movement, rapid set up readily transportable modules capable of being hand carried to a remote location on rough terrain. Each transportable module includes at least one set of interchangeable field assembleable structural components. Each transportable module may include a bin with the necessary field assembled medical treatment supplies and patient support. For example, each transportable module may preferably include at least one bin releasably engageable with and removably attachable to a modular support frame capable of being assembled and dis-assembled, wherein the frame has a pair of load supporting rails, each pair of rails having at least one releasable rail engaging clamp, which clamp is engageable along user-selectable positions of a substantial portion of each said load supporting rail with at least one of at least a pair of struts, the struts accommodating wheel supporting axles, or, upon removal of said struts and wheels, with at least a pair of table support stanchions, wherein further the structural support components further have at least one hand-carried handle and/or at least one support for a medical accessory. The set of interchangeable field assembleable structural components form collapsible wheeled stretcher carriers and multipurpose utility tables for treatment and movement of patients. The storage bins can also have the table support stanchions applied to the bins to form eating tables when the bin is shallow and has a flat top, or can function as bathing tubs when deep and concave.

One or more assemblies of transportable modules and field assembleable structural components can configure as a mobile treatment unit with as a plurality of beds, such as for example, ten beds, designed for rapid set up.

The assemblies include equipment needed to staff an operating room, ICU and triage/treatment and holding facility.

The components of each assembly are transported and housed within the plurality of rapid movement, rapid set-up, transportable modules, which are preferably up to about 50 cubic feet each and each transportable modules weighing no more than 1200 pounds, preferably no more than 750 pounds or less, and which allow a single person to deploy at least one of the rapid movement, rapid set up transportable modules of each assembly.

The transportable modules, bins, rails and field assembleable structural components provide flexibility to form payloads to address variable deployment needs as the needs evolve in the remote location.

One or more of the bins of the mobile medical critical care point of need field installation unit may optionally include a plurality of vertically oriented drawers adaptable to comprise a medicine supply cabinet of horizontally oriented drawers upon pivoting of the bin from a horizontal position of transportation to a fixed vertical position of use on the ground as a medical supply cabinet.

The assemblies of each mobile medical critical care point of need field installation unit include sufficient supplies to operate without external supplies for 72 hours.

Each mobile medical critical care point of need field installation has supplies which include drinking water, oxygen, electricity and advanced treatment capabilities.

The structural components contained in each rapid movement, rapid set up, readily transportable module are interchangeable with respective structural components of other rapid movement, rapid set-up readily transportable modules.

Each assembly of the mobile medical critical care point of need field installation units, having a collection of transportable modules, is adapted to cooperate with other assemblies of transportable modules to scale up to a full size field hospital, with elements in each transportable module being capable of interconnection with elements in other transportable modules.

Preferably, each mobile medical critical care point of need field installation unit has a plurality of assemblies deployed.

The plurality of assemblies of the mobile medical critical care point of need field installation units are preferably deployed in a linked array, such as a closed loop array encircling a disaster or other site in need of medical treatment.

It is further noted that each assembly of the plurality of assemblies deployed in the closed loop array is replaceable by a substitute mobile medical critical care point of need field installation unit in the event one of the mobile medical critical care point of need field installation units is disabled or damaged.

The mobile medical critical care point of need field installation units, including the plurality of transportable modules and each person capable of pushing or pulling each transportation module, may be transported to a remote location by a roadway motor vehicle trailer which can act as a command center, with shower and toilet facilities as well as electronic communication facilities. The mobile medical critical care point of need field installation unit including each transportable module and each person capable of pushing or pulling each transportable module can optionally be transported by air or water to a remote location which is inaccessible to conventional wheeled motorized vehicles, such as trucks and trailers. They can be dropped from helicopters or parachutes by air or brought by boat on navigable waterways.

The releasable clamps for the rails of the set of interchangeable field assembleable structural components preferably include a lower jaw in contact with a rail, an upper jaw mounted on the lower jaw, each jaw having longitudinally extending recesses and therein to grip perimeter frame rails. When assembled, the upper and lower jaws have optional cooperating recesses to grip a support for a medical accessory, of a patient supportable stretcher carrier, and threaded members for attaching the clamping assembly to the rails and the support member.

Optionally the clamps of the structural components are capable of raising or lowering a patient in Trendelenburg positions with raised or lowered head and/or feet.

Each of the cargo bins preferably includes a top shell container of a plurality of shells, each having a top outer surface and an opposing top inner surface; a bottom shell having a bottom outer surface and an opposing bottom inner surface. The top outer surface includes an interchangeable boss arrangement and the bottom outer surface includes a recess arrangement corresponding with the boss arrangement, for aligning a plurality of the cargo bins to be vertically stacked one on top of each other in each assembly of transportable modules. The bins can be flat on top and bottom, or flat on top and concave on the bottom, to fit straddled between a pair hand carried rails.

Additionally, the mobile medical critical care point of need field installation unit includes at least one deployable shelter among the structural components. A shelter can be a tent or a temporary roofed shelter, or other field deployable shelter. Additionally, pre-existing shelters such as public school gymnasiums can be used, if available, to provide shelter.

The present invention also discloses a method of responding to a disaster comprising the steps of:

a) transporting to a scene of the disaster a number of mobile medical critical care point of need field installation units, each of the mobile medical critical care point of need field installation units comprising an assembly of rapid movement, rapid set up collapsible wheeled stretcher carriers and multipurpose utility tables for treatment and movement of patients, a plurality of transportable modules accommodating treatment beds, such as, for example, up to ten beds, which are designed for rapid set up, together with sufficient equipment needed to staff an operating room, ICU and triage/treatment and holding facility, and which are housed within the transportable modules, where each transportable module preferably contains up to 50 cubic feet storage space and weighs no more than 1200 pounds, preferably 750 pounds or less, and which have a means for allowing a single person to deploy each of the transportable modules; and, b) deploying the mobile medical critical care point of need field installation units over an area adjacent to the disaster area sufficiently dispersed to limit exposure of the mobile medical critical care point of need field installation units to collateral damage from the disaster.

The units may be transported by a trailer which functions as a commend center, or if the disaster site in inaccessible to wheeled motorized motor vehicles, then the units can be airlifted and dropped by parachute or helicopter, or can be brought by boat on navigable waterways.

The method further provides two or more of the mobile medical critical care point of need field installation units to be linked up using elements in each mobile medical critical care point of need field installation units being capable of interconnection with elements in other mobile medical critical care point of need field installation units to scale up use of the mobile medical critical care point of need field installation units and allow further specialization of each mobile medical critical care point of need field installation unit.

The method further provides linking the preferably ten or more of the mobile medical critical care point of need field installation unit to form a field hospital at a remote disaster location.

The linking of the mobile medical critical care point of need field installation units may be as deployed in a linked array, such as a closed loop array encircling the perimeter of a disaster site, wherein each mobile medical critical care point of need field installation unit in the closed loop array is replaceable by a substitute mobile medical critical care point of need field installation unit, in the event one of the mobile medical critical care point of need field installation units is disabled or damaged.

Additionally, the method can provide shelter by providing a deployable shelters, such as a tent or other deployable shelter, among the components in the transportation module.

The cart may be a convertible, multi-purpose portable cart, for use in camping, hunting, emergency response, search and rescue operations and other outdoors activities, such as for carrying canoes and small boats by hand. It may also carry game, injured parties or be used for transporting gear at outdoors locations. It is a versatile portable cart which can interchangeably function as a movable or stationary medical rescue carrier, cargo carrier, portable canoe or boat cart, which can be assembled with interfitting parts and with minimal fasteners. It can be folded down and transported within the canoe or boat, as a carry cart for transporting game or injured parties over long, rough terrain or snow, or as a gear cart, all of which can be broken down into a carrying position, by hand or by back.

The cart/utility table is moved by manual pushing or pulling force applied to activate vehicle movement actuators, such as wheels upon terrain or skis upon snow or ice, wherein upon the exertion of force the wheels or skis cause forward or rearward movement of the portable cart.

The cart/utility table is easily assembled or disassembled by connecting its parts together, or optionally assembled from a pre-set storage configuration in a carry pack to an assembled structure.

The cart/utility table easily changes from one use to the other. For example, in one embodiment, a hollow cargo well may contain a second loose layer, which turns into a rescue stretcher when the second layer becomes taut when zipped up from a loose, relaxed state within the cargo well to a taut rescue stretcher for carrying injured persons thereon.

In an alternate rescue embodiment, clamps can be provided on shortened horizontal support members to hold rails to hold medical rescue stretcher rails, and optional handles or pivotable kickstands can be further attached by clamps to the stretcher rails.

In military applications, the height of the vertical struts can be lowered to keep the injured person on a low profile stretcher close to the ground, to avoid visible detection. In such a case, the handles can optionally easily rotate from a handle carry position to a stationary kickstand mode.

The portable cart is preferably under thirty (30) pounds, preferably twenty two (22) to twenty eight (28) pounds, so that it can be carried by hand or within a backpack over rough terrain. It is collapsible, so that it can be disassembled and carried in a canoe or small boat, and then reassembled with minimal assembly steps and parts, at another destination along the canoe or boat's journey.

To prevent flat tires, its wheels are preferably solid core tires, which cannot get flat, or made of cellular materials, such as medium density, micro-cellular urethane, with stainless steel bearings, over which the wheels rotate. A typical wheel has two press fit bearings adjacent to an integrally molded hub. While the typical wheel is about 2-3 inches wide, for transporting cargo or game on sand or granular terrain, the wheels may be wider, such as 4-6 inches in width.

For maneuverability in snow-filled winter scenes, optional ski members, including skis, are attached to vertical braces having a length corresponding to the radius of the cart's wheels. The vertical ski braces are attached to the vertical struts where the wheel axles attach.

For hardiness, the material of the structural frame components is preferably a lightweight but resilient and strong material, such as, for example, 60-61 T6 fully anodized aluminum, or stainless steel. In a substantially pre-assembled optional embodiment, in a storage position within a carry bag, the vertical struts are connected to horizontal supports, which are further engaged with rails to hold a cargo well or rescue stretcher. Pivoting of the horizontal supports about each respective longitudinal axis to a position of rest biases the resiliently engaged rails to return to their natural position of use when released from the storage position.

These pivotable support and strut assemblies can be further strengthened by optional V-shaped braces, which are positioned where each vertical strut meets each corresponding horizontal support member.

The portable cart/utility table can hold up to twenty cubic feet of cargo at 500-750 pounds, and for manual pulling by a single person easily pulls 300 pounds. The portable cart/utility table is durable to carry heavy weight over rough terrain, such as rock-strewn dirt trails or sloping riverbank surfaces. In forming multiple critical care point of need treatment installations in the field at a remote site of rough terrain or other inaccessible geographic location, such as a flood or disaster site, the structurally components can be transported in transportable modules of interchangeable wheeled components, which support hollow bins carrying up to 50 cubic feet of cargo each, weighing up to 1200 pounds, preferably 750 pounds or less, for moving by a single person. At the site the wheeled components carrying the bins can be re-configured and converted to stationary medical supply cabinets and medical treatment tables for victims.

To carry a canoe or boat, two horizontal load supports optionally include support cushions upon which the canoe or boat rests. The position of the horizontal load supports can be varied to accommodate various widths of the canoe or boat.

To function as a game or rescue cart, the frame, such as a pair of U-shaped rails which are joined end to end, is provided upon the horizontal load supports to form a rounded rectangular frame, over which a taunt, but slightly stretchable, bed of fabric is placed, such as canvas or other flexible material, i.e., plastic or netting. The bed includes sewn loops through which portions of the U-shaped rails of the frame are inserted. Other fabric fasteners such as clips, zippers or eyelets can be also used.

In an alternate embodiment, the boat support cushions are removable from the horizontal load supports and are replaced by a two-piece clamp, which attaches by at least one fastener, such as a pair of screws, to the horizontal load supports of the cart. Conventional stretchers or personal rescue carriers, such as Stokes-type baskets, are clamped to the cart within the clamps on each respective horizontal load support. In this embodiment, the boat support cushions are attached to a thin plate, such as of ⅛ inch aluminum or otherwise, which has at least one fastener such as a pair of threaded studs, insertable with the respective hole or holes in the horizontal load supports, so that the boat support cushions can be removed and replaced by the stretcher-bearing clamps.

To function as a wagon cart with a well for carrying gear, a hollow fabric well, such as of canvas, is draped between the horizontal load members and over and around the front and rear U-shaped brackets. A cover may be provided to cover the gear therein. The well and cover can also be made of other suitable flexible materials, such as plastic, netting or canvas. An optional removable hard bottom substrate floor layer may be provided within the cargo well. While this floor layer may be of any hard material, materials such as lightweight aluminum, wood or marine polymer plastics are preferred.

Furthermore, the cargo cart may have an optional handle from which may be draped a further optional accessory cargo bag. In the stretcher embodiment, where the upper layer is fastened taut, the handle may have a removable headrest pillow.

Kickstands may be optionally provided to stabilize the portable cart/utility table during rest or during loading of contents thereon.

In yet another embodiment, an anti-tipping bicycle attachment is provided to attach the cart to a bicycle while preventing the cart from turning over during transportation.

In one embodiment, the cart/utility table has two wheels for cargoes weighing from 300-500 pounds. However, for heavier loads, such as for 600-1,000 pounds, up to 1200 pounds, an optional double axle version includes two pairs of overlapping wheels for heavier cargo. In this embodiment, the portable cart/utility table uses four wheels in the overlapped configuration, with an optional hard molded canister. In this overlapping, wheeled version, a long axle attaches a pair of front wheels and a short axle attaches a pair of rear wheels through the respective vertical supports, although the length of the axles can be reversed. Using four wheels doubles the carrying capacity of the cart/utility table, and the overlapped positioning of the pairs of wheels maintains a short wheelbase for compactness, for maneuverability and for climbing slopes or ledges.

In the four-wheeled embodiment, double parallel rails may be provided for additional structural strength. The overlapping, dual axle, four-wheel version gives the user extra pivot points on rough terrain. For example, pushing down upon the optional handle enables the user to lift the further away distal wheels off the ground. Furthermore, pulling upon the handle enables the user to lift the nearer, proximal wheels off the ground.

The accessory which is placed upon the vertical supports of either the two wheeled or four wheeled cart/utility table, such as the rescue stretcher, the boat cushion, the cargo cart, etc., can be attached permanently or by fasteners to each horizontal load support member of the portable cart/utility table. However, in an alternate embodiment, the horizontal supports have longitudinally extending channels to slide the accessories in on top of the horizontal supports. Furthermore, the accessory, such as a railed rescue stretcher, can be carried by a clamp which itself is attached to the horizontal support by insertion in such a channel, or the stretcher can be dropped in and clamped to a pair of rails forming the horizontal support.

This clamp upon each horizontal support member may be a one-piece clamp with a full width top section and short end pieces, which mate with and slip into a T-shaped slot channel of the horizontal support member. Alternatively, the clamp may have a full width bottom member which mates with and slides into a T-slot of the horizontal support. In yet another embodiment, two short identical clamp members are inserted into the T-slots of the horizontal member at the two ends. Moreover, the clamping sections can have spring-like gripping action to be retained upon tubular members, such as medical rescue stretcher rails, or the clamps can use fasteners such as fasteners, such as thumbscrews or ball plungers for retention.

In yet another embodiment, a covered canister can be held in place over the rails of the frame of the cart, in a stable position, by virtue of its weight being held in place upon the rails of the cart, wherein a concave, downward facing channel engages the linear, upper convex support surface of each rail.

Furthermore, the cart of the present invention can be disassembled and broken down for hand held or backpack transport and it can easily be assembled for its varied uses. Moreover, when a boat or canoe is carried, the cart has a precision balance feature that rotates the wheels to maintain the cart in a horizontal stable position.

The convertible cart/utility table of the present invention is just one of many modular embodiments which may be made of the present invention. Because of the interchangeability of the parts, the components of the convertible cart/utility table can also be used for assembling a boat hauling cart, a game hauling cart, a wheelbarrow-type hauling cart, a low profile stretcher, a high profile stretcher and a component of a mobile emergency medical treatment response system.

Furthermore, in the rescue mode, the convertible cart/utility table allows for one person to transport an injured person instead of two on a stretcher. Because of the convertibility of the cart, when the person is brought to a triage situation for treatment and assessment, the wheels of the cart can be easily removed without tools and replaced by one or more kickstands to stabilize the cart.

Therefore, in its broadest sense, the present invention is a movable support, such as a convertible cart/utility table, which is collapsible for storage and transport and is able to be assembled and dis-assembled for use in carrying a load, and alternatively functioning as a stationary utility table having stationary legs instead of wheels.

In one embodiment, the convertible cart/utility table includes a pair of modular load support members which each includes at least one carrying strut extending downward therefrom and a carrier.

The convertible cart/utility table is preferably carried by handles, which may be extensions of parallel rails constituting the load support member, or the handles may be separate handles having handle extension members nesting in a receiving member of the load support for receiving an adjustably removable handle extension member, such as a tube. The handles may be single grips extending coaxial to the first or the second horizontal frame rails of the movable support.

In an alternate embodiment, the handles in a pivotable rectangular brace configuration, including a first set of manual grips extending between parallel connectors, which are further connected by a rotatable transverse bar, to enable the handles to be rotated up to a carrying position, or down to a storage position.

These optional pivotable handles lock in an upper position for hauling the cart, and reverse to a lower position for storage, or in a low profile use, contact the ground surface for operating as a kickstand.

In addition, the handles may optionally also pivot about their longitudinal axis downward to reach ground level to function as a kickstand for a low profile table cart, or may swing out of the way in a high profile cart when stored during travel or during the stationary utility table mode.

By "low profile use" it is meant that the movable load support is positioned low to the ground to avoid detection, such as in military rescues. By "high profile use" it is meant that the movable load support is positioned higher up from the ground, such as for example, between 30 and 36 inches, more or less, to allow for access to the load. For example, if the load is an injured person in a rescue operation, the height is high enough to allow medical treatment personnel to conveniently treat the injured person. If the load is cargo, then the height of the high profile movable support, such as a cart, is convenient for stowing and removing the cargo being transported.

These axially pivotable handles may slide within a hollow support rail, and be locked in place by fasteners, such as spring pins extending through respective holes in an outer wall of the hollow support rail.

Preferably, the handle includes a first hand grip located coaxially to the handle shaft or tube and an outer second handle grip, which is located parallel to the handle shaft or tube, which is in rigid connection with the coaxial handle grip. Both parallel hand grips are connected by parallel brace members laid perpendicular to the hand grips. The handle member is lockable in at least two positions, such as an upward position for hauling the convertible cart/utility table and a downward position for using the handle as a kickstand in a low profile embodiment, or for storage in a high profile embodiment.

These handles may be locked in place with a spring pin.

The longitudinally extending structural frame rails of the movable support can each accommodate a handle extending therefrom, each frame rail having a connecting end and a handle attachment end, and a plurality of spring pin apertures for attachment of additional members.

In a preferred embodiment, there are at least two spring pins, wherein a spring pin of the plurality of spring pins reversibly protrudes a spring pin aperture of the plurality of spring pin apertures located on each respective frame rail, such as a first horizontal tube.

Preferably, for knockdown transport, each frame rail may be made of several components, such as a longitudinally extending mid section joined at each opposite end to longitudinally extending first and second connecting end portions. A first spring pin aperture is located on each lateral side of the connecting ends of the first horizontal tube and the second horizontal tube; and a second spring pin aperture is located on each top side of the connecting ends of the first horizontal tube and the second horizontal tube, a distance farther from the connecting end than of the first spring pin aperture. Other pin locations are applicable.

These assembled frame rails together accommodate optionally one or more clamps, with at least one clamp in communication with a first horizontal tube and at least one other clamp in communication with the second horizontal tube, with both tubes forming the frame rails of the movable load support.

In a further alternate embodiment, one or more transverse support bars, preferable at least two transverse support bars, are substantially perpendicular to the pair of longitudinally extending frame rail tubes, and may optionally be in communication with a clamp holding a carrier in removable communication with the clamp or clamps. The carrier may be a rescue stretcher, Stokes carrier, cargo bin, open cargo hauling well, rack or other load support means.

The clamp may be attached to a strut through which accommodates axles therethrough for movement actuators, such as wheels.

Optionally the clamp may be at least one clamp, reversible for accommodating a range of sizes of carriers, including a bottom surface, an opposing top surface, and a inside surface, a clamp front surface and an opposing clamp rear surface. The bottom surface includes a plurality of grooves for optionally receiving one of the horizontal support tubes of the frame rails, with the reverse top surface including at least one groove for optionally receiving a horizontal support tube. This reversible clamp has a first bore extending from its top surface to its bottom surface, for allowing a bolt to pass therethrough. The reversible clamp also includes a rail-accommodating aperture extending from the clamp's front surface to the clamp's rear surface for receiving a horizontal support tube of a frame rail, and the reversible clamp has a tightening knob for securely attaching the clamp to each respective horizontal support tube;

The clamp also includes a latch to tighten a load support, such as a stretcher or other rail in place. So that the latch does not become loose, the threaded securing bolt of the latch, which is threaded into a threaded bore of the body of the reversible clamp, includes a bottom flange wider than the threaded bore, which includes a reciprocal flange recess to accommodate the flange of the threaded securing bolt. An optional fixed nut or flange is located at the end of the bolt, for preventing the separation of the joinable latch and main body parts of the reversible clamp and the bolt from the clamp.

In a preferable embodiment, the clamp may be a heavy-duty clamp having a lower portion having a first concavity for insertion above the horizontal support tubes and a second concavity for slidable and removable insertion of a carrier or a second carrier, a top surface and a guide boss for removable attachment of an upper portion. The upper portion has a third concavity for slidable and removable insertion of a carrier and a guide recess for removable attachment to the lower portion. The heavy duty clamp includes a first latch rigidly connected to the clamp's lower portion, in communication with the first concavity for gripping the horizontal support tube of a frame rail of the load support carrier securely.

The heavy duty clamp also preferably has a second latch, preferably at an upper end, which second latch is rigidly connected to an upper portion of the heavy duty clamp in communication with the third concavity for gripping the load support carrier securely.

The heavy duty clamp may optionally support one or more rails holding a fluid catch under the load support carrier, to catch blood and other body fluids if the load support carrier holds an injured person being medically treated thereon.

This second latch includes a lever latch for manual securing of the load support carrier and a clamping jaw for forming a frictional contact force between the latch and the frame rail of the carrier.

When the carrier is a stretcher secured to the convertible cart/utility table, the pitch of the stretcher can be adjusted, such as for example, to raise or lower the head of the person being treated. In this case, the stretcher carrier has a front end and a rear end, wherein the front end of each rail is secured to a respective upper hook receptacle portion of the clamp and the rear end of each frame rail of the carrier is secured to a respective lower hook portions of the clamp, resulting in an elevation differential between the front end and the rear end of the second carrier. The clamps come in pairs so that the front and rear clamps on each side are equidistant from each other in length, with each secured to opposing horizontal support tubes of each frame rail.

In such a case of the head portion of a medical stretcher or other carrier being raised higher than an opposite foot end, the height of the respective head and foot portions can be varied by placing the foot end in the lower hook portions of the foot clamps and the head end in the higher hook portion of the heavy duty clamp. Optionally, the height can be further varied by varying the height of each kickstand, wherein the rear kickstand is in a position of the clearance being a minimum, and the front kickstand is in a position of the clearance being a maximum, resulting in maximum height differential between the front end of the carrier and the rear end of the carrier.

Additionally, the diameter of the upper latch jaw is effectively less then the inside diameter of the rail support concavity of the clamp for allowing the jaw to accommodate a change in pitch of the carrier, in case the carrier has to be tilted, such as for raising the head of an injured person being treated upon the load support carrier. This latch jaw includes cylindrical portions and a contact portion including a concave surface for evenly contacting the convex surface of the carrier's frame rail.

Optionally, the kickstand may be a pair of kickstands, namely a front kickstand and a rear kickstand, adjustable in width and insertable through the clamping means and clamped onto each end of each horizontal support frame rail and extending substantially vertically therefrom.

For further strength of the movable support in a stationary position of use as a utility table, the kickstand may include a substantially vertical left leg, substantially vertical right leg, and a kickstand connecting bar detachably extending horizontally between the left and right legs. Each of the left and right legs of the kickstand may include a lower end and a height adjustable member insertable to the legs by means of a swivel joint for allowing the legs to rotate freely.

The height adjustable members adjust the height of each leg, preferably by insertion of a first pin, such as a locking pin or a spring pin, insertable within a selected aperture of a plurality of pin apertures in substantially vertical orientation, wherein the height adjustment member is removably insertable into each leg for a predetermined incremental height interval, such as about one inch.

Besides this macroadjustment of the kickstand leg by selective insertion of the pin into a selected aperture, the height can be adjusted by a microadjustment means, including the kickstand having a screw end and the lower end of the leg includes a receptacle, for the screw end, for fine adjustment of the height of the movable support, where the distance between the edge of the leg of the kickstand and the lower edge of the height adjustment member is a clearance distance.

The heavy duty clamp also includes an optional outside surface having a hinge for removably attaching at least one rotatable swivelable accessory therefrom, wherein the accessory is an examination or surgical lamp having a flexible or hinged neck, an instrument tray, an arm or leg limb platform support or a gravity or pump fed intravenous (IV) pouch support having an insertable vertical rod and a component for insertion into the vertical rod into the hinge.

The hinge accessory may include a splitting attachment having an insertion pin for removable and rotatable communication with the hinge, and at least two hinges extending substantially vertically for additional components in a stacking arrangement, such as, for example, one instrument tray being elevated above another instrument tray.

If there is a person with blood loss during surgery in the field, this convertible cart/utility table can also have an auxiliary fluid catch draining fluids into a closed shallow bucket.

In addition, medical accessories and a power pack for lighting and for instrument power can be attached to the cart.

In the basic cart mode a transverse member connecting the load support members is not necessary, as the downwardly extending struts accommodate the axles for one or more pairs of wheels, which act as transverse support members for the cart in its basic transportable cart embodiment.

The load support member itself may be a) a resting member supporting a load thereon or, b) it may be a clamp. The clamp may be adjustable by a handle, which may have a stop to prevent complete unscrewing of the stud of the handle so that the clamp cannot come apart. The clamp can be a pair of jaws, or it can be a longitudinally extending slider clamp where the load support slides into a recess between two overhanging cantilevered members extending upward from the base.

The convertible cart/utility table is also useful in military and emergency situations. For example, in addition to rescue of injured military or civilian personnel, the cart may be used in areas contaminated by toxic substances or weather related disasters. Besides moving an injured party in a triage situation to a treatment area in a detoxification environment caused by a weapon of mass destruction such as gas, smoke or other noxious particles, there may be a necessity for a wash of the persons so the contaminated persons can be brought by the convertible cart/utility table to a wash area where they are first immediately washed of surface contaminants. In this weapons of mass destruction treatment facility there can be any one of these pieces of equipment to wheel the injured persons to decontaminate them. If they are not ambulatory, for any further treatment they can be brought to the medical facility.

The medical facility can set up as a fully operational ten (10) or more bed field hospital treatment facility with ten (10) or more sets of bins carried on ten or more carts, wherein each upper most bin shell container of each set of containers for each bin can be tilted and moved can be moved from a horizontal carrying position to a vertical stand upright position with drawers extending outward therefrom. A mobile hospital is modular in its design. If there is a need for more than ten (10) beds, then increment units of ten can be provided and deployed to a site. For rapid deployment, the convertible cart/utility table with cargo hauling bins can be hauled by all terrain vehicles in a rapid manner.

Deployment of 10 bed units of field hospital treatment facilities can be accomplished by any transport compatible with the terrain or emergency situation encountered. This includes truck, rail, ocean vessel, boat, hovering helicopter with winch, or even airdrop. Since the equipment can be ready for use within an hour, large shelter facilities for the equipment that take days to deploy and several hours to erect are to be avoided. Where feasible, hard wall trailers can be used, but cargo carts configured to carry a self-erecting softwall structures to house a 10 bed facility can be deployed along with the 10 bed field hospital treatment units using the same deployment methods as for the field hospital units.

The field hospital treatment facilities of this invention are mission adaptable at several levels. The modularity makes them easily transportable. The convertible cart/utility tables are easily adapted to particular patient and emergency situation needs. The equipment carried on the utility carts likewise can be tailored to the region, season, and particular situation encountered. Thus different protocols from current practice can be supported when beneficial. The enabling factor is the use of small wheeled elements, small 10 bed units, and the ability to move entire units easily when conditions dictate. No powered handlers such as fork lifts are required. Another important aspect of the modularity is the feasibility of providing emergency preparedness for an area by dispersing resources to pre-determined locations prior to a disaster thereby assuring survivability. Response time of personnel is greatly reduced, and hardening of the equipment itself to targeted attack is achieved through equipment dispersal.

In addition, the convertible cart/utility table easily converts without tools from either a wheeled embodiment to a fixed table embodiment wherein the wheels are replaced by one or more kickstands. When in the utility table mode, the cart can have extending therefrom, by clamps, one or more swivelable platforms supporting injured limbs of a person or medical supplies such as an instrument tray, a light, an I.V. tube pole, etc. In this case, the platform is pivotable, but not removable. It pivots like a hinge to any desired position.

Auxiliary transverse bars can be added when in the fixed table embodiment. Additionally, there are micro and macro adjustments of the height of the cart depending on the need for access to the injured person on the cart. For example, there are macro adjustments in one-inch (1") increments to raise the cart up and there is also a micro adjustment by a threaded member for up to a one-inch (1") of micro adjustment.

To hold rescue stretchers or other carrier rails, a heavy-duty utility clamp has a concave hook portion for dropping in a stretcher rail and a lower concave portion for dropping in a rail holding an auxiliary fluid catch basin or sling. However, one end of the stretcher can be put in a lower concave hook of the heavy-duty utility clamp to slant the position of the stretcher. Furthermore, by adjusting the transverse bars and/or the axles, the width of the utility table can be widened, so it is totally adjustable to fit any size carrier or stretcher.

In addition, in order to raise the head of an injured party, raising one end and lowering the other end can slant the table portion. A preferable ten-degree (10°) adjustment can be done with the adjustable foot height and then there is an additional five degrees (5°) by adjusting the heavy-duty clamp and raising or lowering one end of the stretcher on the utility table.

Hinged platform arm or leg board platforms may extend from a clamp attached to the frame rail of the utility table. The platforms swing out radially in a horizontal plane, to provide maximum adjustability for the position of the limbs of a victim or for the positioning of medical/surgical accessories, such as intravenous stands, instrument trays or examination lamps. It is further noted that attached to the auxiliary arm board platforms may be poles for supporting an intravenous fluid pack or a tent to repel insects from the treatment environment. While other suitable measurements may be used, these arm board platforms are preferably six inches (6") wide and the leg boards approximately eight inches (8") wide.

The convertible cart/utility table also optionally includes a clamping means, which may be a latch, a pair of clamping jaws, a longitudinally extending slotted extrusion or a receptacle.

The axle-carrying struts each have a lower end with an axle mounting means at the lower end and at least one axle extending through each axle-carrying vertical strut. Each axle has at least one vehicle movement actuator, such as a wheel or a ski, of a pair of vehicle movement actuators attached at opposite sides of the convertible cart/utility table, which also has a carrier attachable to the load support member, wherein when the carrier supports a load thereupon. Such a carrier may be a hollow well, a bin, a pair of rails, a rescue stretcher or Stokes carrier or other support surface or container. Optionally the carrier may be rotatable from a horizontal position of travel to an upright position as a shelved cabinet.

The bin canisters are preferably made of fiberglass composite, acrylonitrile butadiene stryrene (ABS) or any other appropriate material. The bins canisters offer an alternative to traditional containerization of supplies. The combination of lids, bottoms, trays and drawers can be configured in various combinations providing flexibility form payloads to address variable deployment needs as they evolve. The designs allow payloads to be changed without the need to re-containerize supplies. Up to 1200 pounds, preferably 500-750 pounds can be deployed by a single individual with a loaded bin mounted upon a cart of the present invention.

The parts are easily assembled and disassembled without the necessity of tools. For example, the parts can be held together by clamps or receiving receptacles including a spring pin aperture for receiving a push pin for secure interconnecting of a component of the convertible cart/utility table, such as the handle tube within the receiving member of the load support member. The components can also be held in place by pins or other fasteners positioned within diametrically opposed transverse holes for allowing a through pin to extend therethrough.

While in simple embodiments the convertible cart/utility table includes a single pair of wheels attached by struts extending down from the load support members, in other embodiments the convertible cart/utility table includes two pairs of axle load supports and four vehicle movement actuators, such as wheels.

To convert from a movable support, such as a convertible cart to a stationary utility table, the downwardly extending axle-supporting struts are detached by their clamping means from the load support members, and replaced by stationary kickstands, which contact the ground to maintain the utility table in a stationary position.

One kickstand may be used with the wheeled struts still in place, although for maximum stability all wheeled struts are replaced by kickstands.

The kickstand may be a single rod extending from the load support member to the ground, or it may be an H-shaped or U-shaped pair of downwardly extending rods connected by a widenable transverse member, to vary the width of the convertible cart/utility table.

The convertible cart/utility table may also include at least one cargo bin removably connected to the load support member.

Each of the cargo bins preferably includes a top shell container of a plurality of shells, each having a top outer surface and an opposing top inner surface; a bottom shell having a bottom outer surface and an opposing bottom inner surface. The top outer surface includes a boss arrangement and the bottom outer surface includes a recess arrangement corresponding with the boss arrangement, for aligning a plurality of the cargo bins to be vertically stacked one on top of each other in a caravan of bin-hauling carts. There may also be one or more intermediate shell containers.

The bin of the convertible cart/utility table has one or more latches for removably connecting the top shell to the bottom or intermediate shell, wherein the latch is optionally lockable. Preferably, each bin is made of a sturdy, lightweight material, such as fiberglass.

A top shell can be removed from the stack of bins and stood upright as a medical or other supply cabinet, which includes slidable drawers, anchored to and within the top shell of the cargo bin. Preferably, the top inside surface and the bottom inside surface of the shells of the bin each includes a foam lining for limiting the movement of contents within the cargo bins. Additionally, the shells further include one or more optional removable interior containers.

The mission-adaptable components may therefore deploy a portable cargo bin having a cabinet system and at least one locking latch, and be secured to the collapsible cart/utility table, in a method including:

i) in the case of the collapsible cart/utility table having vehicle movement actuators, such as wheels, securing the wheels in place to prevent movement, ii) applying force to tilt the collapsible cart/utility table about a first axis until a first rest position is reached, wherein the force is optionally applied to a pair of handles in connection with the collapsible cart/utility table, and the first axis of tilt being the vertex formed of the intersection between the bottom outer surface and a bottom front surface;

iii) unlatching the straps holding the shells of the bin;

iv) applying force to tilt the collapsible cart/utility table about a second axis until a second rest position is reached, wherein the second axis of tilt is the vertex formed of the intersection between the top outer surface and the top front surface;

v) disengaging the latch or latches; and vi) separating the top shell from the bottom shell and the portable cart/utility table, allowing it to return to the first rest position or optionally to return fully to the initial standing position.

The convertible cart/utility table may also include a modular load support member which includes at least one axle-carrying strut extending downward therefrom, a receiving member for receiving an adjustably removable handle tube and optionally a clamping means.

The clamping means may be an extrusion slider clamp rigidly attached to the modular load support member, having a top clamp surface, an inside edge and an outside edge. The top clamp surface further includes a groove formation aligned with the inside edge and the outside edge for horizontally receiving a carrier therein.

In this case, the axle carrying struts have a lower end with an axle mounting means at the lower end, at least one axle extending through each axle-carrying strut. Each axle has at least one vehicle movement actuator of a pair of vehicle movement actuators attached at opposite sides of the cart and a carrier attachable to the clamp, wherein when the carrier supports a load thereupon.

The axle carrying struts may each includes a lower end with an axle mounting means at the lower end, at least one axle extending through each vertical strut and a plurality of transverse holes for resisting impact. A carrier is attachable to the load support member, wherein when the carrier supports a load thereupon. Additionally, each axle carrying strut may have a pair of support trusses for increased load support, the trusses being rigidly connecting the axle carrying support and the extrusion clamp.

As a result, the convertible cart/utility table is mission adaptable for a variety of missions, and is not mission specific, such as for one particular task. The components break down into interchangeable parts, and are easily transported or stored for adaptability to a myriad of tasks in both friendly and hostile environments.

In contrast to the bulky container modules of Hirayama '358, the reconfigurable, modular, expandable, transportable, mobile medical critical care point of need field installation system of this invention is primarily for use in soft-wall environments, such as tents. Since no rigid room modules are shipped, the volume and mass of material to be transported is minimized. The portable cart/utility table is collapsible as is other related hospital equipment such as medicinal cabinets, oxygen equipment, and energy sources, all of which are mountable on carts with wheels that can be pulled into place by personnel. Packaged in shock mounted containers, entire multi-bed hospitals as well as individual units can even be air-dropped by parachute to the most remote and rugged disaster sites.

In its simplest form, the field installation system of the present invention includes one or more portable medical utility tables carried by a transportation source, ranging from a simple manually operable cart convertible to the utility table itself, to motor vehicle or aircraft transportation carriers. Each cart is accompanied by one or more interchangeable clamps, which are rapidly deployable to form a medical patient utility treatment table from the components of the cart. Also in its simplest form, the one or more utility tables formed from each portable cart are accompanied by medical treatment equipment, from at least first aid equipment to more sophisticated equipment such as utility power sources, diagnostic equipment, one or more liquid and/or gaseous fluid sources, medical surgical accessories, such as trays, lamps, arm rests and stirrups and/or containers with medical supplies therein.

The reconfigurable, modular, expandable transportable mobile medical critical care point of need field installation system includes one or more manually operable carts having a load support frame of at least one pair of parallel rails. The load support frame is removably engageable and attachable by a clamp, which itself is attachable to one or more pairs of axle supporting struts descending therefrom, with a respective axle extending through each pair of axle supporting struts. Each axle includes a pair of wheels, wherein each wheel is located at opposite end regions of each axle. Therefore each cart is convertible from a wheeled cart to a stationary medical utility table accommodating a patient thereon. Each medical utility table is adaptable to attach one or more medical accessories thereto.

The portable cart/utility table of this invention, along with the many accessories and other cargo cart configurations can therefore be used as the basis for a transportable, medical critical care point of need field installation system. Since all units are collapsible and modular, they can be packaged in foam containers for extreme ruggedness. In addition to medical supply cabinets and oxygen therapy carts, other cargo carts can be used for energy sources, fuel and water tanks, communications equipment, tent air-conditioning, and other hospital infrastructure needs. Having a wheeled cart means that final positioning of the equipment after deployment is handled by personnel on the most rugged of terrain. Deployment can be by any transport means including trucks, rail, ship, boat, helicopter, and even transport aircraft making parachute air drops. A small crew can assemble the parts into a ten bed hospital in about one hour without heavy machinery and few, if any, tools.

For example, a cargo cart of this invention can contain a large battery for DC electrical power and inverter and controller for AC supply. Solar collectors can be used to charge the battery. Alternatively, or in combination, a fuel cell or engine-powered generator can also be mounted on a cart.

Equipment can be packaged as needed. An entire ten-bed hospital can be packaged as a single module for deployment, or modules of the same type of equipment, such as oxygen therapy carts, diagnostic medical imaging/X-ray equipment, or cart/utility tables, can be packaged together from their suppliers and then shipped to a remote site so that they arrive at the disaster site simultaneously by different transporters originating from different locations.

DESCRIPTION OF THE DRAWINGS

The present invention can best be described in connection with the accompanying drawings, in which:

FIG. 32 is a side elevational view of an alternate embodiment of the portable cart of this invention with four wheels, shown with a covered cargo-hauling bin;

FIG. 32A is a top plan view of the cover for a bin used with the cart as in FIG. 32;

FIG. 32B is a top plan view of the bin used with the cart as in FIG. 32;

FIG. 32C is an exploded view of the cover and bin as in FIG. 32;

FIG. 32H is an exploded perspective view of an alternate embodiment of a load support has a plurality of spaced apart, downwardly extending axle carrying struts and a receiving member for a handle tube, has an upper pushpin aperture and a pair of opposite holes for a through pin to extend therethrough, showing two axles accommodating a pair of dual wheels in coaxial orientation;

FIG. 32I is a close-up perspective view of the receiving member and handle spring pin engaged in the receiving member as in FIG. 32H;

FIG. 32JA is a perspective view of a bin on a cargo hauling cart loaded with oxygen concentrator and compressor for filling oxygen tanks;

FIG. 32JB is a side elevational view of the cart mounted equipment supplying oxygen from a concentrator to a patient in a field hospital environment;

FIG. 32JC is a perspective view of the oxygen system of FIG. 32JA being used to fill tanks with compressed oxygen in a mine environment;

FIGS. 32JD, 32JE, and 32JF show three more examples of cargo haulers with bins configured for specialized use, wherein:

FIG. 32JD is a perspective view of an X-ray module;

FIG. 32JE is a perspective view of a dental treatment and analysis module;

FIG. 32JF is a perspective view of a power generation module;

FIGS. 32K, 32L and 32M are side elevational views of the sequence of the disassembly of one of the cargo hauling bins to a deployed standing position with operable sliding draws;

FIG. 32NA is a rear perspective view of a sliding drawer showing channels for sliding drawer cover panel;

FIG. 32NB is a front corner perspective detail of the drawer of FIG. 32NA showing sliding panel in channel;

FIG. 32O is a local perspective view of an optional trailer hitch assembly;

FIG. 32P is a side elevational view of an all-terrain vehicle pulling the four-wheel cargo bin-hauling cart with the trailer hitch as in FIG. 32O.

FIG. 32Q is a side elevational view of the four wheel cargo bin-hauling cart being unloaded from a vehicle, such as a military truck;

FIG. 32S is a side elevation view of a trailer used for deployment of groups of cargo bin-hauling carts and ancillary personnel needs, such as a partitioned area sleeping quarters or for computer control monitoring of the deployment of equipment at a disaster site;

FIG. 33A is a bottom perspective view of the chassis and wheel portions thereof;

FIG. 34 is a perspective view of an alternate embodiment of a channeled horizontal load support member with an integral T-slot;

FIG. 43A is a perspective view of a low profile rescue carrier cart shown with an alternate embodiment for a stretcher bearing assembly having a reversible handle/cart support;

FIG. 43B is an exploded perspective view of the stretcher-bearing tube components of the stretcher-bearing assembly of FIG. 43A, showing interlocking spring-loaded pin and receptacle fasteners;

FIG. 43C is a detail view of the spring-loaded pin as in FIG. 43B;

FIG. 43E shows the low profile rescue carrier cart, in a side elevational view;

FIG. 43F is a perspective view of a reconfigurable modular rescue carrier cart transporting a stretcher atop an auxiliary fabric carrier slung underneath;

FIG. 43G is a perspective view of a reconfigurable rescue carrier cart transporting a stretcher atop an auxiliary multi-purpose waterproof bag slung underneath;

FIG. 43H is a perspective view of a reconfigurable modular rescue carrier fitted with a wooden slat platform atop multi-purpose waterproof bag for washing patients and catching effluent in bag;

FIG. 43I is a perspective view of a reconfigurable modular rescue carrier fitted with a multi-purpose waterproof bag filled with a measure of ice cubes as used for treating hyperthermia;

FIG. 52A is a perspective view thereof showing one wheel in place upon an axle;

FIG. 53 is a close-up cutaway view of the spring stop member regulating outward movement of the optional rails of the cart of the present invention from a storage position to a position of use;

FIG. 56 shows a detail view of an optional ski attachment instead of wheels, for use in snow and winter environments;

FIG. 57 shows a detail view of an optional platform base for supporting objects thereon;

FIG. 62 is an end view of wheel subassembly attachment mechanism in engaged position;

FIG. 63 is an end view of wheel subassembly attachment mechanism in disengaged position;

FIG. 64 is an end view of attachment clamp for tubular overhead bar;

FIG. 71A shows the existing health care facility prior to any augmentation;

FIG. 71B shows the current protocol of parking a large deployable health care facility (HCF) of 100 bed capacity in the vicinity of the existing HFC;

FIG. 71C illustrates the loss of the 100 bed added facility by a single chemical/biological or explosive hit;

FIG. 71E shows the implication of a 10-bed unit being disabled by a single strike or hit reducing added capacity by only 10% of the added unit capacity;

FIG. 71F shows a consolidation of the ten 10-bed units into a more permanent 100-bed facility as the situation stabilizes;

FIG. 72 is an exploded perspective view of the basic components of the convertible cart/utility table of the present invention, showing removable kickstand and wheel support components;

FIG. 73 is an exploded view of the tubular frame component of the convertible cart/utility table of the present invention, with an alternate embodiment for a kickstand holding sleeve;

FIG. 74 is an exploded perspective view of an assembled convertible cart/utility table in the utility table mode, showing an auxiliary power pack attached thereto and a medical stretcher above;

FIG. 75 is a side elevational view of the convertible cart/utility table in the utility table mode as in FIG. 74, shown in a tilting feature with one portion of the utility table being raised higher than a higher opposite lower end proportion, and showing an optional body fluid captive collector;

FIG. 76 is a detailed view of the height adjustable foot portion of the convertible cart/utility table as in FIGS. 74 and 75, as shown in the ellipse "76" in FIG. 74;

FIG. 77 is a detailed perspective view of a reversible clamp of the convertible cart/utility table as in FIG. 43A; shown in the detail callout "78" of FIG. 43A;

FIG. 78 is a close-up rear elevational detail view of the clamp as in FIG. 77, shown in a reversed position, as shown in the detail callout "78" in FIG. 43A;

FIG. 79 is a front elevational view of an optional heavy-duty clamp for the convertible cart/utility table as in FIG. 72, as shown in detail callout "79" in FIG. 72;

FIG. 80 is a detailed front elevational view showing a hook of the heavy-duty clamp as in FIG. 79 showing the retraction of a stretcher rail support, allowing the stretcher rail to drop thereby selectively tilting the head or foot of the stretcher;

FIG. 80A is a front elevation of a preferred embodiment of a stretcher clamp with a blade extended to support a stretcher rail in an upper position upon a notched or concave surface thereof;

Figure 74:
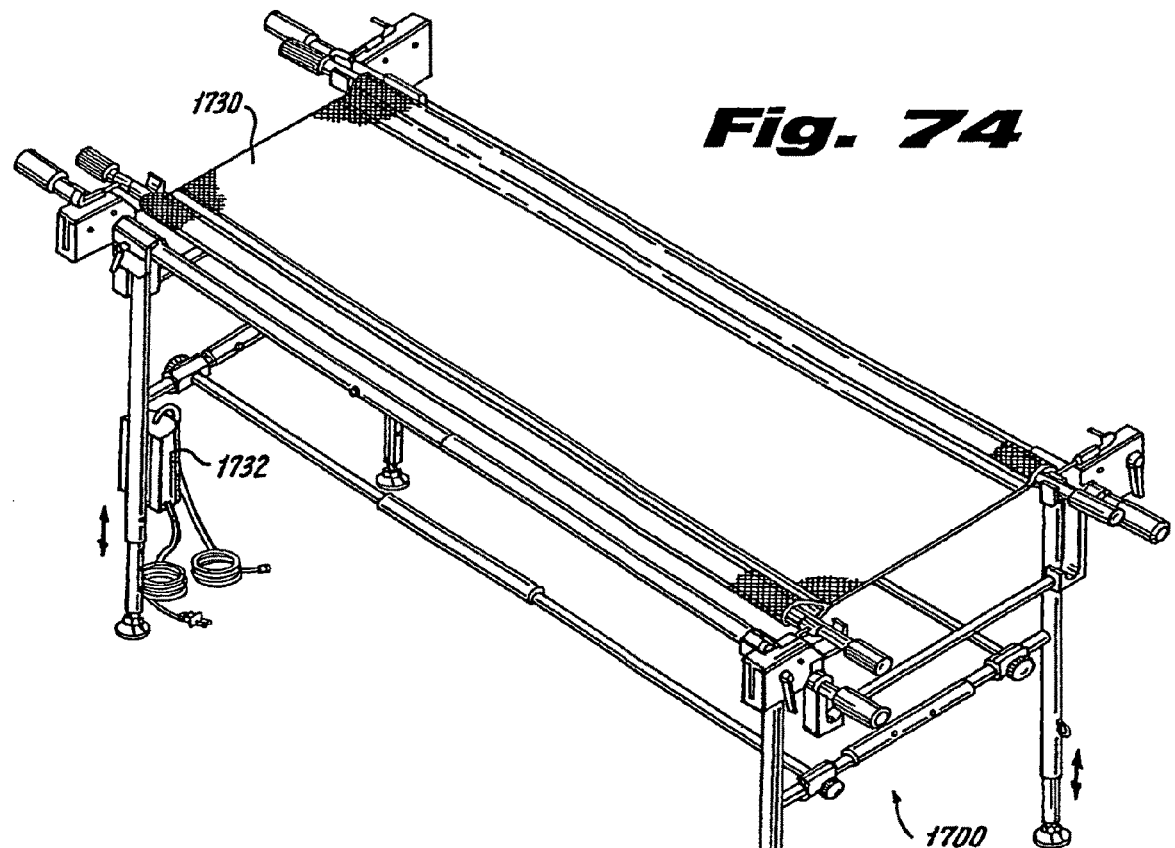
Figure 80A:
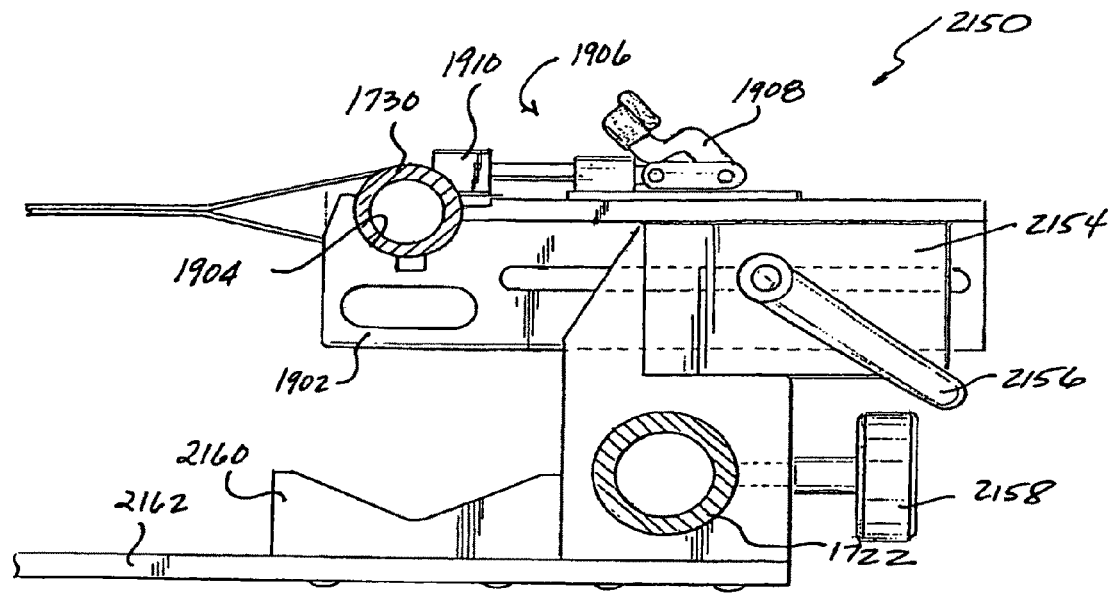
Figure 80B:
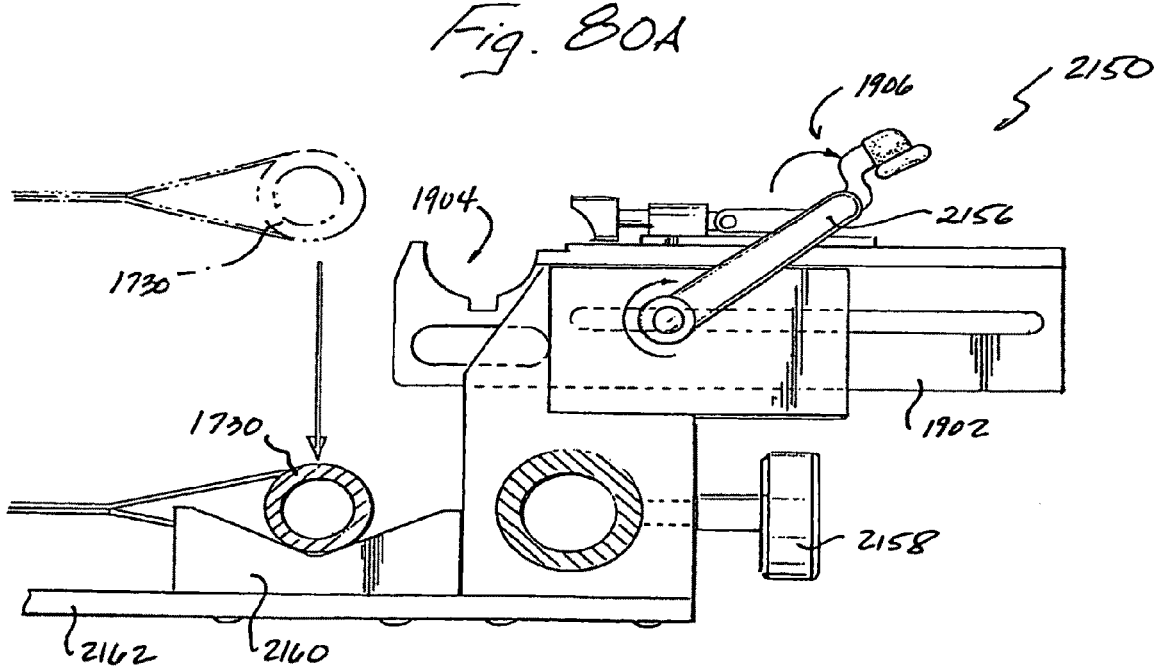
Figure 80C:
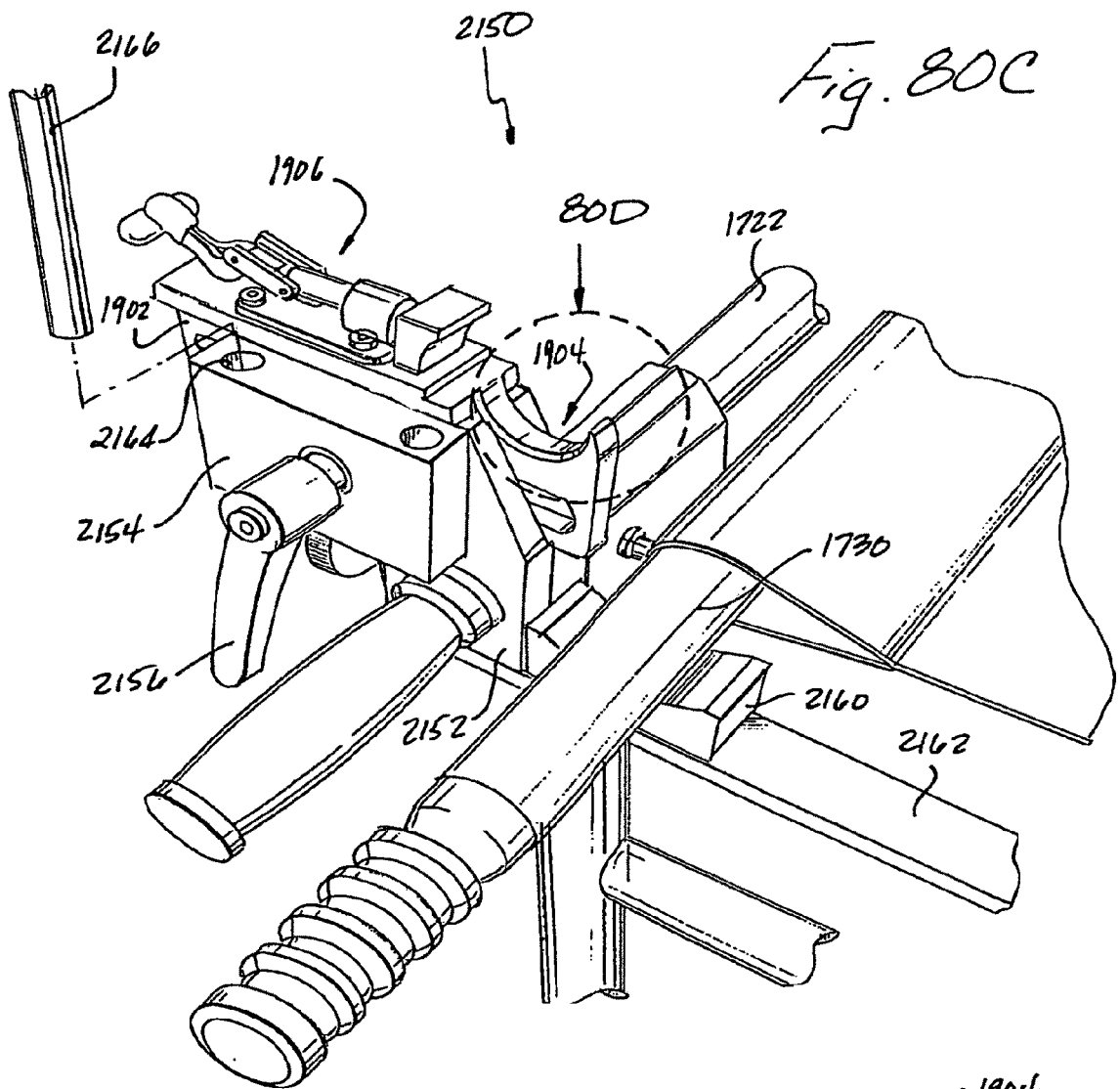
Figure 80D:
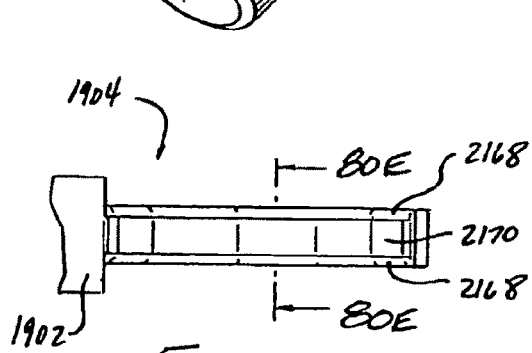
Figure 80E:
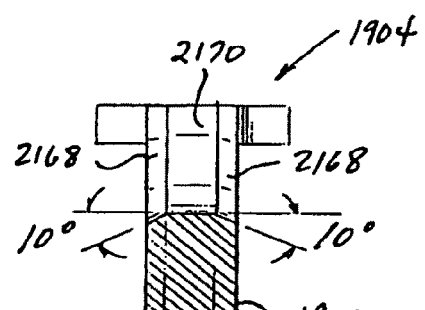
Figure 81:
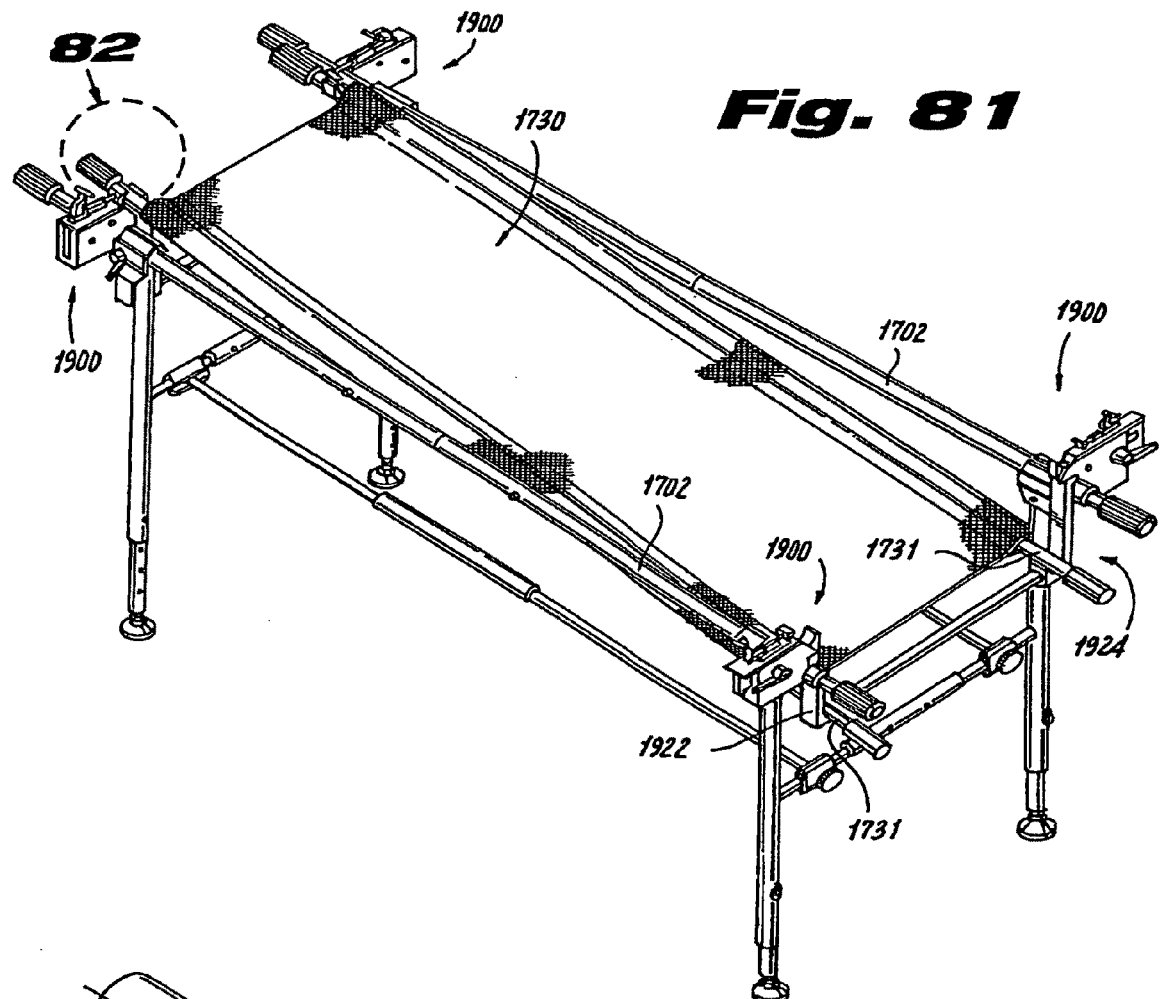
Figure 82:
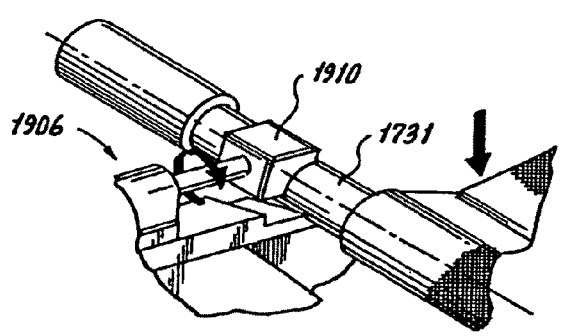
Figure 82A:
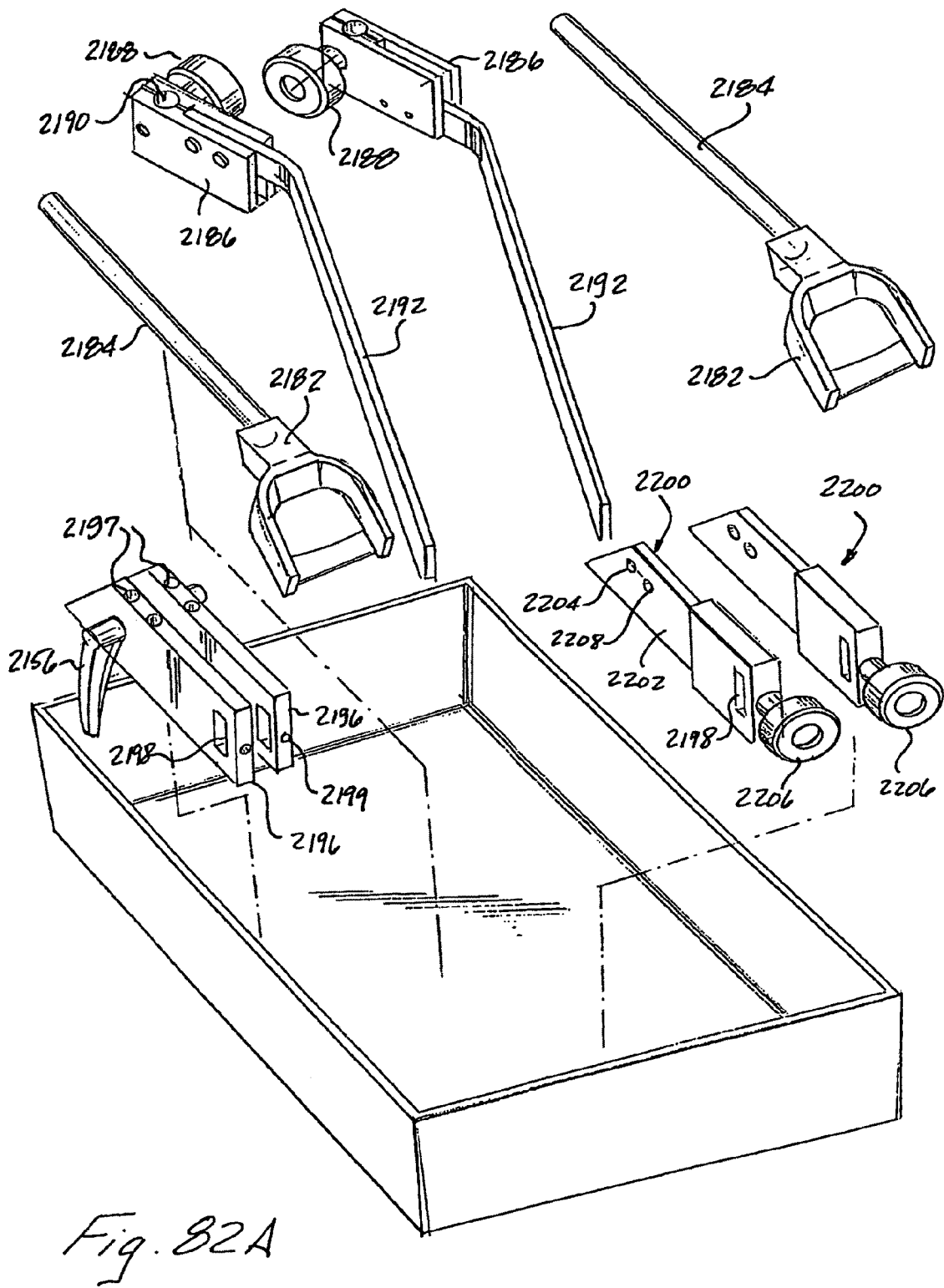
Figure 82C:
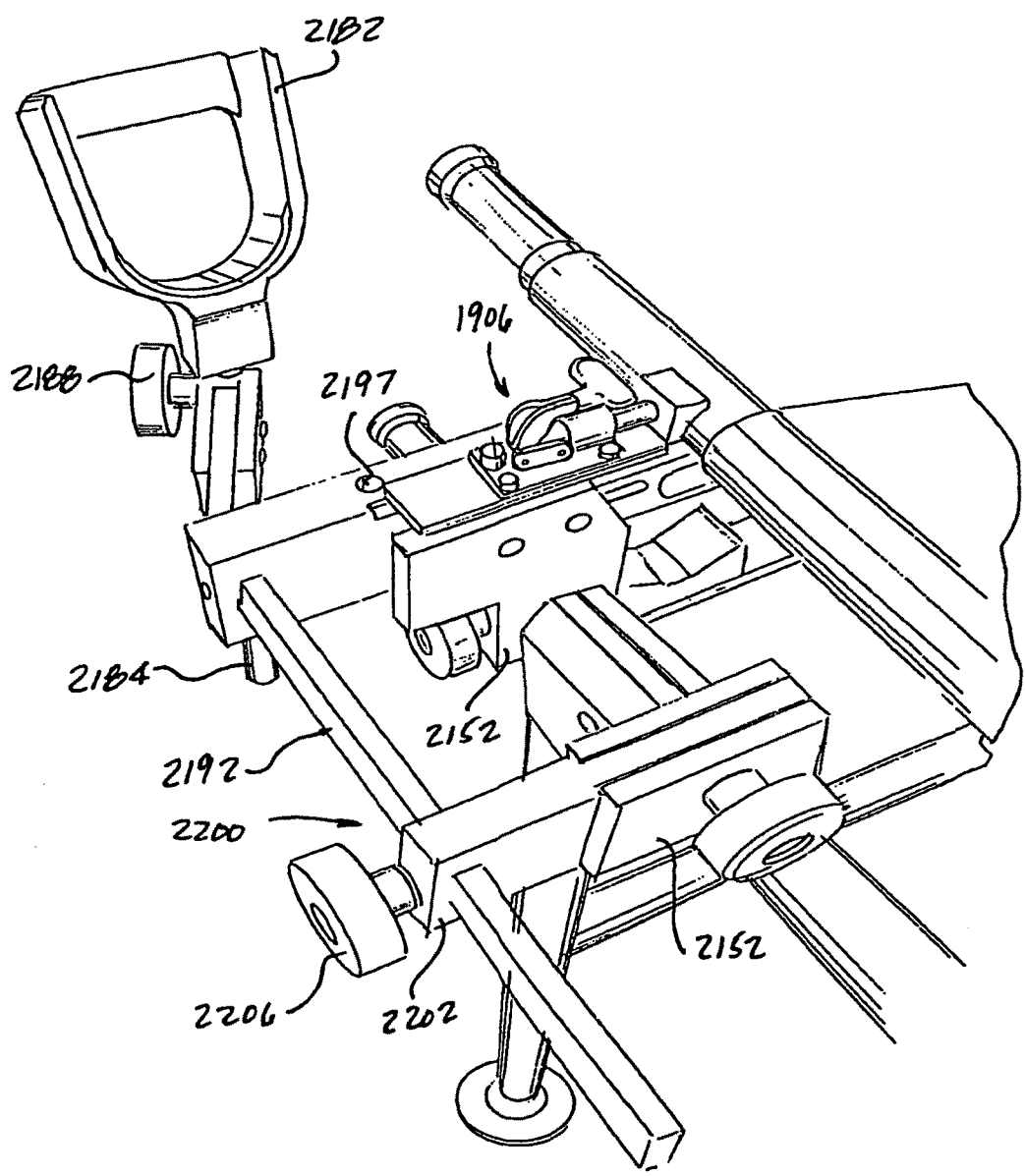
Figure 83:
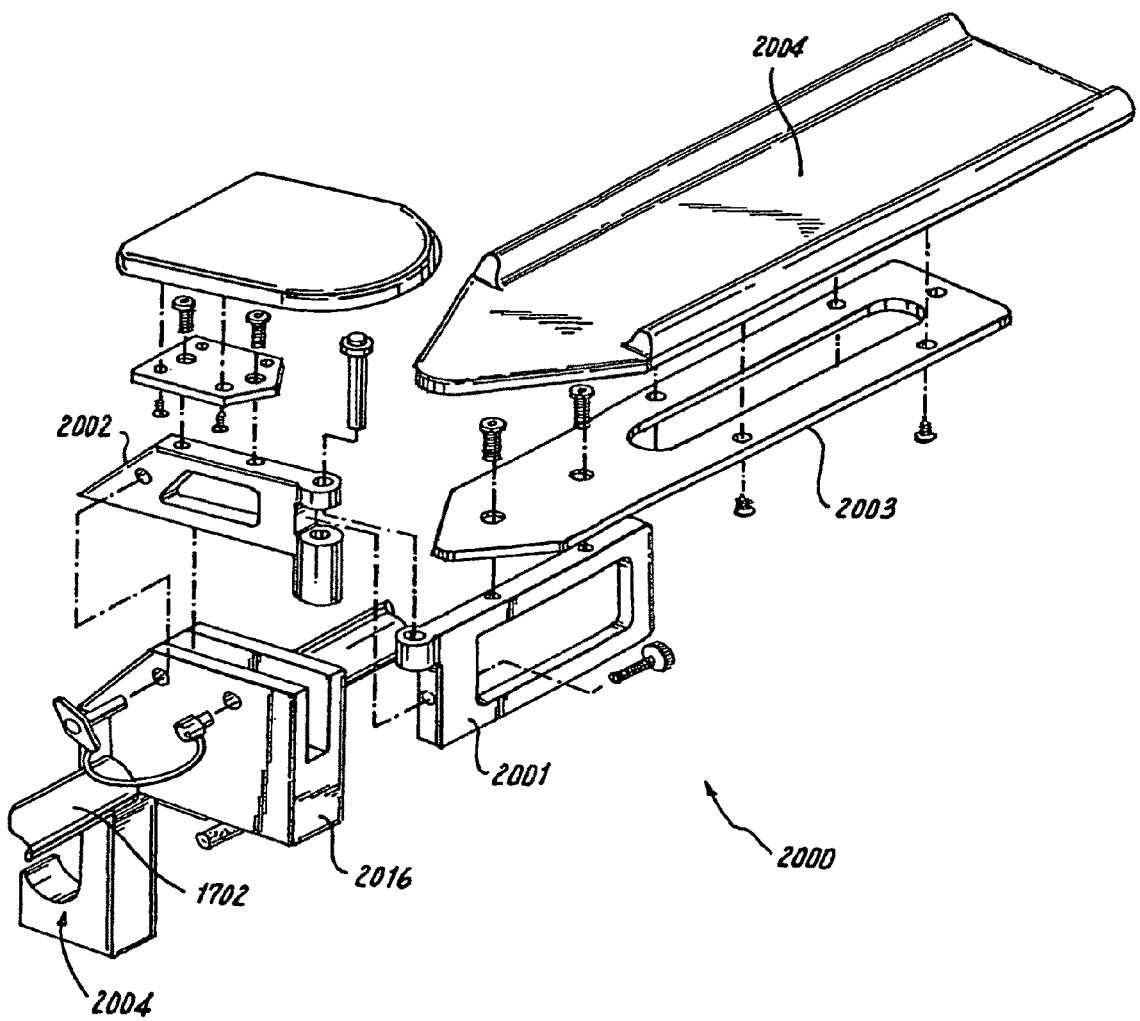
Figure 84:
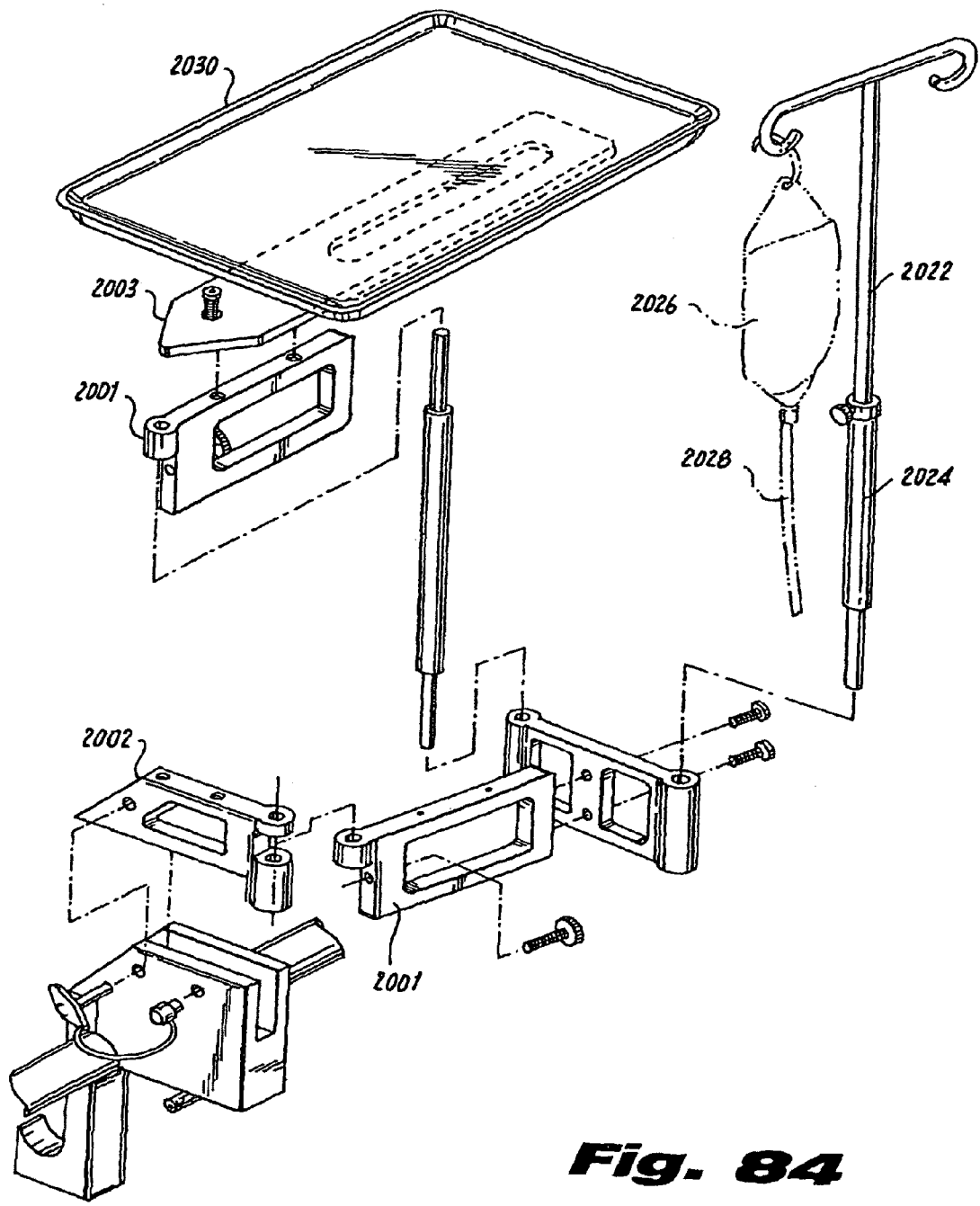

FIG. 80B is a front elevation of the stretcher clamp of FIG. 80A with the upper stretcher rail supporting blade retracted, to support the stretcher in the lower position upon a notched or concave surface of a lower stretcher rail support blade;

FIG. 80C is a perspective view of the stretcher clamp in FIGS. 80A and 80B showing holes to accommodate accessory or IV poles;

FIG. 80D is top view detail of the hook end which supports the stretcher pole;

FIG. 80E is a crossection of the hook end of FIG. 80D showing side chamfers;

FIG. 81 is a perspective view of the stretcher clamp for the tilted stretcher effected by the clamp retractor as in FIG. 80, which stretcher clamp allows for the tilting rotation of the stretcher rod;

FIG. 82 is a perspective view taken at detail callout "82" in FIG. 81, showing the rotation thereof effectuating tilting of the latch;

FIG. 82A is a perspective view of all the parts constituting a stirrup kit for a stretcher, including stirrups, angled support bar assemblies, a tightening plate with a stirrup support hole, and a stirrup support blade;

FIG. 82B is a top schematic view of the two configurations of stirrup positions possible with the angled support bar assemblies;

FIG. 82C is a perspective view detail of one stirrup as mounted, using the stirrup kit;

FIG. 83 is an exploded perspective view of a clamp for an auxiliary limb appendage support used in connection with the convertible cart/utility table as in FIG. 72 or FIG. 74;

FIG. 84 is an exploded perspective view of the clamp as in FIG. 83 showing intravenous support stanchion and a medical instrument tray.

Figure 85:
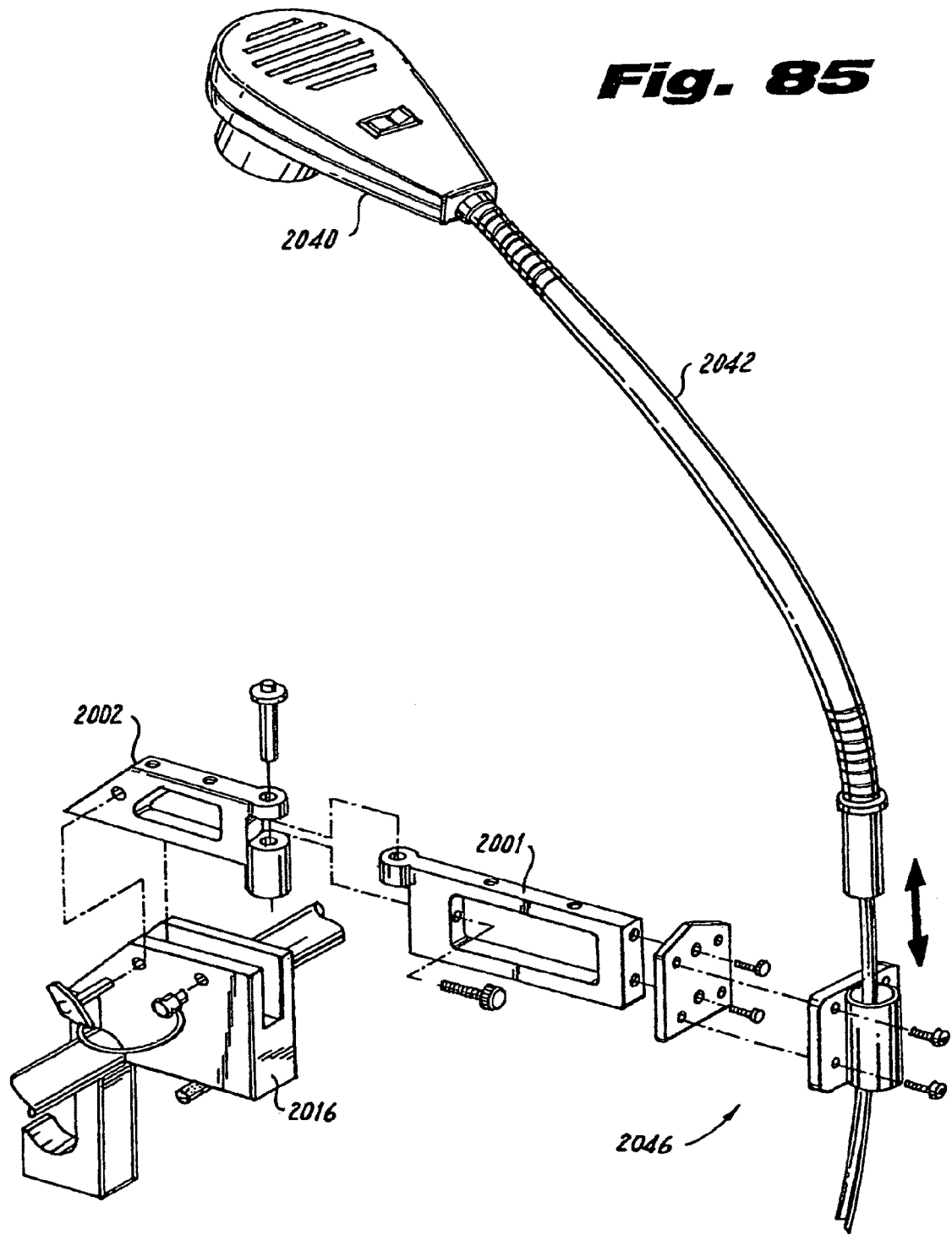
Figure 86:
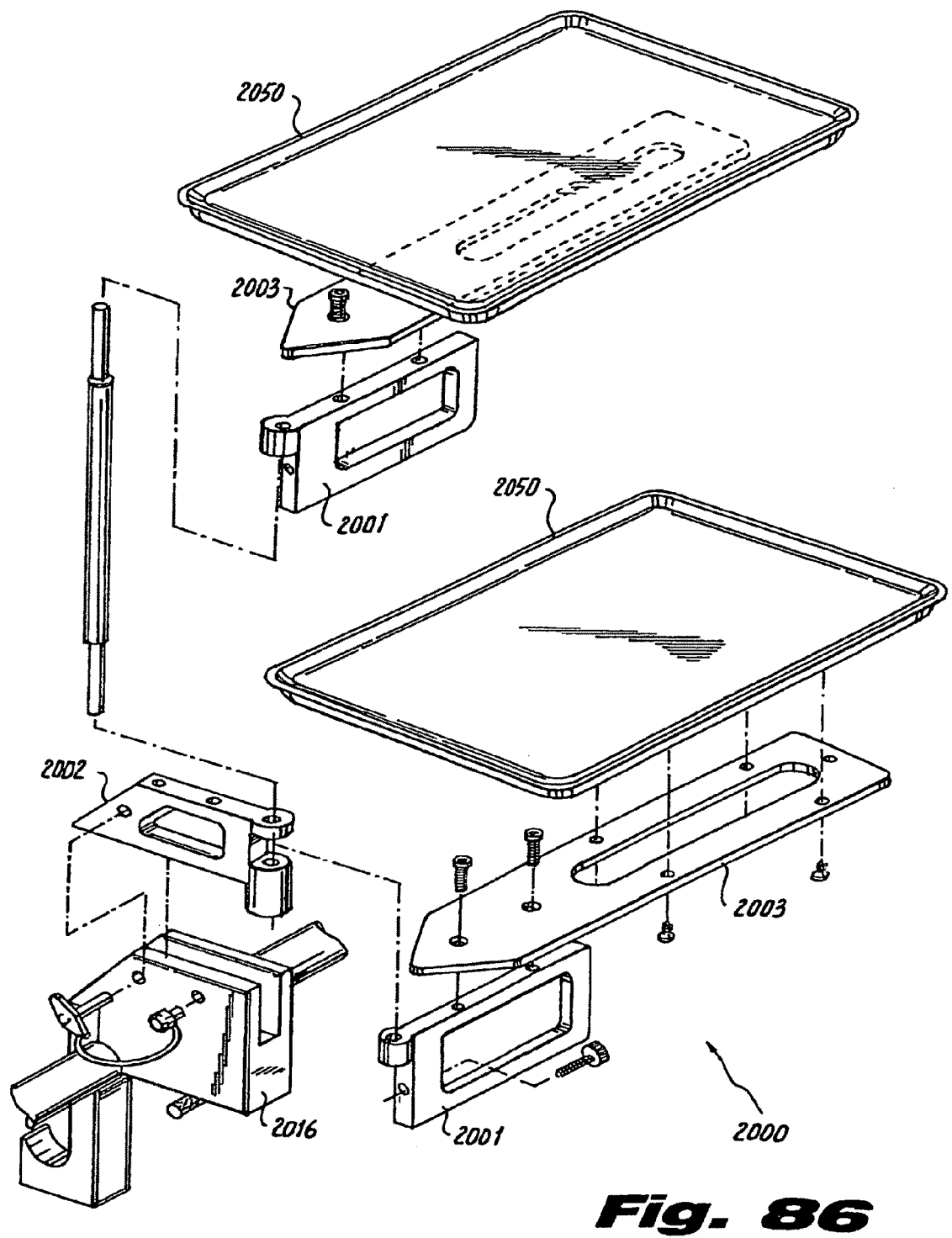
Figure 87A:
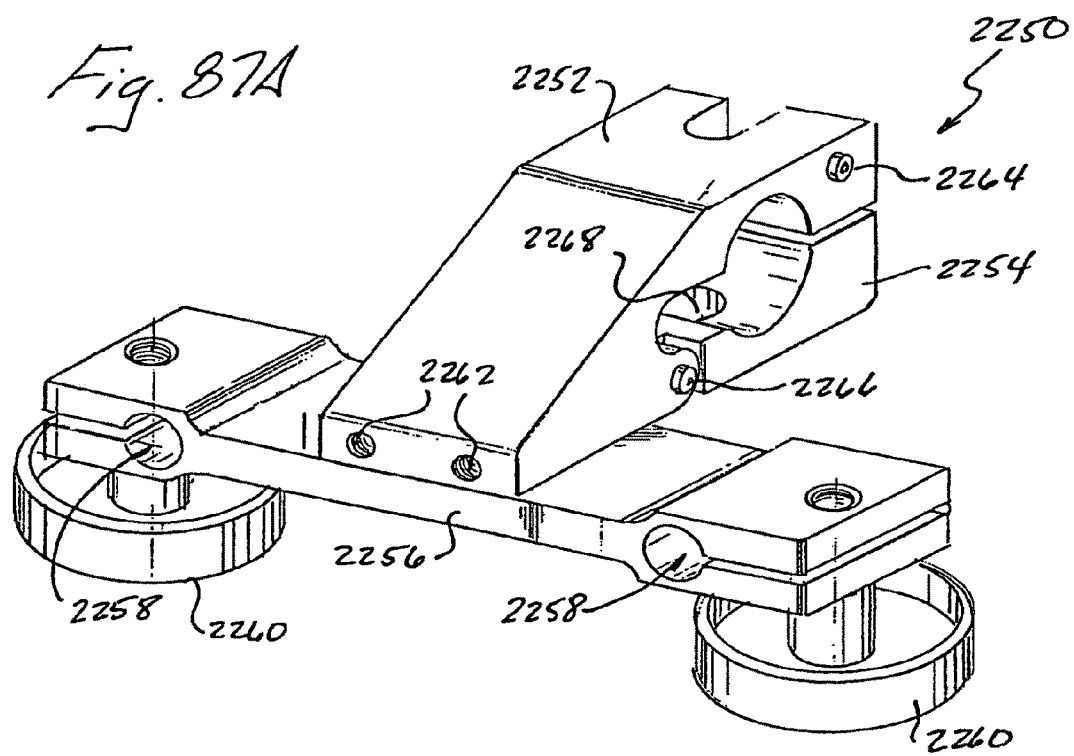
Figure 87B:
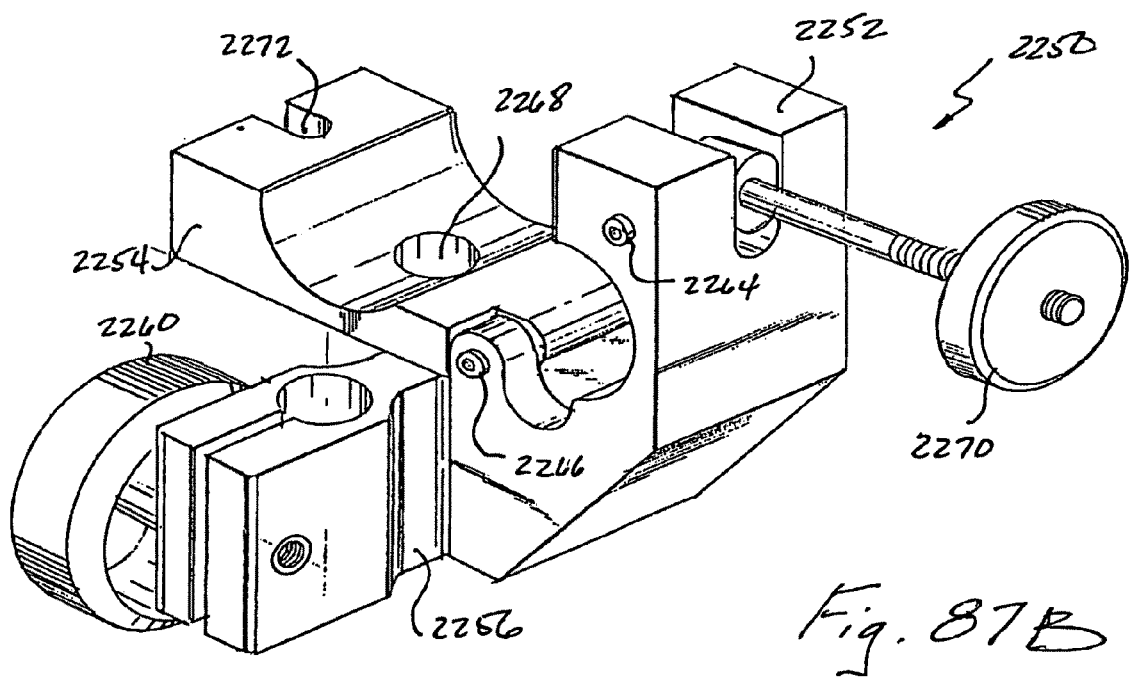
Figure 87C:
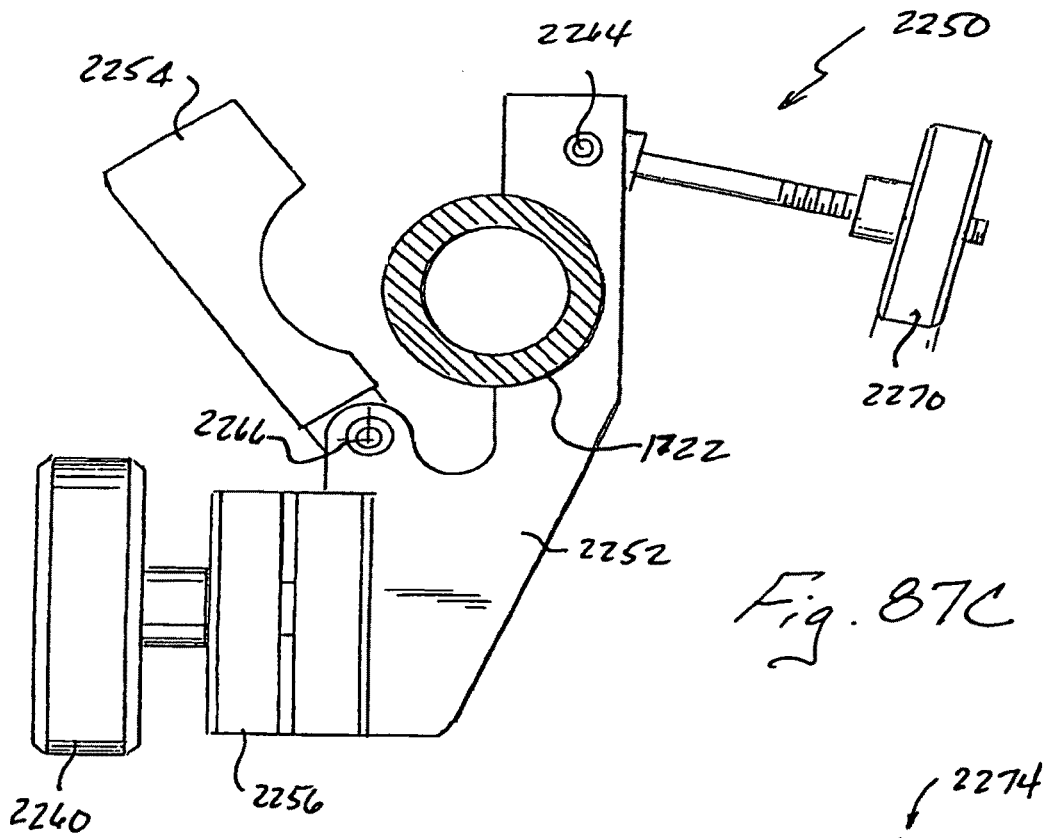
Figure 87D:
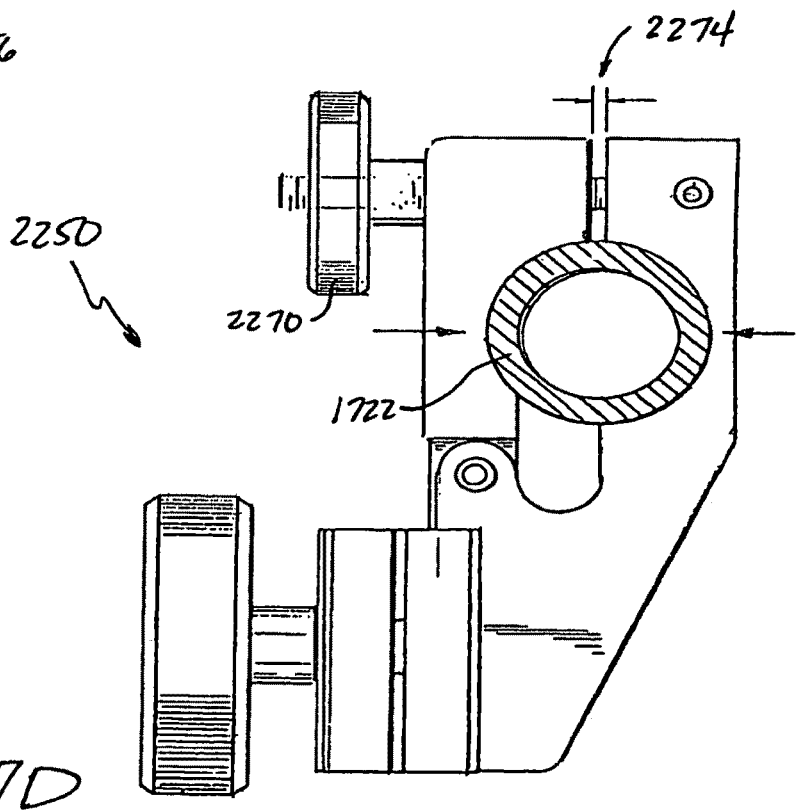
Figure 87E:
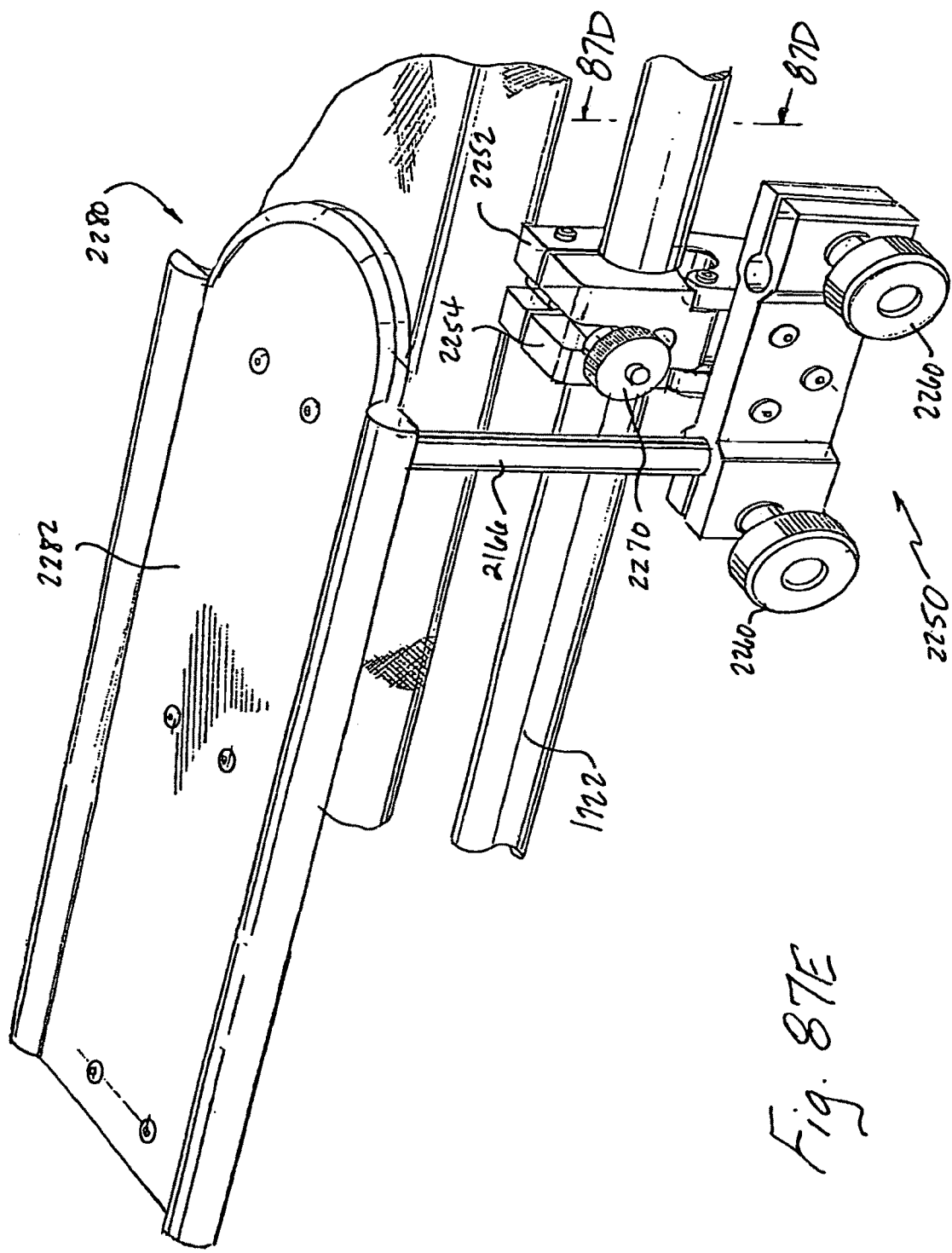
Figure 87I:
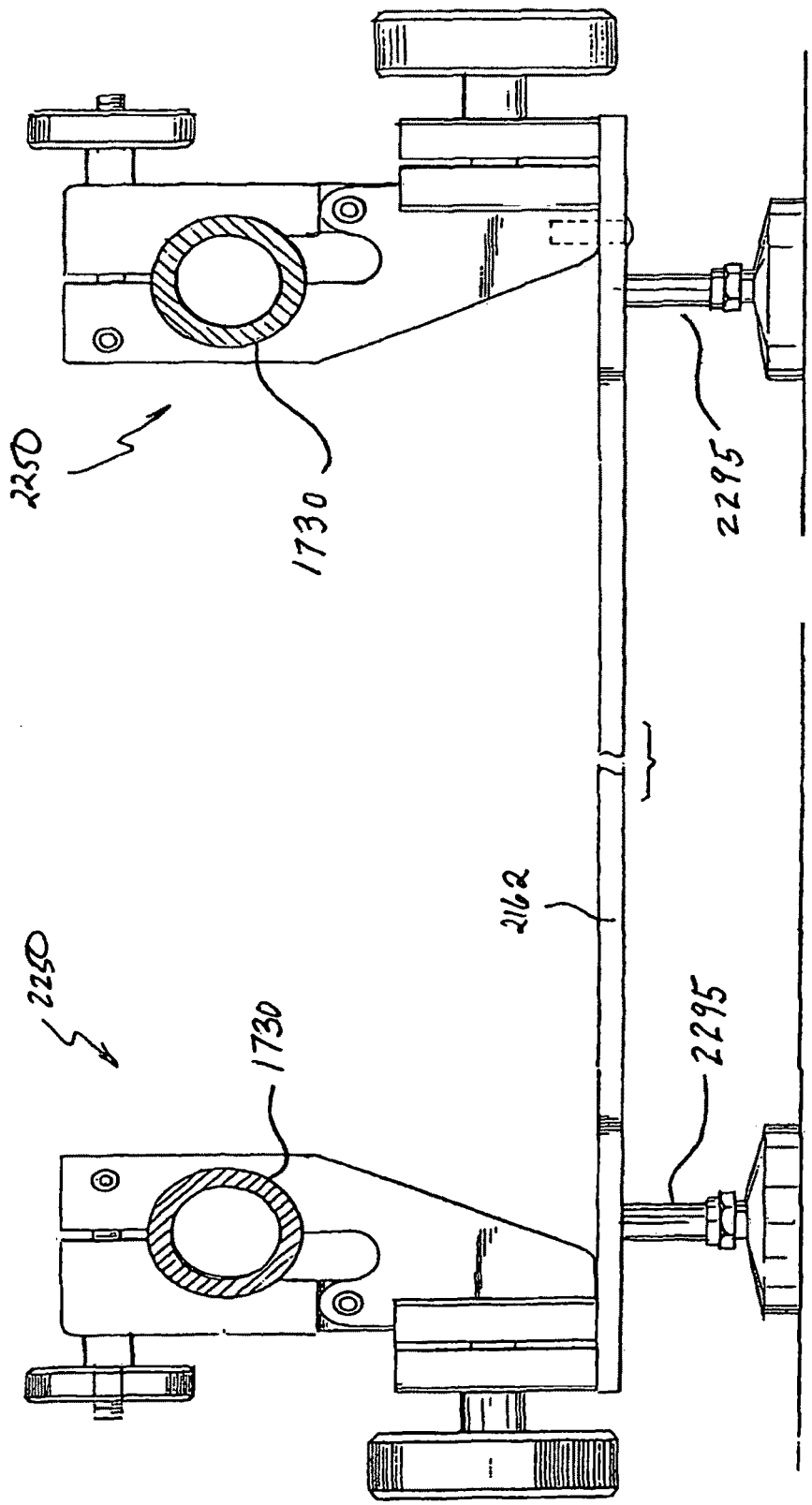

FIG. 85 is an exploded perspective view of the clamp of FIG. 83 sharing a means for mounting a medical clamp;

FIG. 86 is a perspective view illustrating an instrument tray set-up used in connection with the clamp as in FIG. 83;

FIG. 87A is a perspective view of a universal accessory clamp with the clamping jaws in the closed position;

FIG. 87B is a perspective view of the clamp of FIG. 87A in the jaws-open position;

FIG. 87C is a side elevation of the universal accessory clamp with moving jaw open engaging tubing shown in crossection;

FIG. 87D is a side elevation of the universal accessory clamp clamped onto a tubing or rail shown in crossection;

FIG. 87E is a perspective view of the universal accessory clamp in use supporting two accessory poles;

FIG. 87F is a perspective exploded view showing the use of the universal accessory clamp for supporting an arm support panel;

FIG. 87G is a side elevational view in partial crossection of a surgical lamp support assembly mount;

FIG. 87H is a perspective view of a surgical lamp incorporating the improved mount of FIG. 87G;

FIG. 87I is a front elevation of the use of a pair of universal accessory clamps to support the front or back of a stretcher over a table using short legs;

FIG. 88A is a perspective view of the preferred embodiment of a lower leg clamp attached to a lower horizontal tubing member with moving jaw in open position;

FIG. 88B is a perspective view of the clamp of FIG. 88A, shown securely clamped around a leg; and, FIG. 89 is a perspective view of a reconfigurable, modular, expandable, medical utility table with many of the details and features of the previous Figures.

DETAILED DESCRIPTION OF THE PREFERRED EMBODIMENTS

Figure 1:
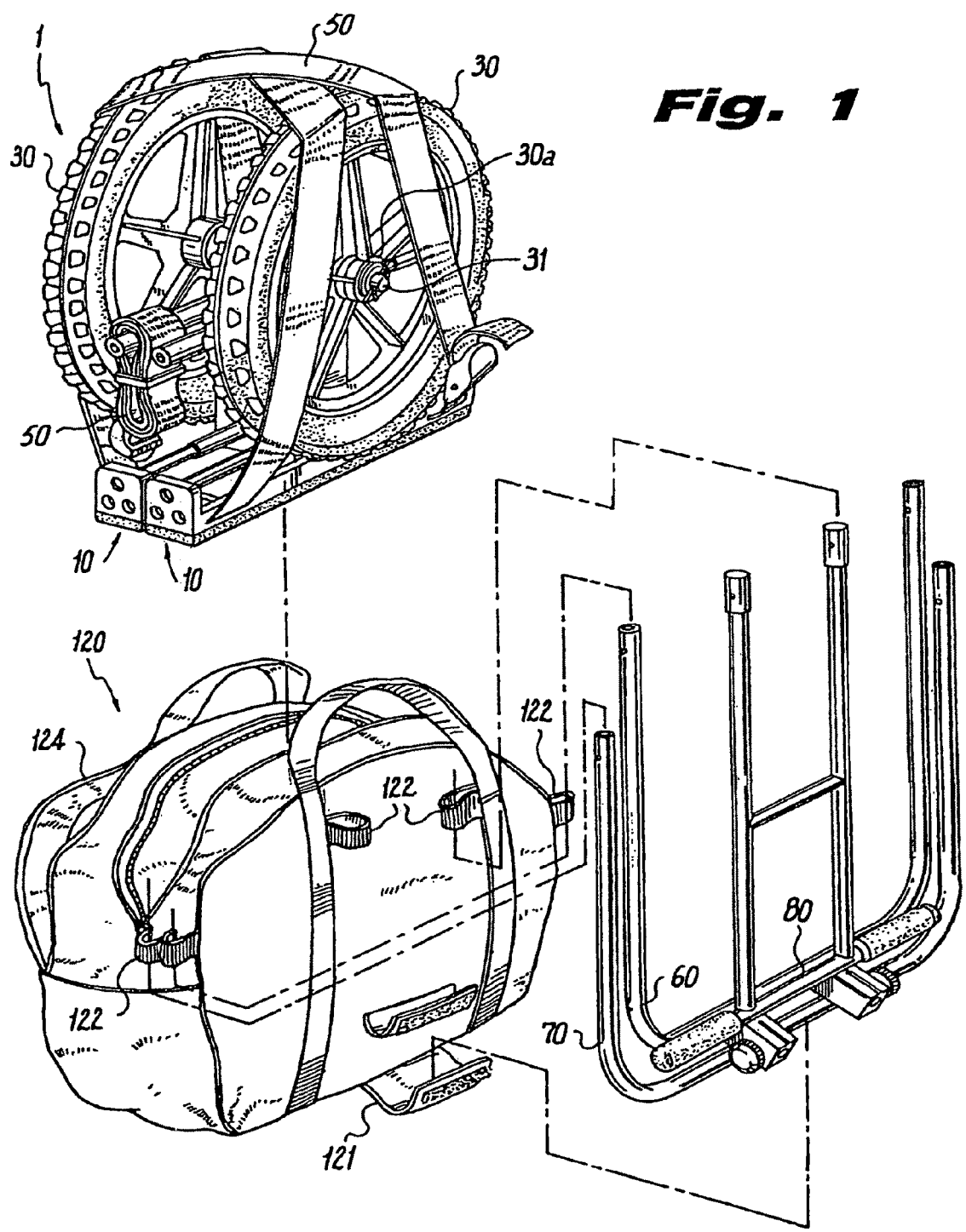
FIG. 1 is an exploded perspective view of the components of the basic cart embodiment broken down for transport within and on the storage backpack.

As shown in the drawing FIGS. 1-89, the present invention is directed to a mission-adaptable set of components forming a convertible cart/utility table. For example, the present invention may include foldable cart 1, having a load support for carrying a load, such as a boat, such as a canoe, which can also function as a game cart or a wagon for carrying gear in outdoor field applications.

FIG. 1 shows cart 1 in a disassembled storage position with a pair of horizontal load support members 10 laid parallel adjacent to each other, supporting wheels 30 thereon. Wheels 30 are secured in place by a transverse connecting rod 31 through wheel hubs 30a and by one or more load securing straps 50. Disassembled storage cart 1 is inserted within carry bag 120, which includes ledge 121 and fabric loops 122 for holding bracket members 60, 70 and handle 80 outside of carry bag 120.

Figure 2:
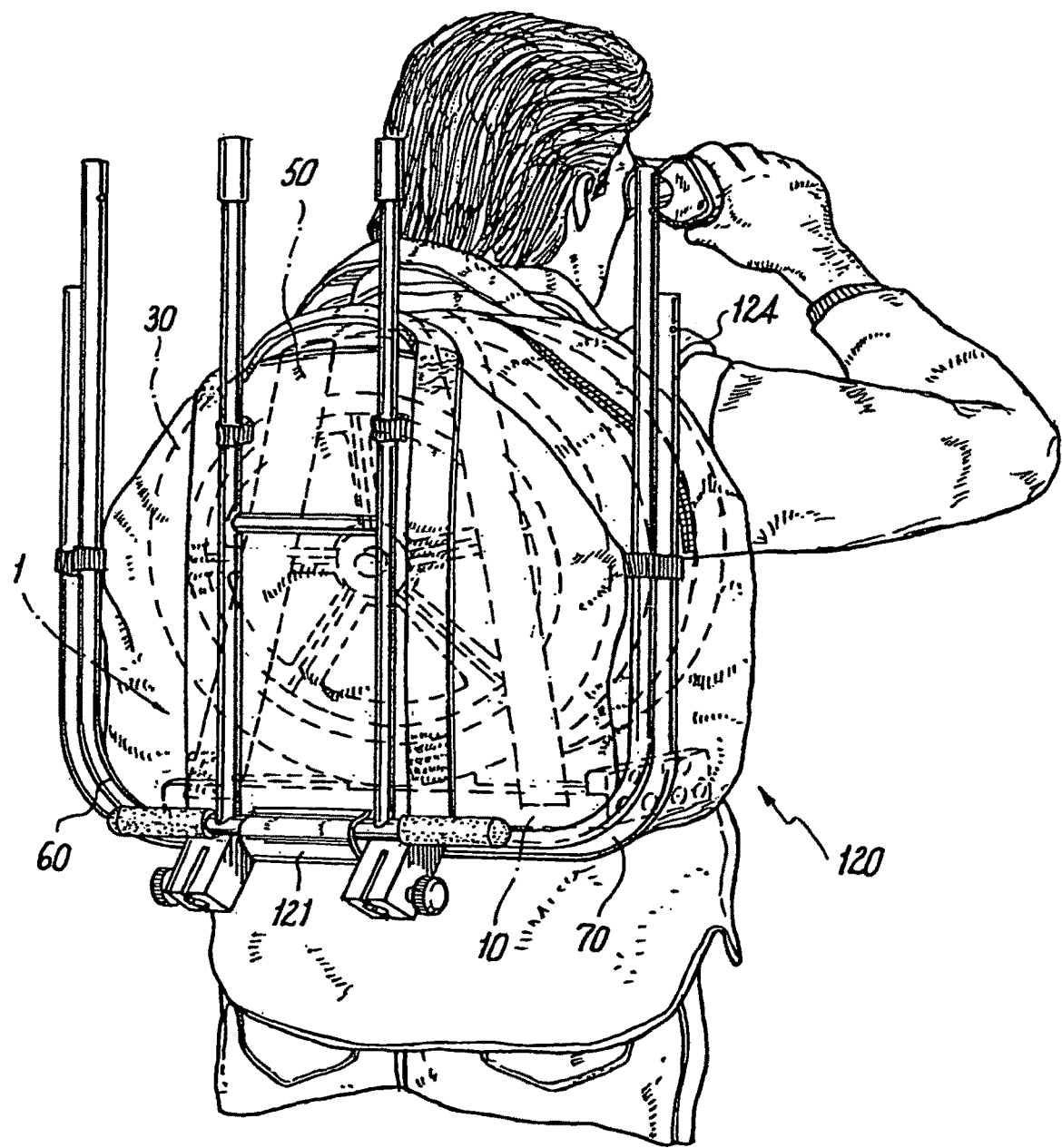
FIG. 2 is a perspective view of the backpack on a user, with the cart contained therein.

To transport portable cart 1 by hand carry straps 124 are attached to carry bag 120. Conversely as shown in FIG. 2, to transport portable cart 1 upon the back of a user, carry straps 124 are attached to carry bag 120, which supports portable cart 1 in a weight bearing manner, or else horizontal support members 10 are inverted to support portable cart 1 in a weight bearing manner, and carry bag 120 covers portable cart 1 in a non-weight bearing manner.

To be disassembled in a carry position, U-shaped bracket rails 60,70, wheels 30 and axle members 32 are inversely attached to horizontal load supports 10 to comprise a folded manually transportable cart.

Figure 3:
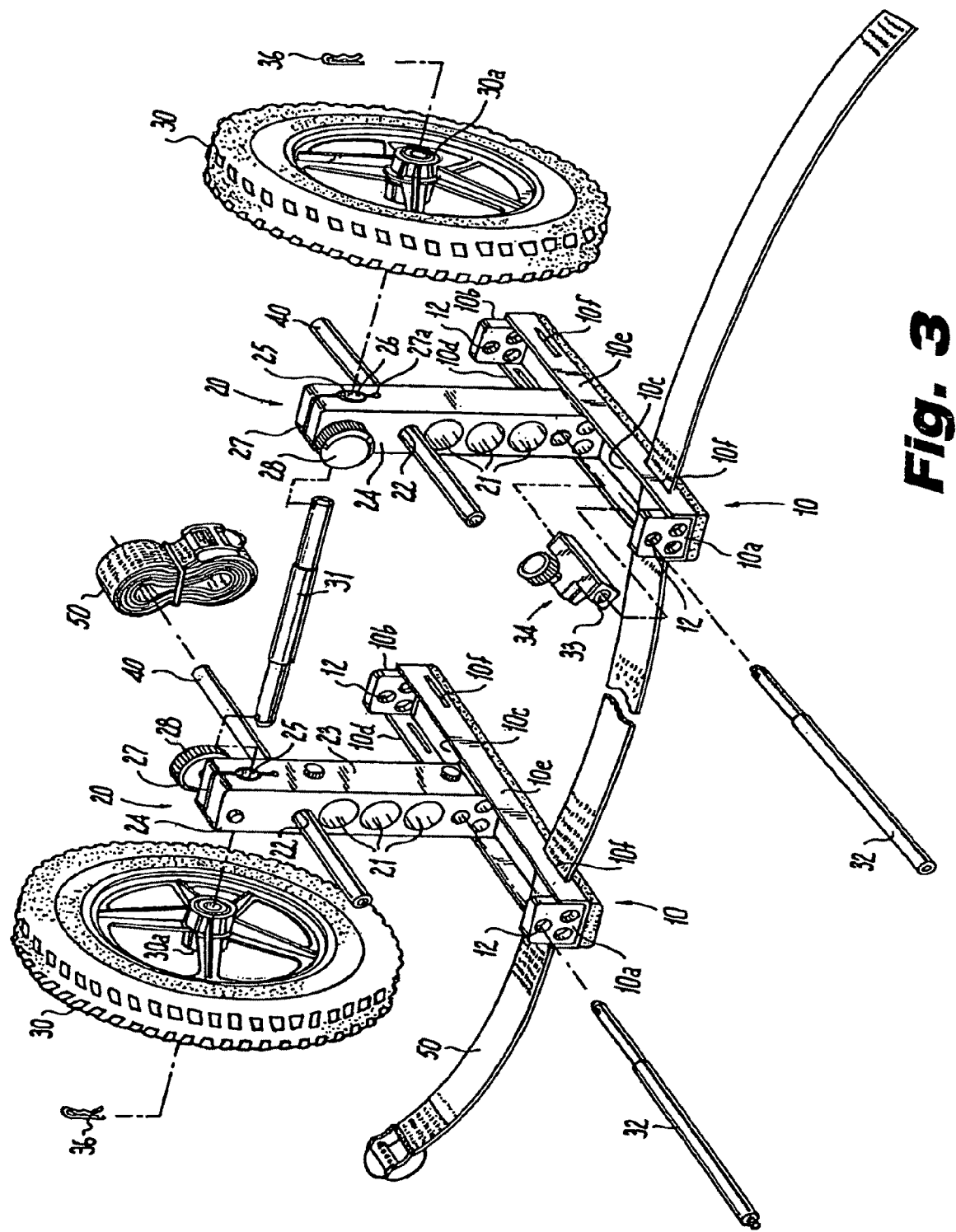
FIG. 3 is an exploded inverted perspective view of the basic cart embodiment components, disassembled from their original transport configuration.

As shown in the exploded view of FIG. 3, in the storage position, in a preferred embodiment, cart 1 includes a pair of parallel, spaced apart inverted horizontal load support members 10. Support members 10 each have a front-end 10a and a rear end 10b. The front and rear ends 10a, 10b each have at least one axially placed receptacle aperture 12 extending longitudinally within each load support member 10, for holding structural components therethrough in a storage position, such as axle members 32 for wheels 30. In this storage position, axle members 32 are also inserted within aperture of 33 of axle connector 34.

FIG. 3 also shows horizontal load support members 10 having preferably a generally upside down U-shaped configuration when viewed in cross-section, wherein a generally flat member 10c has downwardly extending flanges 10d, 10e including one or more linearly extending slots 10f for insertion of holding straps 50 therein.

Although apertures 12 are shown in the drawings, it is contemplated that other configurations may be applicable to horizontal load support members 10, so long as other members, such as rails 60, 70 and so forth, may be attached thereto by fasteners, preferably in an axis parallel to the axis of horizontal support members 10.

While size may vary, support member 10 is preferably sixteen (16) inches long and two and a quarter (2.25) inches wide. Each flange 10d, 10e extends down about one (1) inch from flat member 10c. Slots 10f are preferably 2.125 inches wide and 0.1875 inches high, to accommodate straps 50, such as, for example, standard 2-inch wide fabric straps.

FIG. 3 also shows vertical struts 20 optionally having at least one small hole 22, such as kickstand receptacle aperture 22, for insertion of optional kickstand 40 therein.

FIG. 3 also shows horizontal load support members 10 being respectively demountably attached to a pair of vertical struts 20, having apertures 21 and 22. In one embodiment, horizontal load support members 10 can be demountably attached to vertical struts 20, but in an alternate embodiment they can be permanently affixed to each other, such as in the alternate embodiments shown in FIGS. 3A and 3B.

Moreover, while preferably horizontal struts are U-shaped, as in FIG. 3, in alternate embodiments other configurations can be used, as long as vertical strut 20 can be attached to horizontal support member 10.

Figure 3A:
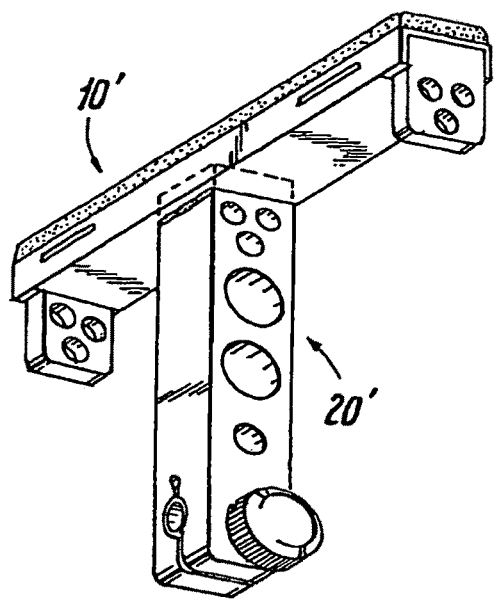
FIG. 3A is a perspective view of an alternate simplified embodiment where the vertical strut is permanently attached to a horizontal member in a "T" configuration.
Figure 3B:
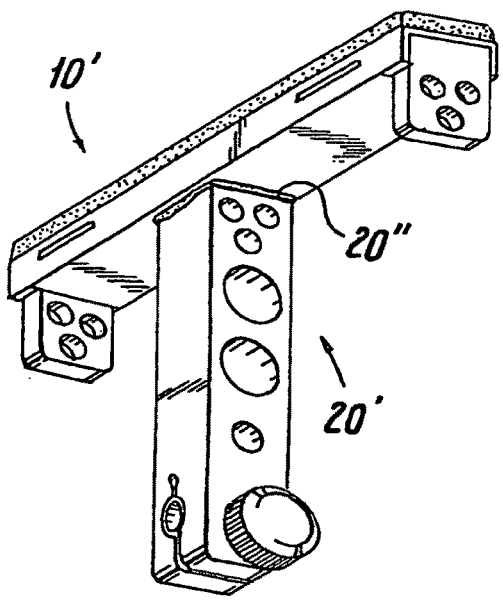
FIG. 3B is a perspective view of an embodiment where the horizontal support is permanently affixed to the vertical strut by welding or other means.
Figure 3C:
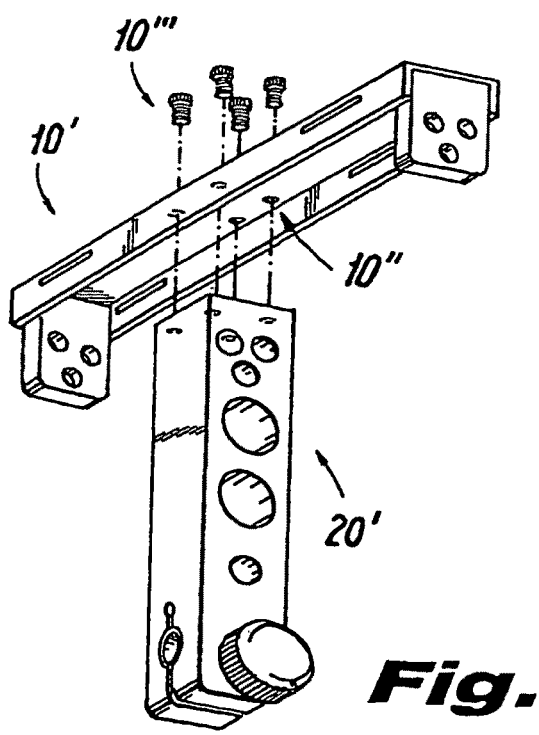
FIG. 3C is an alternate embodiment where the vertical strut fits within a hole in the horizontal support and is fastened by a fastener.

For example, in FIG. 3A vertical strut 20' is in a unified T-shaped member with horizontal support member 10'. In FIG. 3B, vertical struts 20' and horizontal support members 10' are attached by weldment 20". In FIG. 3C, vertical strut 20' is inserted in hole 10" of horizontal support member 10', and attached by fastener 10''', such as a screw or other fastener. In these alternate embodiments shown in FIG. 3A, 3B or 3C, horizontal load support members 10' may be solid in cross sectional configuration. One such configuration shown in FIGS. 3A, 3B and 3C is that of a parallelepiped, namely a solid form, all of whose sides are parallelograms, such as rectangles, and whose opposite sides are parallel to one another.

In another embodiment vertical strut 20 may be adjustable in length with a sleeve containing a telescopic shaft (not shown) and with a spring urging the shaft in and out of the sleeve, with a lock provided.

Figure 4:
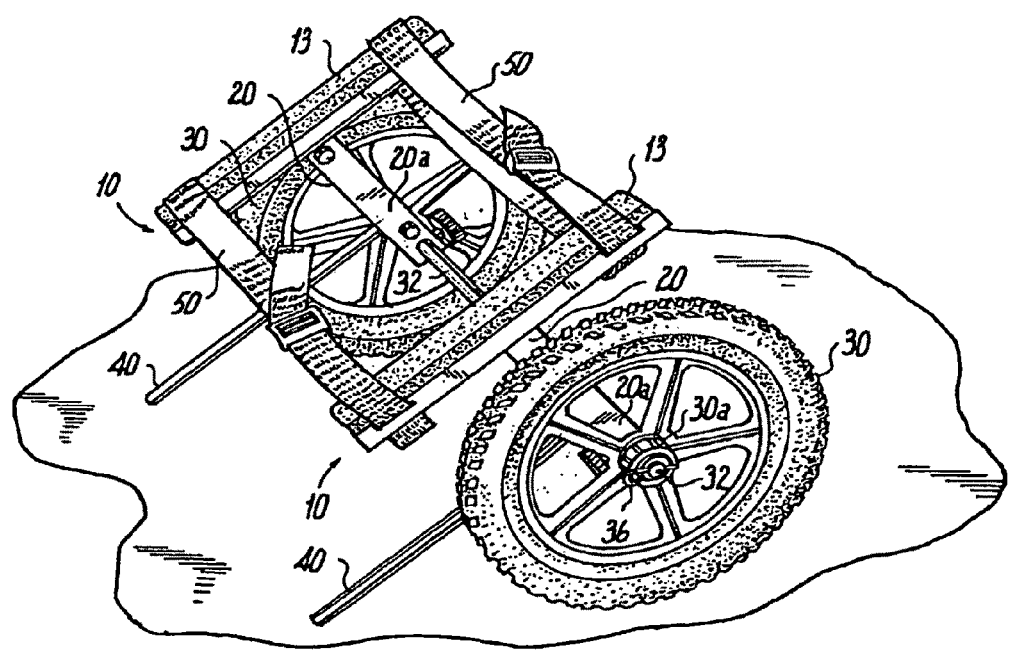
FIG. 4 is a perspective view of the assembled boat cart.

Kickstand 40 is shown deployed in FIG. 4. Kickstand 40 is secured in place by a fastener, such as nylon set screw 37. Set screws 37 also hold axle members 32 in the storage position through vertical struts 20.

Vertical struts 20 are preferably made from 1½×2-inch solid bar stock anodized aluminum, or stainless steel. Vertical struts 20 are preferably about 10.25 inches long, 2 inches wide and 1½ inches in depth.

Also shown in FIG. 3, the plurality of optional larger holes 21, such as holes, which are 0.765 or 1.625 inches in diameter, are located on a front side of vertical strut 20. Smaller hole 22 on the bottom accommodates kickstand 40, which is preferably a hollow aluminum tube of 0.75-inch diameter and 16 inches in length.

Optional larger holes 21 within vertical strut 20 are provided for weight reduction of portable cart 1.

On a side 23 transverse to the front 24 of each vertical strut 20, at a lower portion 20a thereof, is provided a further hole 25 of about 1-inch in diameter for insertion of each axle member 32 therethrough. Hole 25 has a permanently affixed, bushing 26 therein, such as a PVC (polyvinyl chloride) bushing, to prevent wear and tear of each aluminum axle member 32 by the aluminum surface of hole 25.

Figure 6:
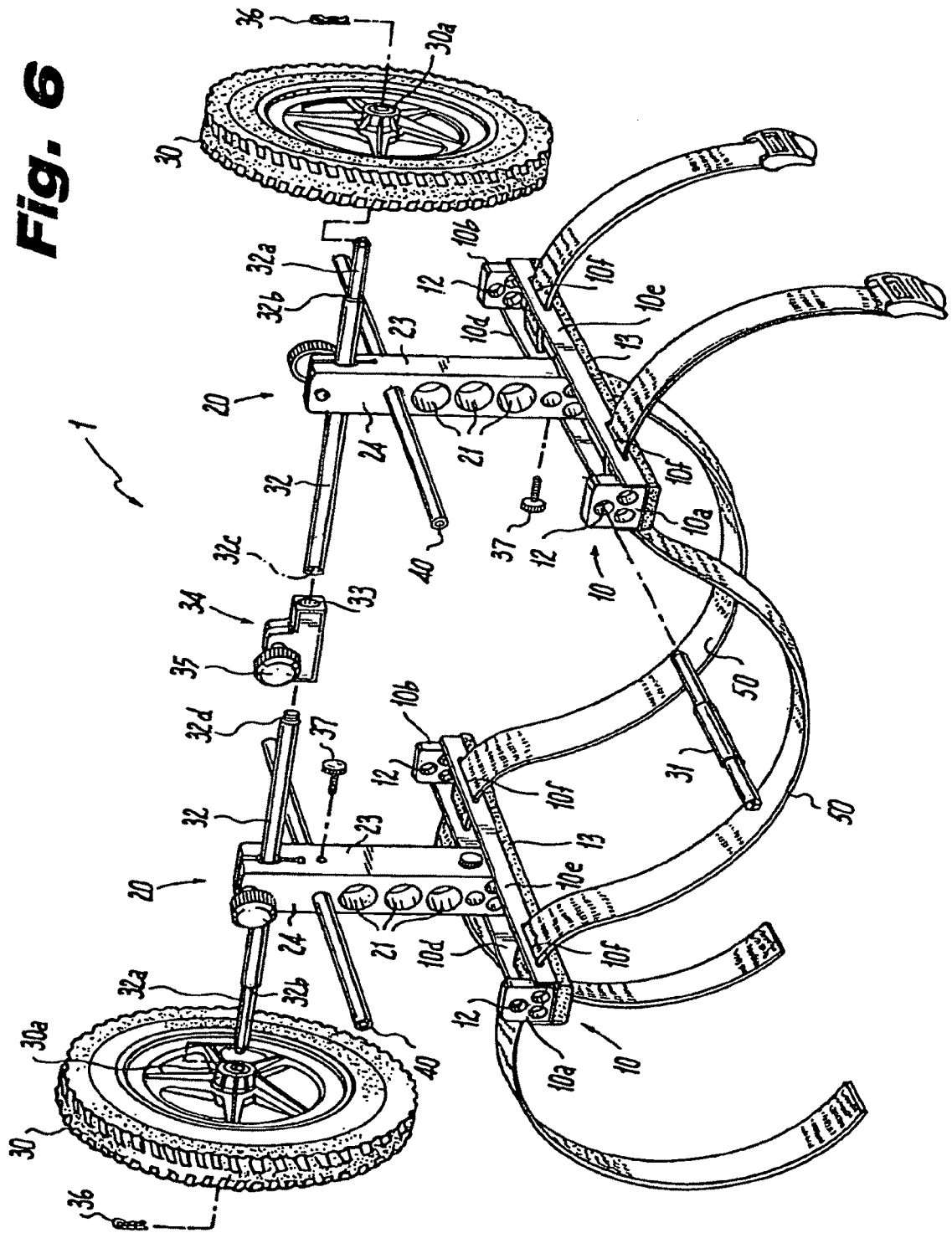
FIG. 6 is an exploded perspective view, inverted, of the components required to assemble the boat cart.

As also shown in FIGS. 3, 4 and 6, each wheel 30 is demountably attached at an end, respectively, to a pair of axle members 32, with axle members 32 extending inwardly from and demountably attached to lower portion 20a of the respective vertical struts 20, wherein axle members 32 are in a transverse relationship to horizontal load support members 10. Fasteners, 36, such as cotter pins, hold each wheel 30 upon each axle 32.

Each axle member 32 is received within each hole 25, of each lower portion 20a of each vertical strut 20. A compression groove 27 exists from the underside of vertical strut 20 to hole 25 and continues to further through hole 27a, providing for compression of lower portion 20a of vertical strut 20.

To accommodate narrow or wider cargo, such as watercraft of varying widths, the distance between vertical struts 20 can be varied along the axle length by loosening and tightening the tightening member 28 and moving vertical struts 20 laterally apart or towards each other along axle members 32.

Although optionally a one-piece axle may be used (not shown), preferably the pair of axle members 32 are held in opposite axial orientation by straight rigid axle connector 34. Axle connector 34 has tightening member 35, and a pair of receptacles 33 at the respective two ends of axle connector 34, so that axle members 32 respectively extend outwardly from, and are demountably attached within, the axle connector receptacle bore 33.

Figure 33:
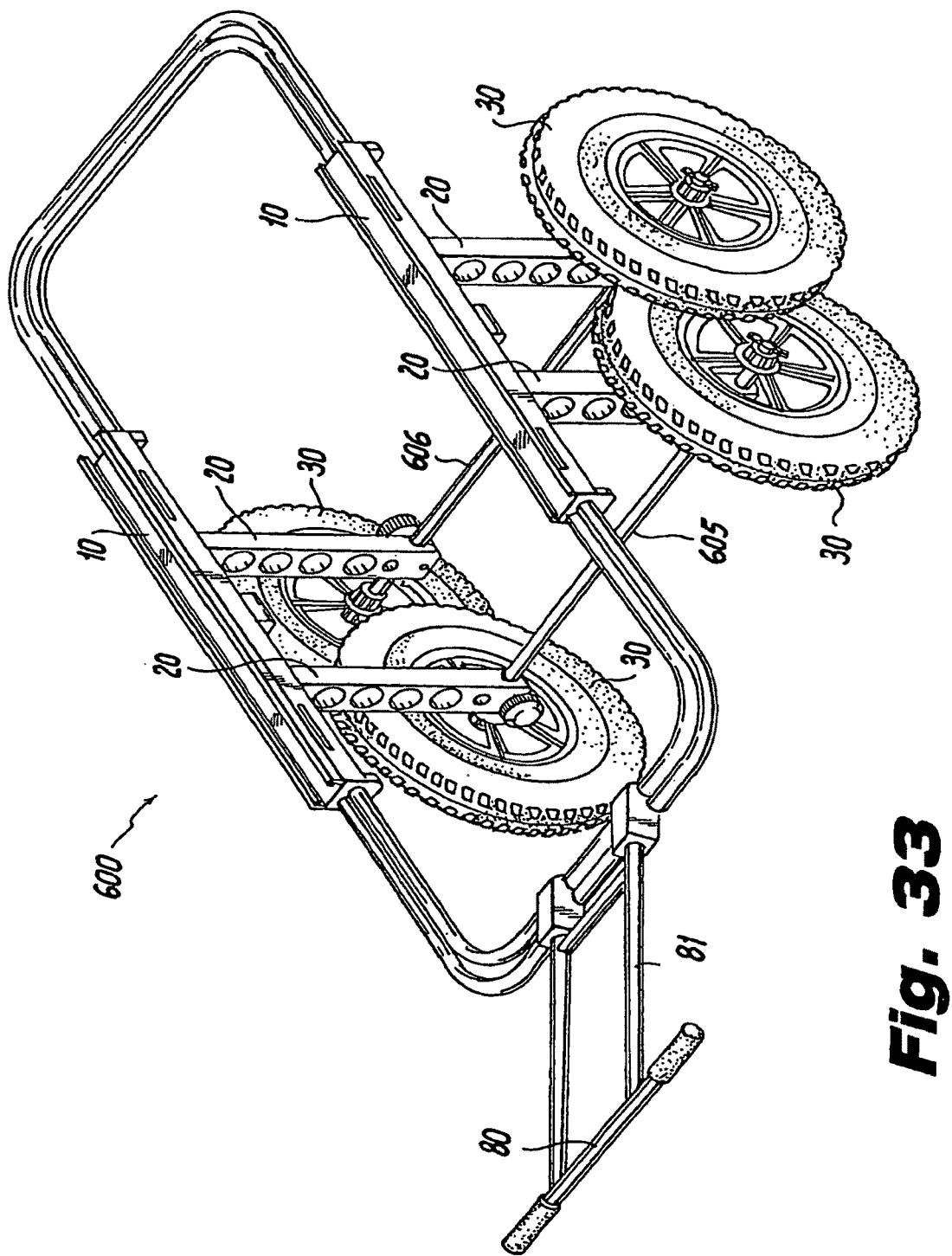
FIG. 33 is a perspective view of one embodiment for an assembled frame of a portable cart with four wheels.

While the axle may be optionally a one-piece axle, such as shown as reference numeral 606 in FIG. 33 herein, preferably the pair of connected oppositely extending axle members 32 form together an axle for wheels 30.

Each axle member 32 is made of solid round stock of anodized aluminum or stainless steel, approximately 0.75 inches in diameter. At the wheel-supporting end 32a, the diameter is about 0.59 inches in diameter with shoulders 32b of about 0.08 inches in height, transverse to the axis of axle member 32. These shoulders 32b provide a resting surface to prevent axial movement of wheel 30 upon axle member 32.

Figure 7:
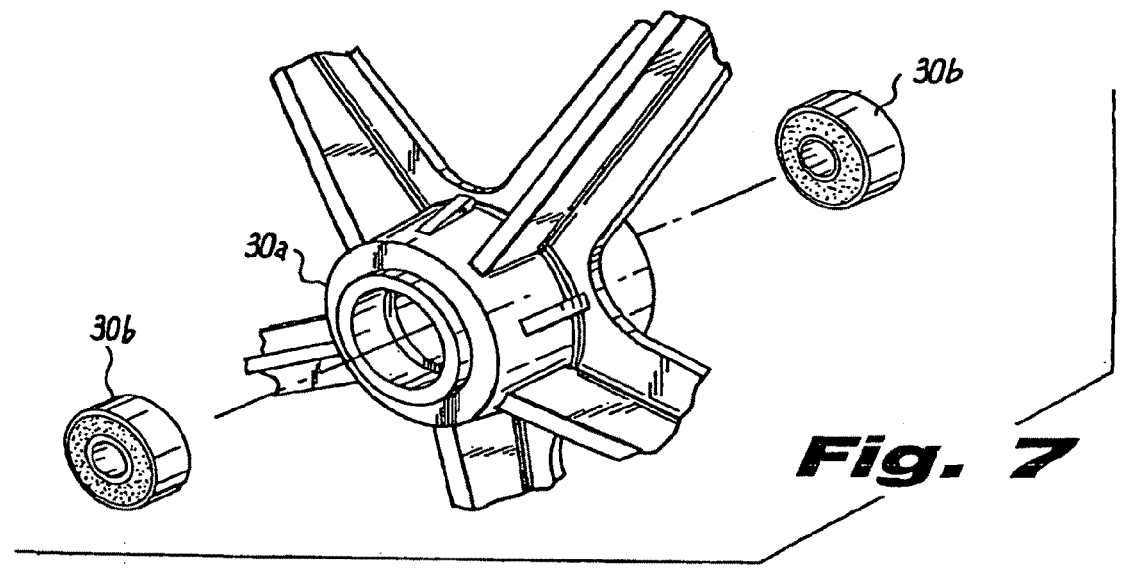
FIG. 7 is an exploded perspective of a typical wheel, showing two press fit bearings adjacent an integrally molded hub.
Figure 8:
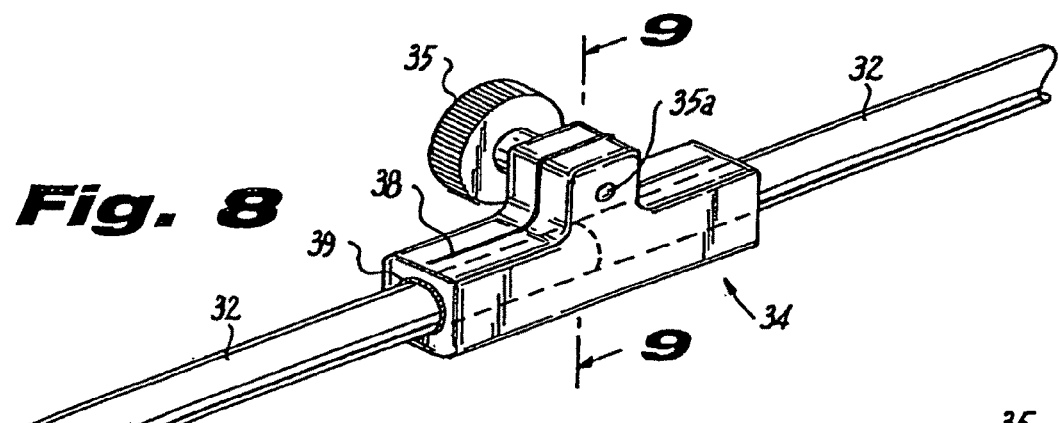
FIG. 8 is a perspective view of an axle-locking member, installed on the assembled axle.

As shown in FIG. 7, each wheel 30 rotates about press fit bearings 32b, while each wheel 30 is positioned upon each respective axle member 32 of FIG. 8. As shown in FIG. 6, at the opposite end of one axle member 32, there is provided a hollow, threaded recess 32c of about 0.75 inches deep, to accommodate a connecting threaded member 32d of other axle member 32, to axially connect both axle members 32 together within axle connector 34, with a wheel 30 at each end.

Figure 9:
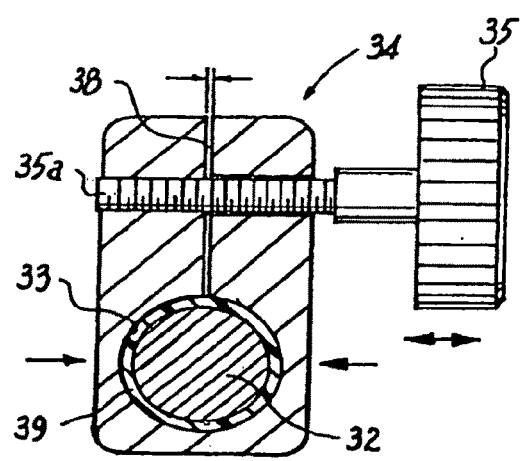
FIG. 9 is a sectional elevation view, taken through lines 9-9 of FIG. 8, showing the locking member compressing and locking the axle joint.

FIGS. 8 and 9 show how axle connector 34 is compensated along groove 38, thereby locking axle members 32 within bushing 39, which is within receptacle bore 33 of axle connector 34, by tightening of tightening bolt 35a of tightening member 35. Preferably bushing 39 is a PVC (polyvinyl chloride) bushing. Groove 38 is preferably 1/16 to 1/8 inch, in width, which allows for the compression of axle connector 34 around axle members 32. Tightening bolt 35a is inserted within a conventional receptacle which is a through hole at the proximal end and which is tapped with threaded grooves at the distal end, to allow for compression of axle connector 34.

FIGS. 4 and 6 also show at least one kickstand 40, preferably a pair, respectively extending horizontally rearward from each lower portion of vertical struts 20. Each kickstand member 40 extends rearwardly from the at least one kickstand receptacle aperture 22 of respective vertical struts 20 and each kickstand 40 is demountably attached within each respective kickstand receptacle aperture 22. Each kickstand member 40 is preferably contoured so as to contact the ground to stabilize portable cart 1 is a parked position of rest.

Figure 5:
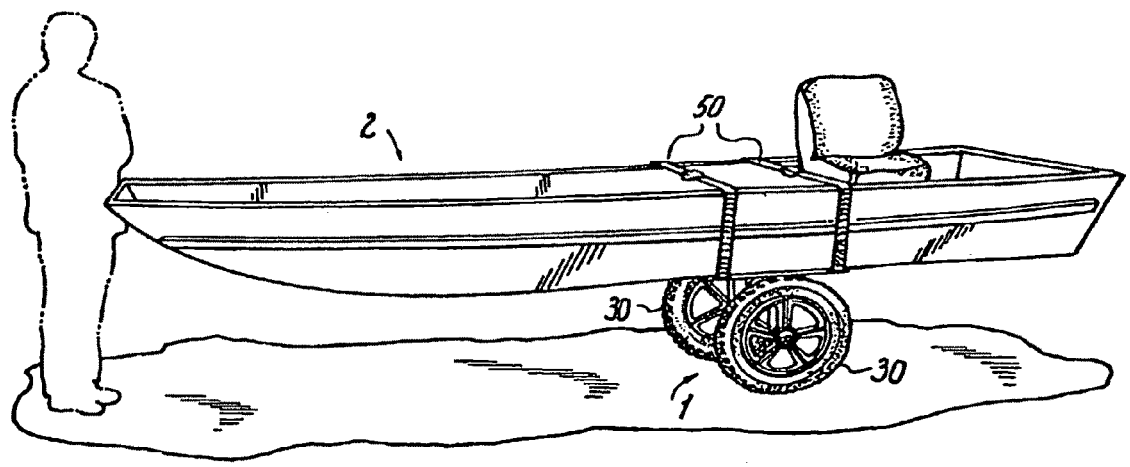
FIG. 5 is a perspective view of the assembled cart with a boat fastened for transport.

As shown in FIG. 5, to hold a canoe, game or cargo in place upon cart 1, one or more adjustable load-securing straps 50 are slidably attached to both respective horizontal load supports 10 in a transverse relationship to load supports 10. Straps 50 are preferably reinforced flexible canvas straps of about 2 inches in width.

To complete portable cart 1 as a canoe or boat cart, FIG. 4 shows support cushions 13 mounted upon respective horizontal load supports 10. Support cushions 13 are flexible, such as of rubber or foam, to support the weight of boat 2 thereon.

Figure 10:
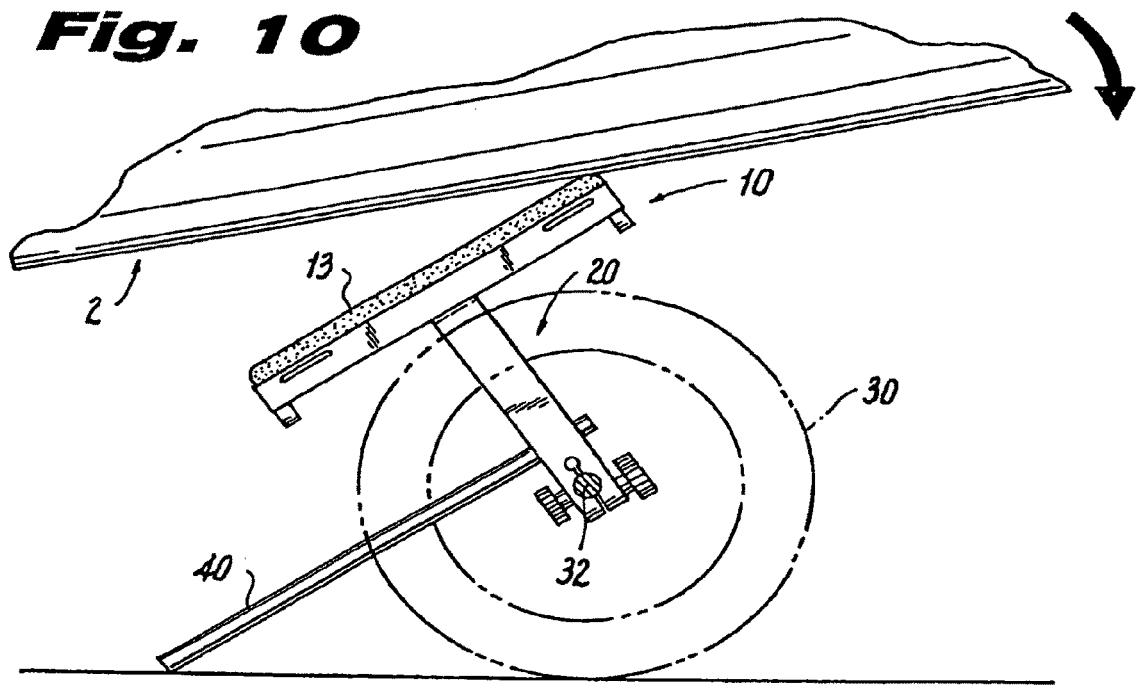
FIG. 10 is a diagrammatic side elevation view of the boat cart in its resting position, with a boat hull contacting the raised edge.
Figure 11:
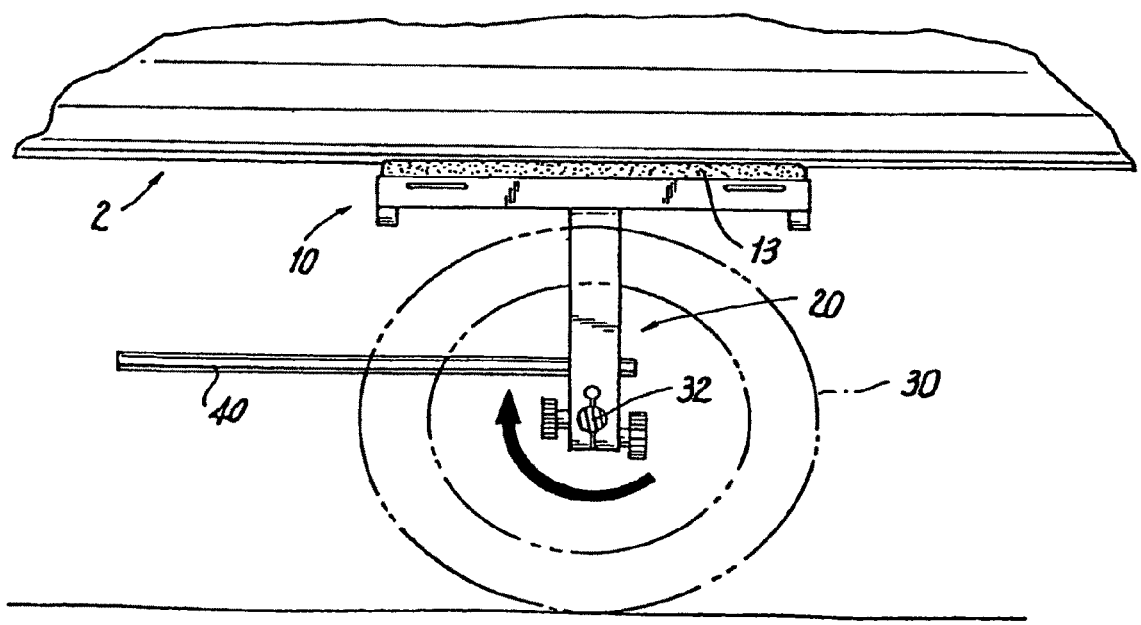
FIG. 11 is a diagrammatic side elevation view of the boat cart with the boat hull positioned and fully installed, illustrating the precision balancing feature of the cart.

FIGS. 10 and 11 show the precision balancing of boat 2 upon cart 1, wherein the placement of boat 2 upon cart 1 causes cart 1 to rotate from a position of rest in FIG. 10 to a horizontal load position of FIG. 11, in the direction of the arrow.

Figure 18:
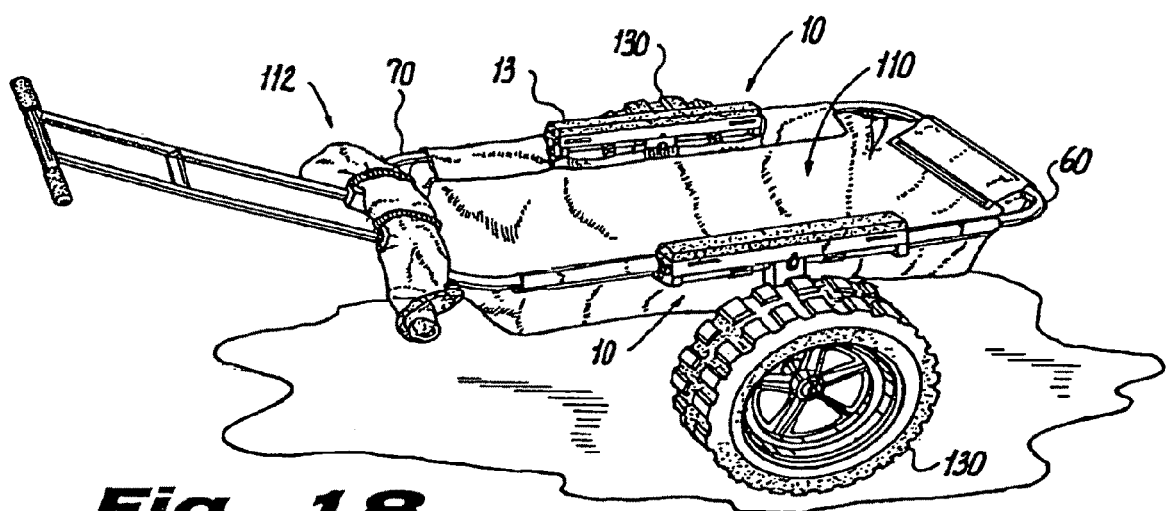
FIG. 18 is a perspective view of a further embodiment, a cart for transporting cargo, equipped with optional wide tires and axle for use on sand or granular terrain.
Figure 19:
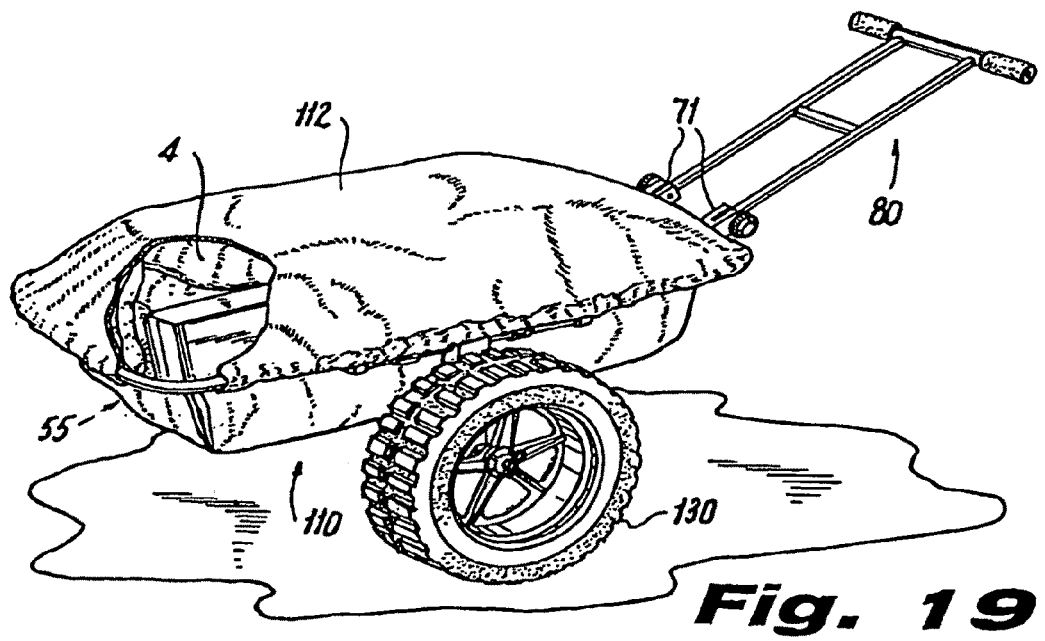
FIG. 19 is a perspective view of a fully loaded cargo cart, with the cover material partially cutaway to reveal its contents.
Figure 20:
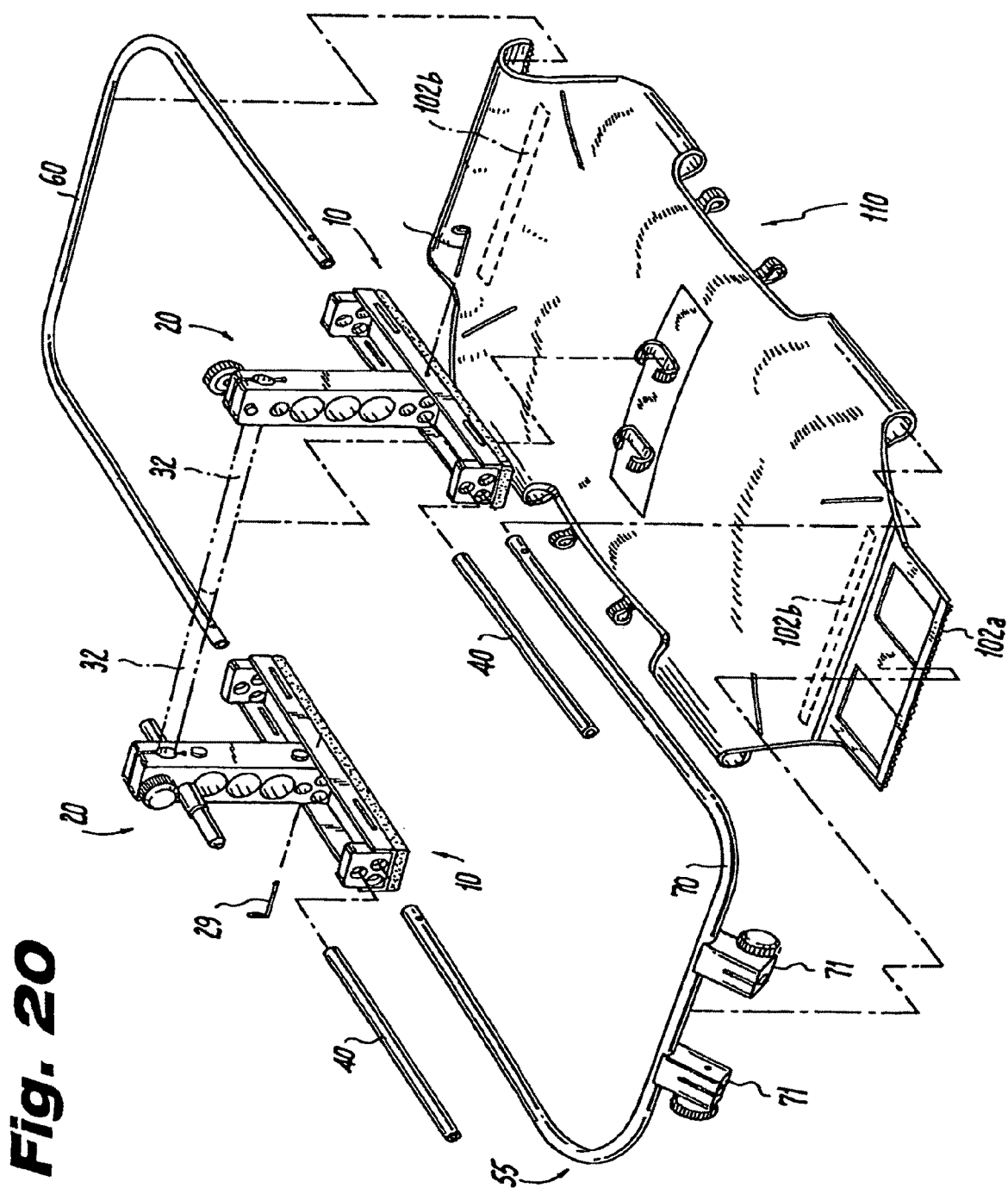
FIG. 20 is an exploded perspective view, inverted, of the cargo cart, illustrating the attachment of the canvas material to the framework components.
Figure 21:
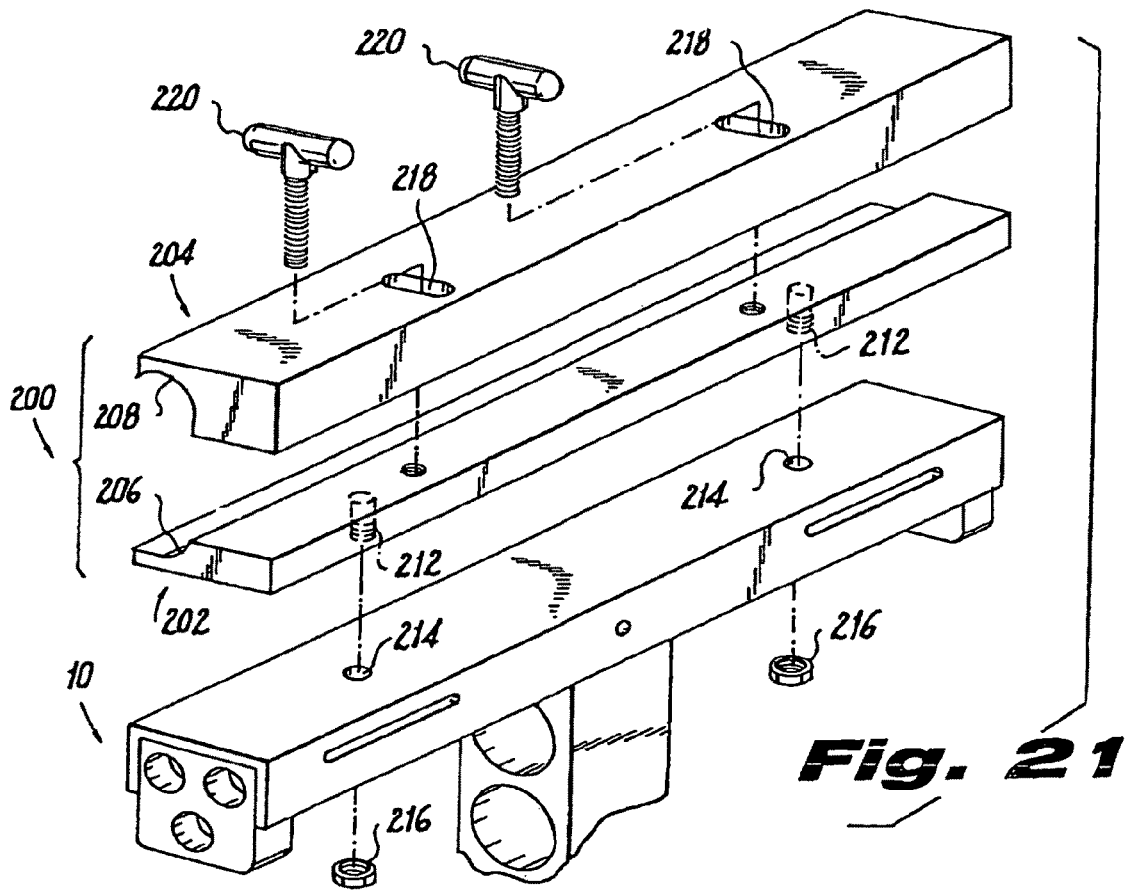
FIG. 21 is another exploded perspective detail view of the components for a stretcher-hauling clamp of an alternate embodiment for a search and rescue cart.
Figure 22:
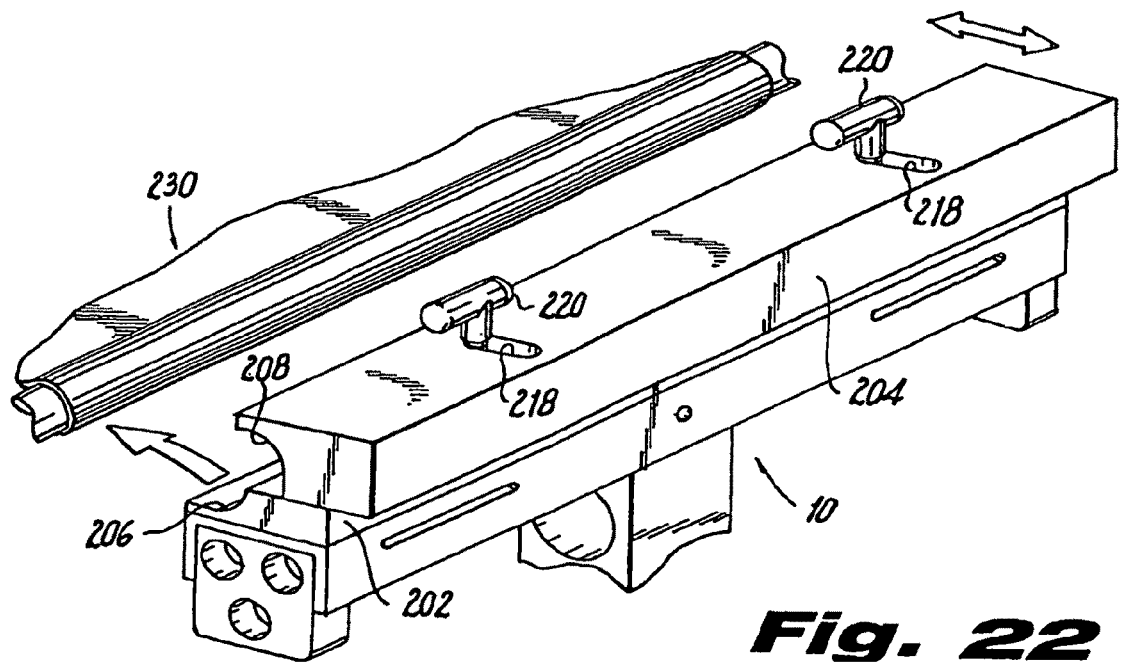
FIG. 22 is a perspective view of the clamp embodiment shown in FIG. 21, showing the sliding action of the clamp therein, for quick removal of the stretcher therefrom.

FIGS. 12-17 show another embodiment that converts portable cart 1 into a game cart. Alternatively, FIGS. 18-20 show how to convert cart 1 into a cargo wagon with a hollow well. First, in either situation, carry frame 55 is secured to horizontal load supports 10. Although a one piece, generally rectangular frame (not shown) may be used, preferably frame 55 includes a pair of U-shaped brackets 60, 70 joinable together to form frame 55.

Various fasteners may be provided to horizontal load supports 10 to carry objects, such as carriers, thereon.

Alternatively, for example, a clamp maybe provided to horizontal load supports 10 to carry a frame of a discrete transportable carrier directly thereon, as disclosed hereinafter with respect to FIGS. 21-24. In that case, instead of the frame being integrally part of the portable chart, as in FIGS. 12-17, in FIGS. 21-24, the frame is clamped to the horizontal load supports 10 of portable cart 1. Other fasteners may include longitudinally extending channel slots, such as in FIGS. 33-39 described further below.

Meanwhile, further with respect to FIGS. 12-17, U-shaped front bracket 60 extends horizontally forward from front-end receptacle apertures 12 of horizontal load supports 10, wherein front bracket 60 is demountably attached within front-end receptacle apertures 12 at one end of horizontal load supports 10.

U-shaped rear bracket 70 extends horizontally rearward from oppositely positioned rear end receptacle apertures 12 of horizontal load supports 10 and rear bracket 70 is demountably attached within each oppositely positioned rear end receptacle aperture 12 of horizontal load supports 10.

Figure 13:
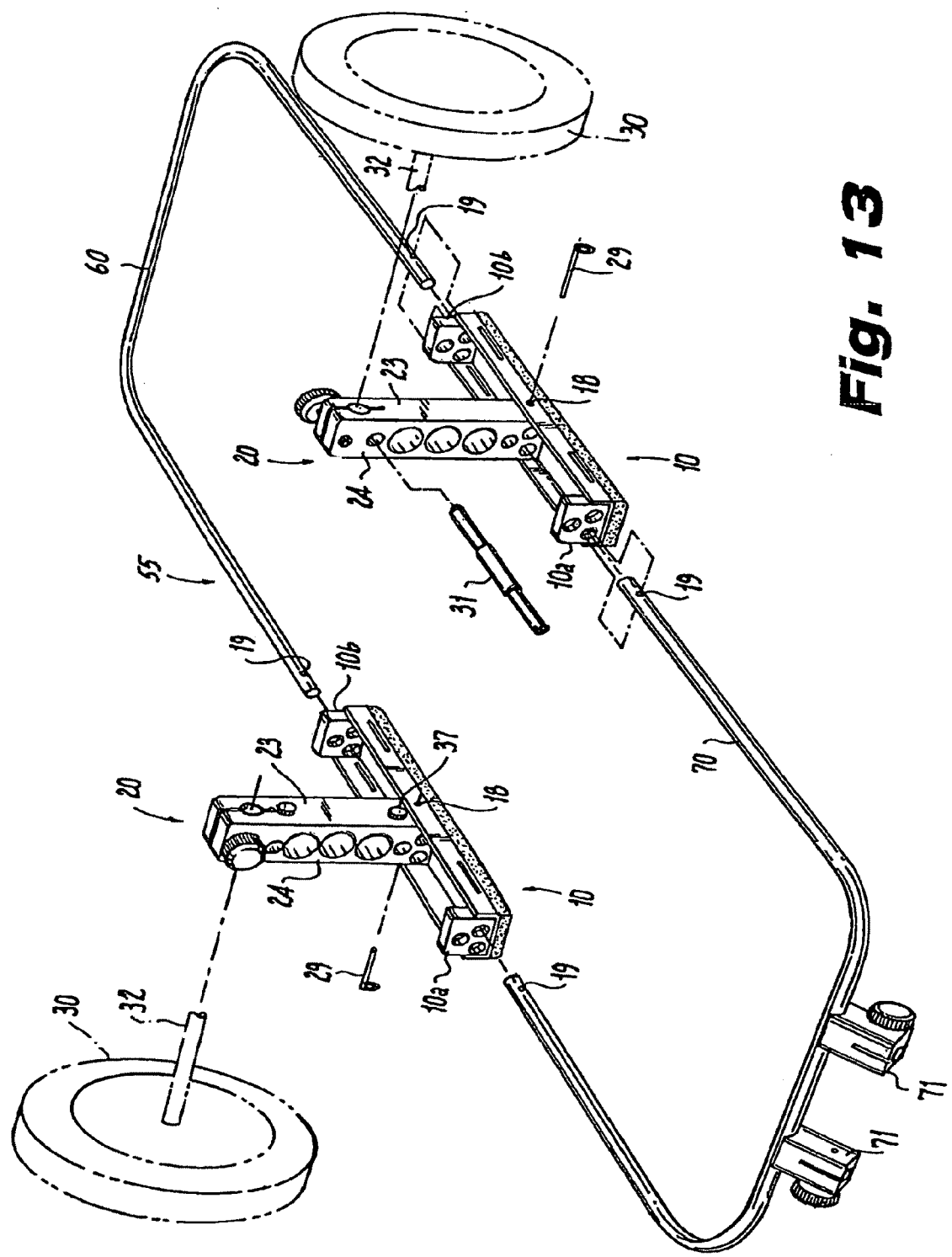
FIG. 13 is an exploded perspective view of the inverted gaming cart, illustrating the framework fastening method.

FIG. 13 shows how frame 55 is secured to cart 1. Each distal end of U-shaped front bracket 60 is inserted through apertures in respective ends 10b of horizontal supports 10 until each distal end engages a corresponding hole in each vertical support 20, where they are held in place by pins 29. Pins 29 engage lateral holes 18 in horizontal supports 10 and corresponding through holes 19 in distal ends of U shaped brackets 60. Likewise, each distal end of U-shaped rear bracket 70 is inserted through apertures in respective ends 10a of horizontal supports 10 until each distal end engages a corresponding hole in each vertical support 20, where it is also held in place by a pin 29. Pins 29 engage lateral holes 18 in horizontal supports 10 and corresponding through holes 19 in distal ends of U shaped brackets 60, 70 of frame 55.

U-shaped brackets 60, 70 are preferably of hollow, anodized aluminum tubing of about 0.75 inches in diameter. The length of each distally extending side member thereof is about 23.50 inches and the width of the cross bar connecting the distal side members is about 21.63 inches. About 0.75 inches from each distal end is a scoring, to accommodate a clamp thereon, to form frame 55.

Figure 12:
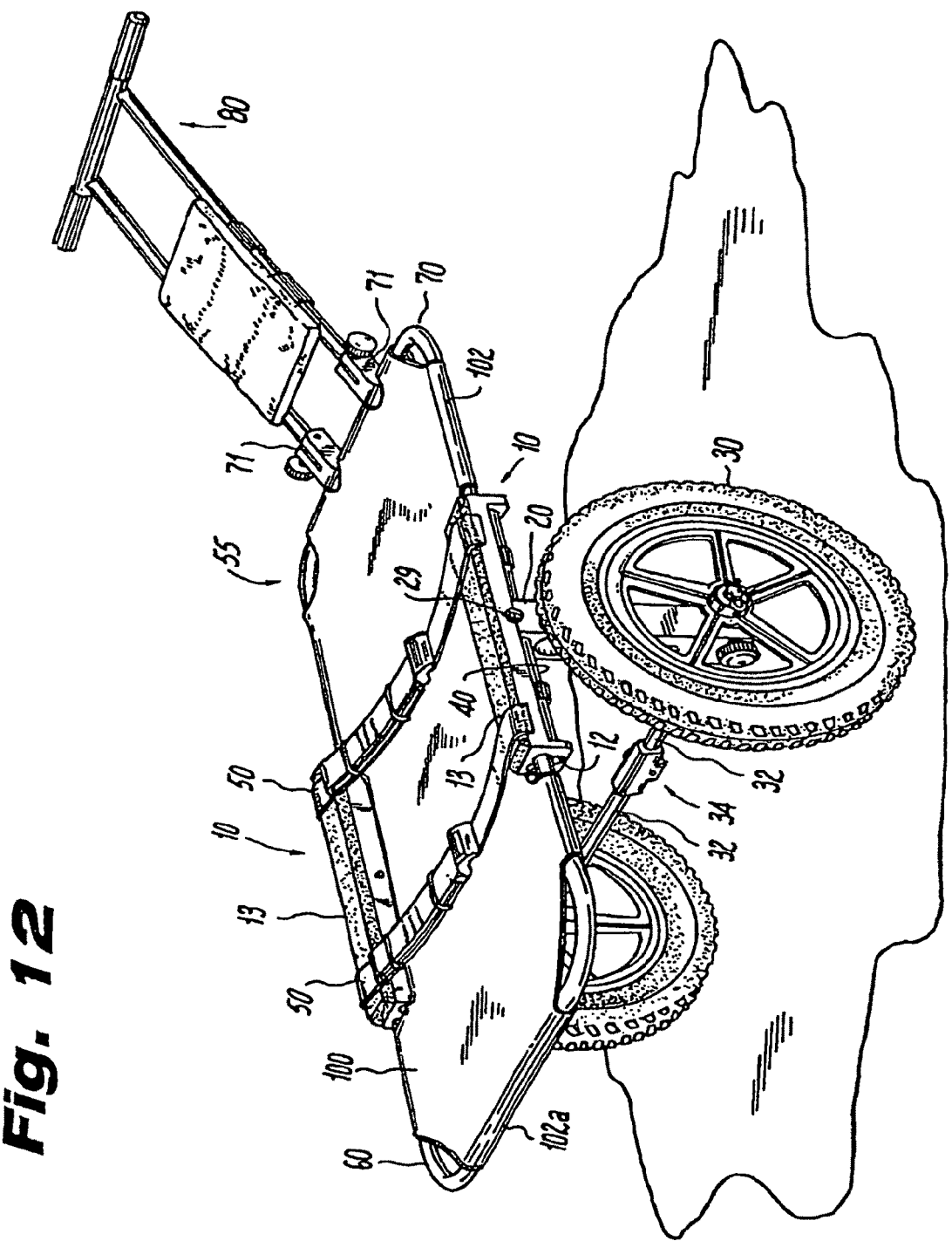
FIG. 12 is a perspective view of the assembled alternate embodiment cart, for hunting/gaming applications.
Figure 15:
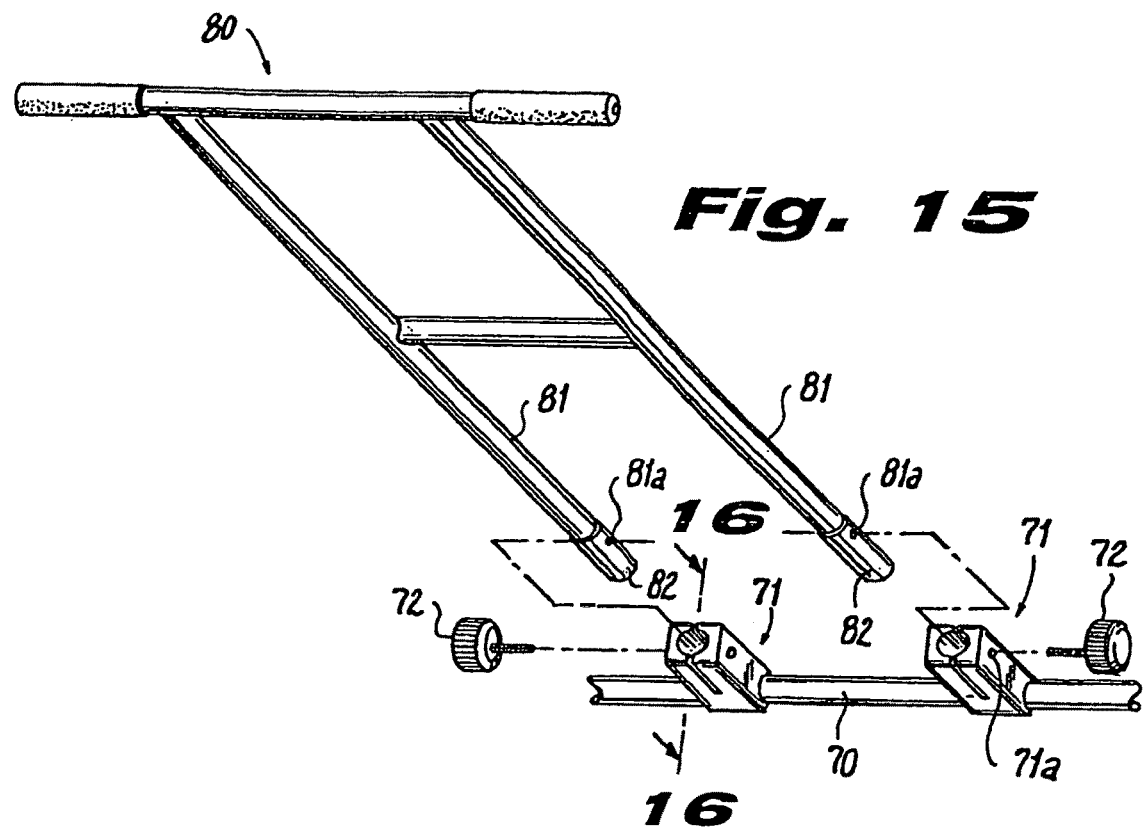
FIG. 15 is an exploded perspective view of the attachment of the handlebar component to the locking receptacles on the framework.
Figure 16:
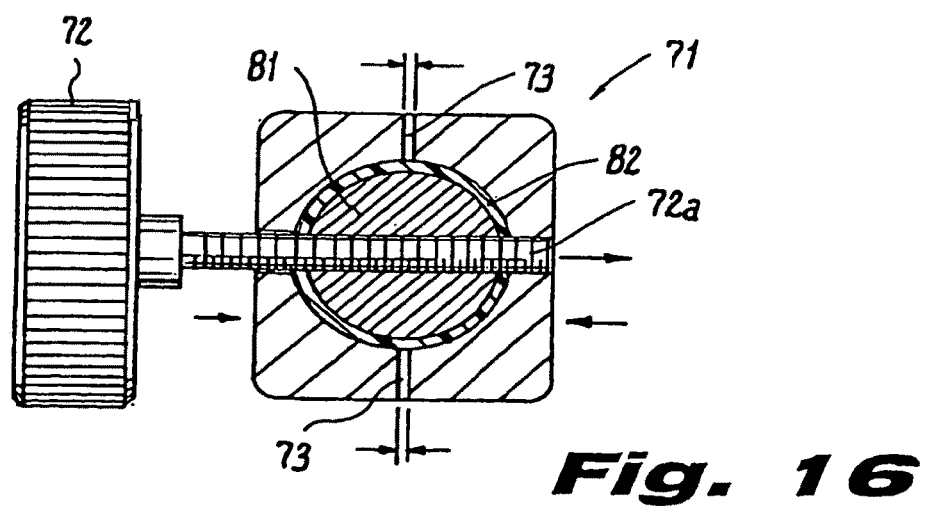
FIG. 16 is a sectional elevation view, taken through lines 16-16 of FIG. 15, showing the locking receptacles acting on the installed leg of the handlebar.

As shown in FIGS. 12 and 15 for pulling or pushing game or cargo upon portable cart 1, handle 80 extends rearwardly at an upward angle from joints 71 of either U-shaped rear bracket 70 for pushing portable cart 1, or from front U-shaped bracket 60 for pulling portable cart 1 (not shown). Furthermore, handle 80 may be permanently attached to either U-shaped bracket 60 or 70, or handle 80 may be removable and demountably attached to either front U-shaped bracket 60 or rear U-shaped bracket 70.

Handle 80 has preferably two aluminum tubing connecting members about 22.5 inches in length, connected by a hand accommodating transverse bar of solid aluminum, and is 17.5 inches in width. Handle 80 includes connectors 81, having distal sleeves, such as PVC (polyvinyl chloride) sleeves 82, permanently affixed thereto, which are insertable within joints 71 by locking member 72, having threaded member 72a which passes through bore 71a of joint 71 and bore 81a of handle 80. Compression groove 73 exists in joint 71, providing compression of joint 71.

Handle 80 may optionally have an auxiliary extension member and clamp (not shown), so that it can be attached to the rear frame of a bicycle (not shown), to pull portable cart 1.

Figure 14:
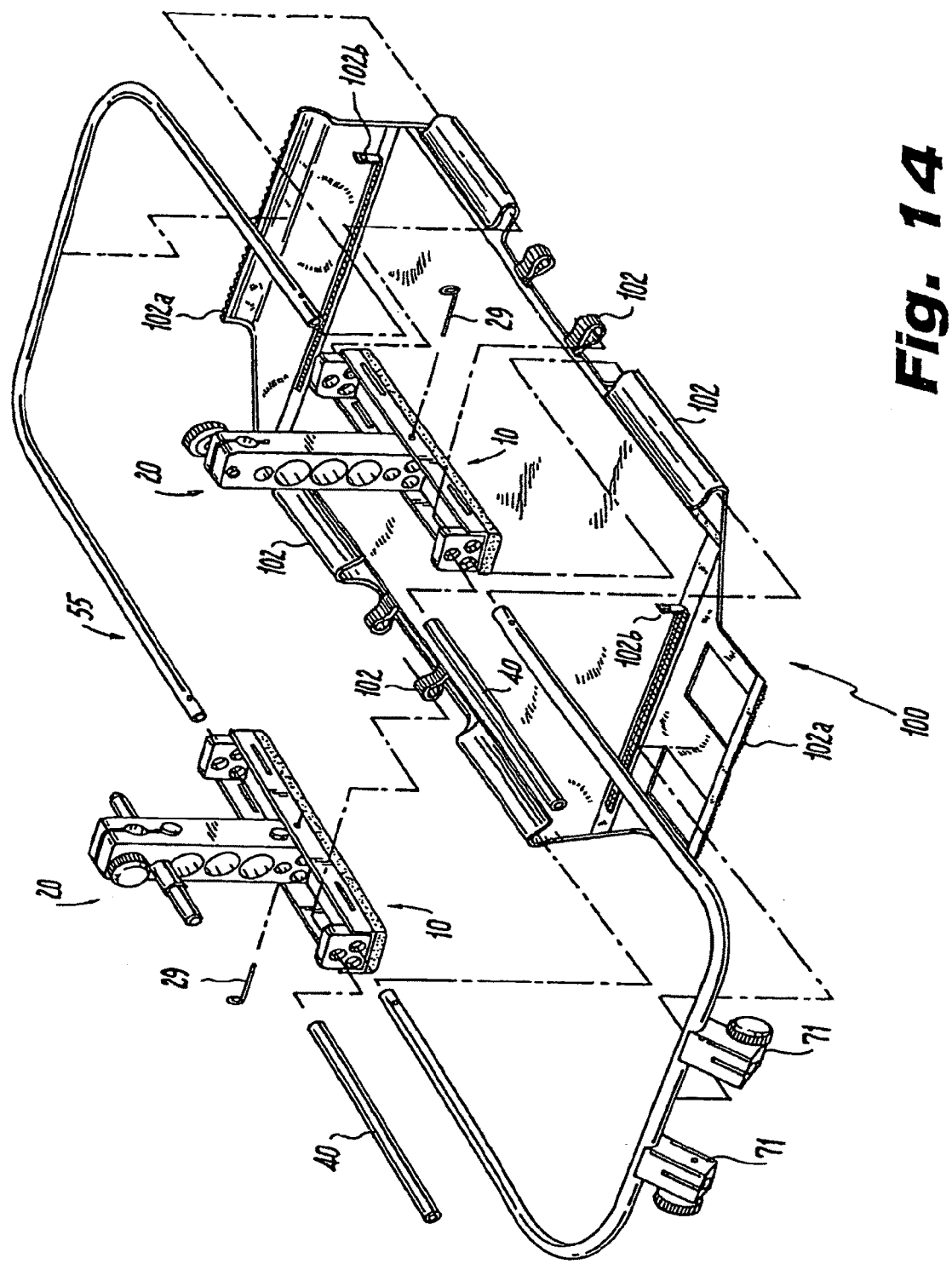
FIG. 14 is an exploded perspective view, inverted, of the gaming cart, illustrating the attachment of the stretcher canvas material to the framework components.
Figure 17:
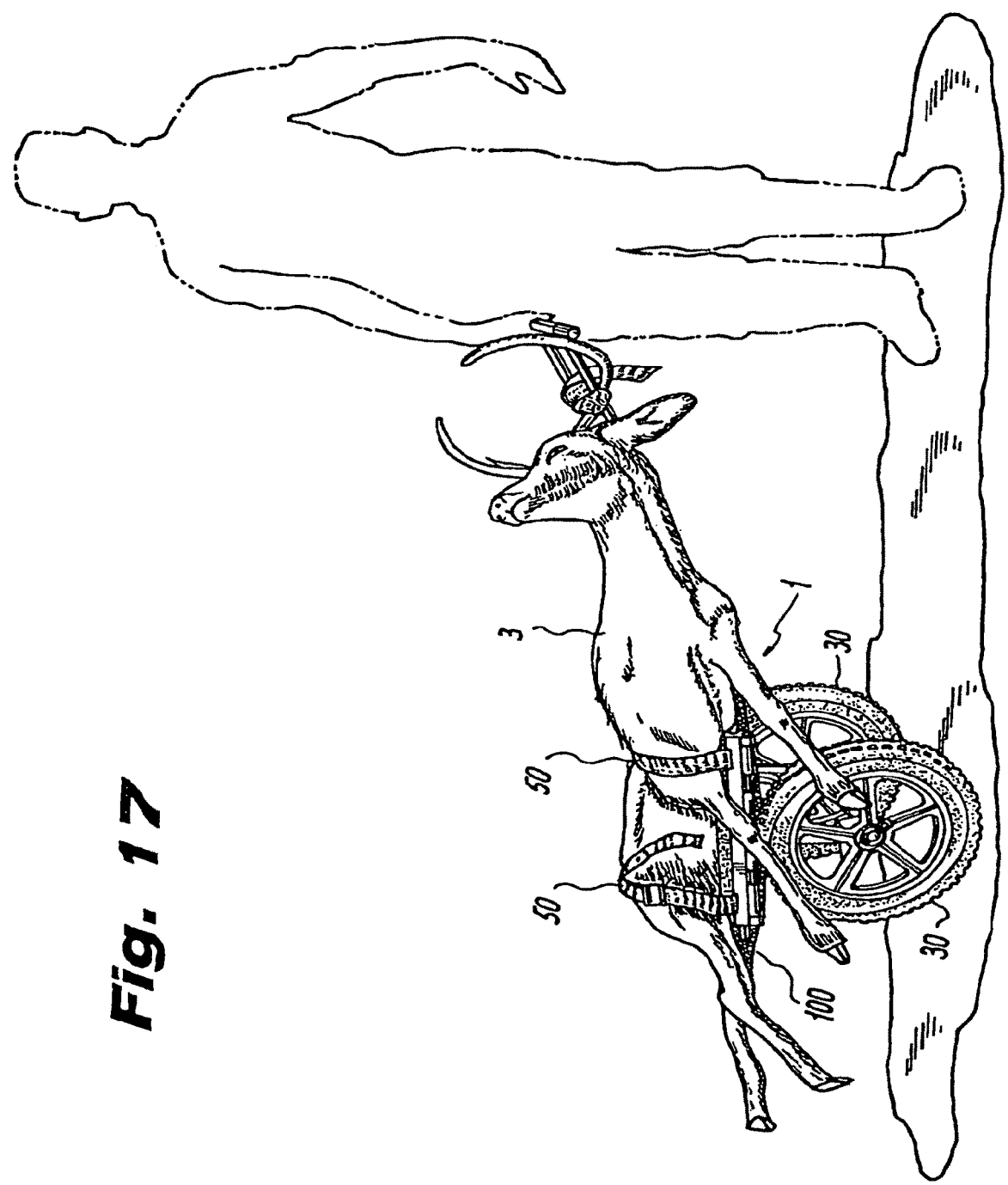
FIG. 17 is a perspective view of the gaming cart, with a deer fastened for transport.

To carry game 3, as shown in FIG. 17, or to carry an injured person in a rescue operation, FIG. 12 shows portable cart 1 having fabric stretcher 100 stretched tautly between horizontal load members 10 and preferably mounted over and around front and rear U-shaped brackets 60 and 70 of frame 55, by threading brackets 60, 70 through fasteners such as sewn-in loops 102 of fabric stretcher 100, which may alternatively be made of plastic or other taut load bearing material. Other types of fasteners can be used. For example, FIG. 14 shows that loop 102a is openable, and closed by fastener, such as zipper fastener 102b.

As also shown in FIG. 12, handle 80 may include a pair of posts extending obliquely off of a horizontal axis of portable cart 1, wherein a head rest cushion 85 extends between the posts to support the head and neck of an injured person being transported upon stretcher 100.

FIGS. 18-20 show that to carry cargo, hollow fabric cargo well 110 is attached in the same manner to frame 55. Hollow cargo well 110 may also alternatively be made of plastic or other taut load bearing material, and covered by cover 112. FIGS. 18 and 19 also show wider wheels 130 for use on sand or granular terrain.

Assembly and Disassembly

The various embodiments of the mission adaptable multiple-purpose portable cart/utility table can be quickly and easily assembled and disassembled.

For example, for making a canoe cart from the disassembled portable cart 1, wheel-retaining members, such as cotter pins 36, are taken out of axle members 32 in their stored position, and wheels 30 come out. Axle members 32 are then removed from between vertical struts 20. The axle members 32 are then clamped in a horizontal use position into receptacles 33 of rigid axle connector 34. Axle members are inserted between vertical struts 20 and locked in place. Wheels 30 are placed upon axle members 32 and secured by cotter pins 36. Kickstand 40 is loosened from its rest position and placed in place in receptacles within vertical struts 20. Canoe supporting cushions 13 are installed upon horizontal load supports 10 to support a canoe or boat thereupon. Straps 50 hold the canoe or boat installed upon cushions 13 in a secure transportable position.

To convert portable cart 1 into a game cart as in FIG. 17 or a rescue cart as in FIG. 12, kickstands 40 are removed and fabric stretcher 100 is installed on U-shaped frame members 60, 70 of frame 55 frames by fasteners such as sewn loops 102 thereof. U-shaped frame members 60, 70 are placed on horizontal load supports 10, and kickstand members 40 are installed as braces for fabric stretcher 100. Straps 50 are then installed to securely hold game or an injured party upon stretcher 100. Then handle 80 is installed upon U-shaped bracket 60 or 70 of frame 55 to pull or push portable cart 1.

To convert portable cart 1 into a wagon to haul cargo, as in FIGS. 18 and 19, fabric stretcher 100 is removed and hollow well 110 is installed over U-shaped members 60, 70 of frame 55.

To make the portable chart 1 portable again, the components are disassembled in reverse into bag 120. Strap or straps 50 are used as a carry handle or for backpack shoulder loops.

Figure 23:
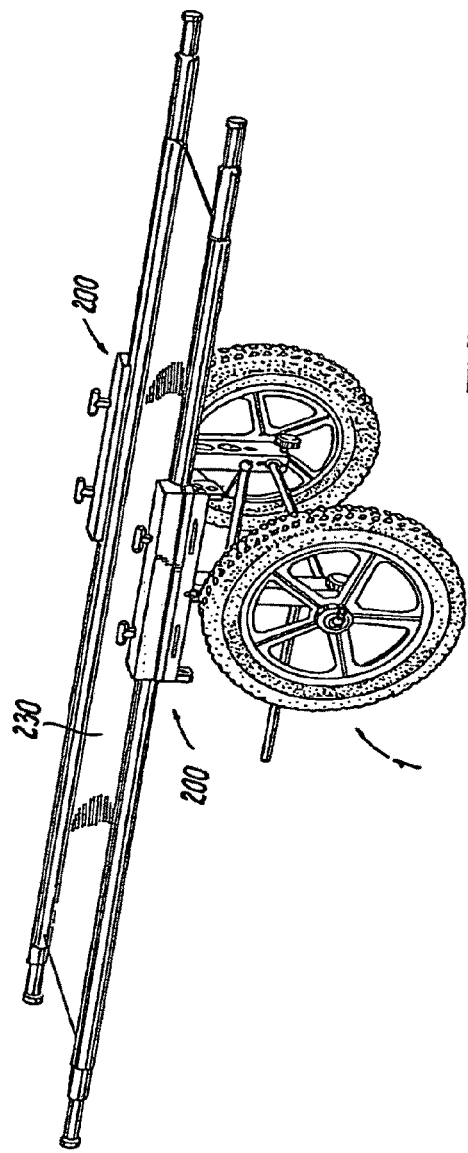
FIG. 23 is a perspective view of the portable cart of the present invention, showing the clamp as in FIGS. 21 and 22 carrying a rescue stretcher.

While the rescue stretcher shown in FIG. 12 has its own customized stretcher 100, in another embodiment shown in FIGS. 21-24, to convert portable cart 1 to a retrofit disabled person-bearing transportable carrier cart for search and rescue operations, using conventional railed stretcher 230, support cushions 13 are removable from horizontal load supports 10 and replaced by clamping assembly 200. Clamping assembly 200 includes lower jaw 202, and upper jaw 204. While different jaw configurations can be used, the embodiment shown in FIGS. 21-24 shows each having longitudinally extending recesses 206 and 208 therein to grip perimeter frame rails of a load supporting transportable carrier, such as conventional railed stretcher 230 therebetween, as shown in FIG. 23.

Lower jaw 202 of clamping assembly 200 includes an engaging surface 210 with threaded studs 212 which are inserted into through-holes 214 of load supports 10, and permanently locked with nuts 216. Upper jaw 204 is provided with a pair of oblong through-slots, 218, to allow upper jaw 204 to slide on upper surface of lower jaw 202, when threaded T-handles 220 are loosened. As shown by the arrows in FIG. 22 this sliding action allows for quick removal of any stretcher frame rail secured between jaw assembly 200.

Figure 24:
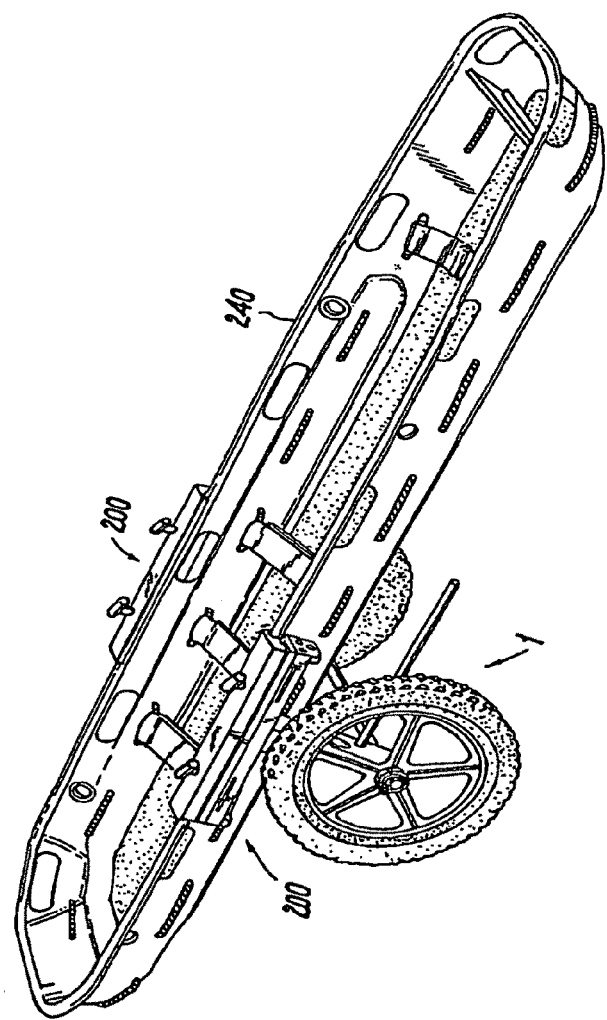
FIG. 24 is a perspective view of the portable cart carrying a Stokes-type personal rescue carrier.

FIGS. 23 and 24 are perspective views of a typical stretcher 230, and a Stokes-type rescue basket 240, securely clamped to portable cart 1 utilizing the previously described clamping assembly 200.

Figure 25:
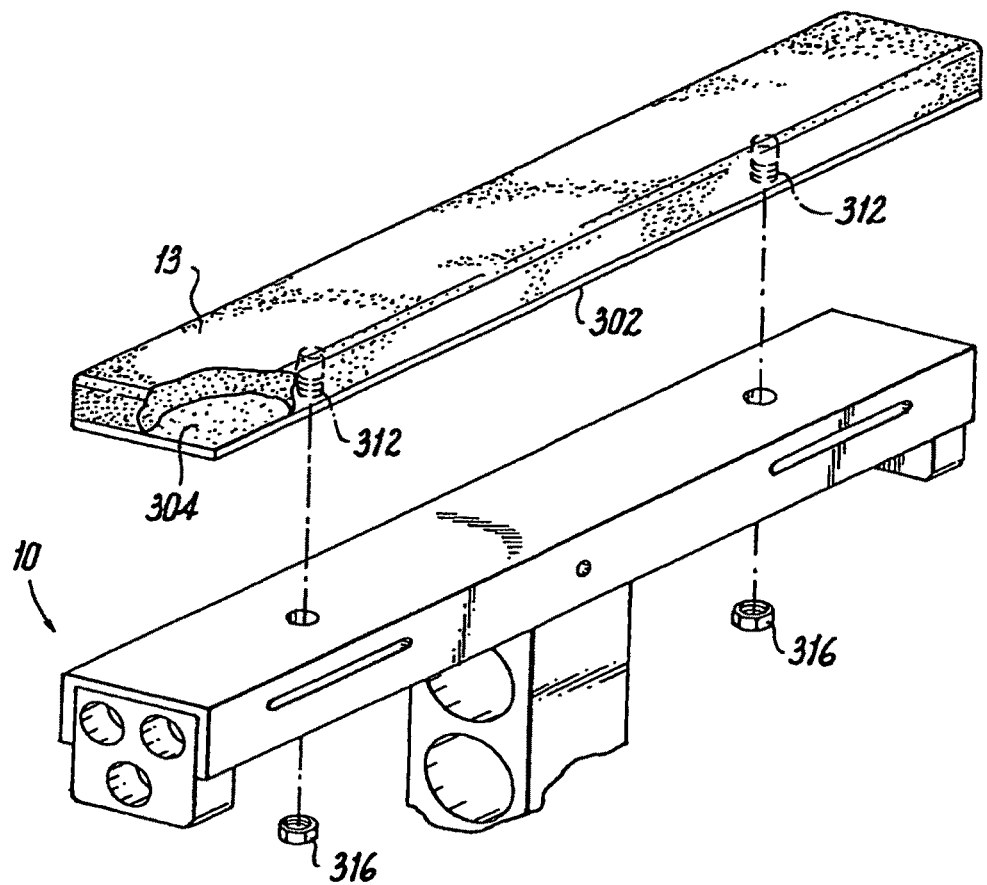
FIG. 25 is an exploded view of components of a further alternate embodiment for a support for removal of a boat support cushion therefrom.

As shown in FIG. 25 in this embodiment, instead of being permanently attached to each horizontal load support 10, removable support cushion 13 is permanently attached to removable plate 302 with an adhesive 304. This cushion assembly is removably attachable by nuts 316 and threaded studs 312, to each horizontal load support 10.

Figure 26:
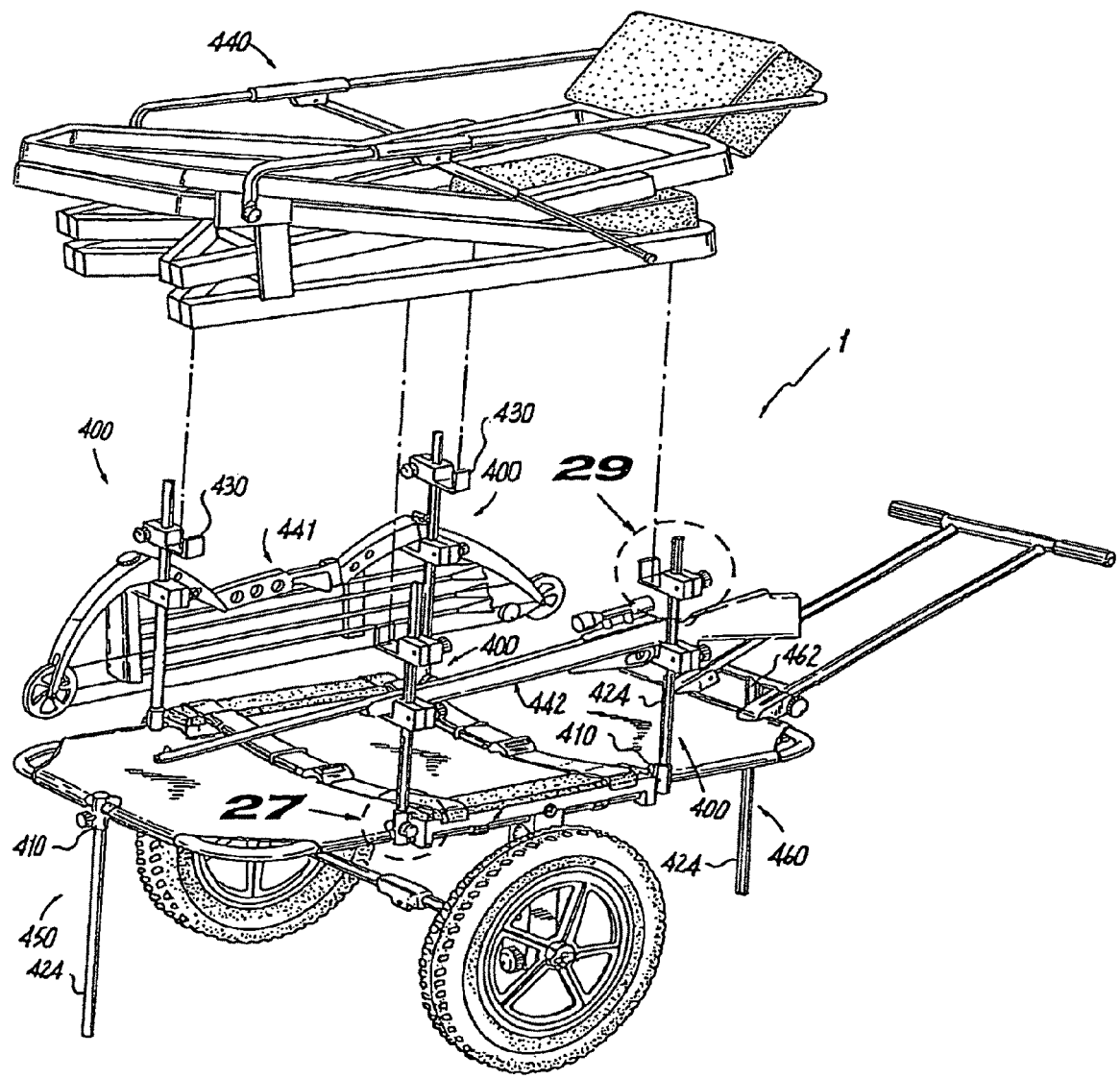
FIG. 26 is a perspective view of an alternate embodiment for a hunting cart with an accessory racking system for transport of hunting gear, such as a tree stand chair, archery implements and firearms thereon.

FIG. 26 illustrates portable cart 1, outfitted with a plurality of racking assemblies 400, each comprising a rail clamp 410, an upstanding post 424, and a hanger clamp 430. Rack assembly 400, when used in conjunction with additional rack assemblies 400, allows for transportation and quick removal of essential hunting gear such as a chair stand 440, archery equipment 441, and rifle 442. Other related items such as knapsacks and bedrolls may be supported by rack assembly 400, as well. Rack assembly 400 is easily disassembled from cart 1 upon reaching a chosen destination, and the components are conveniently transported within cart 1's storage backpack, such as carry bag 120 shown in FIG. 1.

Also illustrated in FIG. 26 are stabilizing assemblies 450 and 460. Assembly 450 makes use of post 420, which is friction-fit into an inverted rail clamp 410. Assembly 460 comprises an inverted tubular sleeve 462, optionally permanently welded to the handle assembly crosspiece. Sleeve 462 accepts kickstand post 424 in a similar fashion to rail clamp 410. These assemblies 450 460 serve to brace the cart 1 when it is parked.

Moreover, kickstand post 424 may be used with any embodiment having a handle, such as handle 80 of FIGS. 12 and 17-19, or handle 81 of FIGS. 32 and 33.

Figure 27:
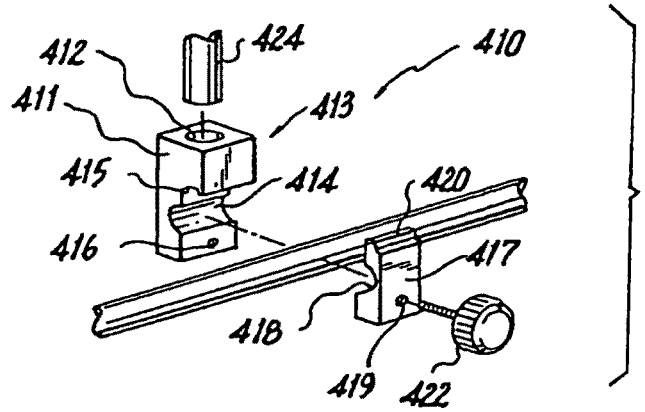
FIG. 27 is an exploded detail view of a quick release clamp for rail fastening to the cart shown in FIG. 26.

Turning to FIG. 27, which is highlighted in FIG. 26, an exploded perspective close-up detail view of rail clamp 410 is presented. Clamping block 411 is provided with a bore 412 to receive post 424, an attachment face 413 including a semi bore 414, and notch 415, and threaded bore 416. Plate 417 includes semi bore 418, through hole 419, and protruding rib 420.

Figure 28:
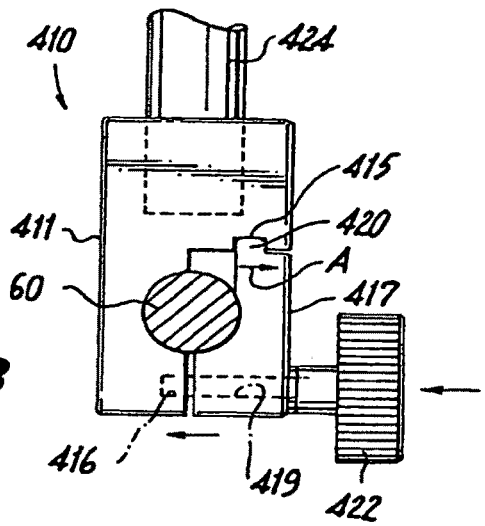
FIG. 28 is an assembled elevational view of the clamp of FIG. 27 attached to a rail.

As shown in FIG. 28, when threaded knob 422 is inserted into hole 419 of plate 417 and tightened into threaded bore 416 of block 411, clamping is achieved against frame member 60. Rib 420 is secured within notch 415 by a camming action in the direction of arrow "A".

Figure 29:
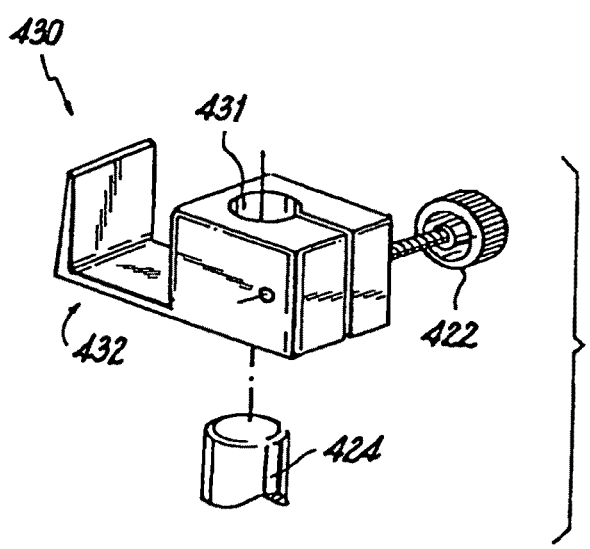
FIG. 29 is an exploded perspective view of a typical clamp for gear support for the cart as in FIG. 26.

FIG. 29 shows cantilevered hanger clamp 430, poised to slide down upstanding post 424. Hanger clamp 430 is provided with a bore 431, which is notched in a similar manner to clamping receptacles 71 of the handle assembly. The notch separates the body of hanger clamp 430 into two walls. Threaded knob 422 will compress the walls surrounding the notch, thereby tightening bore 431 around post 424. L-shaped region 432 is integrally formed with the body of the hanger clamp, and provides a strong and durable support for transporting hunting or other gear.

Figure 30:
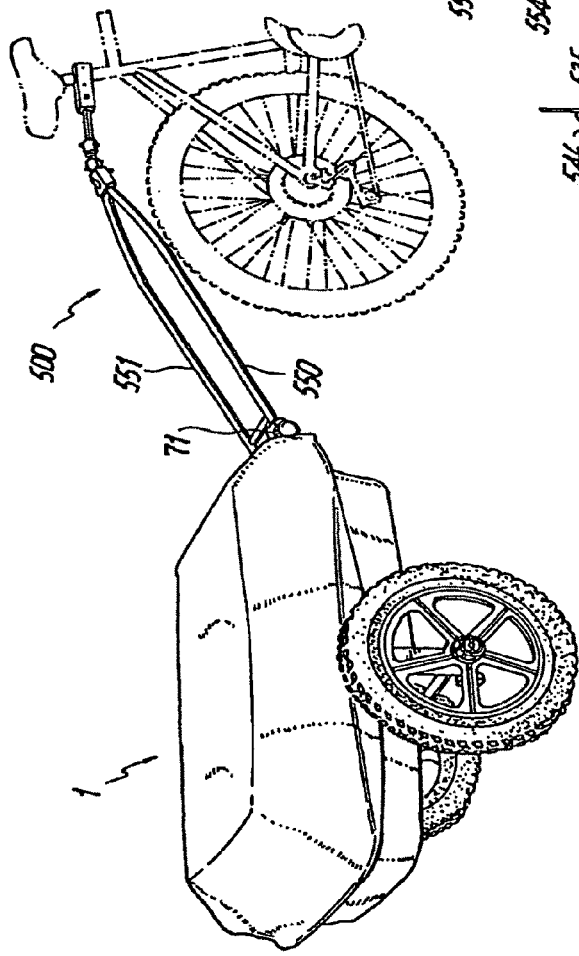
FIG. 30 is a perspective view of an anti-tipping attachment for connecting a bicycle to the portable cart of the present invention.

FIG. 30 is a perspective view of an anti-tipping linkage 500, which couples cart 1 to a bicycle. Linkage 500 counteracts cart rollover caused by centrifugal force as the bicycle negotiates turns.

Figure 31:
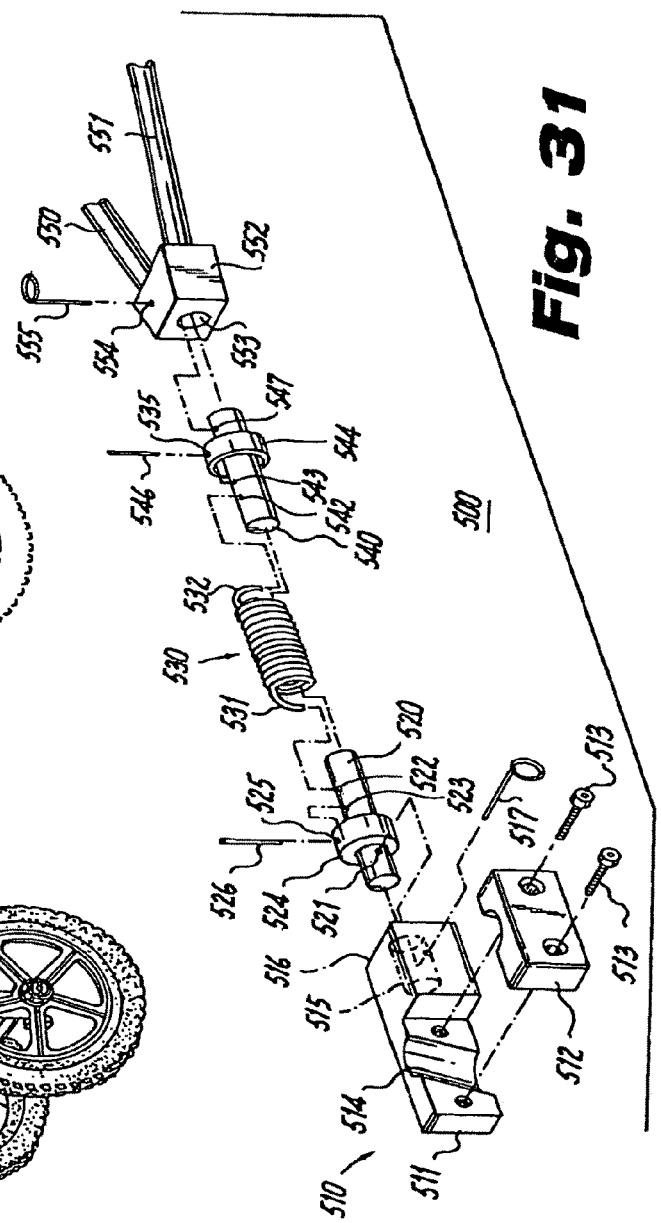
FIG. 31 is an exploded perspective view of the components of FIG. 30.

FIG. 31 illustrates the components of linkage 500. Bicycle seat-stem compression clamp 510 is formed of a body portion 511, and plate 512, fastened by screws 513. Bore 514 is angled so that clamp 510 remains perpendicular when installed on a typical bicycle seat-stem. Clamp 510 is provided with a bore 515 on rear face 516, which accepts a shaft 520. Pin 517 passes through clamp and fixes shaft 520 via a through-bore. Shaft 520 includes through-bore 522 at its distal end. Another through-bore 523 is provided slightly proximal of aperture 522. When shaft 520 is inserted into coil spring 530, hooked leg 531 of the spring will fit into bore 522. A sliding collar 524 will then extend over leg 531 to prevent pull-out, and a pin 526 will be fitted into collar hole 525, and into bore 523 of the shaft 520, thereby securing the collar to the shaft and preventing removal of the coil spring.

A shaft 540 is provided for the opposite end of coil spring 530. Hooked leg 532 fits into bore 542 of the shaft, and collar 544 slides over and is fixed by pin 546, fitted into collar hole 535 and shaft bore 543.

Support rails 550 and 551 are fixed to handle clamps 71 of cart 1. The rails are bent into an inverted V configuration, and permanently affixed to block 552. Block 552 is provided with bore 553, into which the free end of shaft 540 is fitted. Pin 555 is inserted into through bore 554 of block 552, and passes through bore 547 of shaft 540, creating the continuous, secure anti-tipping linkage 500 between cart 1 and a bicycle. It is understood that during maneuvers of the bicycle, there will be no problems associated with a typical universal or pivot joint; the coil spring will absorb and disperse any rotational stresses, and will react as a 360° "living hinge".

FIGS. 32A-32G, 33 and 33A show an alternate embodiment 600 of the portable cart using four wheels 30 in an overlapped configuration. A hard molded cover 601 is illustrated although any cover or no cover can be used as well. Cover 601 covers bin 602 with lower overlapping edge cap 601a fitting over peripheral shoulder 602a of bin 602. Bin 602 also has longitudinally extending concave channels 603, which rest upon rails 604 of cart 600 of FIG. 32. Downward pressure of the weight of bin 602 and its contents helps stabilize bin 602 upon rails 604, which may be optionally covered with rubber or other resilient linearly extending cushions.

Although FIG. 32 illustrates portable cart 600 with covered bin 602, portable cart 600 can be used with other embodiments, such as, for example, boat cushions 13 shown in FIG. 4, framed rail stretchers 100 as in FIG. 12, the game cart of FIG. 17, the cargo cart of FIG. 18, the conventional rescue carriers of FIGS. 23 and 24 or the gear rack of FIG. 26, among others.

FIG. 32H shows an exploded inverted view of an alternate embodiment for a ruggedized handle assembly, including handle 630 and handle shaft 626 with spring pin 628 lined up to enter the end of stanchion truss weldment 620. Stanchion truss weldment 620 has two downward extending struts 632, which accommodate axles 624 therethrough, which axles 624, in-turn, attach to wheels 622. Central bushing receptacle 634 accepts the end of handle shaft 626. Receptacle 634 also has a lower pushpin aperture and a pair of opposite holes for a through pin to hold handle shaft in place. FIG. 32H also shows kickstand 640 stowable within handle shaft 626.

FIG. 32I shows a close-up inverted view of receptacle 634, showing handle shaft 626 located within truss weldment 620, and held in place by spring pin 628 of handle shaft 626 and/or through pin 629.

Figure 32D:
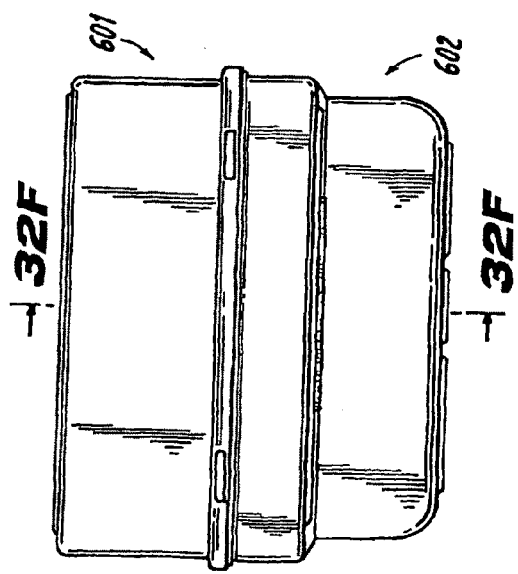
FIG. 32D is a side elevational view of the cover and bin as in FIG. 32.
Figure 32E:
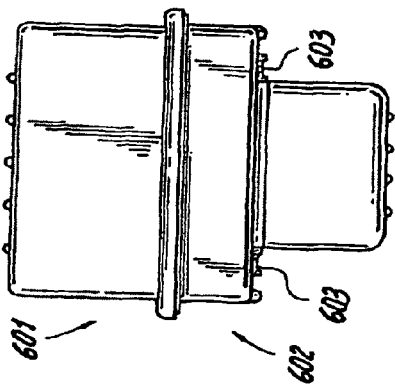
FIG. 32E is a front elevational view of the cover and bin as in FIG. 32.
Figure 32F:
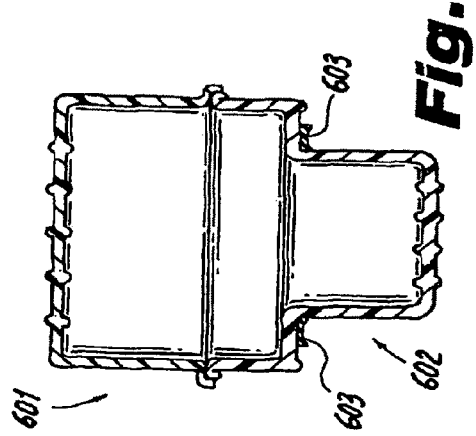
FIG. 32F is a front cross-sectional view thereof, taken along lines "32F-32F" of FIG. 32D.
Figure 32G:
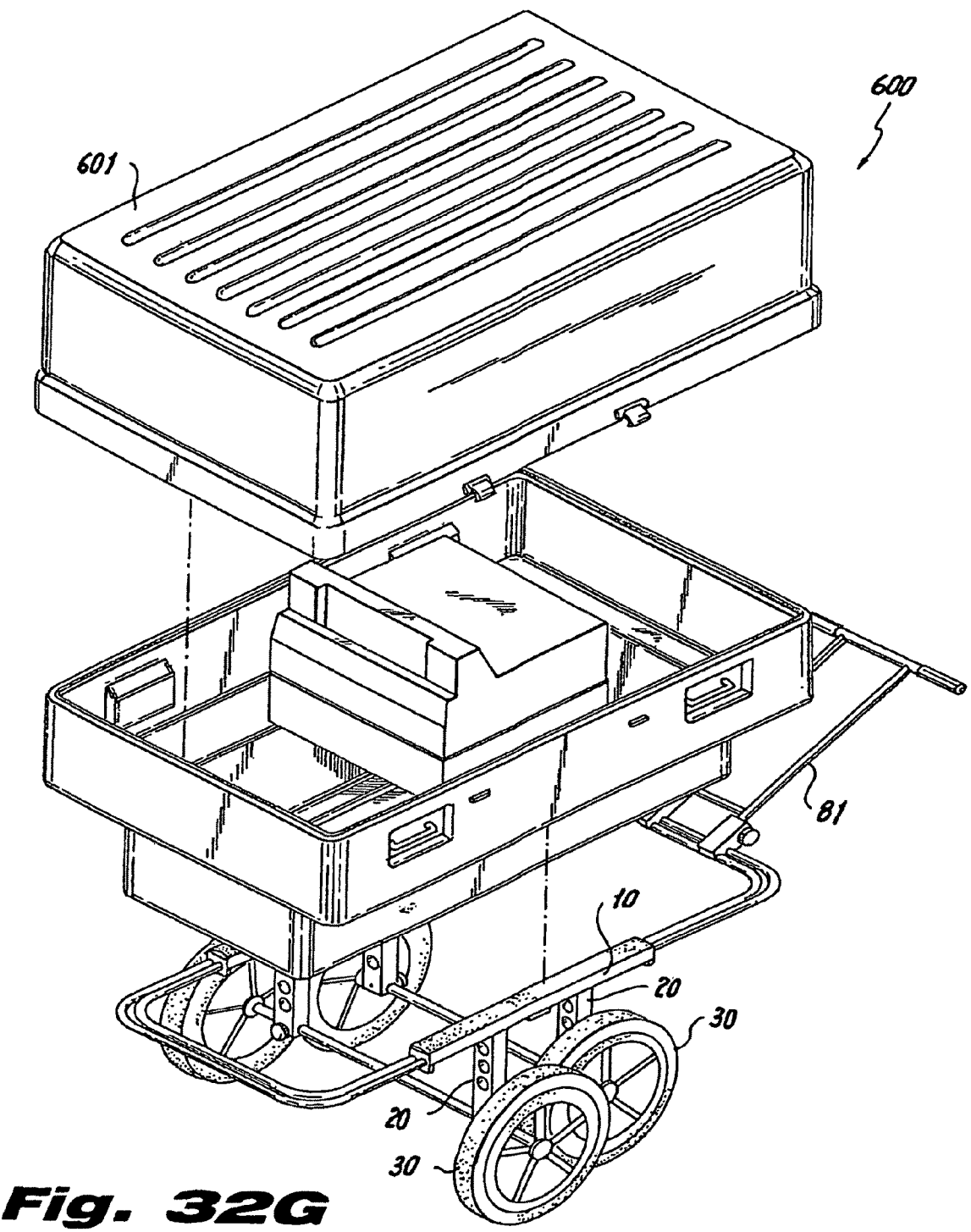
FIG. 32G is an exploded perspective view thereof.
Figure 32K:
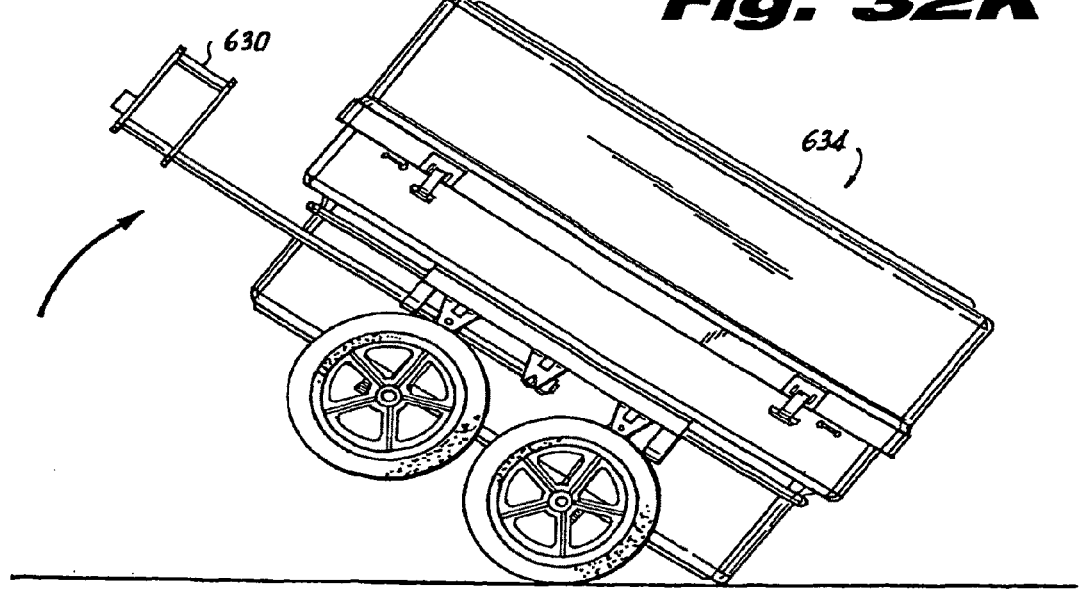
Figure 32L:
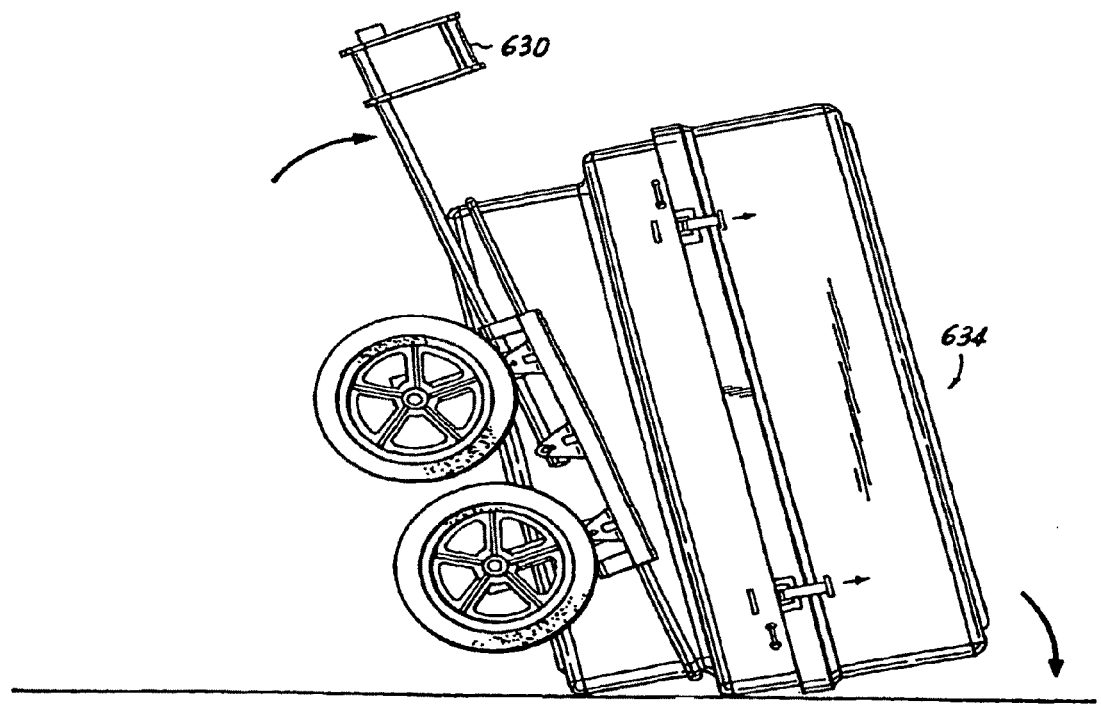
Figure 32J:
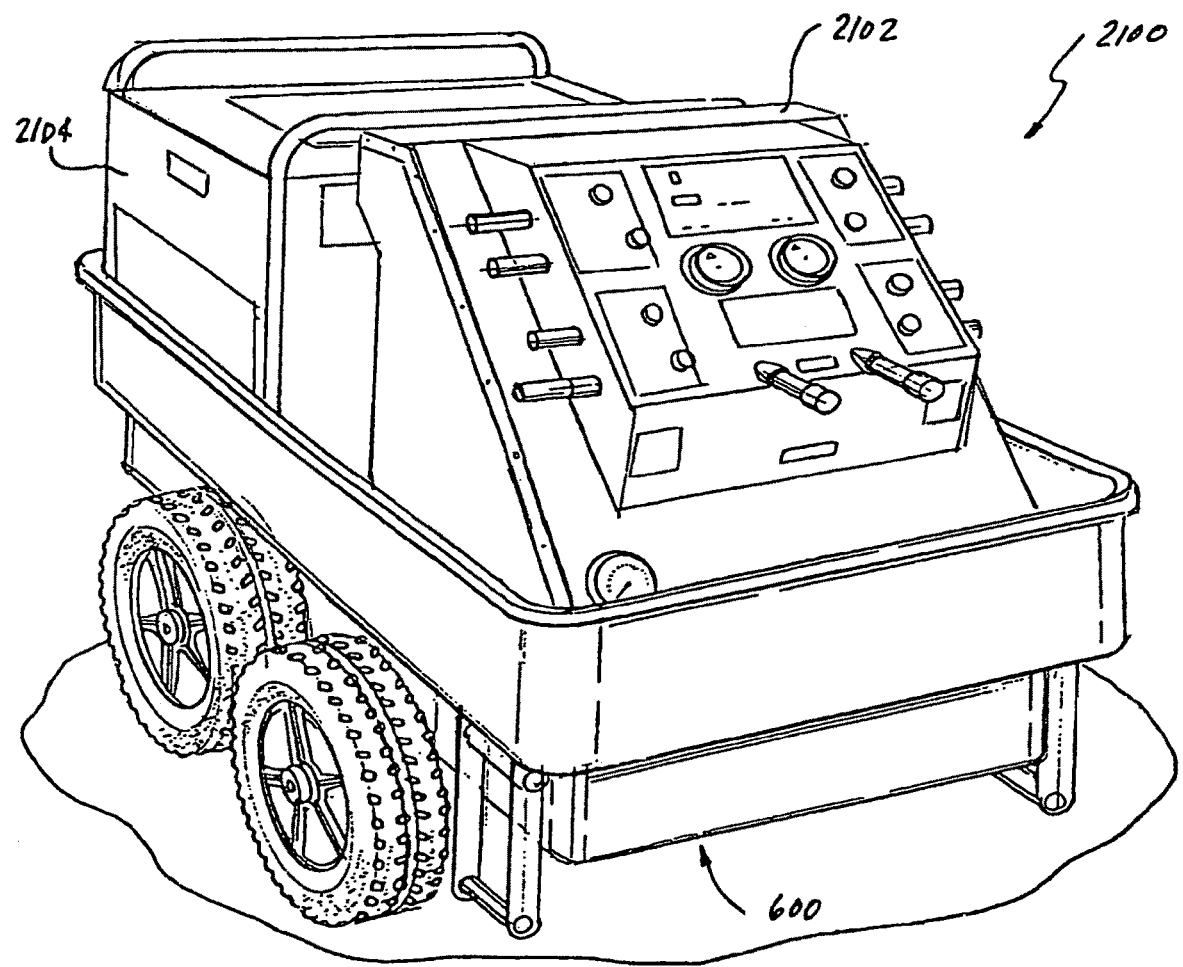
FIG. 32J is a side elevational view of an alternate embodiment of a four-wheel cargo bin hauling cart showing stacked cargo hauling bins held in place in a boss and recess engagement; further showing a kickstand engaged to the handle.
Figure 32J:
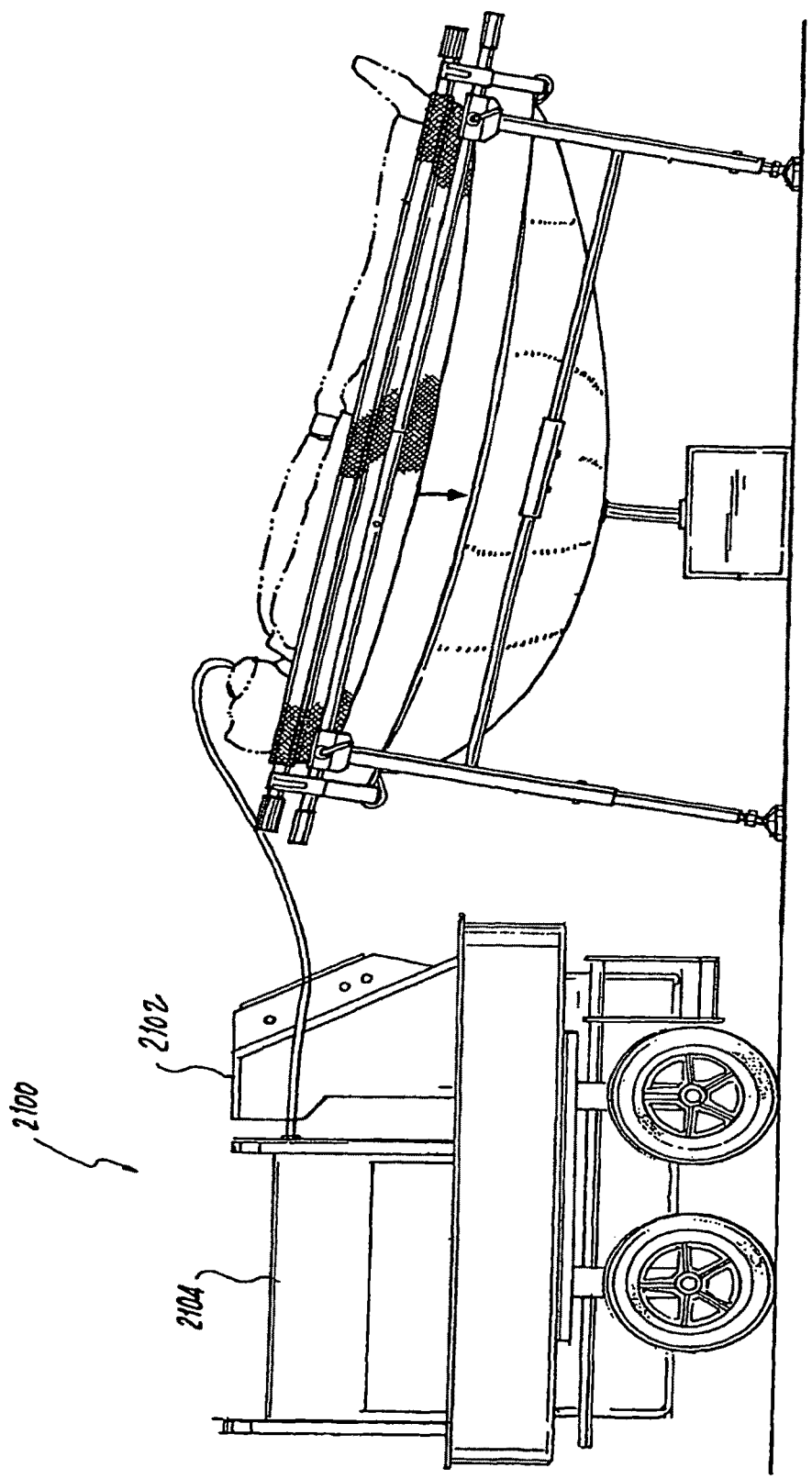
Figure 32J:
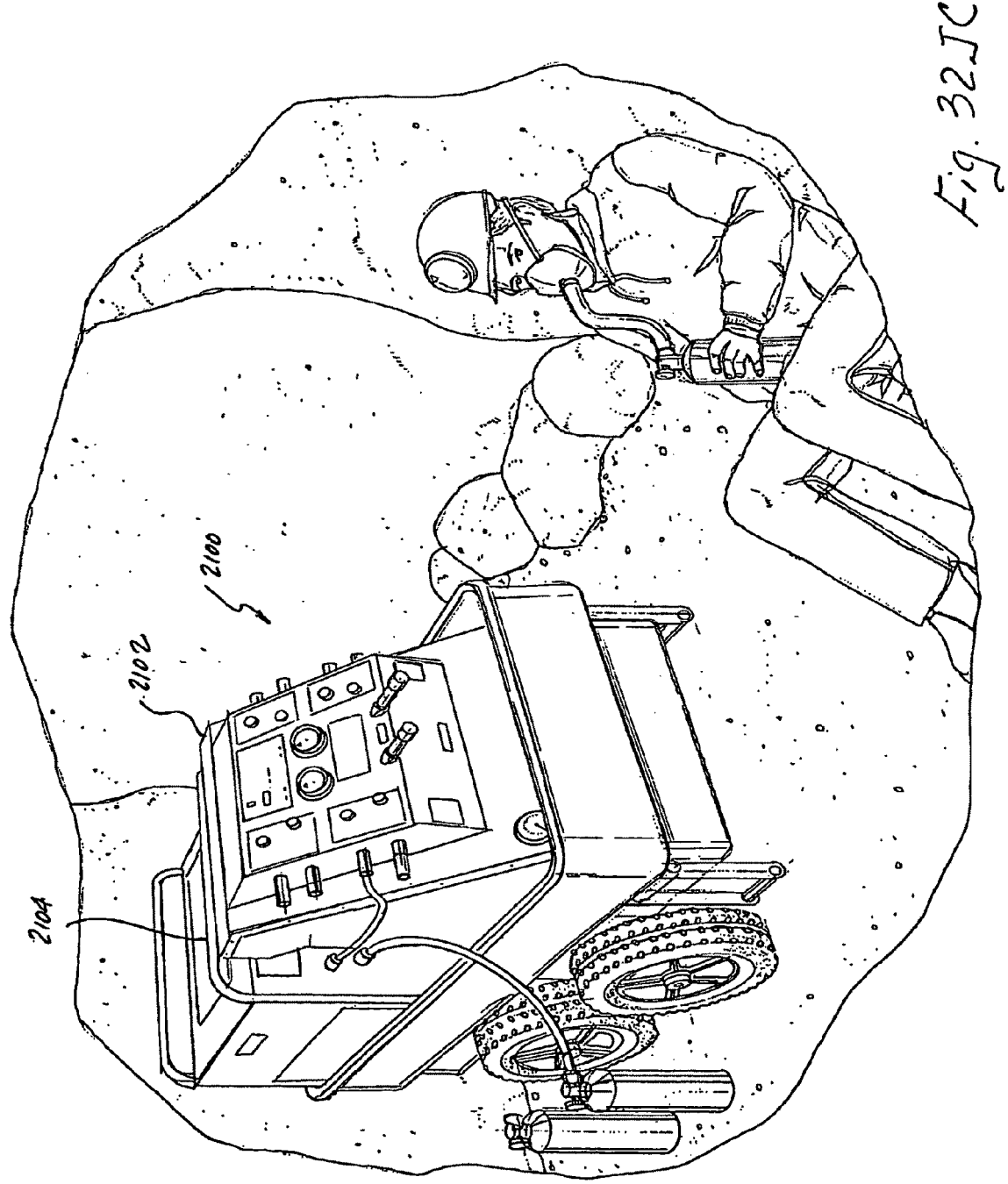
Figure 32J:
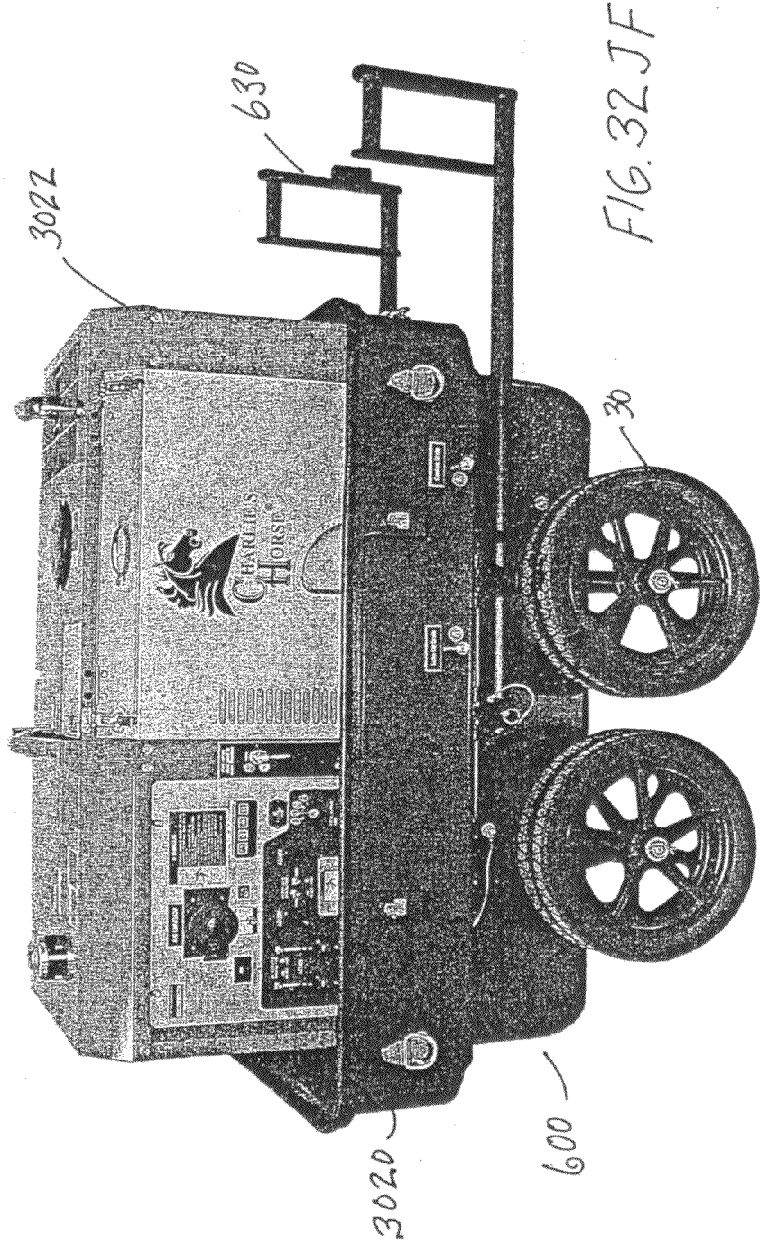

FIG. 32J shows a four wheel cargo hauling cart with kickstand 640 attached to kickstand attachment bracket 638, which is part of handle 630. Also shown are stacked cargo bin shell containers 634 held securely by straps 636.

FIG. 32JA shows bin 600 on a cargo hauling cart used as the basis for oxygen therapy in the field. Oxygen concentrator 2102 can be used directly for patient oxygen supply, or it can feed into compressor 2104 to supply oxygen for filling compressed oxygen tanks for use by other patients in remote venues.

Oxygen therapy cart 2100 is shown in FIG. 32JB supplying oxygen via a face mask to a patient on a mobile stretcher converted to a surgical utility table, directly from a concentrator 2102.

In FIG. 32JC, cart 2100 is used in a mine, supplying oxygen from a tank to a miner. The tank was filled from oxygen supplied by concentrator 2102 and compressed air by compressor 2104.

FIG. 32JD shows cargo hauler 3000 configured as a computerized digital X-ray diagnostic module carrying an X-ray camera 3001, radiograph processing production equipment 3002 and a stand 3003 positioned over a patient support table 2402; a single person can move it short distances for positioning or much longer distances from deployment to final end-use location.

FIG. 32JE shows dental treatment and analysis module 3010 including cart 600, handles 630 and wheels 30, having stored therein instrument support case 3012 for storing and supporting dental instruments 3014, examination light 3016, patient support chair/table 3018 and instrument tray 3019.a While the latter is used for patient care and restoration, it is also instrumental in a massive disaster situation in its forensic role to identify cadavers.

FIG. 32JF shows a power generation module 3022 on a cargo hauler 3020 of cart 600 having wheels 30 and handles 630. Many other such complete systems can be similarly housed on wheeled cargo haulers of carts 600. Of special note are computerized scanning systems, wireless patient monitoring systems, ventilators and aspirators, anesthesia systems, surgical lighting system, oxygen storage modules and a water purification module with a fail-safe ultraviolet disinfection system meeting all applicable international standards. By creating the transport cart modules and partnering with a specified equipment supplier, a state of the art system can be delivered for emergency use. Other deployment examples of these cargo-hauling four wheel carts are illustrated in FIGS. 32Q and 32R. In FIG. 32Q, a cart 600 with cargo bin 602 is shown being unloaded from a military or other emergency response truck, while in FIG. 32R a cart is shown being delivered to an emergency response pick-up site via a hovering helicopter, such as to an flooded community having no road surface access thereto.

As shown in FIG. 32S, in lieu of the truck in FIG. 32Q, the transportation vehicle can be also a forty foot long trailer 660 with storage and exit ramp 661 for carts 600 with cargo bins 602, as well as an optional front area 662 with sleeping accommodations for six persons, including shower and lavatory facilities. Optionally the trailer can have a command center at the front area 662 of the trailer 660. The trailer can also be provided with fifth wheel hitch 663 accommodations. Other specialized areas can include isolation/quarantine areas, refrigeration modules, communications modules and environmental control modules.

Figure 32N:
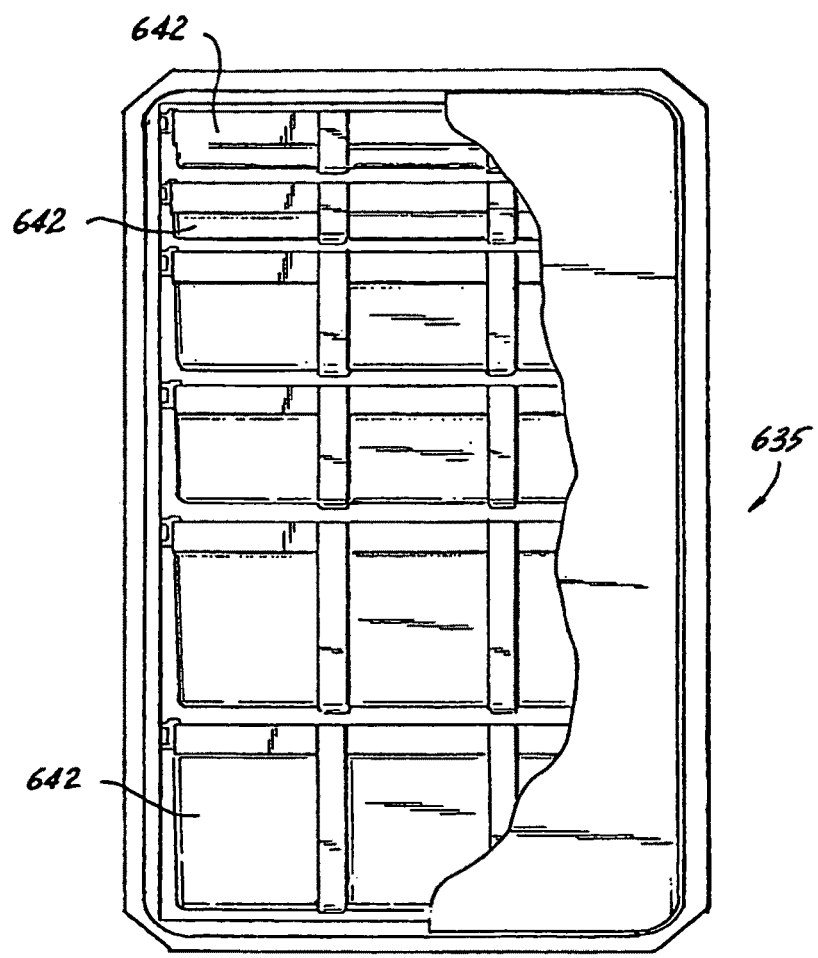
FIG. 32N is a front elevational view of the standing bin as in FIG. 32M.
Figure 32N:
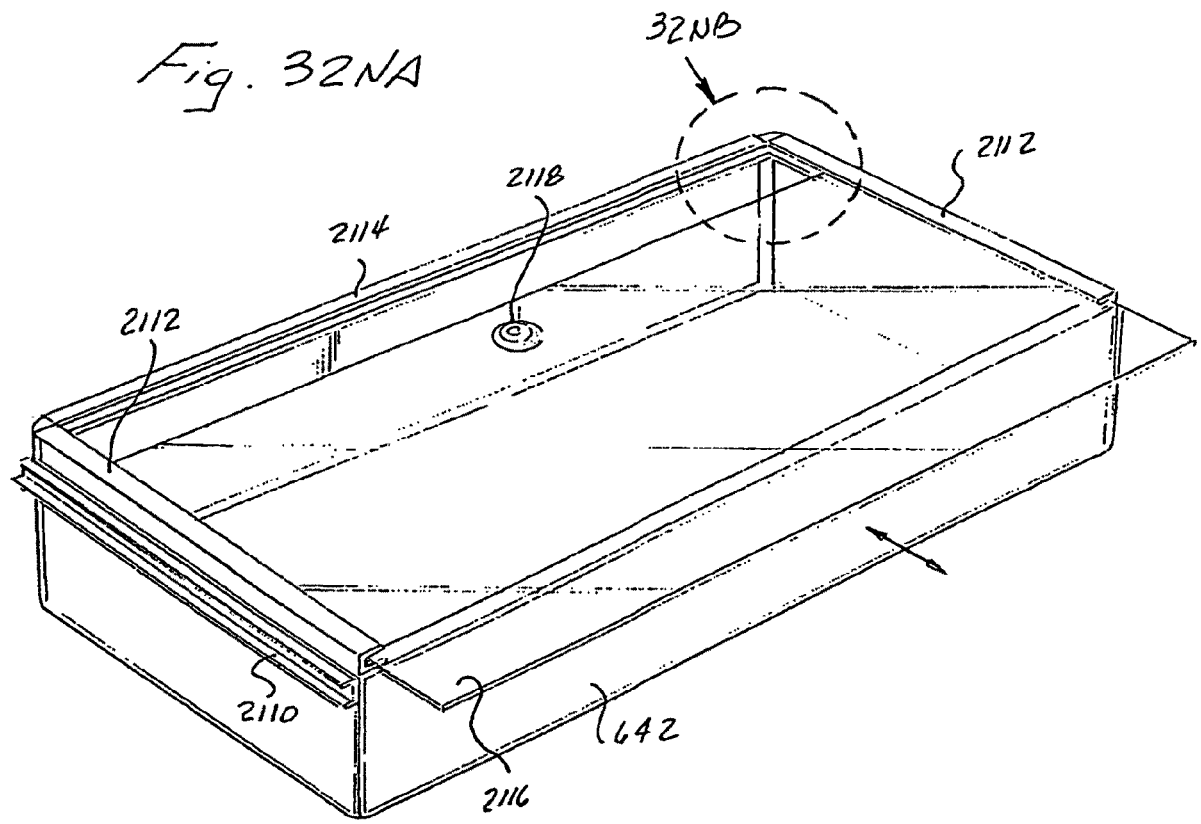
Figure 32N:
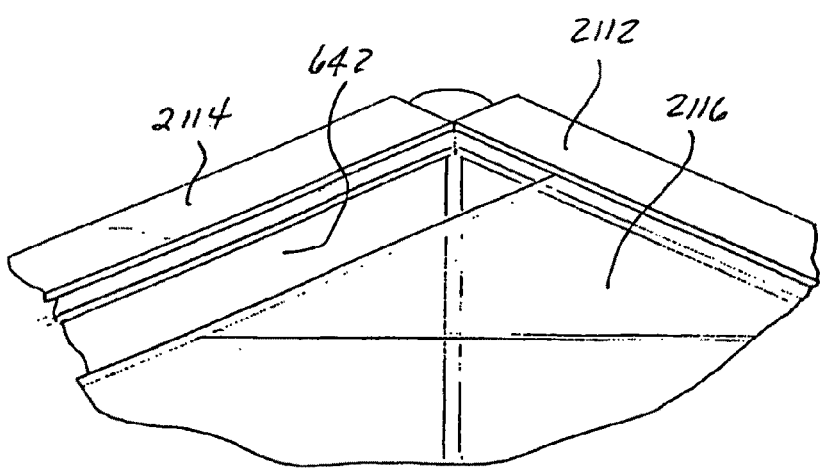
Figure 32R:
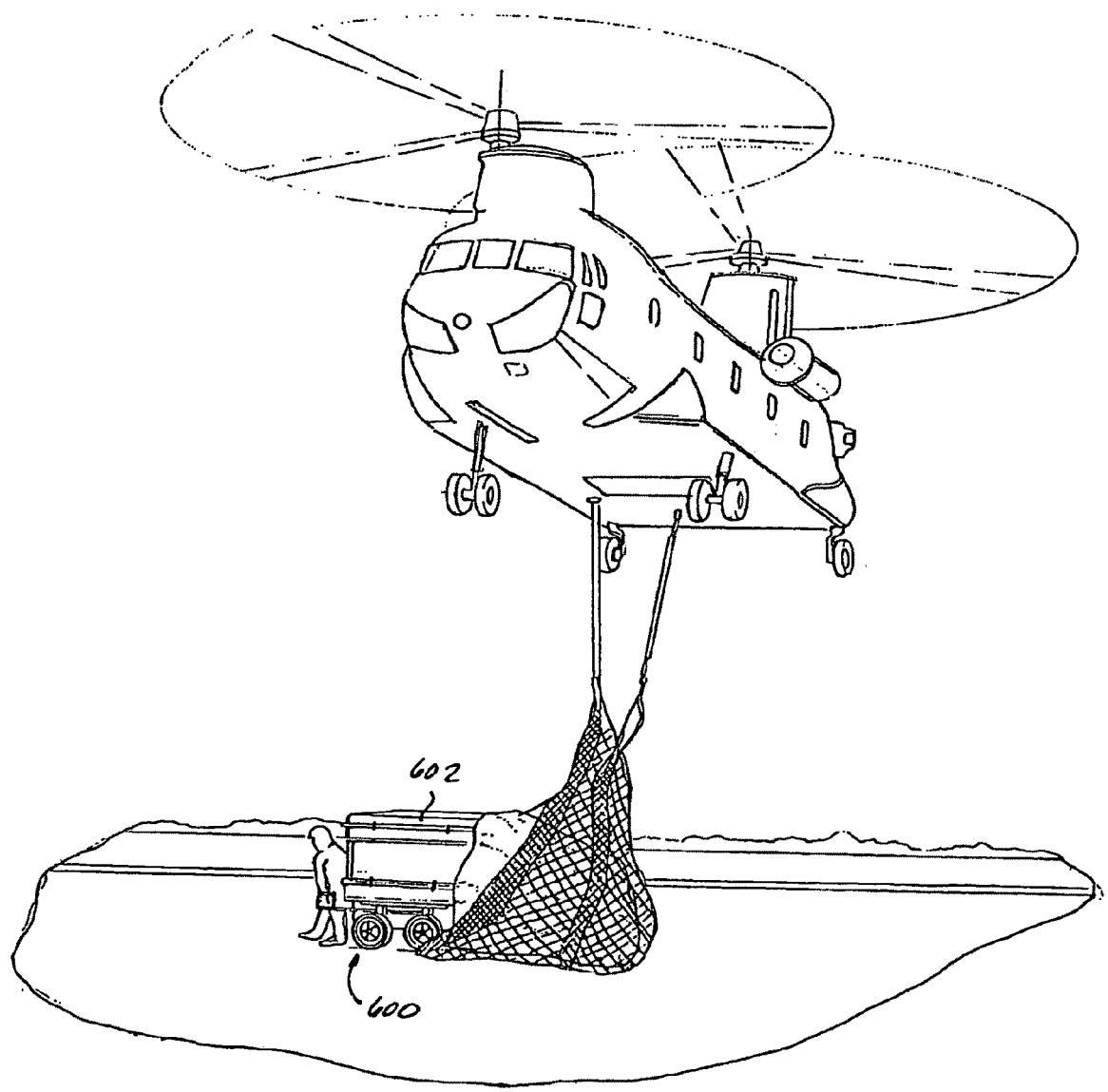
FIG. 32R is a perspective view of the four wheel cargo bin-hauling cart emerging from a cargo net lowered from an aircraft, such as a hovering helicopter.
Figure 32T:
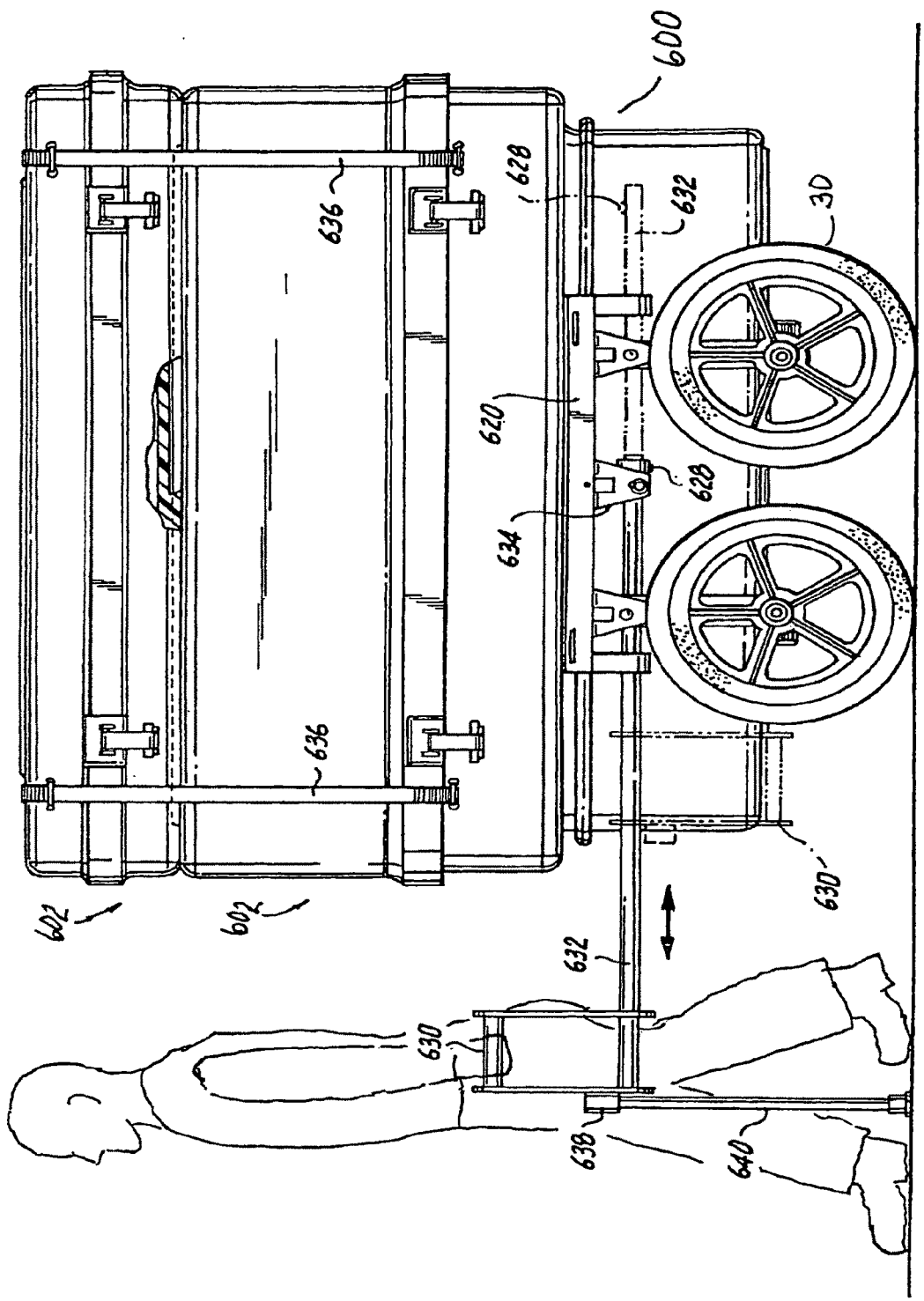
FIG. 32T is a side elevation view of a person hauling cart 600 after being deployed from trailer 660 of FIG. 32S.

FIG. 32T shows cart 600 with equipment bin 602 being carried by a single person, due to its lightweight construction and strong, solid core tires of wheels 30. No forklifts or heavy crane equipment is needed to deploy cart 600 from trailer 660 to its preferred location of deployment at a critical care need site, such as at a disaster area.

In the sequence of FIGS. 32K, 32M, and 32N, straps 636 have been detached from bin shell containers 634, and the sequence of removal of top bin 634 is shown ending with a vertically oriented bin drawer cabinet 635 with a cover panel 639 removed, thereby exposing slidably openable drawers 642 on its front surface. FIG. 32N shows drawers 642 behind drawer retaining panel 639 in a cutaway view.

FIG. 32NA shows a rear view of a drawer 642 with drawer slide 2110 and side drawer cover panel channels 2112. There is also a similar front drawer channel 2114.

In the detail of FIG. 32NB, drawer cover panel 2116, preferably formed of polycarbonate or other suitable strong but slightly flexible flat substrate material, is shown sliding in side channel 2112 as pulled via manually graspable member 2118, such as, for example, elastomer grommeted finger hole 2118. This panel 2116 must seat within the groove of channel 2114 in the secure position before drawer 642 can be closed flush within bin 635, to permit cover panel 639 to properly seat for latching.

Lower bin 634 optionally contains related medical supplies for a field hospital, such as power packs, oxygen tanks, and other necessary medical supplies. The storage bins can also have the table support stanchions applied to the bins to form eating tables when the bin is shallow and has a flat top, such as in bin 635 of FIG. 32M, or can function as bathing tubs when deep and concave, such as in bin.634 of FIG. 32M. To function as a table, the bin 635 can be outfitted with stanchions, such as stanchions 1704 and 1706 of FIG. 73 herein.

FIG. 32O is an optional hitch assembly 644, which replaces the handle assembly. Hitch legs 646 are received into handle 630.

Spring pins 651 also participate in this coupling. Connector 646, with hitch tongue 652, form a structure engageable with receiver clevis 653 attached to all terrain vehicle 656. FIG. 32P shows hitch 644 being used to pull cart 632 by all-terrain vehicle 656.

FIG. 33 shows a perspective view of the frame of cart 600. Long axle 606 attaches front wheels 30 while short axle 605 attaches rear wheels 30 through respective vertical support pairs 20. The use of four wheels doubles the carrying capacity of the cart of this invention while the overlapped positioning of the wheels maintains a short wheelbase for compactness and for maneuverability such as turning with fixed axles and the ability to easily climb ledges. For durability, the rails 604 may be a double pair of parallel rails.

Double axled cart 600 has increased maneuverability, since user pushing upon an optional handle 81 enables user to lift the farther away, distal pair of wheels 30 off the ground, and the user pulling upward of handle 81 raises the nearer proximal wheels 30 off the ground.

FIGS. 34 through 39 are concerned with an alternate embodiment of the horizontal load support member 10. The alternate embodiment 610 has an integral T-slot channel 611 in its top surface to facilitate easy installation and removal of a variety of attachments, such as cushions 615 shown in FIG. 35-36, clamps 620, 630, 640a, shown in FIGS. 37-39, or platform 1450 shown in FIG. 57. Load member 610 can be conveniently extruded of aluminum or magnesium; it can be used either with the two-wheel cart 1 or the four-wheeled embodiment 600.

Figure 35:
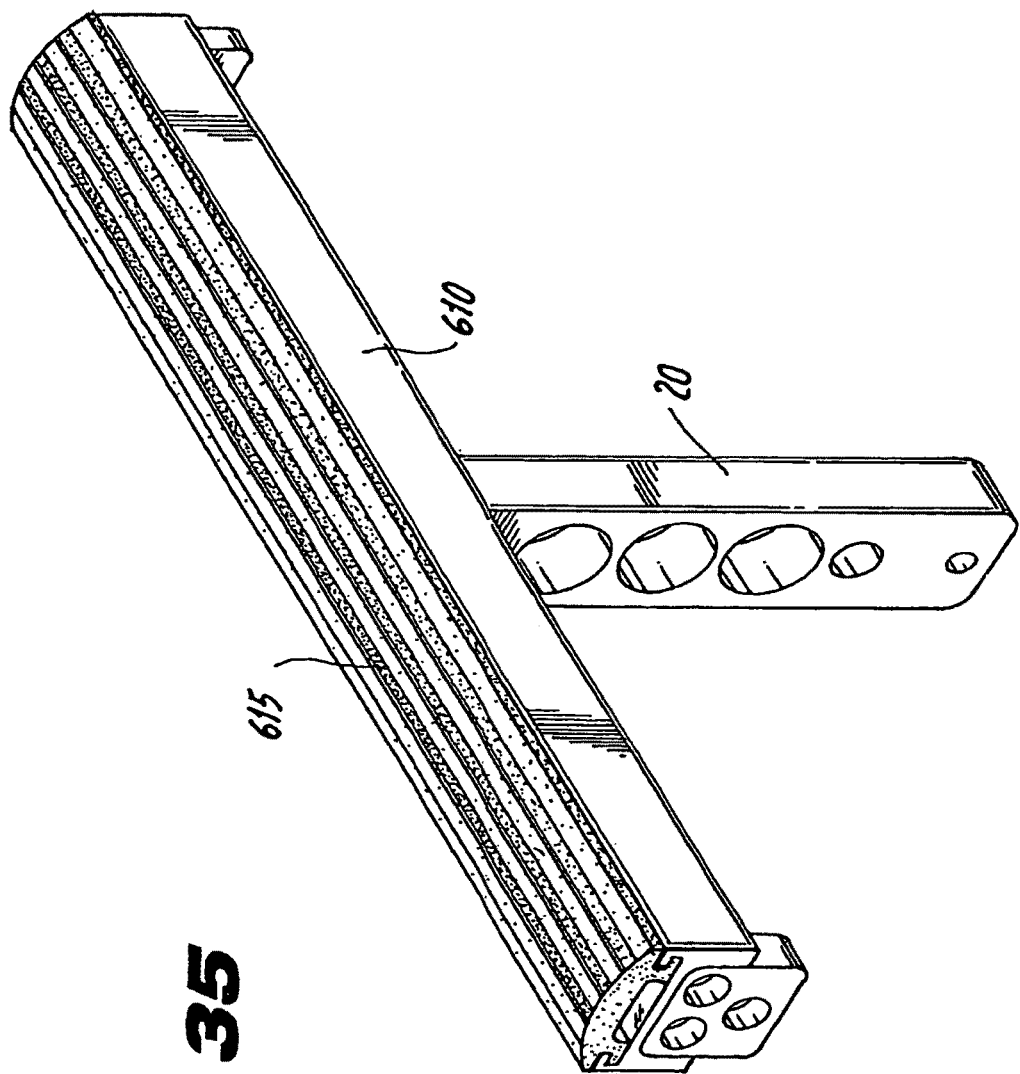
FIG. 35 is a perspective view of the channeled horizontal load support member as in FIG. 34, shown with an extruded support cushion installed in a T-slot.
Figure 36:
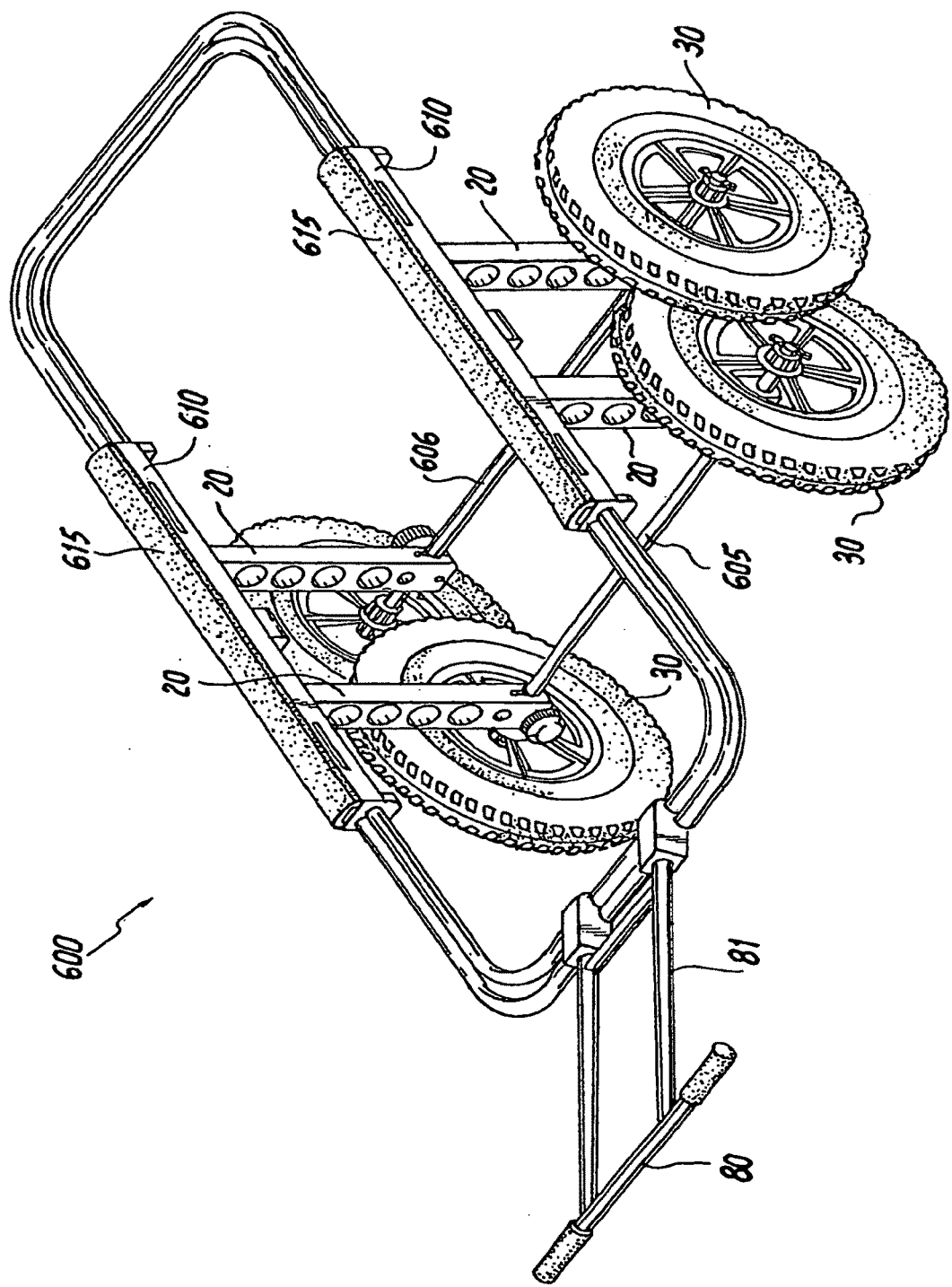
FIG. 36 is a perspective view of the embodiment for an assembled cart with four wheels further incorporating horizontal support members with a T-slot.

FIG. 35 shows a resilient cushion 615 installed in the T-slot 611 of support member 610. This cushion 615 can be extruded of a variety of rubber or thermoplastic elastomers and serves the same purpose as cushion member 13 described above. A perspective view of FIG. 36 shows cushions 615 installed on a four-wheel cart 600.

As described above, clamp assembly 200 is used to convert portable cart 1 to a disabled person-bearing transportable carrier cart. Three separate alternate embodiments of clamp assembly 200 are presented; all are compatible with the use of horizontal support member 610.

Figure 37:
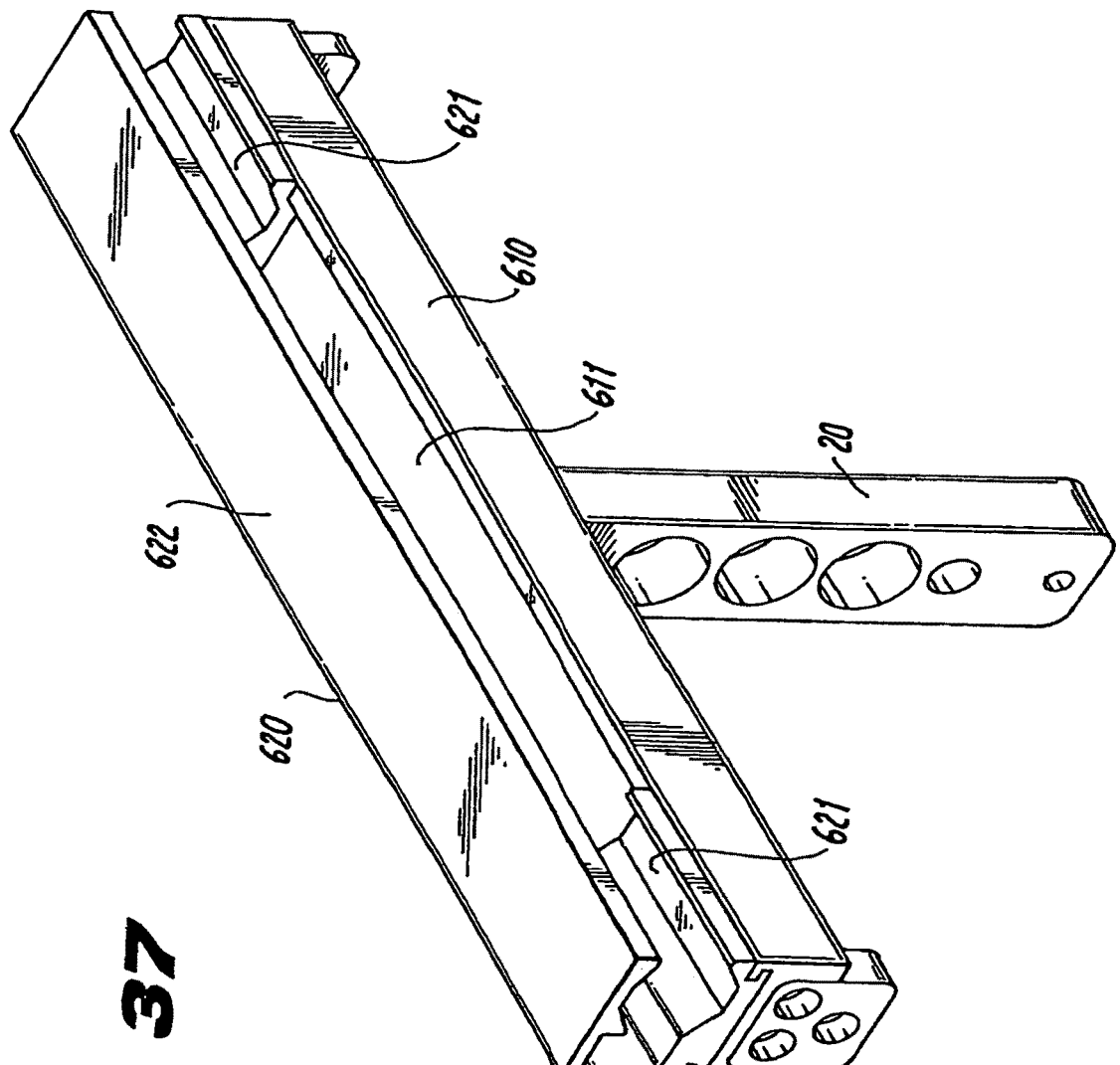
FIG. 37 is a perspective view of a horizontal support member with a clamp member having two short T-slot engaging members and a full-length top section.

FIG. 37 shows a one-piece clamp 620 with full width top section 622 and short end pieces 621, which mate with, and slip into the T-slot 611 of horizontal support member 610.

Figure 38:
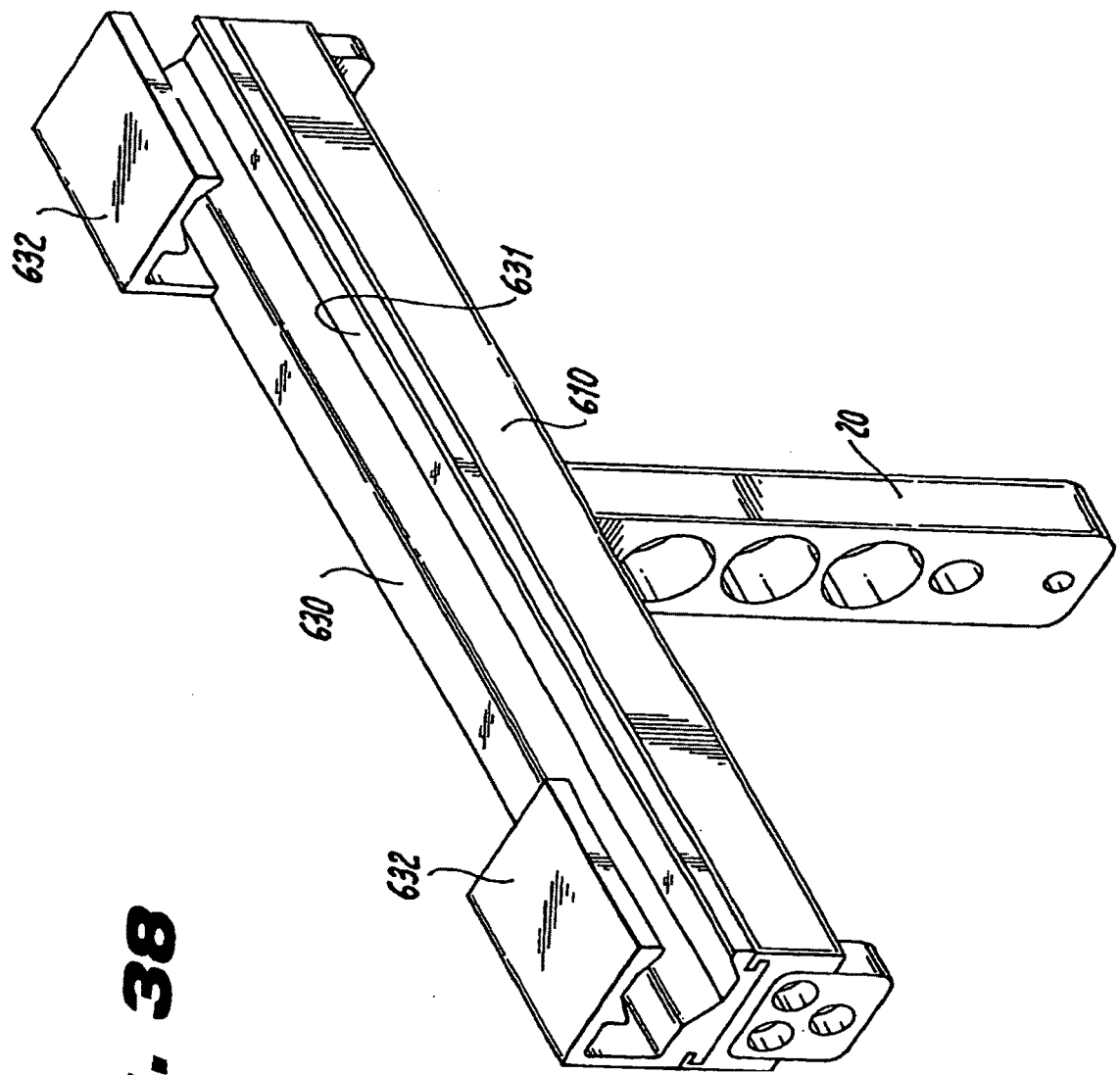
FIG. 38 is a perspective view of a horizontal support member with a clamp member having a full-length T-slot engaging bottom member and two short clamping top members.

FIG. 38 shows clamp 630 with a full width bottom member 631 which mates with and slides into T-slot 611 of horizontal support 610.

Figure 39:
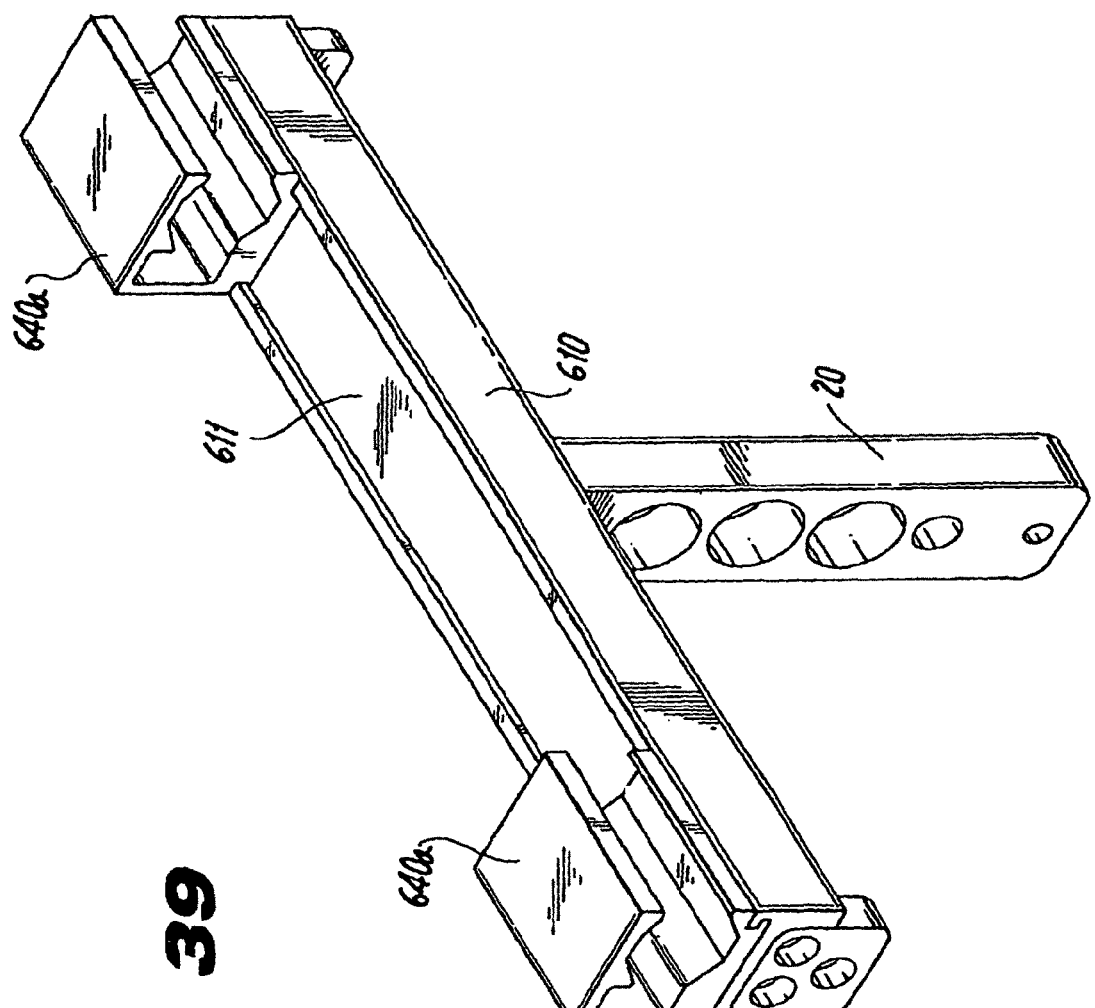
FIG. 39 is a perspective view of a horizontal support member with two short identical clamping members installed in the T-slots at the extreme ends.

FIG. 39 shows another alternate embodiment consisting of two short identical clamp members 640a, which are inserted into the T-slots 611 of member 610 at the two extreme ends.

In all cases, the short clamping sections can be sized to offer spring-like gripping action on the tubular members, or fasteners, such as thumbscrews or ball plungers (not shown) can be used for retention.

Figure 39A:
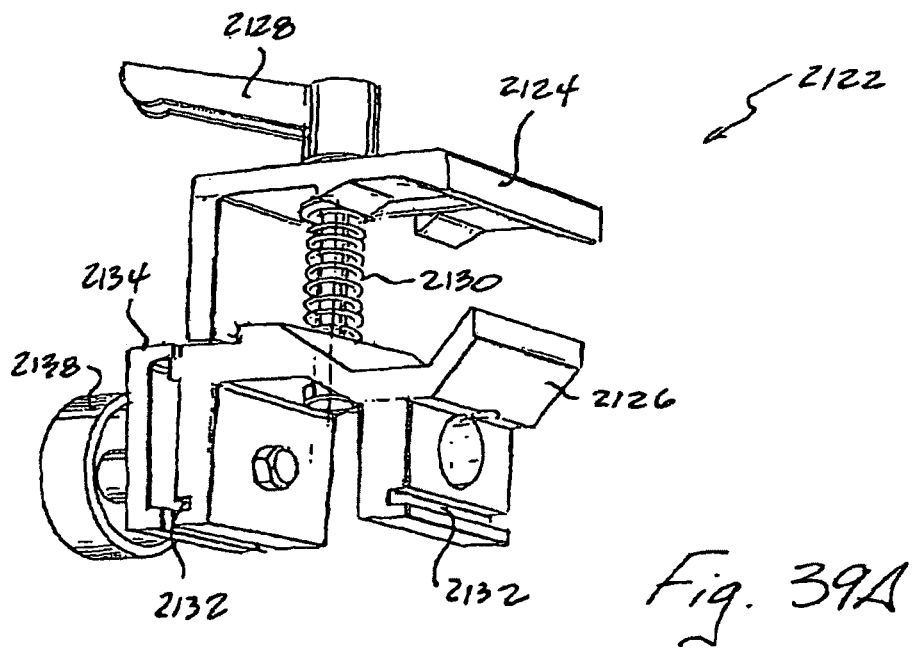
FIG. 39A is a perspective view of the preferred embodiment of a short clamp with a locking feature for positive locking against lateral shifting in the T-slot of the horizontal support member.
Figure 39B:
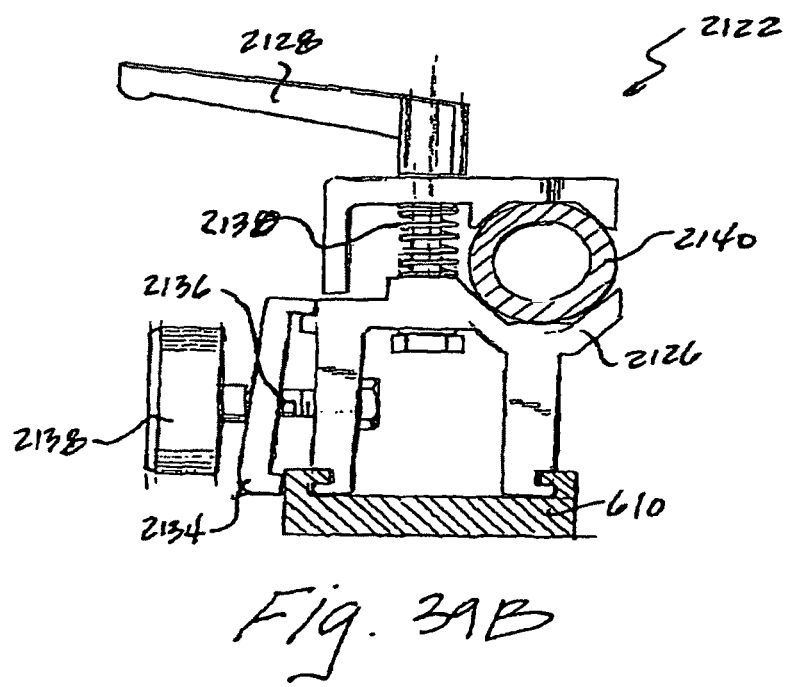
FIG. 39B is an end view of the short clamp of FIG. 39A engaged with tubing member and horizontal support member, both shown in crossection.

A preferred embodiment of short clamp 2122 is shown in FIGS. 39A and 39B. It includes movable jaw 2124 separated from lower jaw 2126 by spring 2130 around a screw, with ratchet handle 2128 used to tighten onto a tubular member such as 2140. A ratchet handle is provided to facilitate tightening in short arc strokes in confined spaces while providing high torque capability; it also provides a means for parking the handle out of the way once tightening is accomplished. Grooves 2132 facilitate sliding into the T-slot of horizontal support member 610. Knob 2138 is used to tighten plate 2134 via screw 2136. Plate 2134 presses against the side of member 610 thereby locking clamp 2122 within the T-slot, and preventing its inadvertent withdrawal.

FIGS. 40-50 show alternate embodiments for converting a conventional hand carried, railed medical rescue stretcher to a lightweight wheeled version.

Figure 41:
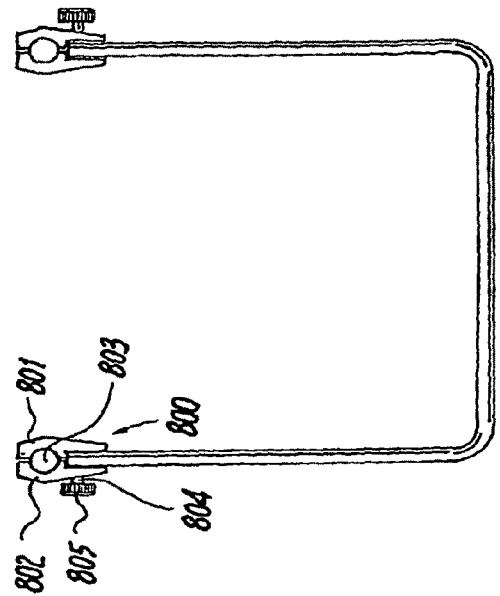
FIG. 41 is a front elevational view of the kickstand portion of the rescue carrier cart as in FIG. 40.
Figure 40:
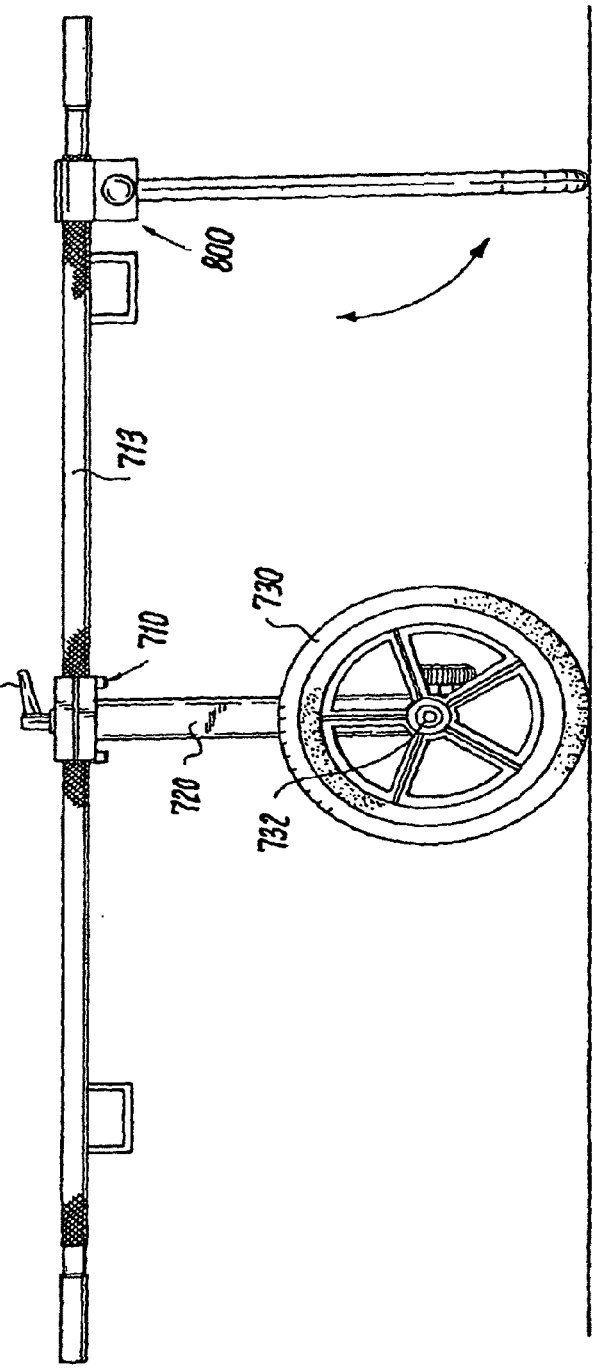
FIG. 40 is a side elevational view of an alternate embodiment for a rescue carrier cart with shortened horizontal supports and with a pivotable kickstand.
Figure 42:
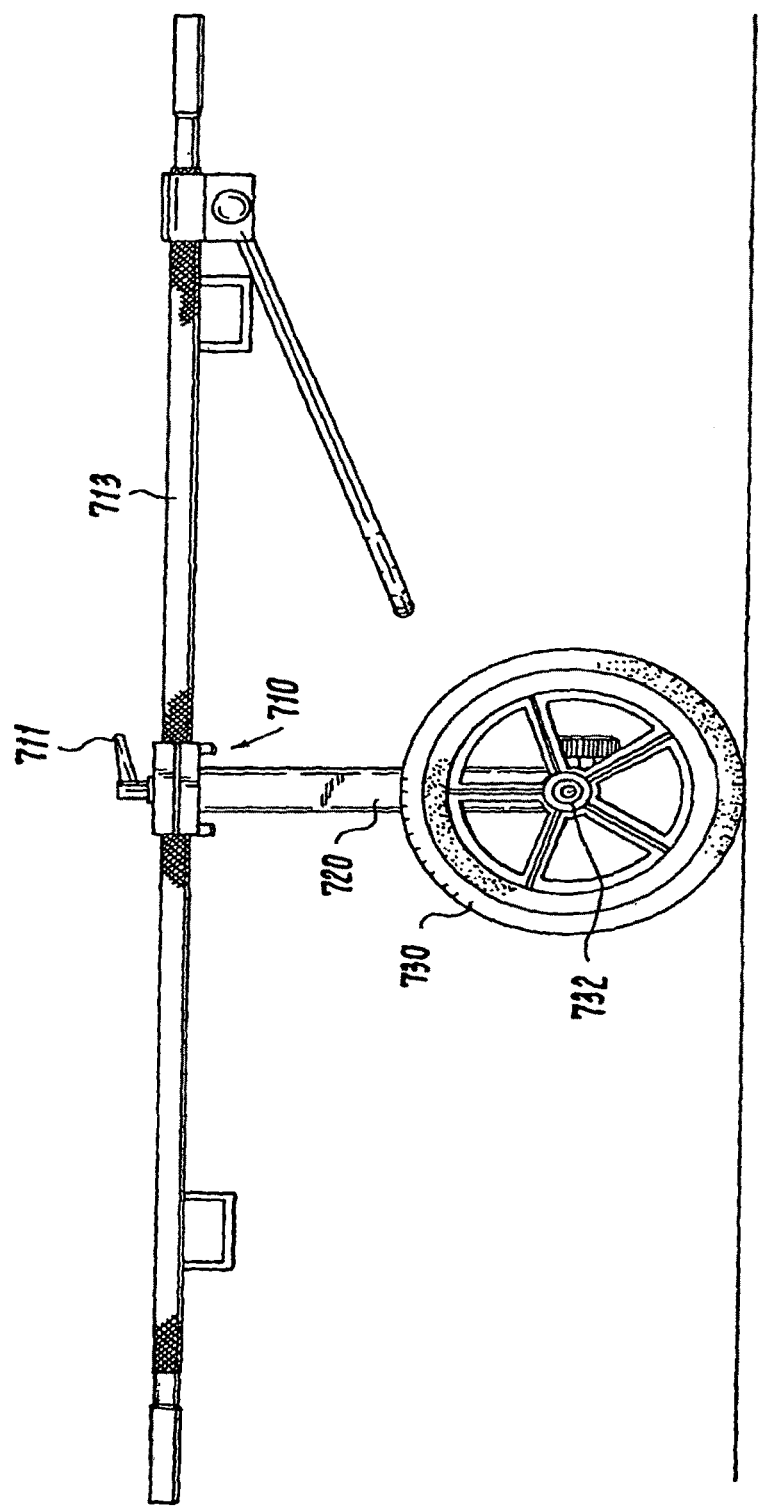
FIG. 42 is a side elevational view of the rescue carrier cart as in FIG. 40, shown with the kickstand pivoted in a transportable position of rest.
Figure 44:
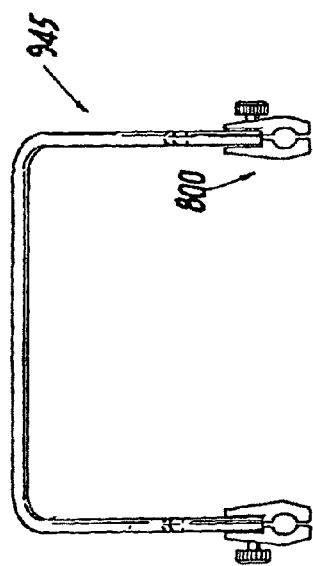
FIG. 44 is a front elevational view of the handle as in FIG. 43.

For example, FIGS. 40-42 show shortened horizontal support members 710 with tightening members 711. Rails 713 are held either by clamps, such as shown in FIGS. 37-39, or alternatively through apertures in horizontal support members 710, as shown in FIG. 14. Horizontal support members 710 are demountably attached to vertical struts 720 having extending therethrough transverse axles 732 supporting wheels 730. Optional pivotable kickstand 740 is attached to rails 713 by clamp 800.

Figure 47:
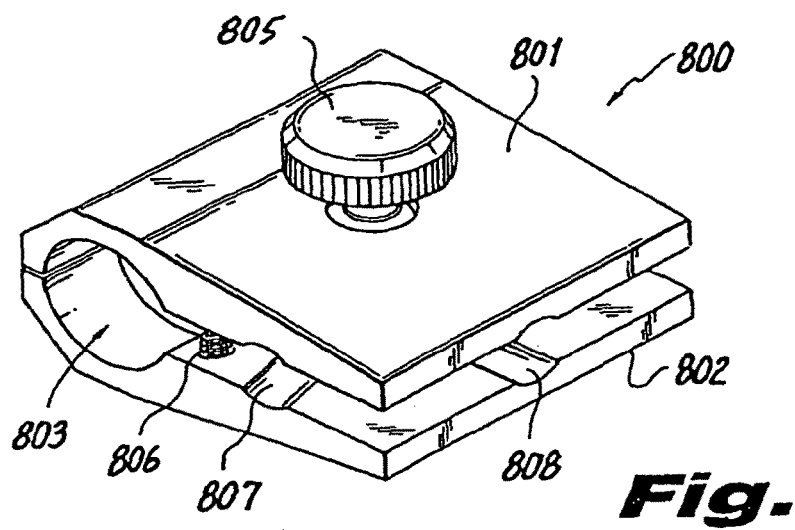
FIGS. 47, 47A, 47B, 48 and 49 show respective isometric, left side, top, front and right side views of the clamp used in the embodiments shown in FIGS. 40-46.
Figure 47A:
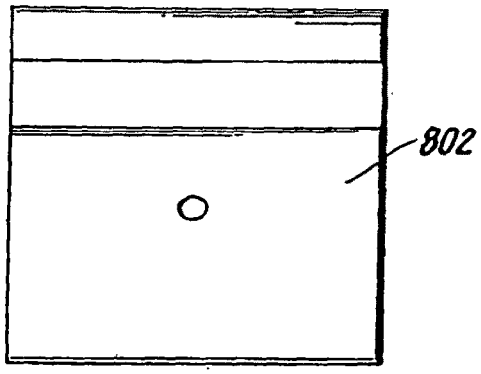
Figure 47B:
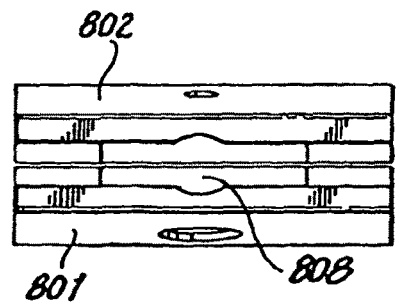
Figure 48:
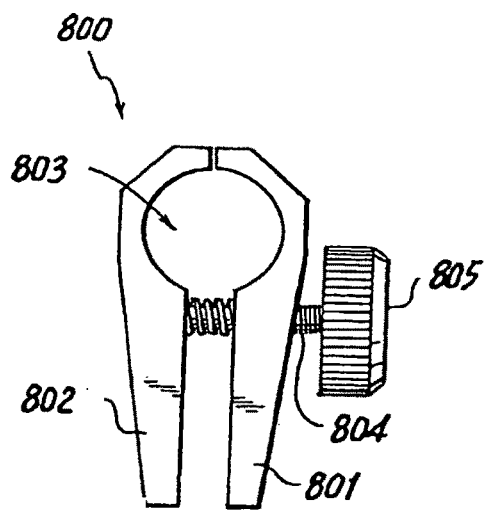
Figure 49:
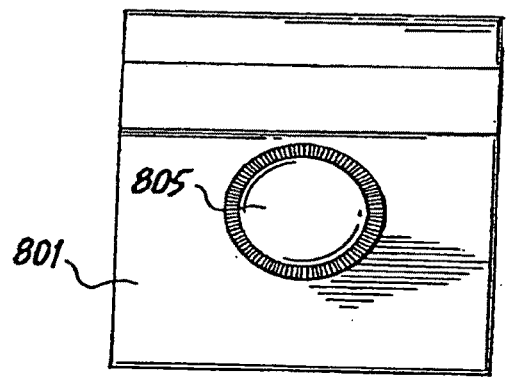
Figure 50:
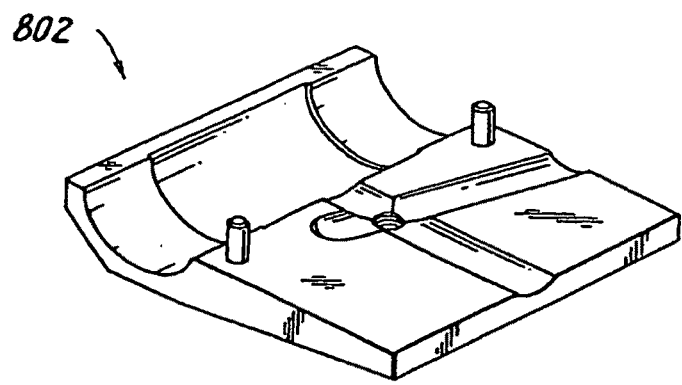
FIG. 50 is an isometric view of a half piece thereof, shown with spring pins.

As also shown in FIGS. 47-50, clamp 800 includes two jaws 801, 802 having aperture recess 803 for insertion of rails 713 therethrough. Clamp 800 is closed and tightened by fastener 804 operated by rotatable knob 805. Internal spring pins 806, as shown in FIG. 47, cooperate with fastener 804 and knob 805 to tighten clamp 800 about rail 713. Internal grooves 807, 808 accommodate kickstand 740 in the respective positions of support and rest, as shown in FIG. 40 and FIG. 42 respectively.

Figure 43:
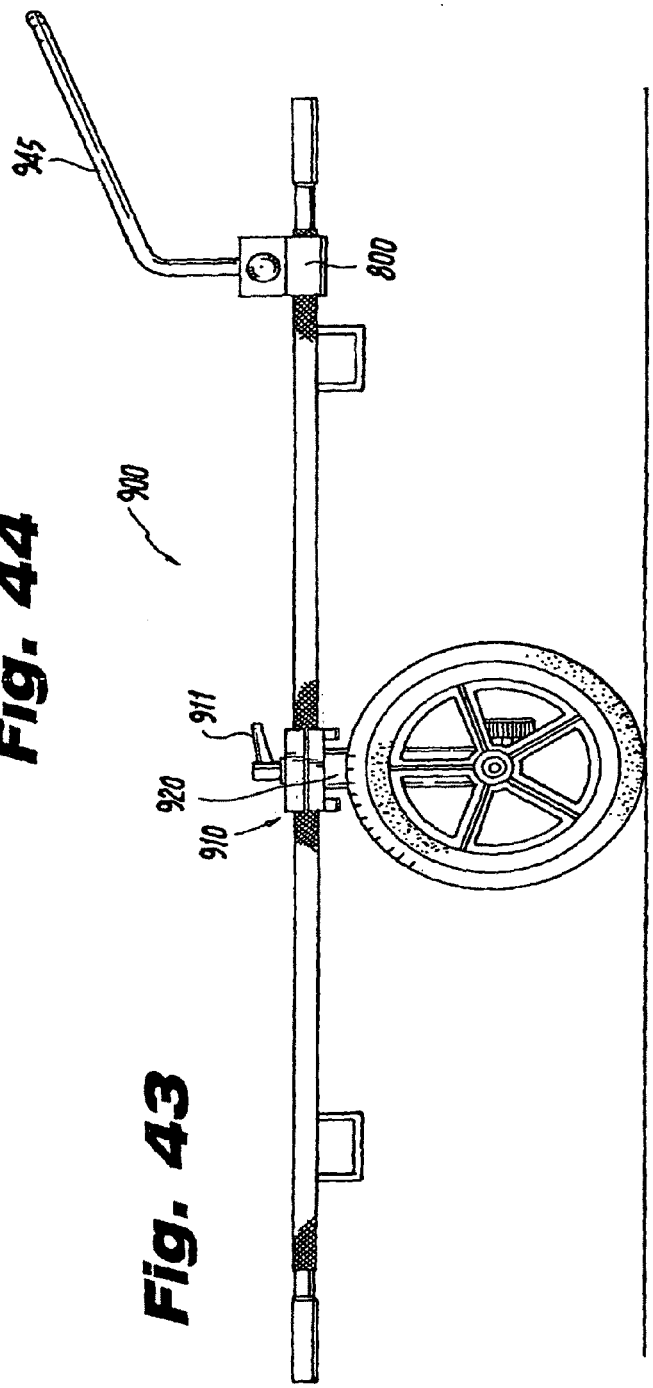
FIG. 43 is a side elevational view of a low profile military rescue carrier cart, shown with a handle.

FIG. 43 shows an alternate embodiment for a military or emergency rescue carrier cart 900 with a profile set low to the ground, including shortened horizontal members 910 with tightening fasteners 911. Rails 913 are also held by clamps as in FIGS. 37-39, or alternately through apertures in horizontal support members 910, as in FIG. 14. Horizontal support members 910 are demountably attached to shortened vertical struts 920 to keep stretcher rails 913 close to the ground. Optional bent handle 945 is connected by clamps 800 disclosed in FIGS. 47-50, as discussed above.

Figure 45:
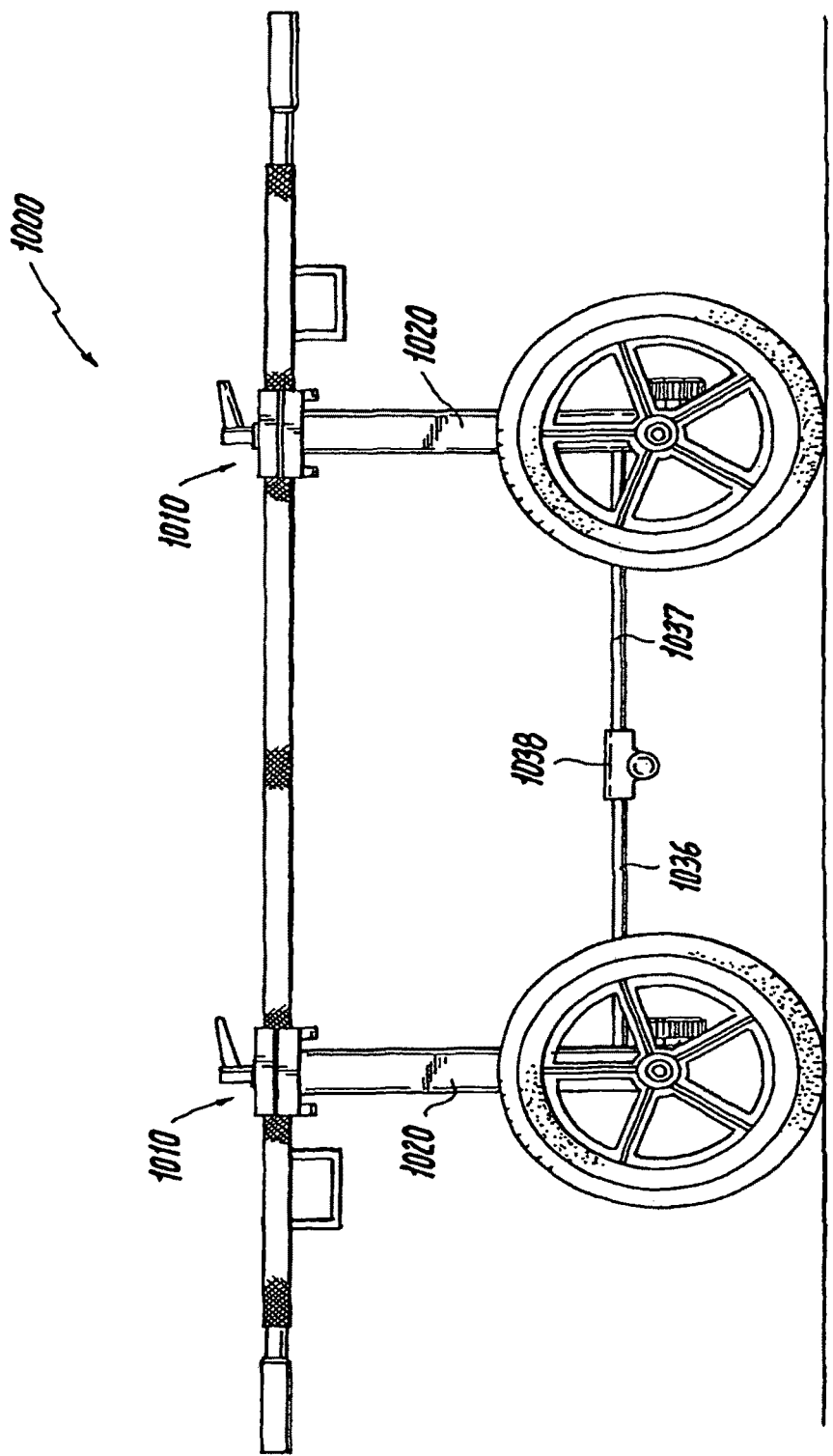
FIG. 45 is a side elevational view of an alternate embodiment for a four wheeled rescue carrier cart, shown with stretcher rails and with stabilizing tie rods, for use as a temporary stationary medical gurney.
Figure 46:
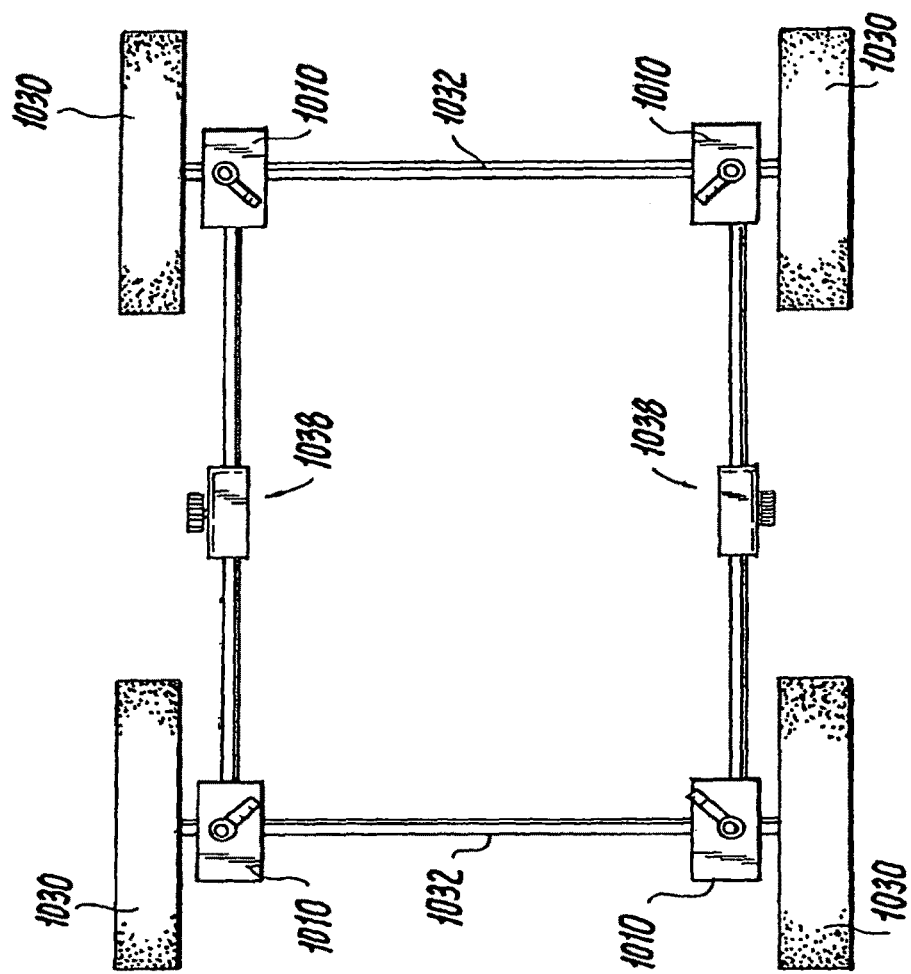
FIG. 46 is a top plan view thereof; shown without the stretcher rails.

FIGS. 45-46 show how the stretcher version shown in FIGS. 40-42 can be converted to a stationary medical gurney 1000. Rails 1013 are supported by horizontal support members 1010, which hare demountably attached to vertical struts 1020, having axles 1032 supporting wheels 1030. To stabilize gurney 1000, horizontally extending tie rods 1036, 1037 are joined by threaded clamp 1038 or other fastening means.

The major structural components of an alternate embodiment low profile rescue carrier are shown in FIG. 43A. Latch clamps 1800 of stretcher bearing tube assemblies 950 support stretcher 1730 and also engage handles 630 at each end. Handles 630 may be rotated into an upward locking position or downward. Tube assemblies 950 include lateral spring pins 962 and upper spring pins 963 for proper placement of wheel assemblies comprising struts 920 having rail bearing clamps 910 operable by latch handles 911.

FIG. 43B shows an exploded view of handles 630 engageable with stretcher bearing tube assemblies 950 of FIG. 43A. Handles 630 are attached to short handle shafts 956 with spring pins 958 (as in detail callout FIG. 43C) within. Similarly, a coupling section detailed in FIG. 43C has spring pins 958 installed as shown. Spring pins 958 include bent leaf spring section 960 which tail end impinges on the inside of tube 956 or tube 952 while the other end is attached to spring pin button 962 which protrudes through a hole in the side of tube 956 or 952. Buttons 962 couple with a tube mid sections 954 via holes near the ends of these tubes. Buttons 963 function as wheel set locators and fit into wheel set clamps for proper fixturing, as shown in FIG. 43A.

Figure 43D:
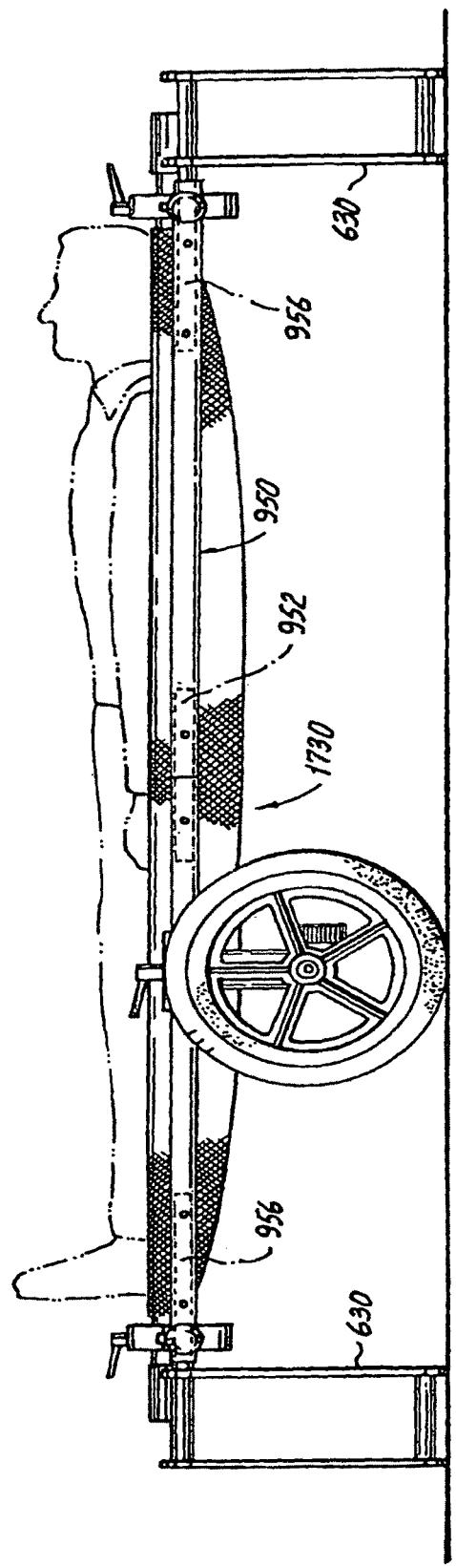
FIG. 43D is a side elevational view of the assembled components of a low profile rescue carrier cart as in FIGS. 43A, 43B and 43C.

The low profile rescue carrier is also shown in the side elevational view of FIG. 43D, which illustrates the feature of the handles 630 rotated to the downward position and functioning as kickstands.

As shown in FIG. 43E, the low profile rescue carrier is easily converted into a low profile transport rotating handles 630 from the kickstand support position to an upright handle position which is easily grasped by medical personnel. Short handle shafts 956 are shown in the optionally extended position in FIG. 43E, to allow for clearance between the medic and the stretcher. The medic may drag the stretcher 1730 upon stretcher bearing assembly 950 as shown, or alternatively, push or pull the stretcher or other carrier bearing assembly 950 forward by reversing his or her orientation.

FIG. 43F shows a reconfigurable, modular rescue carrier 1700 transporting a stretcher 1730 atop an auxiliary fabric carrier 2141 slung underneath.

FIGS. 43G through 43I show the same rescue carrier 1700 as fitted with a multi-purpose waterproof bag 2142 slung under the top frame members. It is attached via flaps at its top edge which are placed over the side rails and then zippered in place.

FIG. 43G shows that bag 2142 does not interfere with the transportation or use of a stretcher 1730 which is placed over, and attached by clamps to horizontal parallel rails, of cart 1700.

FIG. 43H shows bag 2142 used to catch water and effluent from a patient washing operation facilitated by frame members, such as wood slats 2144, on the top surface of carrier 1700 for this purpose.

FIG. 43I shows a patient with hyperthermia upon carrier 1700 being treated in ice cubes 2146 within bag flexible 2142.

Carrier 1700 of FIGS. 43F through 43I is a free standing wheeled stretcher/litter stand which not only provides a platform for patient movement, but when utilized with the cargo carrier bins of FIGS. 32 to 32R, assists in deployment and resupply of a mobile medical field installation system of which it is part. When accessorized, carrier 1700 is a mobile medical field facility in itself. Carrier 1700 can be provided with accessories, such as a second, set of wheels in lieu of a kickstand, a flexible bin stored underneath, a waterproof bath tub bag, fluid capture bags, assorted accessory clamps, medical accessories, portable such as portable X-ray or other medical imaging diagnostic equipment, intravenous fluid dispenser supports, surgical instrument trays, portable lamp assemblies, arm rests, leg stirrup and patient support stretchers with rails clampable to the horizontal support arils of carrier 1700. A typical unit's weight may vary, but is typically from about 57 pounds to about 135 pounds in weight, with a cargo carrying capacity of about 350 pounds to about 500 to 750 pounds, optionally up to 1200 pounds.

Carrier 1700 is unique in its ability to provide a functional surgical operating table which is lightweight and compact for transportation to remote previously inaccessible areas, such as ravines, flooded areas or riverbeds inaccessible to container trailers of Hirayama's mobile hospital. Carrier 1700 allows doctors and nurses to stabilize disaster casualties and to operate when necessary prior to evacuation transportation of a wounded patient. The carrier 1700 enables doctors and nurses to customize the utility table to the medical personnel's specific needs for treatment in seconds.

Figure 51:
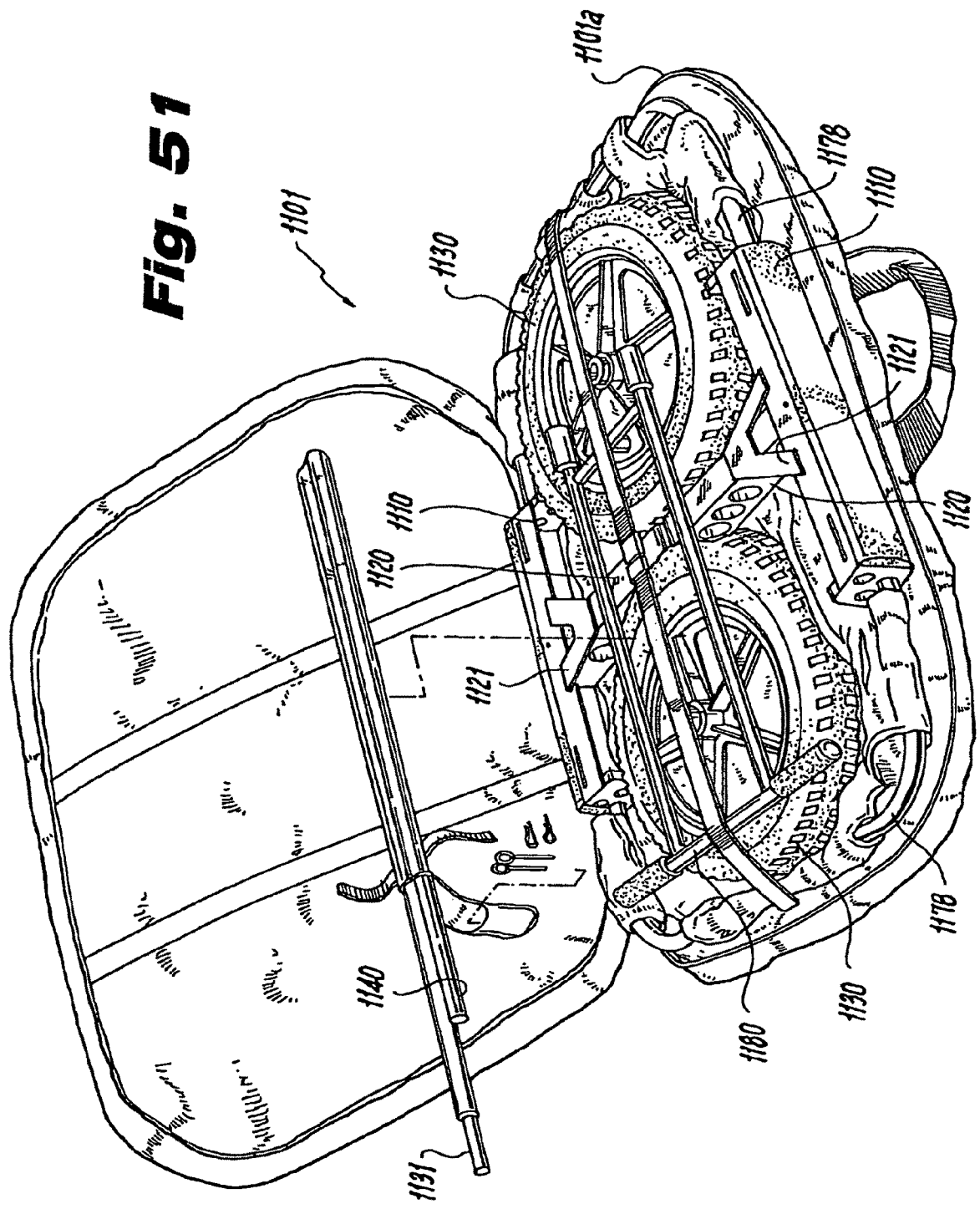
FIG. 51 is an isometric perspective view of a further embodiment for a disassembled, single axle cart, stored in a carry bag.
Figure 51A:
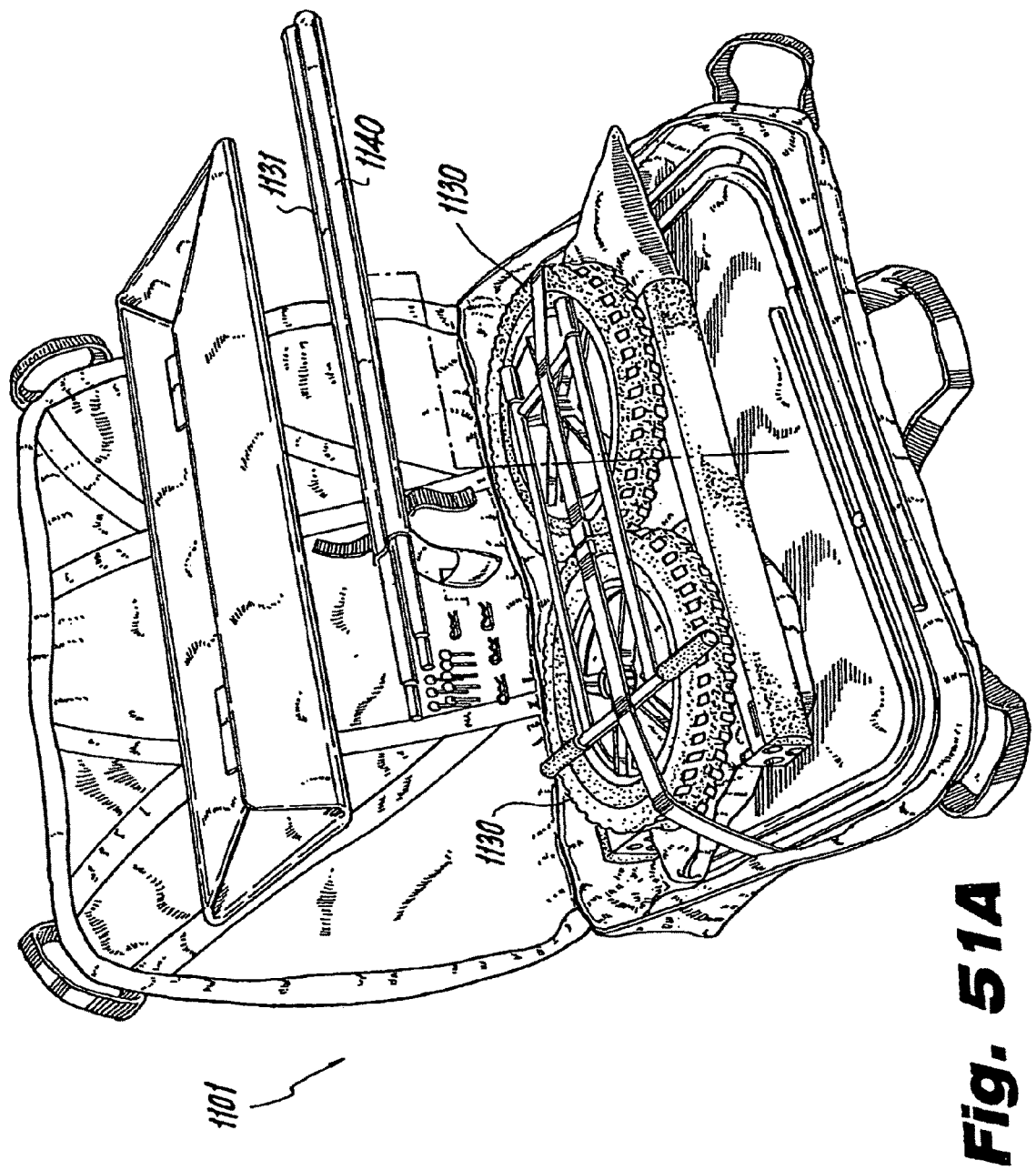
FIG. 51A is a further perspective view thereof.
Figure 52:
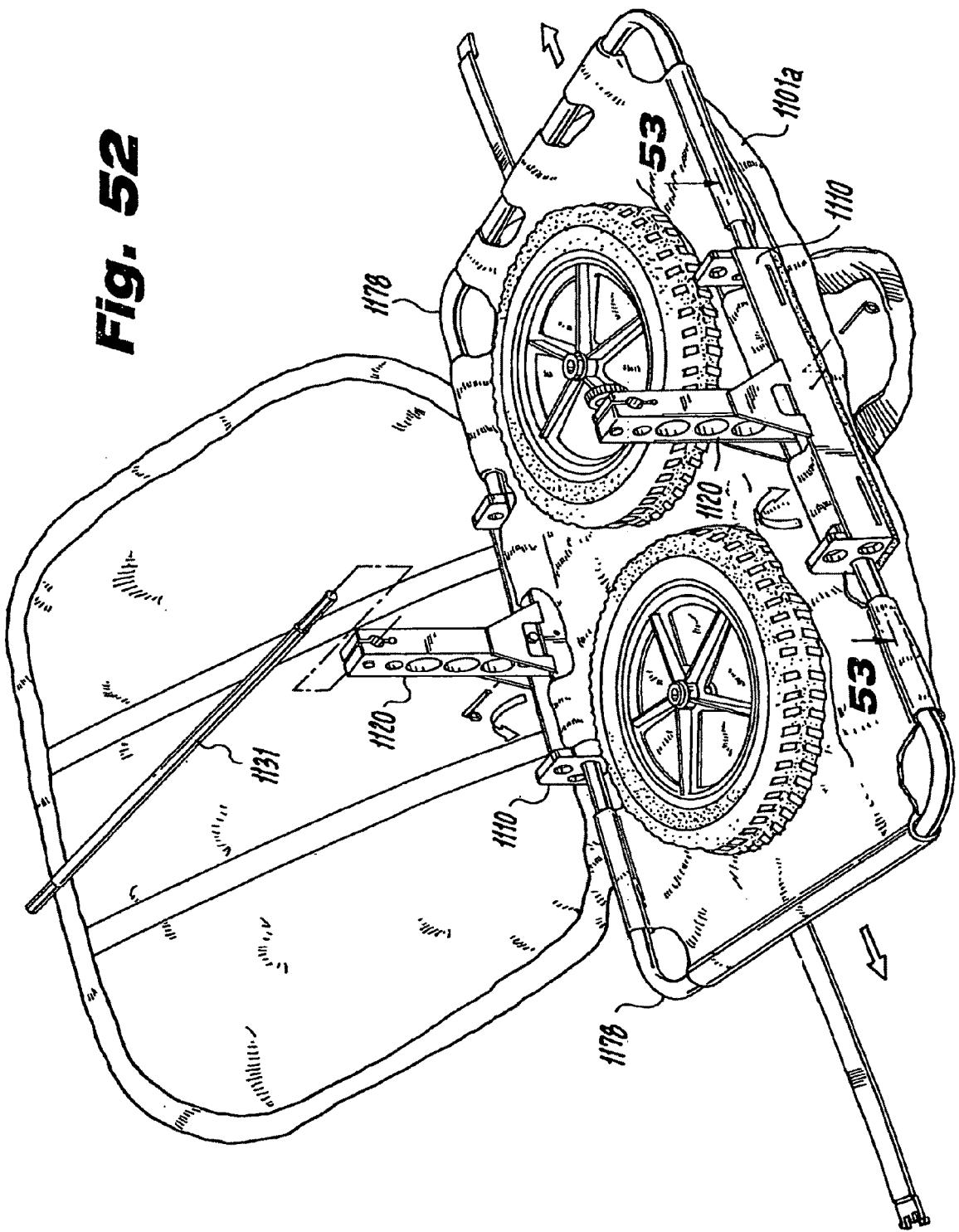
FIG. 52 is an exploded perspective view of the cart as in FIG. 51, shown during assembly, wherein arrows indicate directional movement of rotation about the axis of the rails shown therein.

FIGS. 51-53 show a further embodiment for portable cart 1101 which folds down to a disassembled storage position as in FIG. 51 and which unfolds to an assembled position of use as in FIG. 52. Cart 1101 includes a pair of horizontal load support members 1110 laid parallel to each other, which rotate axially to move perpendicularly extending vertical struts 1120 outward from a position within a storage bag 1101a, where vertical struts 1120 face each other's distal ends, to a position of use 90 degrees perpendicular to the storage position, where vertical struts 1120 extend in the same plane but outward from horizontal load support members 1110.

In this embodiment shown in FIGS. 51-53, the resilient rails 1178 are engaged to horizontal supports 1110 such that when in a position of storage the rails 1178 are biased to return to their normal position of use, when released from the storage position, thus causing vertical struts 1120 attached to horizontal supports 1110 to pivot upward and bow, thus increasing the strength of the cart.

The same is true with other embodiments of the present invention. For example, placing a boat 2 upon cart 1 causes horizontal support members 10 and wheel axles 31 to bow, giving it the strength of an uncollapsible Roman arch. The same is true with respect to stretcher or cargo hauling embodiments shown in FIGS. 12, 17-19, 40-45 and 58-66, for example, wherein putting weight makes the carrier portion taut and bows the frame members into a position of strength. Also the multiple floating overlapping rails as in FIG. 14, for example, bow the rails and strengthen the cart with a load supported thereon.

Moreover, vertical struts 1120 can be further strengthened in place to horizontal supports 1110 by connecting braces, such as V-shaped braces 1121.

Wheels 1130 are held by axle 1131, which in a storage position is placed within the storage bag 1101a. To lengthen cart 1101, rails 1178 move away from each other within holes 1112 within horizontal supports 1110, and are stopped from further movement by spring stop buttons 1171.

Figure 54:
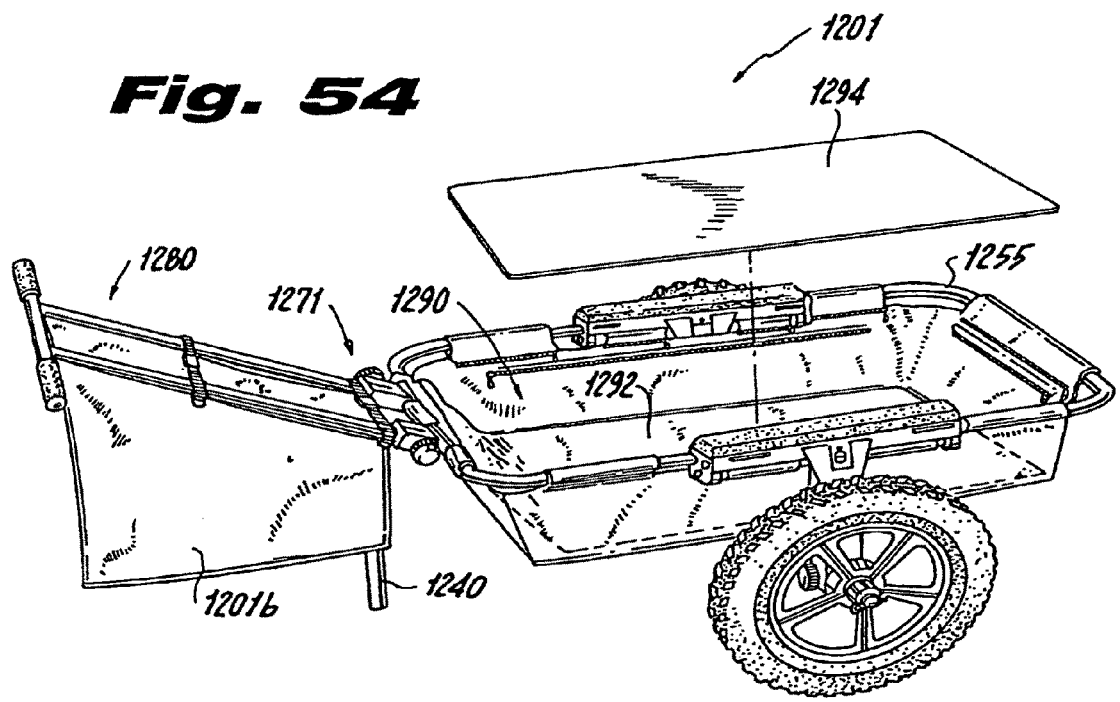
FIG. 54 is an overall perspective view in partial cutaway of the cart showing the wagon portion in its cargo-carrying configuration.
Figure 55:
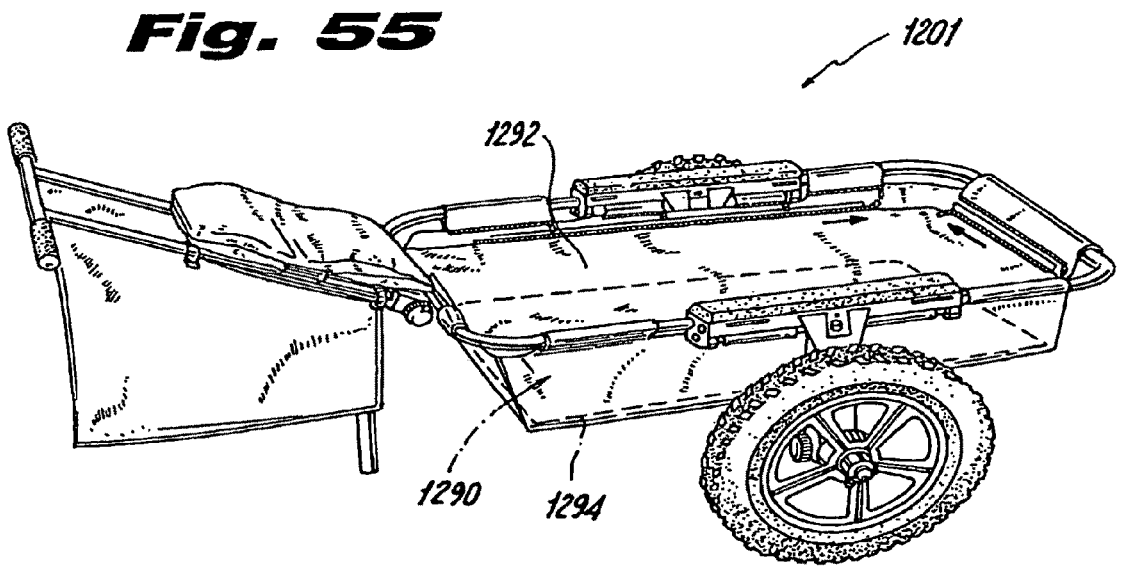
FIG. 55 is an overall perspective view of the cart of FIG. 54, shown in its rescue stretcher configuration.

FIGS. 54-55 show portable cart 1201 which can be converted from a cargo hauling wagon configuration with cargo well 1290 attached to frame 1255, to a rescue stretcher with taut rescue canvas or other stretcher 1292 when stretcher 1292, which sits loosely above hollow well 1290 during the cargo hauling configuration, but which becomes taut when peripheral fasteners, such as zippers 1296, snaps or the like tighten stretcher 1292 in place about frame 1255.

Optional kickstand 1240 or handle 1280 may be attached to cart 1201 by joints 1271. A further accessory arm bag 1201b may be draped down from handle 1280 for further storage. An optional hard floor member 1294 may be provided below stretcher layer 1292 within cargo well 1290 for cargo hauling strength.

FIG. 56 shows optional ski attachments 1330 for cart 1301, wherein ski portions 1331 are attached by braces 1332 to vertical struts 1320. The length of braces 1332 is equal to the radius of wheels 30 in previous embodiments.

FIG. 57 shows optional platform base 1450 for supporting object such as camera tripods, cooking devices, ordnance, etc. upon cart 1401. Platform base 1450 slides within channels 1411 and is secured in place by fasteners such as recessed hex nuts.

Figure 58:
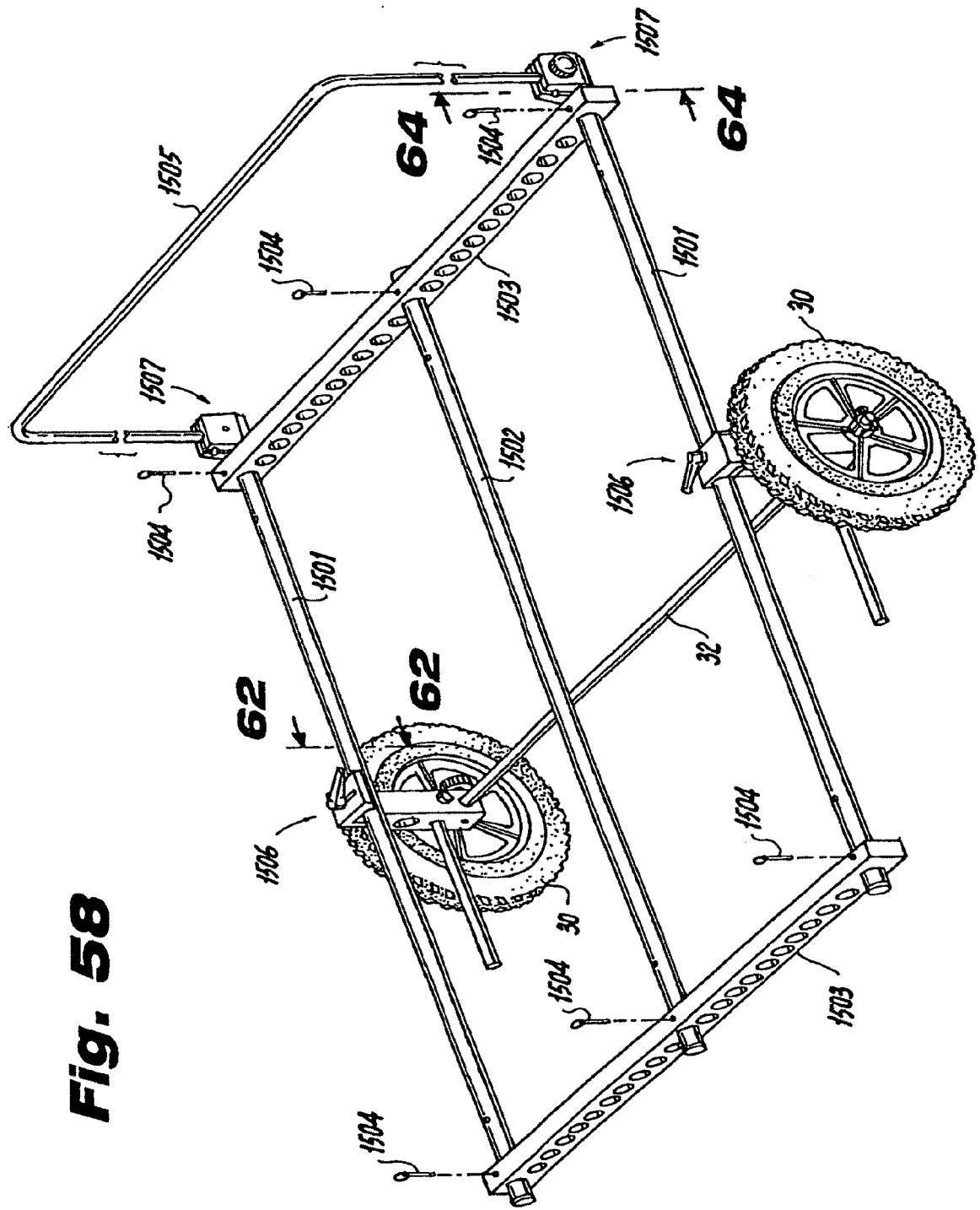
FIG. 58 is a perspective view of portable cart frame configured as a multi-victim stretcher.

FIG. 58 shows a portable cart frame of this invention configured as a cargo hauler or as a multi-victim stretcher. The cart includes two outer longitudinal horizontal parallel rigid load support frame members 1501, which are preferably tubular. The cart also may include an optional center frame member 1502, also preferably tubular, as well as optional transverse frame members 1503, overhead tube frame 1505, two vehicle actuators, such as wheels 30 and axle 32. It is contemplated that in snow conditions the vehicle actuators can alternatively be skis, such as shown in FIG. 56 herein. Also as shown in FIG. 58, fasteners, such as cotter pins 1504 are used to attach horizontal support members 1501 and 1502 within holes, such as circular holes for tubular shaped horizontal support members in transverse members 1503. Also as in FIG. 58, vertical struts having the wheel subassembly with wheel 30 are attached to outer horizontal support members 1501, such as tubes, with mechanisms 1506 which permit quick attachment and detachment. Attachment clamps 1507 secure overhead handle 1505 to outer ends of horizontal support members 1501.

Figure 70:
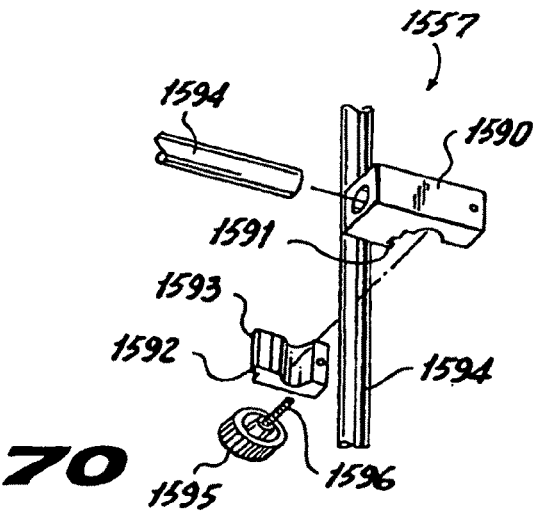
FIG. 70 is a perspective view of adjustable clamp assembly.

Although not shown in the drawings, any of the embodiments herein shown in all the drawing FIGS. 1-70 may have vertical length adjustment means (not shown), such as a sleeve containing a telescoping shaft, the sleeve having a spring means for urging the shaft in a selectably extendable manner out of the sleeve and a lock for locking the telescoping shaft into a selected extended position.

Figure 59:
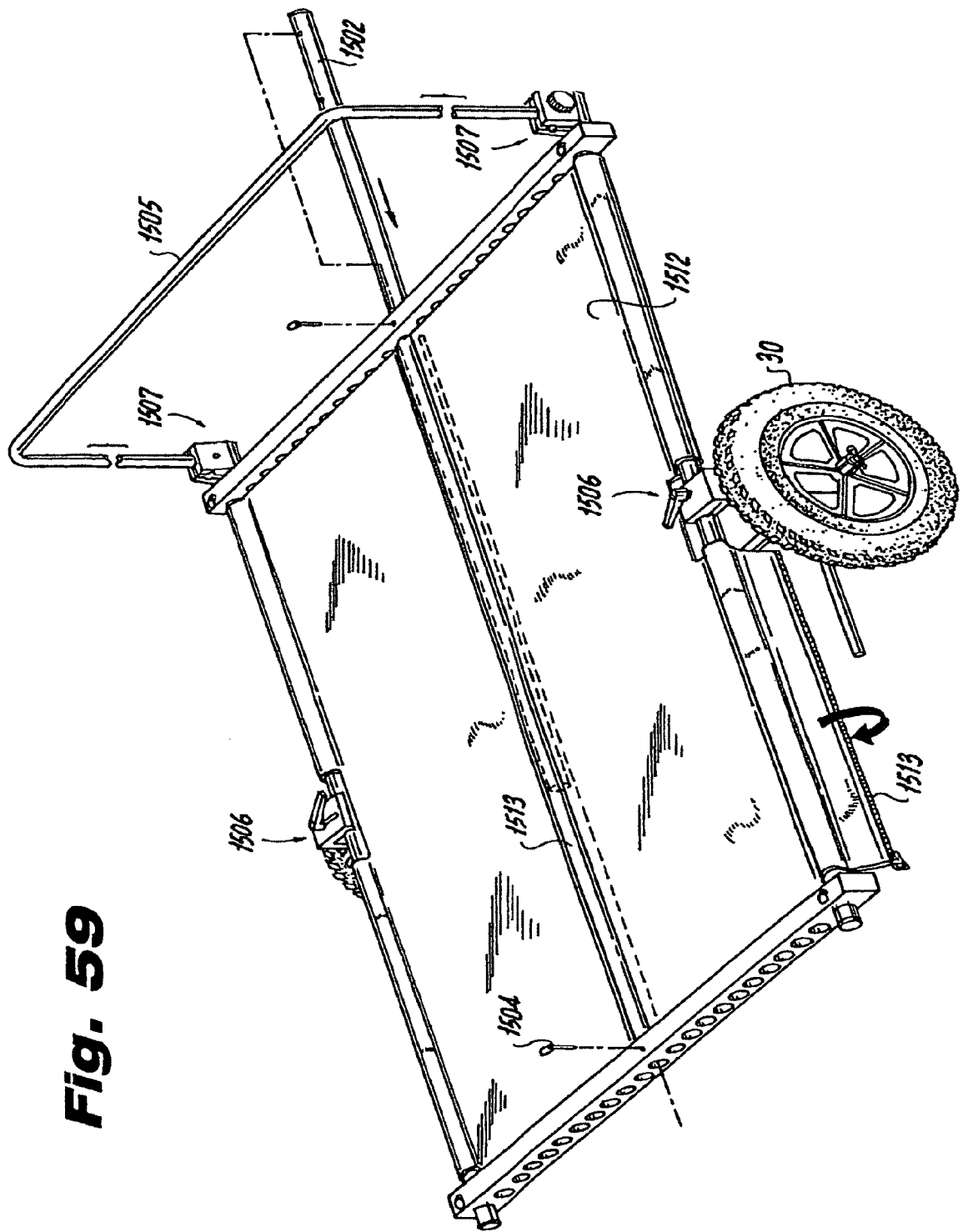
FIG. 59 is a perspective view of multi-victim stretcher using single fabric top surface cover.

FIG. 59 shows a single cargo or person hauling fabric top surface sheet 1512, which can be made of canvas or similar material. Sheet 1512 preferably has sewn longitudinal pockets at the outer edges to accept horizontal support members 1501 and a central pocket 1513 to accommodate optional central frame member 1502 when inserted in direction 1514 as shown. Optional apron sections 1513 can be flipped over the side edges.

Figure 60:
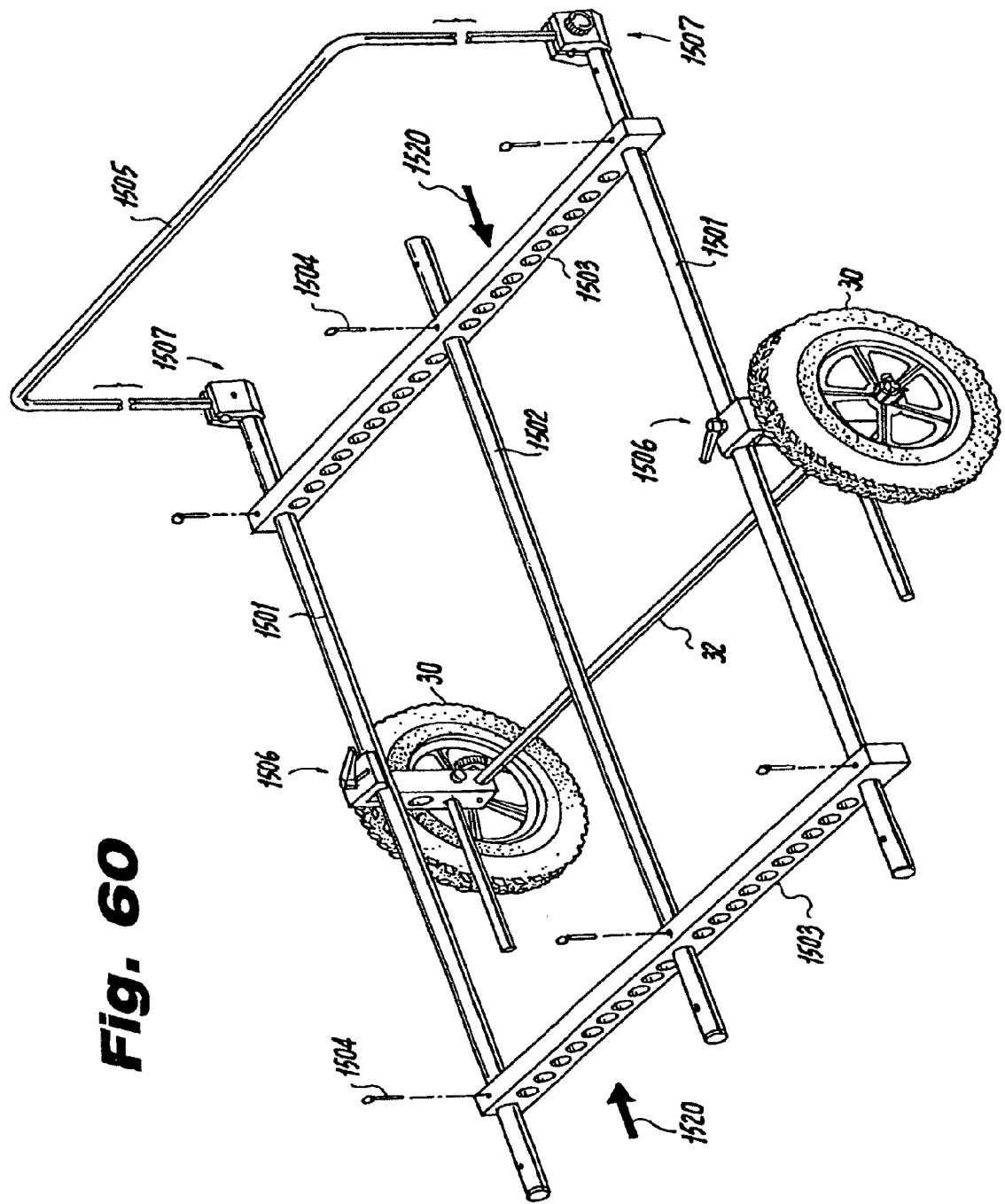
FIG. 60 is a perspective view of multi-victim cart frame reconfigured to accept separate stretchers.

FIG. 60 shows the frame of this cargo hauling or multi-victim cart readjusted to foreshorten the distance between transverse members 1503 by securing cotter pins 1504 in holes in horizontal support members 1501 and 1502 which are located farther in from the ends.

Figure 61:
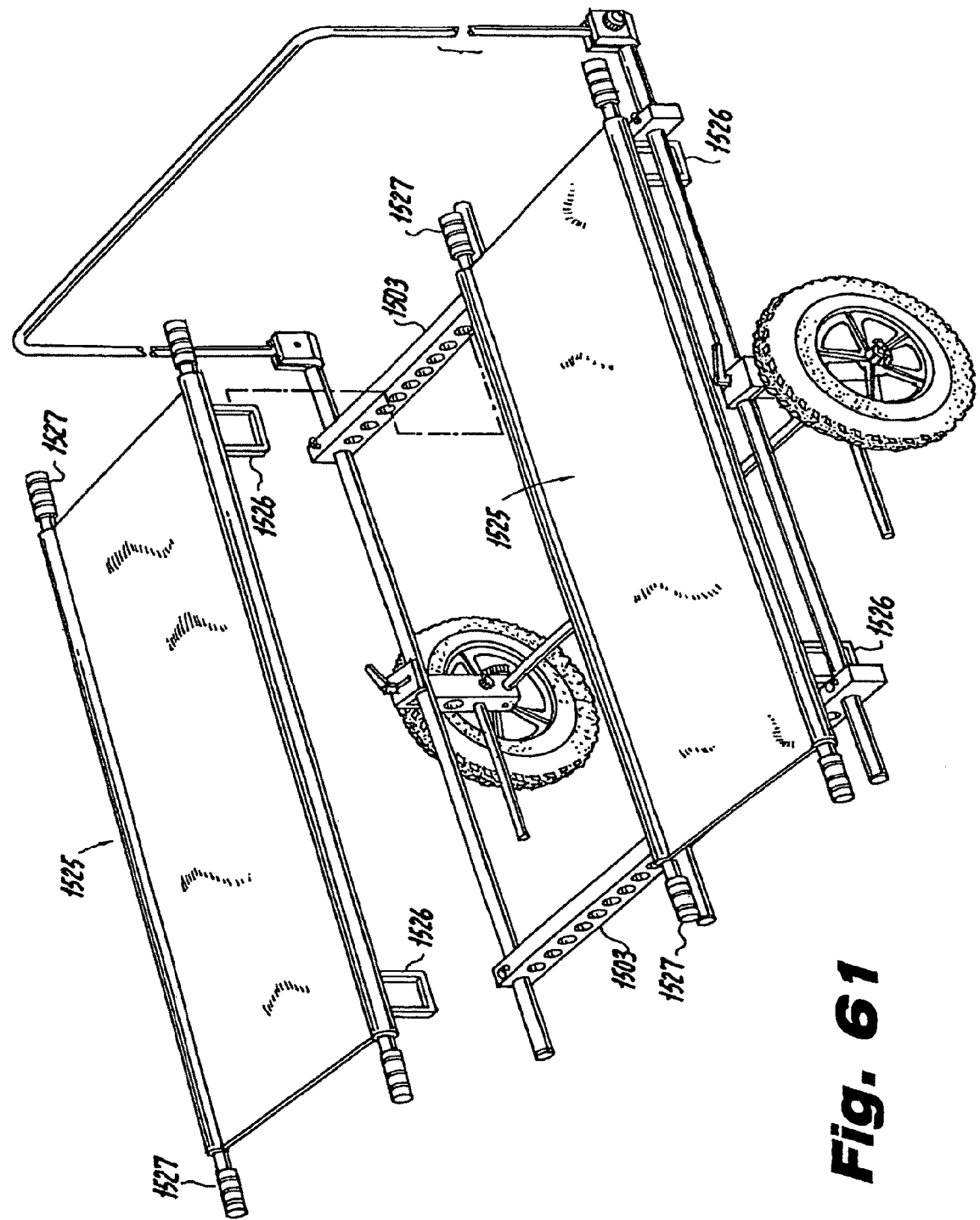
FIG. 61 is a perspective view of multi-victim stretcher using separate stretchers.

As shown in FIG. 61, this adjustment can be used to accommodate separate stretchers 1525 with locating extensions 1526 and handles 1527.

FIGS. 62 and 63 show end views of the quick disconnect/connect mechanisms 1506 (in viewing direction "62-62" in FIG. 58) with horizontal support member 1501 shown optional as tubular in cross section. Top clamping member 1532 has slot 1531 which permits it to slide from the locking position shown in FIG. 62 to the unlocked position of FIG. 63 thereby releasing side horizontal support member 1501 from the wheel 32 subassembly which continues below lower clamp jaw 1533.

In FIG. 62, spring 1534 is compressed since the locking shaft concentric with it has been threaded downward by turning handle 1530 in a clockwise direction.

In FIG. 63, handle 1530 has been turned about 180 degrees counter-clockwise thereby permitting spring 1534 to push up on top member 1532 releasing horizontal support member 1501.

FIG. 64 is a partial end cross section (in plane "64-64" of FIG. 58) of clamp 1507. The split 1544 in clamp body 1540 permits selective grasping of horizontal support member 1501 as per the clamping force from screw 1542 as applied through knob 1541. Stainless steel insert 1543 prevents collapse of the end of tube 1505 of the overhead assembly.

Figure 65:
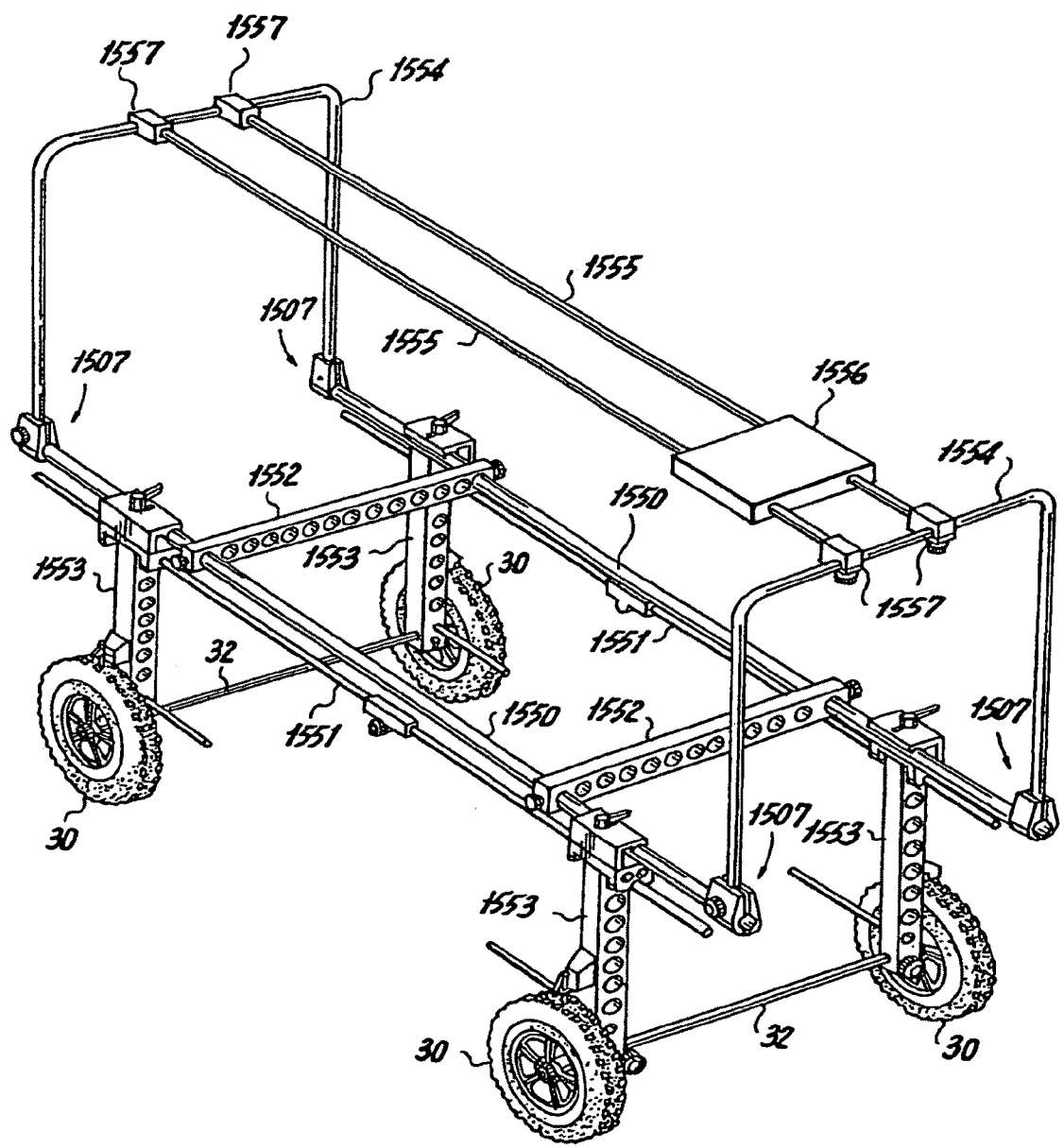
FIG. 65 is a perspective view of portable cart frame configured as an operating room table/gurney.

FIG. 65 shows yet another embodiment of the cart of this invention as a frame for a portable operating room table or a gurney. This portable operating room table/gurney includes side horizontal support members 1550, such as, for example, frame tubes, auxiliary side bars 1551, transverse frame members 1552, vertical struts 1553, overhead support frames 1554, overhead rails 1555, trolley 1556, and attachment clamps 1557. The portable operating room table/gurney rides on four wheels 30 with axles 32.

Figure 66:
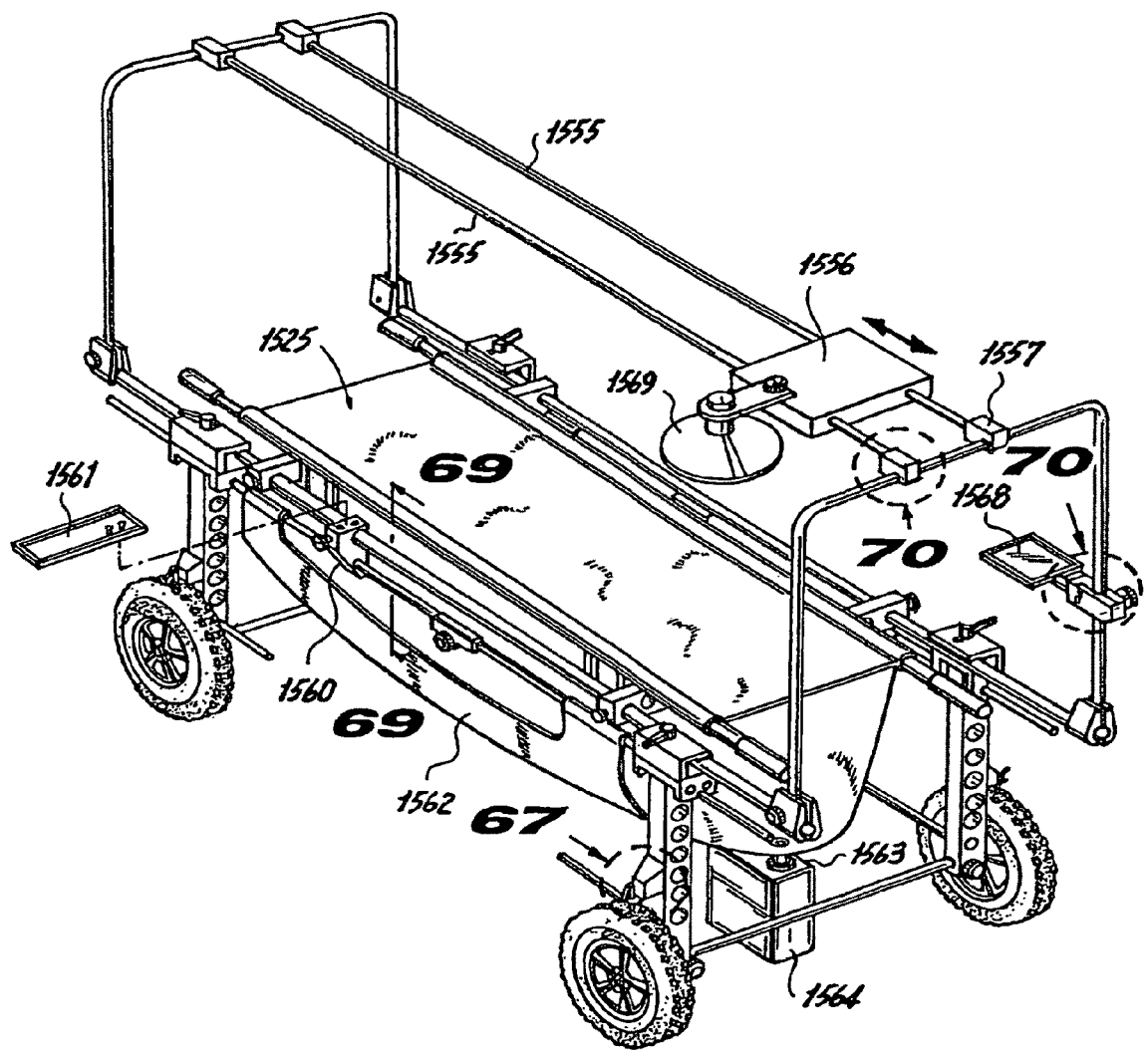
FIG. 66 is a perspective view of operating room table/gurney.

The fully configured gurney is shown in FIG. 66. Additional features shown include flexible fluid capture collection sling 1562, fluid collection tube 1563, fluid collection tank 1564, adjustable side clamp 1560, side rest or surgical instrument table 1561, wheel brakes 1558, and overhead accessory 1569 for attaching lights or other surgical accessories.

Figure 67:
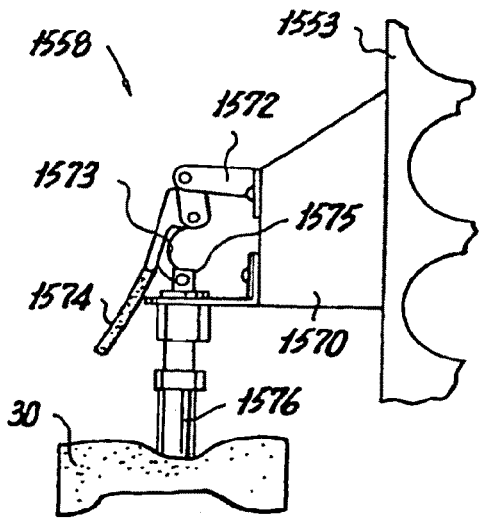
FIG. 67 is an end view of wheel brake mechanism in applied position.
Figure 68:
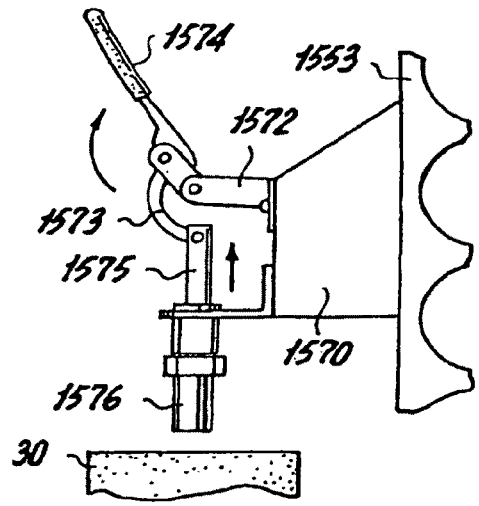
FIG. 68 is an end view of wheel brake in an off position.

FIGS. 67 and 68 show the construction and operation of wheel brake assembly 1558. Brake frame 1570 is rigidly attached to vertical strut 1553. Upper pivot frame 1572 works in conjunction with handle/link 1574, curved spring link 1573, and plunger shaft 1575 to form an "over-center" mechanism with two stable states, clamped or unclamped.

In FIG. 67, handle 1574 is pushed down into a snap-locked position pushing tip 1576 into contact with wheel 32 tire 1571 thereby contacting the top surface and deforming it to prevent wheel 32 from rotating.

FIG. 68 shows the "brake-off" position which is obtained by lifting handle 1574 past the center position thereby lifting tip 1576 out of contact with tire 1571.

Figure 69:
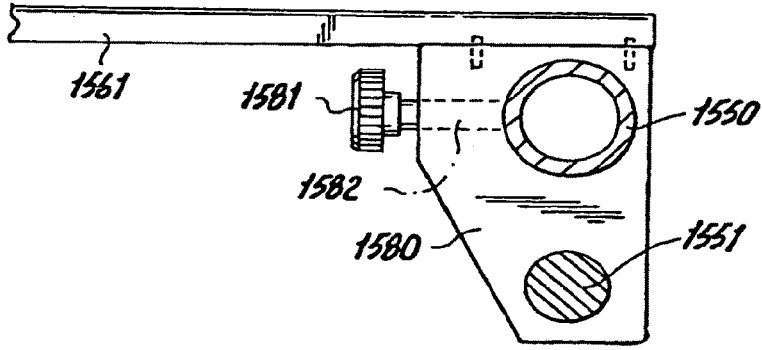
FIG. 69 is an end view of side rail adjustable clamp.

FIG. 69 is an end view of adjustable side clamp 1560 with side tube 1550 and auxiliary rod 1551 in cross section (see plane "69-69" in FIG. 66). Instrument table 1561 attached to clamp body 1580 can be moved longitudinally along tube 1561 and locked in place as desired by turning knob 1581 which impinges the end of screw 1582 against horizontal support member 1550.

FIG. 70 shows an exploded view of attachment clamp 1557 used in a variety of locations on overhead frames 1554. It includes main body 1590 with groove 1591, outer clamp member 1593 with lip 1593 and screw 1596 with knob 1595. In operation, lip 1593 pivots within groove 1591; tube 1554 is grasped by the concave surfaces of body 1590 and outer member 1593 as tightened by screw 1596. A tube end 1594 which can represent a tube 1555 or an accessory 1568 is inserted in the hole in the end of body 1590 and locked.

Figure 71:
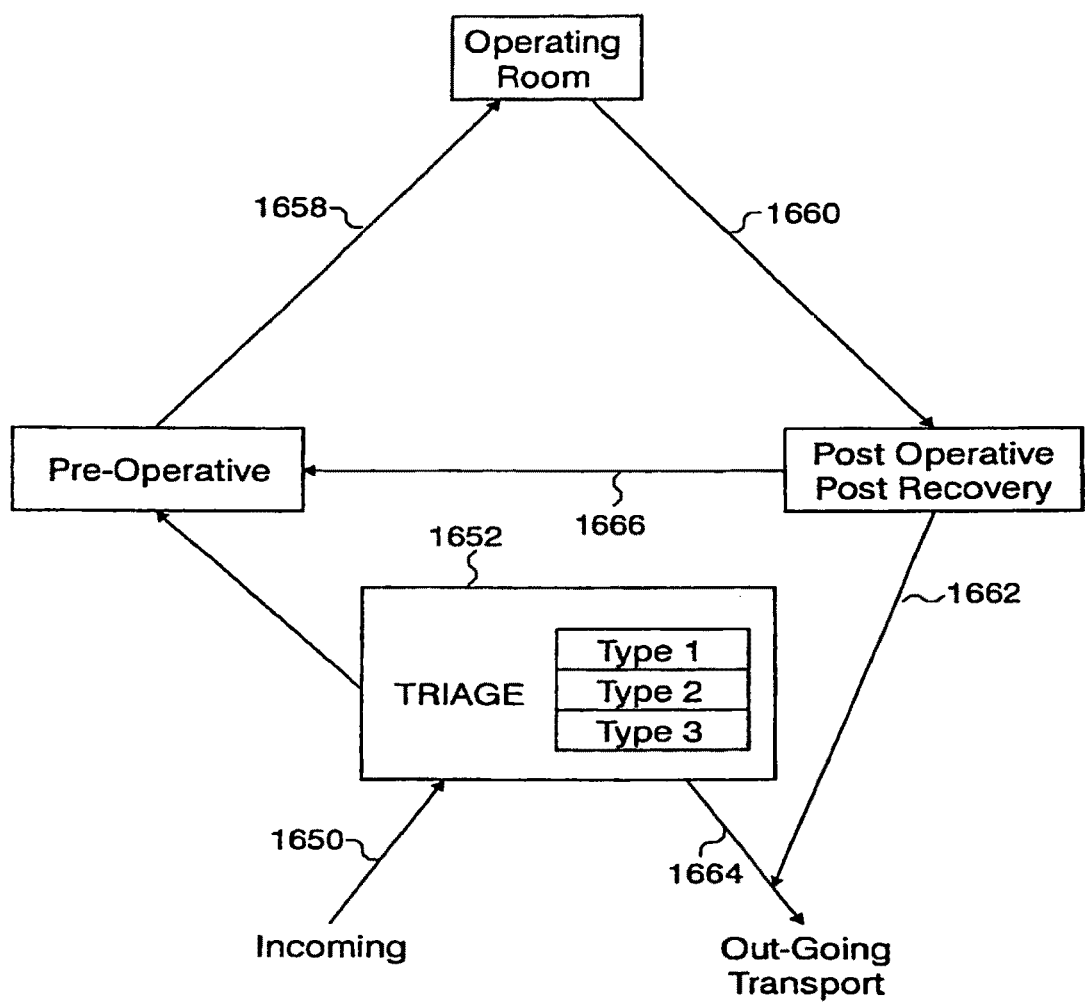
FIG. 71 is a diagrammatic flow chart of use of the convertible cart/utility table of the present invention in a medical emergency response triage environment.

FIG. 71 is a flow chart showing the use of the convertible cart/utility table of the present invention in a medical emergency response triage environment.

For example, in disaster medical care, triage is the medical screening of patients to determine their relative priority for treatment. Three groups are defined, the first is those casualties not expected to survive even with treatment, second is the group who will recover without treatment, and third the highest priority group who need treatment in order to survive. FIG. 71 illustrates how the convertible cart/utility table (CCUT) of this invention can be utilized in this environment.

For example, as in FIG. 71, incoming casualties 1650 arrive at triage center 1652 by ambulance, helicopter or otherwise. Here they are screened into the three categories, labeled "Type 1", "Type 2" and "Type 3" and those who can be treated are then transported via exit path 1654 to field hospital unit 1656 by using a wheeled version of the Convertible cart/utility table (CCUT). After prep at a Pre-Operative Station, the patient is wheeled via path 1658 to the Operating Room (OR) where a table version of the Convertible cart/ utility table (CCUT) is used in a utility table mode as an operating platform. Patient is then wheeled upon Convertible cart/utility table (CCUT) via path 1660 to the Post-Operative/ Post Recovery station for monitoring, which may be done, on either a wheeled or table version of Convertible cart/utility table (CCUT). The patient may need further surgery, which would require transporting wheeled on Convertible cart/utility table (CCUT) back via path 1666 to the Pre-Operative Station. If Patient is sufficiently recovered, he or she is transported via path 1662 upon wheeled Convertible cart/utility table (CCUT) back to triage center 1652 vicinity for further transportation merging with others from triage in the outgoing exit queue path 1664.

Besides triage use of the present invention, the grouping of the equipment carts into a deployable 10-bed Medical Emergency Response Facility (MERF)™ supports disaster relief missions with 24 hour or less deployment worldwide and is operational with minimal personnel within one hour. The equipment itself is mission adaptable. It can be shipped from storage facilities using any appropriate platform, or it can be dispersed in local storage in the vicinity of health care facilities which may become overrun in an emergency situation. The MERF™ units are modular and expandable. Their roles include casualty evacuation, treatment, or collection. They also can supply electrical power, purified water, oxygen, X-ray, and critical care. A single MERF™ can operate without external supplies for 72 hours; it is housed preferably within ten units of 50 cubic feet each and approximately 750 pounds each, totaling 500 cubic feet for delivery and weighs approximately 7500 pounds for the ten units combined. Weight for each unit can be up to 1200 pounds where heavy medical machines are carried. No heavy lift capability is required after deployment to the vicinity of operation. A configuration of multiple MERF™ units can be reconfigured without recourse to powered vehicles.

The adaptability of MERF™ enables the use of alternative disaster protocols that minimize personnel requirements and maximize casualty support at all levels. FIGS. 71A-71F provide an example contrasting the MERF™ protocol with current protocol in dealing with a major disaster in the vicinity of an existing Health Care Facility (HCF).

FIG. 71A shows the situation soon after a major disaster with hundreds to thousands of casualties and the existing HCF overwhelmed by walk-in patients.

Using the current protocol shown in FIG. 71B, a large deployable fleet-type HCF of 100-bed capacity is brought in and set up in the vicinity of the existing HCF. While surge capacity has been addressed, other issues remain open.

Figure 71C:
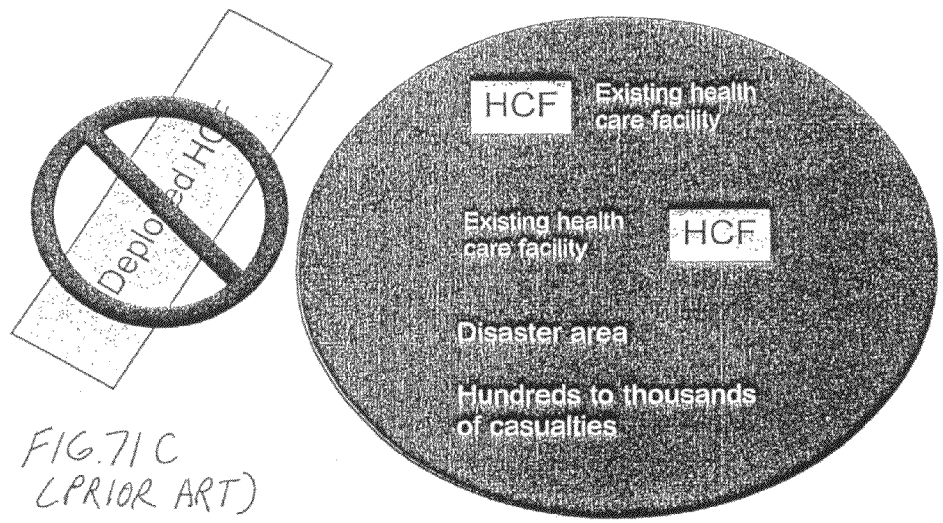
FIGS. 71A-71C are a set of diagrammatic illustrations contrasting protocols of this invention with current protocols in handling major disasters at existing health care facilities.

A major potential problem with the current protocol is illustrated in FIG. 71C. The 100-bed deployed HFC suffers a chemical/biological impact with probable loss of 100% of the mobile facility. The vulnerability of large single-unit facilities in unquestionable.

Figure 71D:
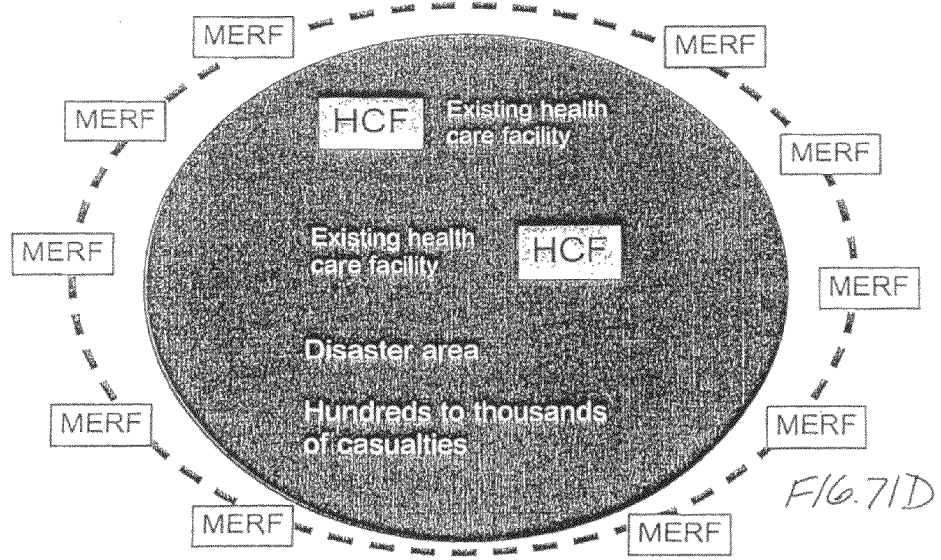
FIG. 71D illustrates the same addition of 100 bed capacity using the protocol enabled by this invention through the dispersed location of 10 separate 10-bed units adjacent to the existing HCF.

FIG. 71D shows how the protocol is changed by the arrival of 10 MERF™ units which are now dispersed around the periphery of the existing HCF.

Figure 71E:
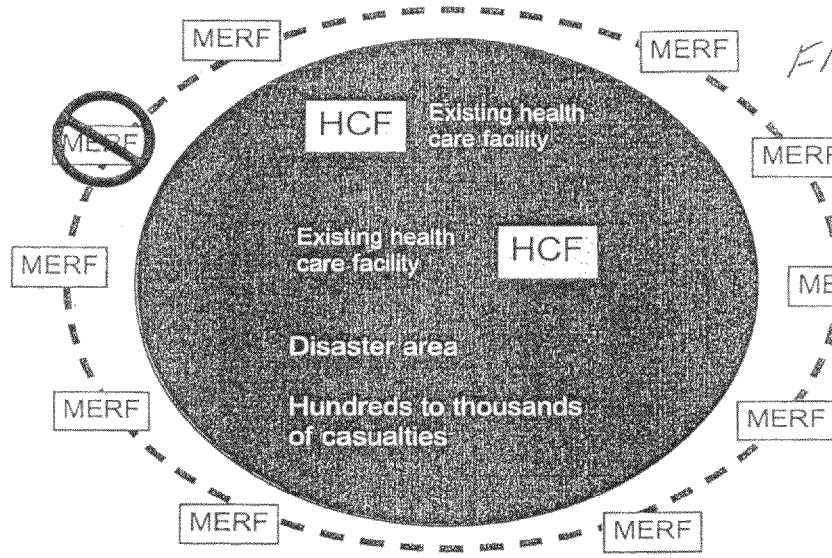

FIG. 71E shows the result of the same impact as shown previously in FIG. 71C. However here the results are vastly different. While an entire 10-bed MERF™ unit is taken out, this represents only 10% of the capability of the deployed units.

Figure 71F:
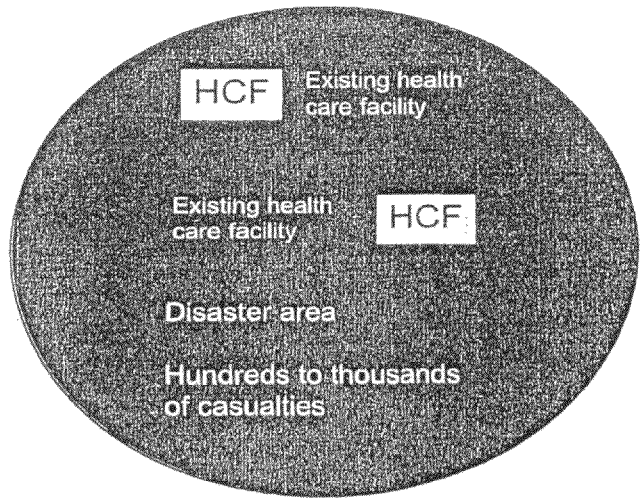

FIG. 71F shows the situation 72 hours later after some stability has been achieved. MERF™ units are re-supplied and relocated to treat additional casualties or consolidated to establish a more permanent 100 bed facility.

FIG. 72 shows an exploded view of the major components of convertible cart/utility table (CCUT) 1700 for supporting stretcher 1730 thereon. These include axle support struts 1712 with rail clamps 1716 at the top ends and wheels 1718 located by axle 1715. Kick stands 1704, used with heavy duty rail clamps 1714, convert convertible cart/utility table (CCUT) to the stationary utility table configuration. Adjustable feet 1710 provide a high friction surface and terrain adjustability. Macro adjustment of leveling or height is via multiple holes 1706, in kickstand like 1704, which accept spring pin 1713 attached near the end of foot extension 1708. Side rails 1702 complete the basic structure.

Figure 73:
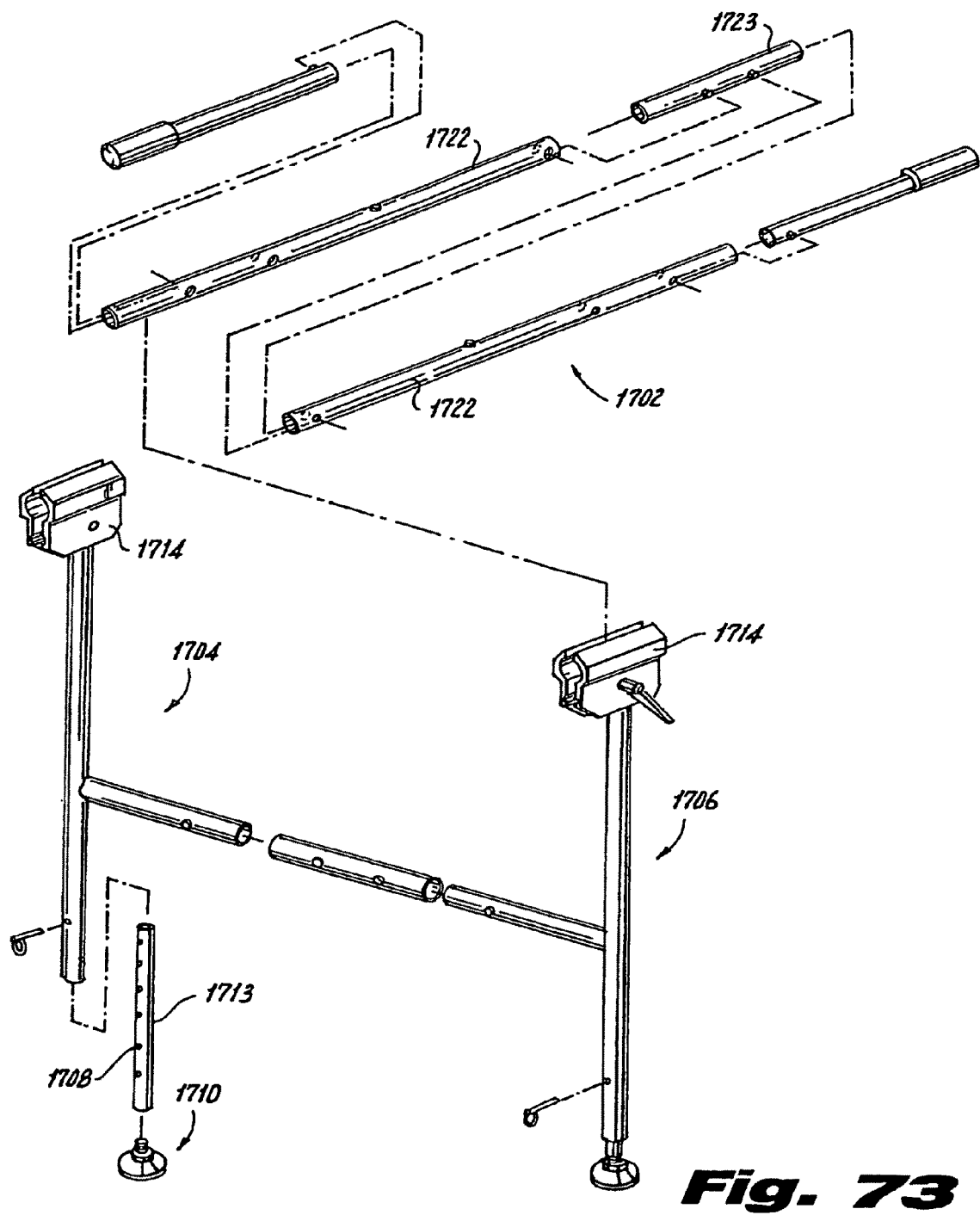

FIG. 73 shows side rails 1702, which are mounted to kickstands 1704 by clamps 1714, which engage tubing rails 1702. Tubing rails 1702 have middle connecting tube 1723 and side tubes 1722, connected by connectors, such as, for example, spring pins and holes.

FIG. 74 shows convertible cart/utility table (CCUT) 1700 configured as a utility table with auxiliary power pack 1732 and stretcher 1730.

Figure 75:
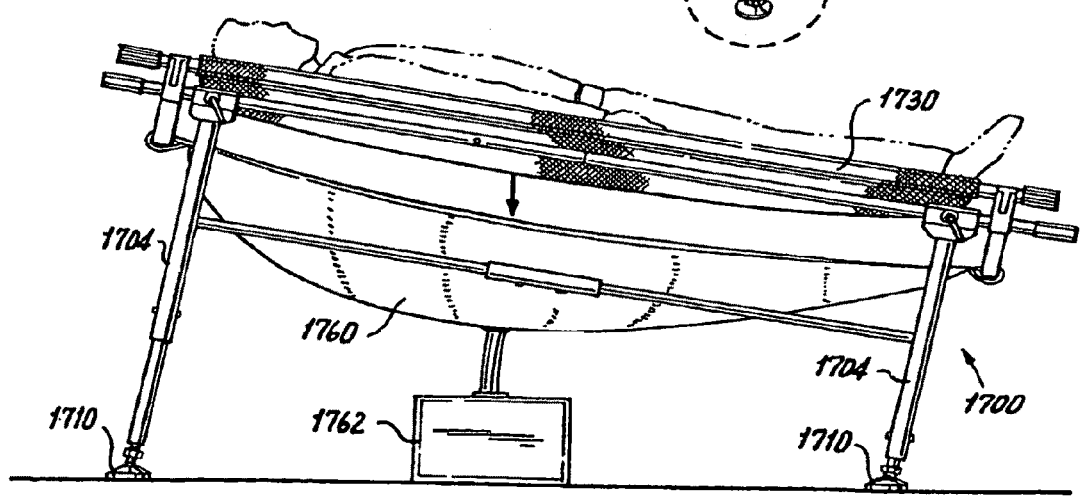

FIG. 75 shows the feature, which tilts the table top by adjusting the height of kickstands 1704 on different ends at different heights. FIG. 75 also shows an optional body fluid capture collector 1760 such as a concave sling connected to a medical waste collector 1762.

FIG. 76 shows details of kickstand foot 1710. Threshold shaft 1752 is screwed into nut 1754 and into foot extension 1713 thereby providing a micro adjustment of height up to about one inch. High friction pad 1756 and tilt adjustment ball and socket joint 1754 complete foot 1710.

FIG. 77 shows reversible clamp 1800, as in FIG. 43A, which is used with convertible cart/utility table (CCUT) 1700. It includes housing block 1802, with rail aperture 1812, which clamps onto tubing 1722 via lever screw 1814. Groove 1816 receives tubing rail 1730, such as that from a stretcher, which rail 1730 is locked in place via over-center clamp 1804 with jaw 1808, operable by actuator lever 1810. The opposite grooves 1818, 1820 and 1822 are spaced laterally to accommodate stretchers of different widths. These can be optionally locked via a clamp 1806 having a jaw similar to jaw 1808, which is moved to the desired groove 1818, 1820 or 1822.

FIG. 78 shows reversible clamp 1800 inverted to use the multiple width grooves 1818, 1820 or 1822.

FIGS. 79 and 80 show details of heavy duty clamp 1900, which has upper block 1902 with groove 1904 to receive a stretcher side tube 1730. Over-center latch 1906 locks stretcher tube via jaw 1910 and actuator lever 1908. Lower block 1912 has side rail groove 1920, holding rail 1722, which groove 1920 is lockable via latch 1914 with jaw 1918 and lever 1916. Lower extension 1922 accommodates either stretcher tube or fluid drape in groove 1924.

A preferred embodiment of heavy duty stretcher clamp 2150 is illustrated in FIGS. 80A-80E. Clamp 2150 has body 2152 with a lower extension with a transverse hole to receive side tube 1722 (or its equivalent) which is locked via a fastener, such as a nylon tipped knob screw 2158. The upper section of body 2152 has a groove to accept blade 1902 (or similarly shaped elements). Blade tightening panel 2154 uses a mechanical incremental moving device, such as a ratchet handle 2156, for tightening blade 1902 in its appropriate position. Lower stretcher tube holder 2160 is used, for example, in a Trendelenburg maneuver; it is screwed to rectangular crossection cross member 2162, which is also screwed into the bottom of body 2152.

FIGS. 80A and 80B show blade 1902 in the extended position supporting stretcher 1730 tube at the upper position, and retracted with stretcher tube resting on holder 2162 respectively.

The view of FIG. 80C shows the two accessory pole support holes 2164 which can be used for IV poles.

FIGS. 80D and 80E show details of the stretcher pole hook 1904. The inner hook surface is preferably chamfered on each side 2168 of a central region 2170 to provide flat bearing surfaces to a stretcher tube in either tilt position as well as the flat position.

The end view of clamp 1900 in FIG. 81 shows that upper retaining latch block 1932 can pivot to permit stretcher tube 1930 to tilt relative to side rail 1722.

In the more complete perspective view of FIG. 82, it can be seen that the lower (foot) end of stretcher rail 1731 of stretcher 1730 is then supported by recess or groove 1924 in the lower extension 1922 of the second clamp 1900.

A kit 2180 of components for the attachment of stirrups using the preferred embodiment stretcher clamp 2150 is shown in FIGS. 82A-82C. The kit includes two stirrups (or foot supports) 2182 with attached stirrup support rods 2184, two bent stirrup support bars 2192 with attached rod clamps 2186, stretcher clamp tightening plate with stretcher bar access hole 2196, and stirrup blade extension 2200. In operation, hole 2190 in stirrup rod clamp 2186 accepts rod 2184 which is then tightened by clamping screw with knob 2188. Tightening plate 2196 with accessory pole support holes 2197 is substituted for part 2154 of stretcher clamp 2150. Then stirrup blade 2200 is used in a second 2150 clamp spaced away from the end stretcher clamp. The distal end of bent stirrup support bar 2192 is then passed through both bar access holes 2198 in plate 2196 and 2200 respectively. Blade 2200 has two holes, 2204 and 2208, in blade end 2200 to provide two positions of lateral support in clamp body 2152.

The detail drawing of FIG. 82C shows this arrangement with support bar fastener, such as, for example, retaining screw 2206 in blade 2200 (it can be used in addition or instead in hole 2199 of plate 2196). Note that blade 2200 is retained in body 2152 with a simple knob screw instead of a tightening plate.

FIG. 82B shows in schematic form two different positions of stirrups 2182 as provided by the bent angle of support bars 2192. If angled inward as shown on the left, there is a smaller distance between the stirrups as for a gynecological exam. The larger distance between the stirrups can be used for more major abdominal surgery for both male and female patients.

FIG. 83 depicts auxiliary pivotable medical support platform assembly 2000 including base 2001, clamp insert 2002 and platform 2003. This versatile mechanism clamps onto a side rail of the convertible cart/utility table (CCUT). Body limb member support 2004 holds a limb. Assembly 2000 has movable hinge section can swivel relative to clamp base 2016. FIG. 84 shows medical support platform assembly 2000 with pole 2022 used to support intravenous (IV) bag 2026 with infusion line 2028. Extension rod 2024 provides more height for proper infusion gravity head. Tray 2030 is similarly supported.

FIG. 85 shows medical support assembly 2000 used to support gooseneck examination/surgical lamp 2040 attached to flexible neck conduit 2042 held in and movable arm support 2046.

FIG. 86 shows another use of medical support assembled 2000 to support multiple instrument trays 2050.

A universal accessory clamp 2250 is illustrated in FIGS. 87A-87F. The parts of clamp 2250 can be understood by reference to FIG. 87A, which shows a closed configuration and FIG. 87B which shows the open jaw position. Clamp frame 2252 has a recess to accept a portion of a structural tube, threaded holes 2262 provide for other attachments. Dual accessory pole clamp 2256 is attached to frame 2252 and provides accessory pole clamping holes 2258 which are clamped via fasteners, such as clamping screws with knobs 2260. Swinging jaw 2254 is pivoted on spring pin axle 2266 and locked via swinging locking screw with knob 2270, which pivots on spring pin axle 2264 and locks within clearance groove 2272. Hole 2268 is provided for clearance of any protruding snap spring tips that may be used on tubing assemblies.

FIGS. 87C and 87D illustrate clamping around tube 1722 shown in crossection. Note gap 2274 which remains in the tightened clamped configuration to insure proper grip force on tube 1722.

FIG. 87E shows clamp 2250 in use supporting two accessory poles 2166.

FIG. 87F shows an exploded view of the use of clamp 2250 with arm support 2280. Arm support panel 2282 is attached to arm support bracket 2284 which engages pole 2166 in hole 2286 and locking screw 2288. The distal end of pole 2166 is then adjusted and clamped in one side of clamp 2256.

FIGS. 87G and 87H show details of an improved surgical lamp 2281 incorporating a feature that mechanically precludes drop-down of lamp over accessory pole 2166. Flange bracket 2285 is attached to gooseneck 2042 which is then attached to pole bracket 2287 with a blind hole at its lower end to accept accessory pole 2166. The blind hole prevents drop-down. Transverse pin 2291 in pole 2166 fits in recess 2293 at the entrance of the blind hole to prevent lamp 2281 assembly from rotating on pole 2166; this gives lamp 2281 more stability and resistance to movement when lightly brushed against personnel. Pole 2166 supporting lamp 2281 is attached via pole clamp 2256 of clamp 2250.

Yet another application of universal accessory clamp 2250 is shown in FIG. 87I. When a convenient flat table top exists, it can be converted into a base for a stretcher for holding or operating on a patient. This is accomplished by using a flat crossbar 2162 which is attached to a pair of clamps 2250 using threaded screw holes 2262. The width of the crossbar is such that stretcher poles 1730 are conveniently gripped at the correct position. One such crossbar with attached clamps 2250 and short legs with feet 2295 is used at the front and at the rear of the stretcher. Each clamp 2250 has two accessory pole clamps which can be used to support one or more intravenous fluid dispensers (IV's) or transfusion bags as needed.

A preferred embodiment of lower leg clamp 2300 is shown in FIGS. 88A-88B. Clamp 2300 includes frame 2302, which is pinned by pin 2312 to the end of lower tube 2316. It has swinging clamping screw 2306 pinned at 2310 and swinging jaw 2304 pinned at 2314. Swinging jaw 2304 has a clearance groove 2308 for locking screw 2306. Clamp 2300 is simply placed at the desired position on leg 2318 and clamped around leg 2318 and tightened. This provides quick attachment or detachment or adjustment of the distance from foot 2320. Pin 2330 facilitates up or down movement of leg 2318. Note, all elements of clamp 2300 are permanently attached.

FIG. 89 shows a portable medical utility table 2400 with many of the features and accessories described in the earlier drawings. It is an example of a "bed" serving one patient that can be one of many in a reconfigurable, modular, expandable, transportable, mobile, medical critical care point of need field installation system.

It is further noted that other modifications may be made to the present invention, without departing from the scope of the invention.

I claim:

1. A method of responding to a disaster including medical casualties at a remote site comprising the steps of:
   transporting a plurality of compact, complementary, portable modules to the site, each said module comprising a medical emergency response facility (MERF);
   each MERF comprising a set of complementary components including removable, replaceable support frame substantially parallel load supporting rail Members having alternately removable repositionable wheeled strut assemblies and complementary removable repositionable stationary table support stanchions, said support frame rail members further having removable repositionable clamps supporting complementary equipment and patient supports,
   configuring or reconfiguring the components of each module to one of a plurality of specific functional configurations including reconfiguring a wheeled convertible cart/utility table to a stationary utility table, and a portable utility table having a bed for serving one patient being reconfigured to one of a number of other elements of a field installation system to enable a specific MERF mode of operation therewith, which configured or reconfigured modules in an aggregate interoperate to enable emergency responders an ability to optimally provide medical care to disaster survivors, whereby a module is refigured to form a different specific function when required;
   arranging said modules around said disaster area wherein said modules having specific configurations provide first medical responders with the ability to treat survivors;
   configuring some of said modules for performing triage of disaster survivors, caring for patients including pre-operative, surgical operative and post operative recovery categories with equipment carried and supported by said modules, and then transporting said patients away from said disaster area;
   reconfiguring each of said compact, complementary reconfigurable modules by sliding a plurality of releasable rail engaging clamps upon said pair of substantially parallel load supporting frame rail members, and selected to fix said first plurality of releasable rail engaging clamps to various positions along each selected rail of said pair of substantially parallel load supporting rails, and reconfiguring said compact, portable complementary reconfigurable modules to one of said specific MERF function or mode of operation;
   providing at least one air of strut assemblies and connecting each respective strut of said pair of strut assemblies at one end to a wheel and releasably connecting each respective strut of said pair of strut assemblies at its other end to one first pair of releasable rail engaging clamps of said plurality of releasable rail engaging clamps;
   attaching a carrier for at least one of a plurality of medical emergency response components to a second pair of releasable rail engaging clamps; said carrier for said plurality of medical emergency response components selected from the group consisting of a patient support stretcher or Stokes carrier; a height adjustment attachment for adjusting the respective height of the patient's head and/or foot; a support for an elevated medical medicine dispensing carrier; a support for a medical instrument tray; a support for a power source; a pivotal bin containing equipment and supplies; a support for a patient vital sign measuring device; a support for a medical imaging device; a communication device, a support for a light, a tent structure and/or a patient limb support;
   changing a module from a movable module to a stationary module by removing and replacing said pair of strut assemblies with said wheel with at one least pair of table support stanchions and placing said compact, portable complementary, reconfigurable module at said specified location, and adjusting each stanchion at one end for stable placement on terrain and releasably connecting each stanchion at its other end to said first pair of rail engaging clamps of said plurality of releasable rail engaging clamps;

attaching one or more of said plurality of medical emergency response components by said second pair of rail engaging clamps, each of which components and their respective operation define the configurable nature of the module with respect to one said plurality of MERF specific modes of operation;

configuring some of said modules for performing triage of disaster survivors, caring for patients including pre-operative, surgical operative and post operative recovery categories with equipment carried and supported by said modules, and then transporting said patients away from said disaster area.

2. The method of responding as set forth in claim 1, wherein transporting comprises using handles releasably connectable to modular support frames to hand carry said modules to said disaster site.

3. The method of responding as set forth in claim 1, wherein transporting includes using any roadway motor vehicle trailers, air transportation means and water transportation means to deploy said modules.

4. The method of responding as set forth in claim 1, wherein a module has a bin which includes a plurality drawers and compartments and wherein said step of configuring includes detaching said bin from a frame and arranging it so that said drawers and compartments are readily accessible to responders.

5. The method of responding as set forth in claim 4, wherein said at least one bin includes an amount of medical treatment supplies and apparatus to operate without external supplies for a minimum of 72 hours out to whatever is required.

6. The method of responding as set forth in claim 1, wherein a specific module includes a source of medical supplies and apparatus available for medical treatment drinking water, oxygen, surgical tools, medicines, fluoroscopic equipment, cardiac monitoring equipment, cardiac resuscitation equipment, cauterization equipment and sterilization equipment.

7. The method of responding as set forth in claim 1, wherein a plurality of bins in specific module configurations are deployed to operate as a covered triage platform, a covered pre-operative platform, a covered operating and a covered post-op recovery platform, respectively, in an interoperable arrangement to assist field surgery in a ergonomically optimized and substantially hygienic fashion.

8. The method of responding as set forth in claim 1, wherein ten or more of said plurality of modules are deployed specifically configured or reconfigured, and linked together to form a field hospital.

9. A method of responding to a disaster including medical casualties at a remote site comprising the steps of:

transporting a plurality of compact, complementary, portable modules to the site, each said module comprising a medical emergency response facility (MERF);

each MERF comprising a set of complementary components including removable, replaceable support frame members having alternately removable repositionable wheeled struts and complementary removable repositionable stationary stanchions, said support frame members further having removable repositionable clamps supporting complementary equipment and patient supports, configuring or reconfiguring the components of each module to one of a plurality of specific functional configurations to enable a specific MERF mode of operation therewith, which configured or reconfigured modules in an aggregate intemperate to enable emergency responders an ability to optimally provide medical care to disaster survivors;

arranging said modules around said disaster area wherein said modules having specific configurations provide first medical responders with the ability to treat survivors;

configuring some of said modules for performing triage of disaster survivors, caring for patients including pre-operative, surgical operative and post operative recovery categories with equipment carried and supported by said modules, and then transporting said patients away from said disaster area;

providing modules with a modular support frame comprising a pair of substantially parallel load supporting rails;

reconfiguring each of said compact, portable, complementary reconfigurable modules by sliding a plurality of releasable rail engaging clamps upon said pair of substantially parallel load supporting rails, and selected to fix said first plurality of releasable rail engaging clamps to various positions along each selected rail of said pair of substantially parallel load supporting rails, and reconfiguring said compact, portable complementary reconfigurable modules to one of said specific MERF function or mode of operation;

providing at least one pair of strut assemblies, and connecting each respective strut of said pair of strut assemblies at one end to a wheel and releasably connecting each respective strut of said pair of strut assemblies at its other end to one first pair of releasable rail engaging clamps of said plurality of releasable rail engaging clamps;

attaching a carrier for at least one of a plurality of medical emergency response components to a second pair of releasable rail engaging clamps; said carrier for said plurality of medical emergency response components selected from the group consisting of a patient support stretcher or Stokes carrier; a height adjustment attachment for adjusting the respective height of the patients head and/or foot; a support for an elevated medical medicine dispensing carrier; a support for a medical instrument tray; a support for a power source; a pivotable bin containing equipment and supplies; a support for a patient vital sign measuring device; a support for a medical imaging device; a communication device, a support for a light, a tent structure and/or a patient limb support;

changing a module from a movable module to a stationary module by removing and replacing said pair of strut assemblies with, said wheel with at one least pair of table support stanchions and placing said compact, portable complementary, reconfigurable module at said specified location, and adjusting each stanchion at one end for stable placement on terrain and releasably connecting each stanchion at its other end to said first pair of rail engaging clamps of said plurality of releasable rail engaging clamps;

attaching one or more of said plurality of medical emergency response components by said second pair of rail engaging clamps, each of which components and their respective operation define the configurable nature of the module with respect to one said plurality of MERF specific modes of operation;

providing at least one bin that is releasably connectable to said modular support frame structure of said compact, portable, complementary reconfigurable, modules using a number of said plurality releasable rail engaging clamps and storing within said bin during transport said plurality of releasable rail engaging clamps, the at least one pair of strut assemblies, the at least one pair of table support stanchions and the plurality of medical emergency response components; and configuring some of said modules for performing triage of disaster survivors, caring for patients including pre-operative, surgical operative and post operative recovery categories with equipment carried and supported by said modules, and then transporting said patients away from said disaster area.

10. The method of responding as set forth in claim 9, further comprising the steps of providing each of said plurality of releasable rail engaging clamps with a lower jaw and moving said lower jaw for releasable contact with one of said rails, providing an upper jaw mounted on said lower jaw, gripping said frame support rails within respective longitudinally extending recesses in each upper jaw, wherein said upper and lower jaws when assembled include optional cooperating recesses; gripping a medical accessory support or said patient support stretcher or said stokes carrier and attaching said clamp to said support member by threaded members.

11. The method of responding as set forth in claim 9, wherein said step of raising or lowering a patient in height adjustment attachment for adjusting the respective height of the patient's head and/or foot comprises maneuvering the patient into Trendelenburg positions with raised or lowered head and/or feet.

12. The method of responding as set forth in claim 9, further comprising the step of providing said at least one bin with a top shell container having a top outer surface and an opposing top inner surface; a bottom shell having a bottom outer surface and an opposing bottom inner surface, and providing said top outer surface of said at least one bin with an interchangeable boss arrangement and the bottom outer surface including a recess arrangement corresponding with the boss arrangement; aligning said at least one bin to a plurality of bins and vertically stacking one bin on top of each other bins of said plurality of bins when detached from said frame, wherein further each top surface may independently function as a table surface.

13. The method of responding as set forth in claim 9, further comprising the step of limiting each of said plurality of compact, complementary, portable modules to a maximum size up to 50 cubic feet storage space, to a maximum weight of no more than 1200 pounds and to facilitate its deployment and configuration or reconfiguration by a single responder.

14. The method of responding as set forth in claim 9 further comprising the step of providing at least one bin that is releasably connectable to said modular support frame ail structure of said compact, portable, complementary reconfigurable, modules using a number of said plurality releasable rail engaging clamps and storing within said bin during transport said plurality of releasable rail engaging clamps, the at least one pair of strut assemblies, the at least one pair of table support stanchions and the plurality of medical emergency response components.

* * * * *